US009877299B2

(12) United States Patent
Smith

(10) Patent No.: US 9,877,299 B2
(45) Date of Patent: Jan. 23, 2018

(54) METHOD AND SYSTEM FOR PERFORMING TRILATERATION FOR FIXED INFRASTRUCTURE NODES (FIN) BASED ON ENHANCED LOCATION BASED INFORMATION

(71) Applicant: Rivada Research, LLC, Colorado Springs, CO (US)

(72) Inventor: Clint Smith, Warwick, NY (US)

(73) Assignee: RIVADA RESEARCH, LLC, Colorado Springs, CO (US)

( * ) Notice: Subject to any disclaimer, the term of this patent is extended or adjusted under 35 U.S.C. 154(b) by 0 days.

(21) Appl. No.: 15/434,017

(22) Filed: Feb. 15, 2017

(65) Prior Publication Data

US 2017/0164318 A1 Jun. 8, 2017

Related U.S. Application Data

(63) Continuation-in-part of application No. 15/284,806, filed on Oct. 4, 2016, now Pat. No. 9,723,453, which
(Continued)

(51) Int. Cl.
*H04W 24/00* (2009.01)
*H04W 64/00* (2009.01)
(Continued)

(52) U.S. Cl.
CPC ............ *H04W 64/003* (2013.01); *G01C 5/06* (2013.01); *G01C 17/02* (2013.01); *G01C 21/00* (2013.01);
(Continued)

(58) Field of Classification Search
CPC ....... H04W 4/02; H04W 64/00; H04W 4/025; H04W 64/003; G01S 19/42; G01S 5/0289;
(Continued)

(56) References Cited

U.S. PATENT DOCUMENTS 6,990,351 B2 1/2006 Tsunehara et al.
7,764,231 B1 7/2010 Karr et al.
(Continued)

FOREIGN PATENT DOCUMENTS

CN 1688892 A 10/2005
CN 101305567 A 11/2008
(Continued)

OTHER PUBLICATIONS

First Office Action Issued by State Intellectual Property Office for Chinese Application No. 201280050710.4 dated Oct. 31, 2014.
(Continued)

*Primary Examiner* — Nhan Le
(74) *Attorney, Agent, or Firm* — The Marbury Law Group, PLLC

(57) ABSTRACT

Method, systems and devices for performing trilateration for a fixed infrastructure node (FIN) using enhanced location based information may include receiving a plurality of inputs (e.g., waypoints) from a plurality of devices, using the received plurality of inputs to generate an initial positional fix, and setting a current waypoint of the FIN based the initial positional fix. The FIN may receive additional inputs, and use the plurality of inputs to generate updated (more accurate) location information for the FIN. The FIN may update its current waypoint based on the generated updated location information. The FIN trilateration operation may also include applying three or four of the received inputs (e.g., waypoints) kalman filter, and reporting/using the output of the kalman filter as the device's current waypoint or location.

20 Claims, 66 Drawing Sheets

Related U.S. Application Data is a continuation of application No. 14/993,618, filed on Jan. 12, 2016, now Pat. No. 9,485,623, which is a continuation-in-part of application No. 14/950,595, filed on Nov. 24, 2015, now Pat. No. 9,344,848, which is a continuation of application No. 14/823,244, filed on Aug. 11, 2015, now Pat. No. 9,332,386, which is a continuation of application No. 14/293,056, filed on Jun. 2, 2014, now Pat. No. 9,232,354, which is a continuation of application No. 13/585,125, filed on Aug. 14, 2012, now Pat. No. 8,787,944.

(60) Provisional application No. 62/295,788, filed on Feb. 16, 2016, provisional application No. 61/575,300, filed on Aug. 18, 2011, provisional application No. 61/573,636, filed on Sep. 9, 2011.

(51) Int. Cl.

| | | |
|---|---|---|
| *G01S 19/46* | (2010.01) | |
| *G01C 5/06* | (2006.01) | |
| *G01C 17/02* | (2006.01) | |
| *G01C 21/00* | (2006.01) | |
| *G01S 5/00* | (2006.01) | |
| *H04W 4/00* | (2009.01) | |
| *H04W 4/02* | (2009.01) | |
| *H04W 4/22* | (2009.01) | |
| *G01S 19/13* | (2010.01) | |
| *G01S 19/48* | (2010.01) | |
| *G01S 5/02* | (2010.01) | |

(52) U.S. Cl.
CPC .......... *G01S 5/0072* (2013.01); *G01S 5/0284* (2013.01); *G01S 5/0289* (2013.01); *G01S 5/0294* (2013.01); *G01S 19/46* (2013.01); *H04W 4/008* (2013.01); *H04W 4/02* (2013.01); *H04W 4/023* (2013.01); *H04W 4/025* (2013.01); *H04W 4/026* (2013.01); *H04W 4/027* (2013.01); *H04W 4/028* (2013.01); *H04W 4/22* (2013.01); *H04W 64/00* (2013.01); *G01S 5/0263* (2013.01); *G01S 19/13* (2013.01); *G01S 19/48* (2013.01); *H04M 2250/10* (2013.01)

(58) Field of Classification Search
CPC ........ G01S 19/46; G01S 5/021; G01S 5/0205; G01S 5/0215
USPC ...... 455/404.1, 404.2, 456.1–456.6; 370/328
See application file for complete search history.

(56) References Cited

U.S. PATENT DOCUMENTS

| | | | |
|---|---|---|---|
| 7,769,395 B2 | 8/2010 | Fiatal | |
| 8,200,251 B2 | 6/2012 | Huang | |
| 8,306,552 B2 | 11/2012 | Sridhara | |
| 8,359,643 B2 | 1/2013 | Low et al. | |
| 8,385,964 B2* | 2/2013 | Haney | H04M 3/4228 455/404.1 |
| 8,433,334 B2 | 4/2013 | Huang | |
| 8,989,053 B1* | 3/2015 | Skaaksrud | H04W 12/06 370/255 |
| 9,161,175 B1 | 10/2015 | Smith | |
| 9,374,799 B2 | 6/2016 | Batada | |
| 9,467,803 B2* | 10/2016 | Siomina | H04W 4/02 |
| 9,485,623 B2 | 11/2016 | Smith | |
| 2002/0005804 A1 | 1/2002 | Suprunov | |
| 2005/0037775 A1 | 2/2005 | Moeglein et al. | |
| 2007/0049291 A1* | 3/2007 | Kim | G01S 5/0072 455/456.1 |
| 2007/0099634 A1* | 5/2007 | Chari | H04L 67/2804 455/456.3 |
| 2007/0232319 A1 | 10/2007 | Bells et al. | |
| 2007/0239348 A1 | 10/2007 | Cheung | |
| 2007/0275730 A1 | 11/2007 | Bienas et al. | |
| 2008/0002190 A1 | 1/2008 | Romain | |
| 2009/0047973 A1 | 2/2009 | MacNaughtan et al. | |
| 2009/0073045 A1 | 3/2009 | Supino et al. | |
| 2009/0079622 A1 | 3/2009 | Seshadri et al. | |
| 2009/0149202 A1 | 6/2009 | Hill et al. | |
| 2010/0062792 A1 | 3/2010 | Han et al. | |
| 2010/0291973 A1 | 11/2010 | Nakahara | |
| 2010/0318322 A1 | 12/2010 | Brauer et al. | |
| 2011/0009130 A1 | 1/2011 | Wu | |
| 2011/0117934 A1 | 5/2011 | Mate | |
| 2011/0124347 A1 | 5/2011 | Chen et al. | |
| 2011/0151892 A1 | 6/2011 | Vengroff et al. | |
| 2011/0171973 A1 | 7/2011 | Beck et al. | |
| 2011/0227788 A1 | 9/2011 | Lundgren et al. | |
| 2011/0276556 A1 | 11/2011 | Meier et al. | |
| 2012/0129545 A1 | 5/2012 | Hodis | |
| 2012/0286997 A1 | 11/2012 | Lin et al. | |
| 2013/0030931 A1 | 1/2013 | Moshfeghi | |
| 2013/0143596 A1 | 6/2013 | Forstall et al. | |
| 2014/0273920 A1 | 9/2014 | Smith | |
| 2014/0334463 A1 | 11/2014 | Lipman et al. | |

FOREIGN PATENT DOCUMENTS

| | | |
|---|---|---|
| CN | 101720058 A | 6/2010 |
| JP | 2005-331423 A | 12/2005 |
| JP | 2010-69910 A | 4/2010 |
| WO | 2004008171 A1 | 1/2004 |
| WO | 2011/037214 A1 | 3/2011 |
| WO | 2011-123421 A | 10/2011 |

OTHER PUBLICATIONS

Mexican Office Action Issued by the Mexican Patent Office for Mexican Application No. MX/a/2014/001745 dated May 19, 2015.
Japanese Office Action Issued by the Japanese Patent Office for Japanese Application No. 2014-526179 dated May 12, 2015 corresponding to PCT/US2012/050981.
Russian Office Action Issued by the Russian Patent Office for Russian Application No. 2014109421/01(014916) dated May 16, 2015 corresponding to PCT/US2012/050981.
Chinese Office Action Issued by the Chinese Patent Office for Chinese Application No. 201280050710.4 dated Mar. 20, 2015.
Communication Pursuant to Rules 70(2) and 70a(2) EPC Issued by the European Patent Office for European Application No. 12824068.6 dated Mar. 5, 2015.
Extended European Search Report Issued by the European Patent Office for European Application No. 12824068.6-1812 dated Feb. 16, 2015.
International Search Report and Written Opinion issued in PCT Application No. PCT/US2012/050981 dated Jan. 29, 2013.
International Preliminary Report on Patentability and Written Opinion for PCT/US2012/050981 dated Feb. 18, 2014.
Zyren, "Overview of the 3GPP Long Term Evolution Physical Layer", Freescale Semiconductor, 3GPPEVOLUTIONWPP, pp. 1-27, (Jul. 2007).
Keithley, "OFDM.MIMO Master CLass Understanding the Physical Layer Principles of WPLAN, WiMAX and LTE", www.keithley.com, pp. 1-119, (2004).
Xiong, et al. "SecureAngle: Improving Wireless Security Using Angle-of-Arrival Information", Hotnets, pp. 1-6, (Oct. 20-21, 2010).
3GPP, "3rd Generation Partnership Project; Technical Specification Group Radio Access Network; Evolved Universal Terrestrial Radio Access Network (E-UTRAN); Stage 2 functional specification of User Equipment(UE) positioning in E-UTRAN (Release 9)", 3GPP TS 36.305, V9.3.0, pp. 1-52, (Jun. 2010).
MultiService Forum , MSF Whitepaper on Location Services in LTE Networks, MultiService Forum, MSF-TR-SERVICES-005-FINAL, pp. 1-19, (2009).

(56) References Cited

OTHER PUBLICATIONS

"Comments of Motorola Mobility, Inc. and Motorola Solutions, Inc." before the Federal Communications Commission, Washington, DC 20554, Matter of Wireless E911 Location Accuracy Requirements vs E911 Requirements for IP-Enabled Service Providers, pp. 1-20, (Jan. 19, 2011).
3GPP, "3rd Generation Partnership Project; Technical Specification Group Core Network; Universal Geographical Area Description (GAD) , (Release 1999)", 3G TS 23.032, V3.1.0 pp. 1-29, (Mar. 2000).
3GPP, "LTE; Evolved Universal Terrestrial Radio Access (E-UTRA); Physical Layer Procedures (3GPP TS 36.213 version 10.1.0 Release 10)", ETSI TS 136 213 V10.1.0 pp. 1-117 (Apr. 2011).
3GPP, "LTE; Evolved Universal Terrestrial Radio Access (E-UTRA); LTE Positioning Protocol (LPP) (3GPP TS 36.355 version 10.1.0 Release 10)", ETSI TS 136 355, V10.0.0 pp. 1-115 (Jan. 2011).
3GPP, LTE; NAS Signaling for Control Plane LCS in Evolved Packet System (EPS), (3GPP TS 24.141 version 9.0.0 Release 9) ETSI TS 124 171, v9.0.0, pp. 1-19, (Apr. 2010).
Notification of Transmittal of International Search Report and the Written Opinion of the International Searching Authority, or the Declaration, International Application No. PCT/US2016/013235, dated Apr. 29, 2016.
Notification of Transmittal of th International Search Report and the Written Opinion of the International Searching Authority for International Application No. PCT/US2017/018113 dated May 24, 2017.

\* cited by examiner

Multiple Layer Antenna

Range 1X = [T1(a) − T1(b) − (Tx(a)-Tx(b))]/2

METHOD AND SYSTEM FOR PERFORMING TRILATERATION FOR FIXED INFRASTRUCTURE NODES (FIN) BASED ON ENHANCED LOCATION BASED INFORMATION

RELATED APPLICATIONS

This application claims the benefit of priority to U.S. Provisional Application No. 62/295,788, entitled "Method and System for Performing Trilateration for Fixed Infrastructure Nodes (FIN) Based On Enhanced Location Based Information" filed Feb. 16, 2016, and is a Continuation in part of U.S. patent application Ser. No. 15/284,806, entitled "Method and System for Providing Enhanced Location Based Trilateration" filed Oct. 4, 2016, which is a continuation of U.S. Non-Provisional application Ser. No. 14/993,618 entitled "Method and System for Providing Enhanced Location Based Trilateration" filed Jan. 12, 2016 (issued as U.S. Pat. No. 9,485,623 on Nov. 1, 2016), which is a continuation in part of U.S. patent application Ser. No. 14/950,595 entitled "Method and System for Providing Enhanced Location Based Information for Wireless Handsets" filed on Nov. 24, 2015 (issued as U.S. Pat. No. 9,344,848 on May 17, 2016), which is a continuation of U.S. patent application Ser. No. 14/823,244, entitled "Method and System for Providing Enhanced Location Based Information for Wireless Handsets" filed on Aug. 11, 2015 (issued as U.S. Pat. No. 9,332,386 on May 3, 2016), which is a continuation of U.S. patent application Ser. No. 14/293,056 entitled "Method and System for Providing Enhanced Location Based Information for Wireless Handsets" filed Jun. 2, 2014 (issued as U.S. Pat. No. 9,232,354 on Jan. 5, 2016), which is a continuation of U.S. patent application Ser. No. 13/585,125 entitled "Method and System for Providing Enhanced Location Based Information for Wireless Handsets" filed Aug. 14, 2012 (issued as U.S. Pat. No. 8,787,944 on Jul. 22, 2014), which claims the benefit of priority to each of U.S. Provisional Application No. 61/575,300, entitled "Method and System for Providing Enhanced Location Based Information for Wireless Handsets" filed Aug. 18, 2011, and U.S. Provisional Application No. 61/573,636, entitled "Method and System for Providing Enhanced Location Based Information for Wireless Handsets" filed Sep. 9, 2011, the entire contents of all of which are hereby incorporated by reference. This application is also related to U.S. patent application Ser. No. 14/961,088 Entitled Method and System for Providing Enhanced Location Based Server Trilateration using a Single Device filed on Dec. 7, 2015 (issued as U.S. Pat. No. 9,568,585 on Feb. 14, 2017), the entire contents of which is hereby incorporated by reference.

FIELD OF INVENTION

The present application relates generally to a wireless communication systems, and more particularly to methods and systems for performing trilateration for fixed infrastructure nodes.

BACKGROUND

Wireless communication technologies and mobile electronic devices (e.g., cellular phones, tablets, laptops) have grown in popularity and use over the past several years. To keep pace with increased consumer demands, mobile electronic devices have become more powerful and feature rich, and now commonly include global positioning system (GPS) receivers, sensors, and many other components for connecting users to friends, work, leisure activities and entertainment. However, despite these advancements, mobile devices remain lacking in their ability to provide effective location information or location based services. As mobile devices and technologies continue to grow in popularity and use, generating enhanced location information for mobile devices is expected to become an important and challenging design criterion for mobile device manufactures and network engineers.

SUMMARY

The various aspects include methods of performing trilateration for a fixed infrastructure node (FIN) using enhanced location based information, including receiving, via a processor of a FIN device, a plurality of inputs from a plurality of devices (the received plurality of inputs including two or more of a global position system (GPS) data input, a network provided location based service (LBS) data input, a mobile device LBS data input, a dead reckoning data input collected during an initial positioning of the FIN, and an external device data input), using the received plurality of inputs to generate an initial positional fix, setting a current waypoint of the FIN based the initial positional fix, using the received plurality of inputs to generate updated location information for the FIN, and updating the current waypoint based on the generated updated location information.

In an aspect, receiving the plurality of inputs from the plurality of devices may include receiving location information from one or more external devices, the received location information may include a waypoint from each of the one or more external devices, each waypoint may include a coordinate value, an altitude value and a range value, and the range value may identify a distance from an external device to the mobile device. In a further aspect, the method may include determining the validity of each of the received waypoints, performing normalization operations to normalize the received valid waypoints, assigning an overall ranking to each of the normalized waypoints, assigning a ranking to each of the normalized waypoints, and storing the normalized waypoints in memory. In a further aspect, using the received plurality of inputs to generate updated location information for the FIN may include selecting at least three waypoints from memory based on the ranking associated with each waypoint, and applying the selected waypoints to a kalman filter to generate a final location waypoint.

In a further aspect, the method may include using the current waypoint to provide a location based service. In a further aspect, using the received plurality of inputs to generate the initial positional fix for the FIN includes determining an initial latitude value (X), an initial longitude value (Y), and an initial altitude value (Z). In a further aspect, receiving the plurality of inputs from the plurality of devices may include receiving external device data from at least one passive device. In a further aspect, receiving the plurality of inputs from the plurality of devices may include receiving external device data from at least one active device. In a further aspect, the method may include an initial latitude value (X), an initial longitude value (Y), an initial altitude value (Z), a change in latitude value ($\Delta X$), a change in longitude value ($\Delta Y$), a change in altitude value ($\Delta Z$), at least three confidence values ($C_x$, $C_y$, $C_z$), and a time value ($\Delta t$). In a further aspect, the method may include generating a Q matrix information structure based on a Kalman filter, generating an R matrix information structure based on the Kalman filter, predicting an updated coordinate value, determining a covariance value, computing Kalman gain with the Kalman filter, and updating the current waypoint based on the Kalman gain.

In a further aspect, the method may include determining a confidence value for each waypoint included in the received plurality of inputs, comparing each determined confidence value to a threshold value, and discarding each input that is associated with a confidence value that does not exceed the threshold value prior to using the received plurality of inputs to generate updated location information for the FIN. In a further aspect, using the received plurality of inputs to generate updated location information for the FIN includes applying waypoints included in the received plurality of inputs to a kalman filter to generate a final location waypoint, and updating the current waypoint based on the generated updated location information includes setting the current waypoint equal to the final location waypoint. In a further aspect, applying waypoints included in the received plurality of inputs to the kalman filter to generate the final location waypoint includes applying at least three waypoints to the kalman filter to generate the final location waypoint.

In a further aspect, receiving the plurality of inputs from the plurality of devices includes receiving at least one waypoint from a mobile device that includes time and range information, the method further including sending a request for position information from the FIN device to the mobile device, receiving, via the processor, the requested position information and a time value identifying an amount of time between a first time that the mobile device received the request and a second time that the mobile device began transmission of the position information, determining a total elapse time value, and subtracting the identified amount of time from the total elapse time. In a further aspect, the method may include determining whether new location information is available, estimating a variance value base on an accuracy of the generated updated location information in response to determining that new location information is available, and extrapolating a last known location value and increasing the variance value based on an age of the generated updated location information in response to determining that new location information is not available.

In a further aspect, at least one input in the received plurality of inputs include information for determining an angle of arrival (AOA) value, time of arrival (TOA) value, or observed time difference of arrival (OTDOA) value. In a further aspect, the inputs in the received plurality of inputs include network provided LBS data that includes multiple input multiple output (MIMO) configuration information. In a further aspect, the method may include determining whether information obtained via a geospatial system of the FIN is accurate, collecting location information from a plurality of fixed wireless devices in a communication group in response to determining that the information obtained via the geospatial system is not accurate, computing more precise location information for the FIN based on the location information collected from the plurality of fixed wireless devices, the more precise location information including three-dimensional location information; and using the generated location information to provide a location based service.

In a further aspect, the method may include determining a new position based on initial latitude value (X), longitude value (Y), altitude value (Z), changes in latitude value ($\Delta X$), longitude value ($\Delta Y$), altitude value ($\Delta Z$), confidence values ($C_x$, $C_y$, $C_z$) and a time value $\Delta t$, initializing latitude value, longitude value, altitude value and an initial covariance value, determining whether the latitude value, longitude value, altitude value and an initial covariance value are available for trilateration, computing a Q matrix information structure and an R matrix information structure, predicting latitude values, longitude values and altitude values and covariance values at time equal to k−1, computing Kalman gain with a Kalman filter, and updating the latitude value, longitude value, altitude value and covariance value at time equal to k, in which the Q and R matrix information structures are associated with the Kalman filter.

Further aspects may include a fixed infrastructure node (FIN), including a processor configured with processor-executable instructions to perform operations including receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, using the received plurality of inputs to generate an initial positional fix, setting a current waypoint of the FIN based the initial positional fix, using the received plurality of inputs to generate updated location information for the FIN, and updating the current waypoint based on the generated updated location information.

Further aspects may include a non-transitory computer readable storage medium having stored thereon processor-executable software instructions configured to cause a processor in a fixed infrastructure node (FIN) to perform operations for including receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, using the received plurality of inputs to generate an initial positional fix, setting a current waypoint of the FIN based the initial positional fix, using the received plurality of inputs to generate updated location information for the FIN, and updating the current waypoint based on the generated updated location information.

Further aspects may include a fixed infrastructure node (FIN), having means for receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, means for using the received plurality of inputs to generate an initial positional fix, means for setting a current waypoint of the FIN based the initial positional fix, means for using the received plurality of inputs to generate updated location information for the FIN, and means for updating the current waypoint based on the generated updated location information.

Further aspects may include methods of providing a location based service in a fixed wireless device, including determining via a processor of a fixed wireless device whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the generated location information to provide the location based service.

In an aspect, the method may include sending GPS timing information to another fixed wireless device. In a further aspect, the method may include receiving three-dimensional location information from a mobile device. In a further aspect, the method may include relaying three-dimensional location information to another fixed wireless device. In a further aspect, collecting location information from a plurality of fixed wireless devices in a communication group includes receiving three-dimensional location information from both fixed and mobile wireless devices. In a further aspect, collecting location information from a plurality of fixed wireless devices in a communication group includes receiving location information from a network based location server. In a further aspect, collecting location information from a plurality of fixed wireless devices in the communication group includes receiving network-provided location information from network based location server in addition to location information from other fixed and mobile wireless devices.

In a further aspect, the fixed wireless device is a fixed infrastructure device, such as a small cell device, a femto cell device, or a beacon device that has GPS capabilities. In a further aspect, the fixed wireless device further includes a sensor hub including at least one of an accelerometer, a 2 or 3 axis gyro, a compass, an altimeter or a GPS transceiver, and the method further includes receiving sensor information from the sensor hub, and using the sensor information to generate the more precise location information. In a further aspect, the method may include receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, using the received plurality of inputs to generate an initial positional fix, setting a current waypoint of the FIN based the initial positional fix, using the received plurality of inputs to generate updated location information for the FIN, and updating the current waypoint based on the generated updated location information.

Further aspects may include a fixed wireless device, including a geospatial system, a memory, and a processor coupled to the memory, in which the processor may be configured with processor-executable instructions to perform operations including determining whether information obtained via the geospatial system is accurate, collecting location information from a plurality of fixed wireless devices in a communication group in response to determining that the information obtained via the geospatial system is not accurate, computing more precise location information for the fixed wireless device based on the location information collected from the plurality of fixed wireless devices, the more precise location information including three-dimensional location and position information, and using the generated location information to provide the location based service.

In an aspect, the processor may be configured with processor-executable instructions to perform operations further including sending GPS timing information to another fixed wireless device. In a further aspect, the processor may be configured with processor-executable instructions to perform operations further including receiving three-dimensional location information from a mobile device. In a further aspect, the processor may be configured with processor-executable instructions to perform operations further including relaying three-dimensional location information received from another fixed wireless device. In a further aspect, the processor may be configured with processor-executable instructions to perform operations such that collecting location information from a plurality of fixed wireless devices in the communication group further includes receiving three-dimensional location information from both fixed and mobile wireless devices. In a further aspect, the processor may be configured with processor-executable instructions to perform operations such that collecting location information from a plurality of fixed wireless devices in the communication group includes receiving location information from a network based location server. In a further aspect, the processor may be configured with processor-executable instructions to perform operations such that collecting location information from a plurality of fixed wireless devices in the communication group includes receiving network-provided location information from network based location server in addition to location information from other fixed and mobile wireless devices. In a further aspect, determining whether information obtained via the geospatial system is accurate includes determining whether information received in a fixed infrastructure device is accurate. In a further aspect, the fixed wireless device may include a sensor hub coupled to processor, the sensor hub including at least one of an accelerometer, a gyro, a compass, an altimeter or a GPS transceiver.

Further aspects may include non-transitory computer readable storage medium having stored thereon processor-executable software instructions configured to cause a processor in a fixed wireless device to perform operations including determining whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the generated location and position information to provide the location based service. In an aspect, the stored processor-executable instructions may be configured to cause a processor to perform operations further including sending GPS timing information to another fixed wireless device.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description below, serve to explain features of the invention.

DETAILED DESCRIPTION

Figure 1:
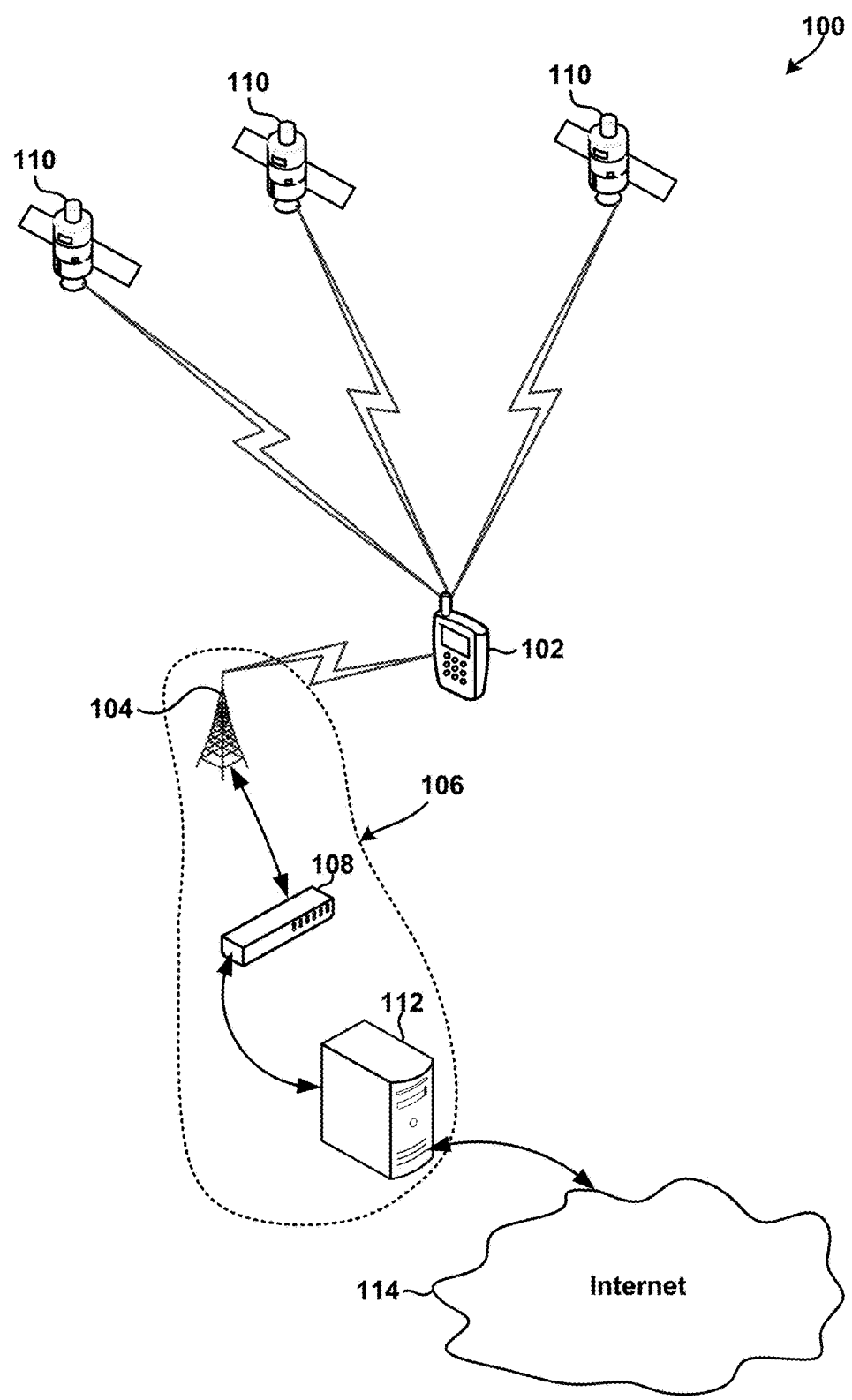
FIG. 1 is a communication system block diagram illustrating network components of an example telecommunication system suitable for use in a mobile-device centric approach for determining the location of a mobile device in accordance with various embodiments.

The various embodiments are described herein in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "cellular telephone," and "cell phone" are used interchangeably herein to refer, for example, to any one or all of cellular telephones, smart-phones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in mobile devices, such as cellular telephones, which have limited battery life, the embodiments are generally useful in any computing device that may be used to wirelessly communicate information.

The terms "wireless network", "network", "cellular system", "cell tower" and "radio access point" may used generically and interchangeably to refer to any one of various wireless mobile systems. In an embodiment, wireless network may be a radio access point (e.g., a cell tower), which provides the radio link to the mobile device so that the mobile device can communicate with the core network.

The term "fixed wireless device" is used herein to refer to any wireless device, component, or system designed for use in a fixed location. Examples of fixed wireless devices may include fixed infrastructure nodes or wireless fixed infrastructure devices (FIDs), such as femtocells, small cells, WiFi access nodes, Bluetooth® beacons, antennas attached to masts or buildings, fixed appliances, and other such devices.

Location information may include any one or more of latitude, longitude, altitude, velocity, GPS data, and/or GPS timing information for a device. Coordinates and measurements may be relative between the providing device and the receiving device, or they may be based upon a grid or other coordinate system. The devices may be a mobile device and/or a fixed infrastructure device.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EVDO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (herein collectively "solutions") are currently available for determining the location of mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OT-DOA), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

Various embodiments discussed herein may generate, compute, and/or make use of location information pertaining to one or more mobile devices. Such location information may be useful for providing and/or implementing a variety of location-based services, including emergency location services, commercial location services, internal location services, and lawful intercept location services. By way of example: emergency location services may include services relating to the provision of location and/or identification information to emergency service personal and/or emergency systems (e.g., to 911 system); commercial location services may include any general or value-added service (e.g., asset tracking services, navigation services, location-based advertising services, etc); internal location services may include services pertaining to the management of the wireless service provider network (e.g., radio resource management services, message delivery services, paging services, call delivery services, services for providing position/location network enhancements, etc.); and lawful intercept location services may include any service that provides public safety and/or law enforcement agencies with identification and/or location information pertaining to a mobile device or a mobile device user. While the various embodiments are particularly useful in applications that fall within one or more of the categories/types of location based services discussed above, the embodiments are generally useful in any application or service that benefits from location information.

Modern mobile electronic devices (e.g., mobile phones) typically include one or more geospatial positioning systems/components for determining the geographic location of the mobile device. Location information obtained by these geospatial systems may be used by location-aware mobile software applications (e.g., Google® Maps, Yelp®, Twitter® Places, "Find my Friends" on Apple®, etc.) to provide users with information regarding the mobile device's physical location at a given point in time. In recent years, such location-based services and software applications have increased in popularity, and now enable mobile device users to navigate cities, read reviews of nearby restaurants and services, track assets or friends, obtain location-based safety advice, and/or take advantage of many other location-based services on their mobile devices.

Consumers of modern mobile devices now demand more advanced, robust, and feature-rich location-based services than that which is currently available on their mobile devices. However, despite many recent advances in mobile and wireless technologies, mobile devices remain lacking in their ability to provide users/consumers with location based services that are accurate or powerful enough to meet the demands of these consumers. For example, while existing location-aware mobile software applications (e.g., "Find my Friends" on Apple®, Google® Latitude, etc.) enable a mobile device user to view the approximate geographical position of other mobile devices on a two-dimensional map, they lack the capability to accurately, efficiently and consistently pin point the precise location and/or position of the other mobile devices in all three dimensions and/or within a wireless communication network. The various embodiments overcome these and other limitations of existing solutions by collecting information from multiple mobile devices, generated more precise location information on or about one or more mobile devices, generating advanced three-dimensional location and position information on or about one or more mobile devices, and using the generated location/position information to provide mobile device users with more accurate, more powerful, and more reliable location based services.

One of the challenges associated with using geo-spatial positioning technology on a mobile device is that the mobile device's ability to acquire satellite signals and navigation data to calculate its geospatial location (called "performing a fix") may be hindered when the mobile device is indoors, below grade, and/or when the satellites are obstructed (e.g., by tall buildings, trees, etc.). The presence of physical obstacles, such as metal beams or walls, may cause multi-path interference and signal degradation of the wireless communication signals when the mobile device is indoors or in urban environments that include tall buildings or skyscrapers. In rural environments, the mobile device may not have sufficient access to satellite communications (e.g., to a global positioning system satellite) to effectively ascertain the mobile device's current location. These and other factors often cause existing geo-spatial technologies to function inaccurately and/or inconsistently on mobile devices, and hinder the mobile device user's ability to fully utilize location-aware mobile software applications and/or other location based services and applications on his/her mobile device.

Another problem with using existing geo-spatial positioning technologies is that position accuracy afforded by existing technologies may not be sufficient for use in emergency services due to the relatively high level of position accuracy required by these services.

The various embodiments include improved location determination solutions that determine the location of a mobile device at an improved level of location accuracy suitable for use in emergency location services, commercial location services, internal location services, and lawful intercept location services.

Generally, there are three basic approaches for determining the location of mobile devices in a communication network: a mobile-device centric approach, a network centric approach and a hybrid approach that may include aspects of both the mobile device centric approach and the network centric approach.

FIG. 1 illustrates an example communication system 100 suitable for implementing a mobile-device centric approach for determining the location of a mobile device 102 in accordance with various embodiments. The mobile device 102 may include a global positioning system (GPS) receiver in communication with multiple geo-spatial positioning and navigation satellites 110 and a base tower 104 of a communication network 106. The mobile device 102 may receive (e.g., via the GPS receiver) radio signals emitted by the satellites 110, measure the time required for the signals to reach the mobile device 102, and use trilateration techniques to determine the geographical coordinates (e.g., latitude and longitude coordinates) of the mobile device 102. The mobile device 102 may send the geographical coordinates to the communication network 106 at various times and/or in response to various conditions or events, such as upon initial acquisition with the communication network 106, in response to network-based requests, and/or in response to third party requests, etc.

In an embodiment, the communication network may be a cellular telephone network. A typical cellular telephone network includes a plurality of cellular base stations 104 coupled to a network operations center 108, which operates to connect voice and data calls between mobile devices 102 (e.g., mobile phones) and other network destinations, such as via telephone land lines (e.g., a POTS network, not shown) and the Internet 114. Communications between the mobile devices 102 and the cellular telephone network 106 may be accomplished via two-way wireless communication links, such as 4G, 3G, CDMA, TDMA, and other cellular telephone communication technologies. The network 106 may also include one or more servers 112 coupled to or within the network operations center 108 that provide connections to the Internet 114.

In various embodiments, the mobile device 102 may be configured to communicate with a radio access node, which can include any wireless base station or radio access point such as LTE, CDMA2000/EVDO, WCDMA/HSPA, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnection to the Internet and PSTN.

Figure 2:
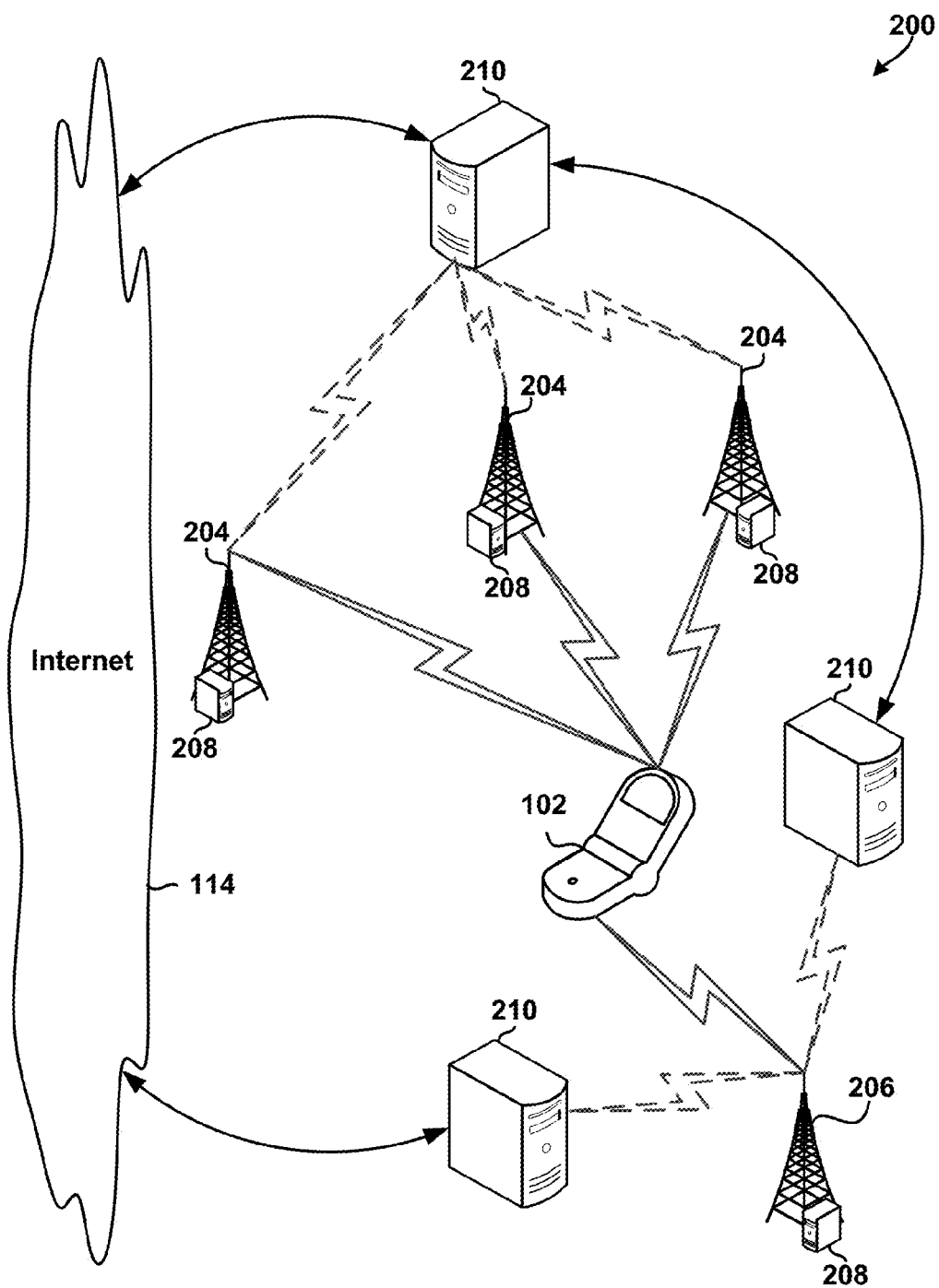
FIG. 2 is a communication system block diagram illustrating network components of an example telecommunication system suitable for use in a network-centric approach for determining the location of a mobile device in accordance with various embodiments.

FIG. 2 illustrates an example communication system 200 suitable for implementing a network centric approach for determining the location of a mobile device 102 in accordance with various embodiments. The mobile device 102 may include a circuitry for wirelessly sending and receiving radio signals. The communication system 200 may include a plurality of radio access points 204, 206 having installed thereon additional radio equipment 208 for measuring the location of the mobile devices in the communication system. For example, the mobile device 102 may transmit radio signals for reception by one or more (e.g., typically three) radio access points 204, and the radio access points may receive the transmitted signals and measure the signal strength and/or radio energy of the received signals to identify the location of the mobile device 102. Radio equipment 208 may include capabilities that are software or hardware enabled.

In an embodiment, the radio access points 204 may be configured to determine the location of the mobile device relative to a known location of a network component, such as the illustrated radio access point 206. In this manner, the additional radio equipment 208 installed on the radio access points 204, 206 provides the communication system 200 with similar functionality as is provided by a GPS receiver for signals received from the mobile device. For example, the radio equipment on one or more of the radio access points 204 may measure how long it takes for the radio signal to travel from the mobile device 102 to another radio access point 206, and using trilateration techniques (e.g., time of arrival, angle of arrival, or a combination thereof), the mobile device 102 or a network server 210 may estimate the location of the mobile device 102 to within an accuracy of 100 to 300 meters. Once the network has estimated the latitude and longitude coordinates of the mobile device 102, this information can be used to determine the geo-spatial location of the mobile device 102, which may be communicated to other systems, servers or components via the Internet 114.

Various embodiments may implement and/or make use of a hybrid approach for determining the location of mobile devices in a communication network, which may include aspects of both the device-centric and the network-centric approaches discussed above with reference to FIGS. 1 and 2. For example, an embodiment may implement a hybrid approach in which the GPS capabilities of mobile devices, the measured signal strengths and/or radio energy of radio signals transmitted from the mobile devices, and known locations of network components may be used in combination to estimate the locations of one or more mobile devices in a network. In a further embodiment, the mobile devices and/or network components (e.g., severs, radio access points, etc.) may be configured to dynamically determine which factors (e.g., radio signal strength, GPS, etc.) to measure and/or use in determining the location of the mobile devices.

Figure 3:
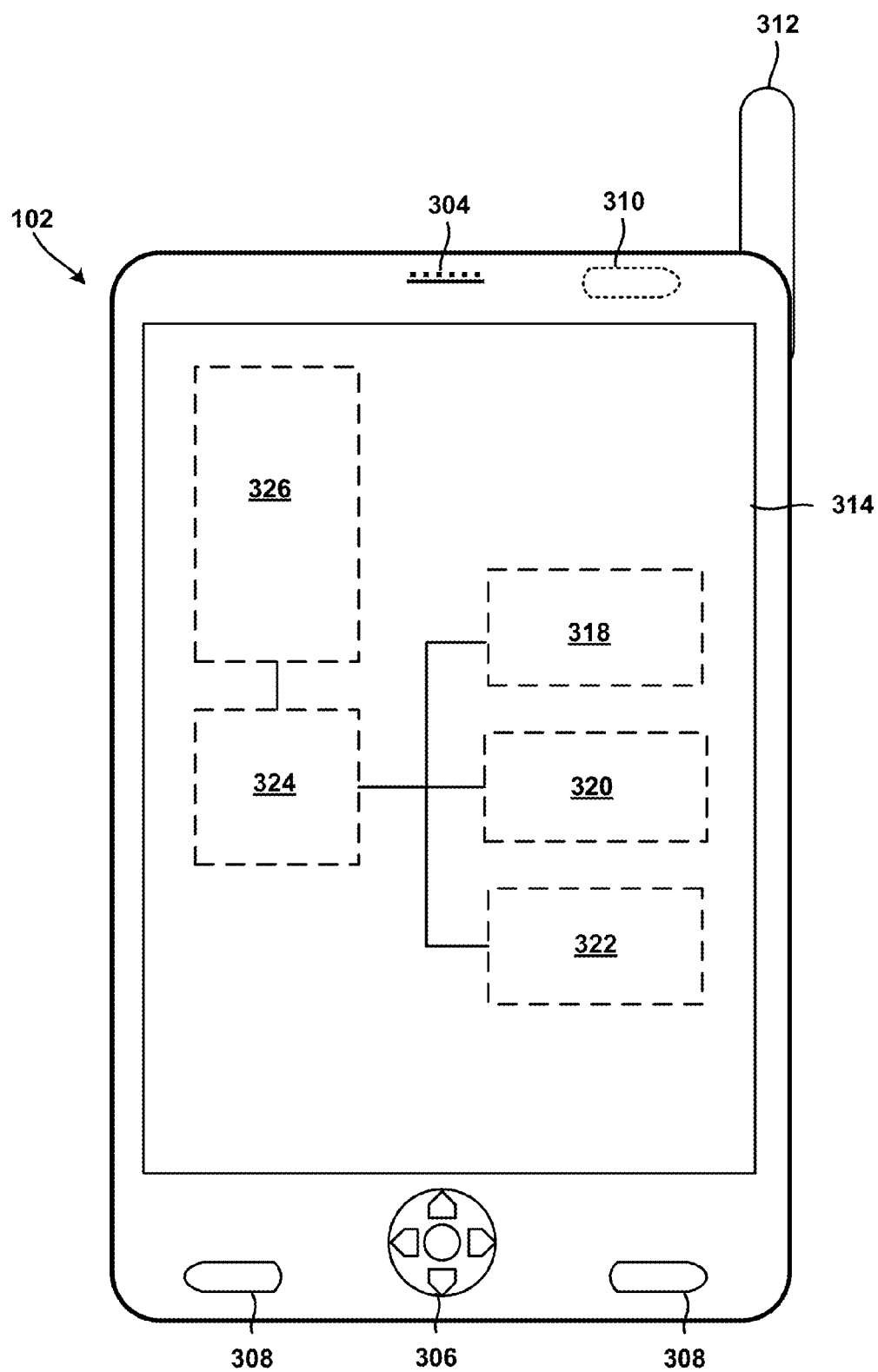
FIG. 3 is an illustration of an example mobile device suitable for use in grouping with other mobile devices and computing precise location information in accordance with the various embodiments.

FIG. 3 illustrates sample components of a mobile device in the form of a phone 102 that may be used with the various embodiments. The phone 102 may include a speaker 304, user input elements 306, microphones 308, an antenna 312 for sending and receiving electromagnetic radiation, an electronic display 314, a processor 324, a memory 326 and other well known components of modern electronic devices.

The phone 102 may also include one or more sensors 310 for monitoring physical conditions (e.g., location, motion, acceleration, orientation, altitude). The sensors may include any or all of a gyroscope, an accelerometer, a magnetometer, a magnetic compass, an altimeter, an odometer, and a pressure sensor. The sensors may also include various biosensors (e.g., heart rate monitor, body temperature sensor, carbon sensor, oxygen sensor) for collecting information pertaining to environment and/or user conditions. The sensors may also be external to the mobile device and paired or grouped to the mobile device via a wired or wireless connection (e.g., Bluetooth®). In embodiment, the mobile device 102 may include two or more of the same type of sensor (e.g., two accelerometers, etc.).

The phone 102 may also include a GPS receiver 318 configured to receive GPS signals from GPS satellites to determine the geographic location of the phone 102. The phone 102 may also include circuitry 320 for transmitting wireless signals to radio access points and/or other network components. The phone 102 may further include other components/sensors 322 for determining the geographic position/location of the phone 102, such as components for determining the radio signal delays (e.g., with respect to cell-phone towers and/or cell sites), performing lateration and/or multilateration operations, identifying proximity to known networks (e.g., Bluetooth® networks, WLAN networks, WiFi, ANT+), and/or for implementing other known geographic location technologies.

The phone 102 may also include a system acquisition function configured to access and use information contained in a subscriber identity module (SIM), universal subscriber identity module (USIM), and/or preferred roaming list (PRL) to, for example, determine the order in which listed frequencies or channels will be attempted when the phone 102 is to acquire/connect to a wireless network or system. In various embodiments, the phone 102 may be configured to attempt to acquire network access (i.e., attempt to locate a channel or frequency with which it can access the wireless/communication network) at initial power-on and/or when a current channel or frequency is lost (which may occur for a variety of reasons).

The mobile device 102 may include pre-built in USIM, SIM, PRL or access point information. In an embodiment, the mobile device may be configured for first responders and/or public safety network by, for example, setting the incident radio system as the default and/or preferred communication system.

As mentioned above, despite recent advances in mobile and wireless communication technologies, determining the specific location of a mobile device in a wireless network remains a challenging task for a variety of reasons, including the variability of environmental conditions in which mobile devices are often used by consumers, deficiencies in existing technologies for computing and/or measuring location information on mobile devices, and the lack of uniform standards. For example, there is currently no universally accepted standard for implementing or providing location-based services. As a result, mobile device designers and wireless network operators, in conjunction with local public safety and third party providers, use a variety of inefficient, incoherent, and sometimes incompatible methods, technologies, solutions, and/or techniques to determine the location of a mobile device and/or to provide location based services.

While there are no universally accepted standards for implementing or providing location-based services, there are certain requirements or standards associated with determining the location of a mobile device that may be of use in various embodiments. The U.S. Congress has mandated that cellular service providers configure their networks, communication systems and/or mobile devices so that the locations of mobile devices can be determined when a 911 call is placed. To implement Congress's mandate, the Federal Communications Commission (FCC) requested cellular service providers upgrade their systems in two phases (herein "Phase I" and "Phase II" respectively). While the level of precision/accuracy provided by these Phase I and II upgrades are generally inadequate for providing effective location based services that meet the demands of modern users of mobile devices, these upgrades provide a foundation from which more effective location based solutions may be built.

As mentioned above, the FCC requested cellular service providers upgrade their systems in two phases. In the first phase (Phase I), cellular service providers were to upgrade their systems so that emergency calls (e.g., 911 calls) are routed to the public service answering point (PSAP) closest to the cell-tower antenna with which the mobile device is connected, and so that PSAP call-takers can view the phone number of the mobile device and the location of the connecting cell-tower. The location of the connecting cell-tower may be used to identify the general location of the mobile device within a 3-6 mile radius.

In the second phase (Phase II), cellular service providers were to upgrade their systems so that PSAP call-takers could identify the location of the mobile device to within 300 meters. To meet these Phase II requirements, wireless service providers have implemented a variety of technologies, and depending on the technology used, can generally identify the location of the mobile device to within 50-300 meters. For example, on systems that have implemented a network-based solution (e.g., triangulation of nearby cell towers), the location of a mobile device can be determined within an accuracy of 100 meters 67% of the time, and to within an accuracy of 300 meters 95% of the time. On systems that have adopted a mobile device-based solution (e.g., embedded global positioning system receivers), the location of the mobile device may be determined to within 50 meters 67% of the time, and to within 150 meters 95% of the time.

Existing phase I and II solutions, alone, are not adequate for generating location information having sufficient accuracy or detail for use in providing accurate, and reliable location based services. Various embodiments may use some or all of the capabilities built into existing systems (e.g., as part of phase I and II upgrades, device-centric systems, network-centric systems), in conjunction with more advanced location determination techniques, to compute location information suitable for the advanced location based services demanded by consumers.

In addition to the three basic approaches discussed above, a number of different solutions are currently available for determining the location of mobile device, any or all of which may be implemented by and/or included in the various embodiments.

Most conventional location determination solutions use distance estimation techniques that are based on single-carrier signals. One of the fundamental operations in ground-based (or network-centric) location determination solutions is timing estimation of a first-arrival path of a signal. That is, a single-carrier signal transmitted between a transceiver and a mobile device can be received via multiple paths (i.e., multipath), and the multiple paths of the signal can have different received powers and arrival times. The received signal may be cross-correlated to distinguish the multiple paths of the received signal. In this method it is generally assumed that the first-arrival path (e.g., first detected signal, strongest signal, etc.) is associated with the path traveling the shortest distance, and hence is the correct value to use in estimating distance between the mobile device and the transceiver. Often, the first-arrival path is the strongest path due to zero or fewer reflections, relative to the other paths, between the transceiver and the mobile device.

In various embodiments, the first-arrival time of the identified first-arrival path may be used in addition to other parameters (e.g., an estimated signal transmission time and/or a time offset between clocks of the transceiver and the mobile device) to estimate distance between a mobile device and a network component (e.g., another mobile device, a transceiver, an access point, a base station). The first-arrival time may be estimated by the mobile device (e.g., based on the downlink received signal) or by the network component (e.g., based on an uplink received signal).

The location of the mobile device may also be determined by estimating the distance between the mobile device and a network component or other signal sources (e.g., a transceiver, ground or satellite-based signal sources). For example, the location of the mobile device may be determined by performing trilateration using estimated distances between multiple (e.g., three or more) transceivers and the mobile device.

Another location determination solution may include computing an observed time difference of arrival (OTDOA) value by measuring the timing of signals received from three network components (e.g., mobile devices, transceivers, access points). For example, a mobile device may be configured to compute two hyperbolas based on a time difference of arrival between a reference transceiver signal and signals of two neighbor transceivers. The intersection of the computed hyperbolas may define a position on the surface of the earth that may be used by various embodiments to determine the location of the mobile device.

The accuracy of such OTDOA solutions may be a function of the resolution of the time difference measurements and the geometry of the neighboring transceivers. As such, implementing an OTDOA solution may require determining the precise timing relationship between the neighboring transceivers. However, in existing asynchronous networks, this precise timing relationship may be difficult to ascertain.

In various embodiments, location measurement units (LMUs) may be added throughout a deployment region of an asynchronous network to measure/compute timing information for one or more network components (e.g., transceivers) relative to a high quality timing reference signal. For example, a mobile device or an LMU may determine the observed time difference between frame timing of transceiver signals, and the observed time difference may be sent to the transceiver or a radio network controller of the communication network to determine the location of the mobile device. The location of the mobile device may also be determined based on the observed time difference and assistance data (e.g., position of the reference and neighbor transceivers) received from the communication network.

Another location determination solution may include computing an uplink-time difference of arrival (U-TDOA) based on network measurements of the time of arrival of a known signal sent from the device and received at multiple (e.g., four or more) LMUs. For example, LMUs may be in the geographic vicinity of the mobile device to accurately measure the time of arrival of known signal bursts, and the location of the mobile device may be determined using hyperbolic trilateration based on the known geographical coordinates of the LMUs and the measured time-of-arrival values.

As discussed above, conventional location determination solutions are typically based on single-carrier signals. The various embodiments include a ground-based location determination solution based on multi-carrier signals. A location determination solution based on multi-carrier signals may improve the accuracy of the computed location information by, for example, improving the accuracy of the timing estimation (e.g., by expanding the bandwidth of cellular signals). Location determination solutions based on multiple carriers may be used in both the device-centric (e.g., mobile device-based) and network-centric (e.g., base station-based) approaches, and may be applied to both 3GPP and 3GPP2 wireless communication technologies.

In various embodiments, a mobile device may be configured to determine its geospatial location based on information collected from mobile device sensors (e.g. gyroscope, accelerometer, magnetometer, pressure sensor), information received from other mobile devices, and information received from network components in a communication system.

Figure 4A:
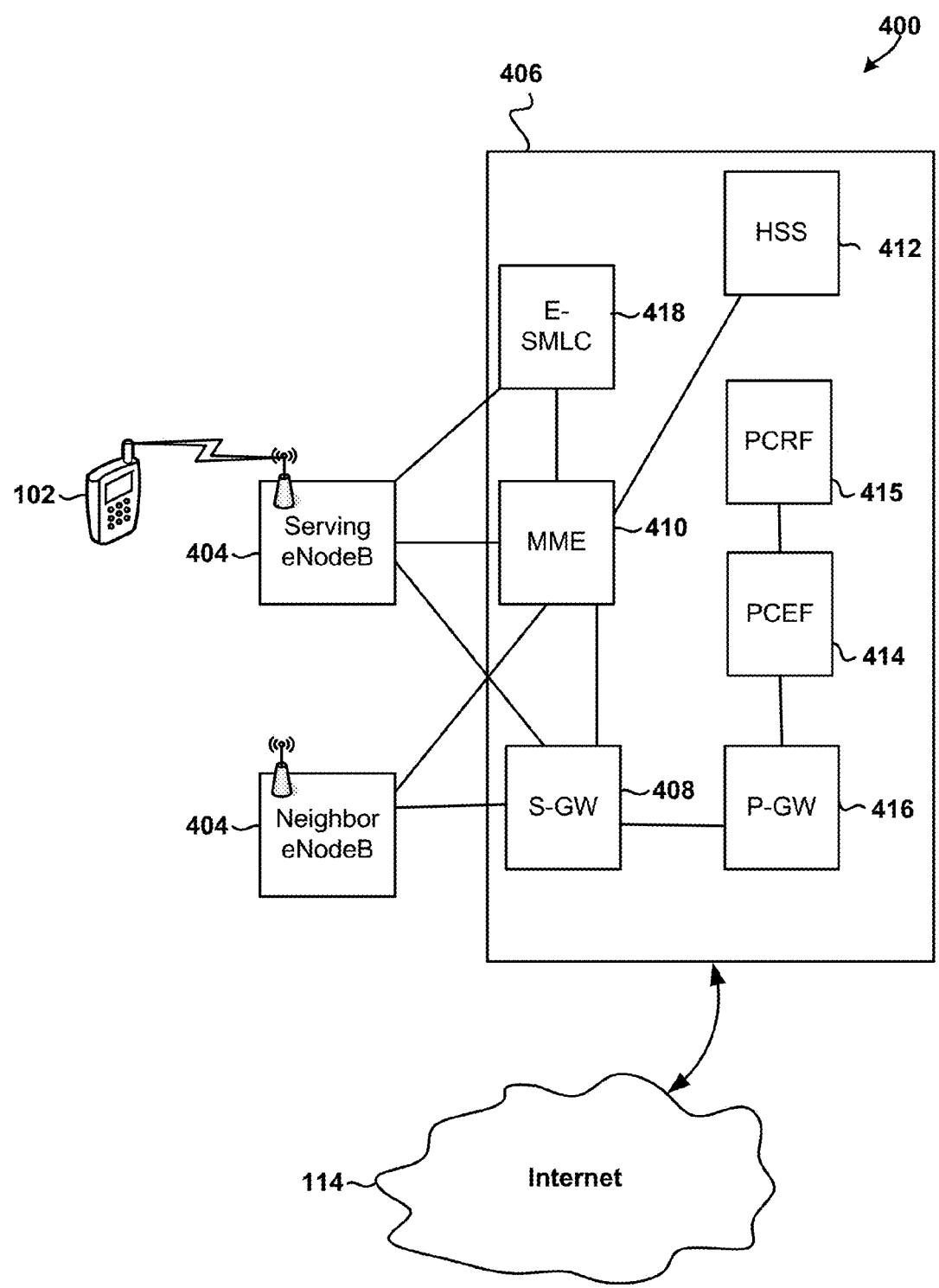
FIG. 4A is a communication system block diagram illustrating network components of an example LTE communication system suitable for use with various embodiments

FIG. 4A illustrates an example communication system within which the various embodiments may be implemented. Generally, the mobile device 102 may be configured to send and receive communication signals to and from a network 406, and ultimately the Internet 114, using a variety of communication systems/technologies (e.g., GPRS, UMTS, LTE, cdmaOne, CDMA2000™). In the example illustrated in FIG. 4, long term evolution (LTE) data transmitted from the wireless device 102 is received by a eNodeB (eNB) 404 and sent to a serving gateway (S-GW) 408 located within the core network 406. The mobile device 102 or serving gateway 408 may also send signaling (control plane) information (e.g., information pertaining to security, authentication) to a mobility management entity (MME) 410.

The MME 410 may request user and subscription information from a home subscriber server (HSS) 412, perform various administrative tasks (e.g., user authentication, enforcement of roaming restrictions), and send various user and control information to the S-GW 408. The S-GW 408 may receive and store the information sent by the MME 410 (e.g., parameters of the IP bearer service, network internal routing information), generate data packets, and forward the data packets to a packet data network gateway (P-GW) 416. The P-GW 416 may process and forward the packets to a policy and control enforcement function (PCEF) 414 which receives the packets and requests charging/control policies for the connection from a policy and charging rules function (PCRF) 415. The PCRF 415 may provide the PCEF 414 with policy rules that it enforces to control the bandwidth, the quality of service (QoS), and the characteristics of the data and services being communicated between the network (e.g., Internet, service network) and the mobile device 102. In an embodiment, the PCEF 414 may be a part of, or perform operations typically associated with, the P-GW 416. Detailed information about policy and charging enforcement function operations may be found in "3rd Generation Partnership Project Technical Specification Group Services and System Aspects, Policy and Charging Control Architecture," TS 23.203, the entire contents of which are incorporated herein by reference.

In various embodiments, the network 406 may also include an Evolved Serving Mobile Location Center (E-SMLC) 418. Generally, the E-SMLC 418 collects and maintains tracking information about the mobile device 102. The E-SMLC 418 may be configured to provide location services via a lightweight presentation protocol (LLP), which supports the provision of application services on top of TCP/IP networks. The E-SMLC 418 may send or receive (e.g., via LPP) almanac and/or assistance data to and from the MME 410 and/or eNodeB (eNB) 404. The E-SMLC 418 may also forward external or network initiated location service requests to the MME 410.

In addition, the mobile device 102 may receive information from the serving eNodeB 404 via System Information Blocks that includes the neighbor cells to scan that are on the same system using the same frequencies or different frequencies, Home eNB (HeNB), in addition to CDMA, GERAN and UTRA cells.

Figure 4B:
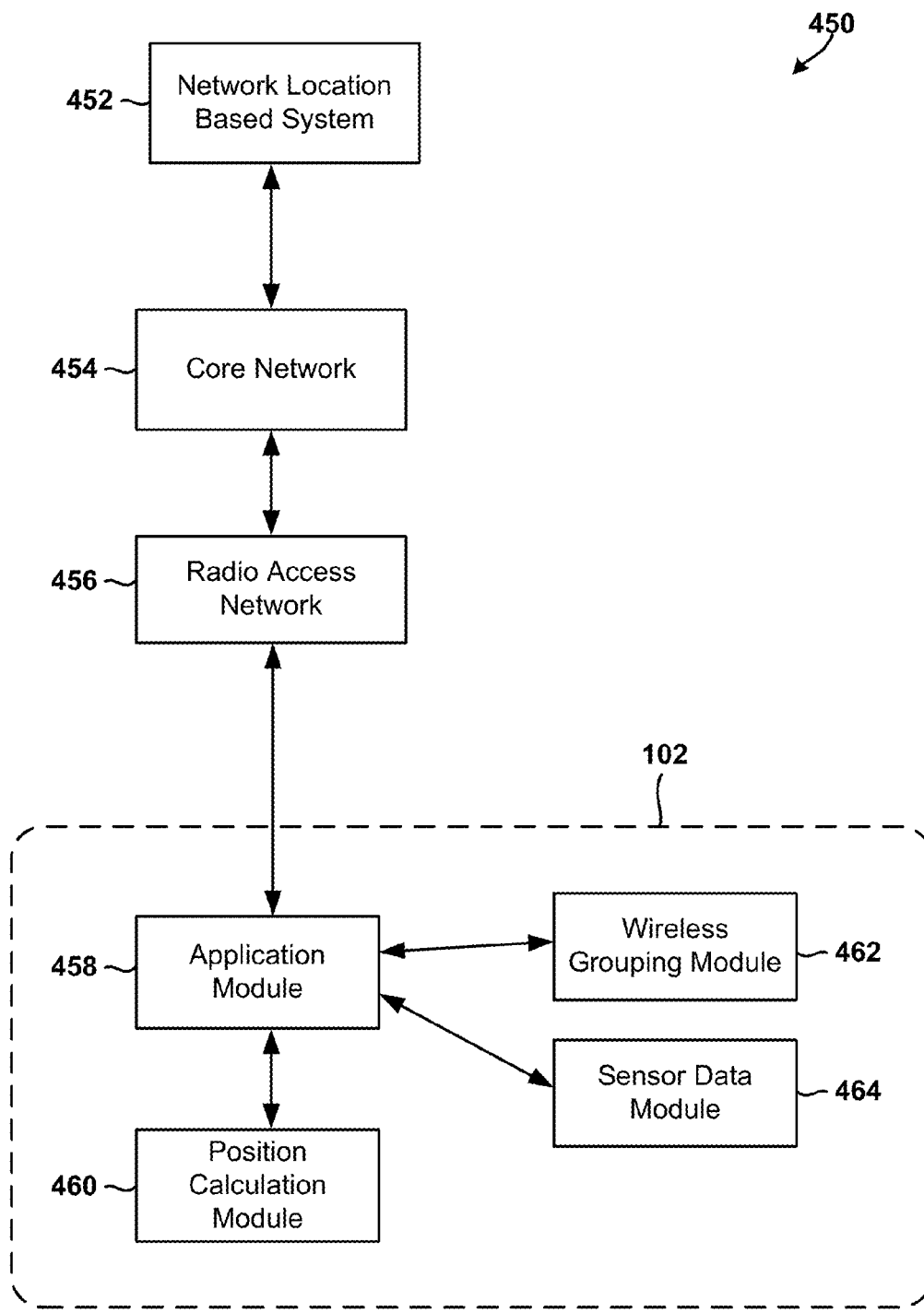
FIG. 4B is a block diagram illustrating logical components, communication links and information flows in an embodiment communication system.

FIG. 4B illustrates logical components, communication links, and information flows in an embodiment communication system 450 suitable for use in determining the location of the mobile device. The communication system 450 may include a network location based system 452, a core network 454, and a radio access network 456. The communication system 450 may also include an application module 458, a position calculation module 460, a wireless grouping module 462, and a sensor data module 464, any or all of which may be included in a mobile device 102. The application module 458 (e.g., client software) may request and receive location information from the network location based system 452 (e.g., through the core network 454 and the radio access network 456). Likewise, the network location based system 452 (or another client attached to, or within, the core network 454) may request and receive location information from the application module 458.

In various embodiments, the mobile device 102 may be configured to determine its geospatial location based on information collected from mobile device sensors (e.g. gyroscope, accelerometer, magnetometer, pressure sensor), information received from other mobile devices, and information received from network components in a communication system. In an embodiment, the collection and reporting of sensor information may be controlled/performed by the sensor data module 464. For example, the application module 458 may retrieve/receive sensor information from the sensor data module 464. Application modules 458 may also send the sensor information to the position calculation module 460 to compute the location of the mobile device locally for position updates and/or position augmentation. The application module 458 may also send the computed location information to the network location based system 452 and or other mobile devices.

In various embodiments, the mobile device 102 may be configured to determine its geospatial location based on information collected from other mobile devices. In these embodiments, two or more mobile devices may be organized into groups. Each mobile device may also share its location information with the other mobile devices with which the mobile device is grouped. For example, mobile devices may be configured to share their current location and/or position information (e.g., latitude, longitude, altitude, velocity, GPS data and/or GPS timing information). A mobile device may also share an estimate of a distance between itself and a target mobile device or other transmitter or transceiver with other mobile devices in their group.

In an embodiment, the grouping of mobile devices may be controlled by the wireless grouping module 462. For example, the application module 458 may retrieve wireless group information (e.g., information pertaining to the locations of other mobile devices) from the wireless grouping module 462. The application module 458 may send the group information to the position calculation module 460 to perform local calculations for position updates and/or position augmentation. In an embodiment, the position calculation module 460 may perform the local calculations based on both sensor information received from the sensor data module 464 and group information received from the wireless grouping module 462.

In an embodiment, the mobile device 102 may be configured to automatically share its location information with other mobile devices upon discovery of the other mobile devices. Mobile devices may augment their location information (e.g., position coordinates) with information received from other mobile devices within same geographic area, and in a controlled pseudo ad-hoc environment. Since the shared location information (e.g., latitude, longitude, altitude, velocity, vector, GPS information, bearing, and GPS timing) involves a relatively small amount of data, in an embodiment the mobile devices may receive such information from a network server by in-band and or out-of-band signaling.

When implemented in a 3GPP-LTE network, the various embodiments may include an E-SMLC 418 component configured to send and receive location information (e.g., latitude, longitude, altitude, velocity, GPS data, GPS timing) to and from the mobile devices, which may be achieved both on-net and off-net. The location information may be delivered in standard formats, such as those for cell-based or geographical coordinates, together with the estimated errors (uncertainty) of the location, position, altitude, and velocity of a mobile device and, if available, the positioning method (or the list of the methods) used to obtain the position estimate.

To aid in the determination of the locations of mobile devices, 3GPP-LTE networks have standardized several reference signals. Various embodiments may use these reference signals for timing based location and positioning solutions. Such reference signals may include the primary and secondary synchronization signals and the cell specific reference signals.

Two or more mobile devices may be organized into groups. Mobile devices within the same group may be part of the same network, or may be associated with different networks and/or network technologies. The mobile devices within the same group may also operate on different network operating systems (NOSs) and/or radio access networks (RANs).

Figure 5A:
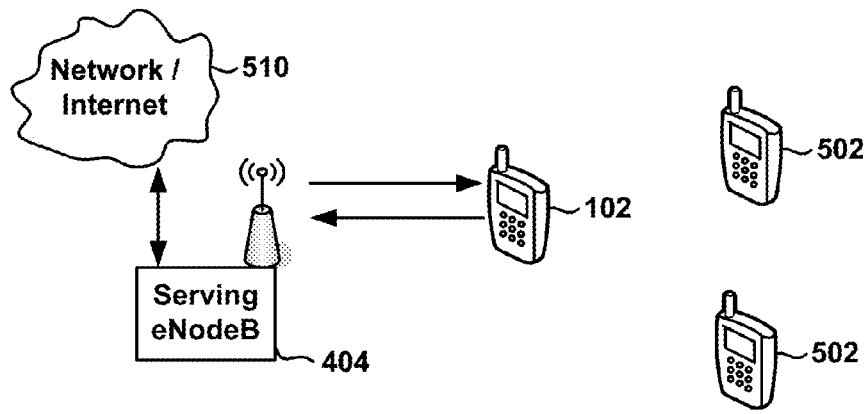
FIGS. 5A through 5C are component block diagrams illustrating functional components, communication links, and information flows in an embodiment method of grouping mobile devices and sharing location information between grouped mobile devices.
Figure 5B:
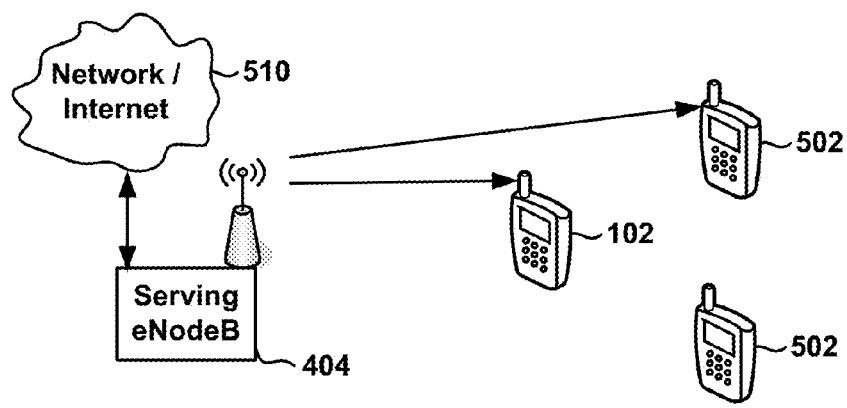
Figure 5C:
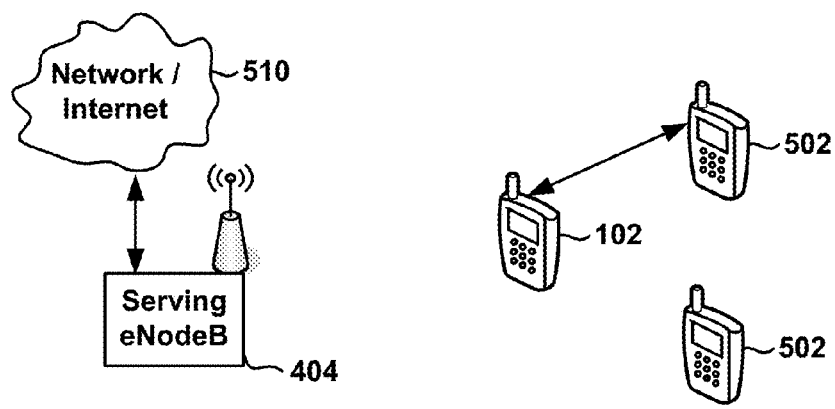

FIGS. 5A-5C illustrate functional components, communication links, and information flows in an embodiment method of grouping mobile devices and sharing location information between grouped mobile devices. With reference to FIG. 5A, after a mobile device 102 is powered on, the mobile device 102 may scan for predefined and/or preferred radio frequency carriers and/or systems with which the mobile device 102 may connect to the network. If the mobile device 102 does not find an appropriate network with which it may connect (or loses its connection) the mobile device 102 may scan the airwaves for other radio access systems (e.g., mobile network, radio access point associated with a mobile device) to acquire (i.e., connect to) until a connection to a network/Internet 510 is established. These operations may also be performed in the event of a dropped call or power interruption.

The mobile device 102 may also begin acquiring GPS signals while scanning the airwaves for radio frequency carriers and/or systems. If the mobile device 102 cannot acquire GPS signals, a network component (not illustrated) may help determine the relative position of the mobile device 102 based on one or more of the location determination solutions discussed herein (e.g., based on the antenna used for the radio access point, the time delay, angle of arrival).

The mobile device 102 may acquire (e.g., connect to) an appropriate radio access system, radio frequency carrier and/or system via the mobile device's system acquisition system. In the examples illustrated in FIGS. 5A-5C, the mobile device 102 establishes a connection to a network 510 via an eNodeB 404. However, it should be understood that any or all of the communication technologies discussed above are contemplated and within the scope of the various embodiments.

After the mobile device 102 acquires the radio access system, the network 510 (e.g., a component in the network such as a server) may determine the approximate location of the mobile device 102 (e.g., via one or more of the location determination solutions discussed above, such as proximity to base towers). In addition, the mobile device 102 may compute its current location (e.g., via GPS and/or the location determination solutions discussed above), store the computations in a memory of the mobile device, and report its current location to the network 510.

In addition to knowing the approximate location of the mobile device 102, the network 510 may also be informed of the locations of other mobile devices 502 and the relative positions/proximity of the other mobile devices 502 to the recently acquired mobile device 102.

FIG. 5B illustrates that the network 510 may send instructions/commands to the mobile devices 102, 502 to cause the mobile devices 102, 502 to group with mobile devices 102, 502 and possibly others. In an embodiment, the network 510 may be configured to automatically group the mobile devices 102, 502 based on the proximity of the mobile devices 102, 502 with respect to one another. In an embodiment, the network 510 may be configured to allow an incident command system (ICS) commander to group the devices. In an embodiment, the network 510 may be configured to allow the mobile devices to form groups based on their proximity to one another.

FIG. 5C illustrates that the mobile device 102 may pair/group with another mobile device 502 and/or establish communication links so that the mobile devices 102, 502 may share real-time relative location information with each other. Two or more grouped/paired mobile devices 102 and 502 may identify their relative positions to each other by sending relative location information over the established communication links. The relative location information may include time-to-arrival, angle-of-arrival, and existing or self-aware location information.

The mobile devices 102, 502 may be configured report sensor information to each other and/or the network 510. The sensor information may include x, y, z coordinate information and velocity information. The sensor information may be polled on a continuous basis, may be requested periodically, and/or made available on demand in response to network/system requests.

In various embodiments, mobile devices 102, 502 may be configured to report sensor information in response to determining that there is a high likelihood that there has been change in a location of the mobile device 102, 502 (e.g., in response to detecting motion). The mobile devices 102, 502 may also be configured collect and report sensor information to the network 510 in response to receiving an instruction/command from the network 510 (e.g., a component in the network such as a server or E-SLMC 418 illustrated in FIG. 4). The network 510 (e.g., from a component in the network) may be configured to receive the sensor and location information from the mobile devices 102, 502, and compute and store information about the distances (e.g., in time delay and angle of arrival with respect to the mobile devices 102, 502).

In an embodiment, the reporting of sensor information may be based on local parameter settings. For example, the mobile devices 102, 502 may be configured to transmit sensor information when any of the measured parameters (e.g., x, y, z and velocity information) meet or exceed a threshold value (e.g., exceed a rate-of-change, meet a timeout limit), which may be identified by local parameter settings stored in a memory of the mobile devices 102, 502. In an embodiment, the mobile devices 102, 502 may be configured to re-compute and/or update their location information in response to determining that the measured parameters (e.g., X, Y, and Z coordinates and velocity information) meet or exceed a threshold value.

In an embodiment, a mobile device 102 and/or the network 510 (e.g., a component in the network) may be configured to compare collected sensor information to computed latitude and longitude coordinates, relative altitude information, and other available information to determine if there is a discrepancy between the collected/measured values and the expected values. When it is determined that a discrepancy may exist between the expected and measured values, the mobile device 102 and/or network 510 may perform additional measurements to improve the location accuracy of the measurements/location information.

Figure 5D:
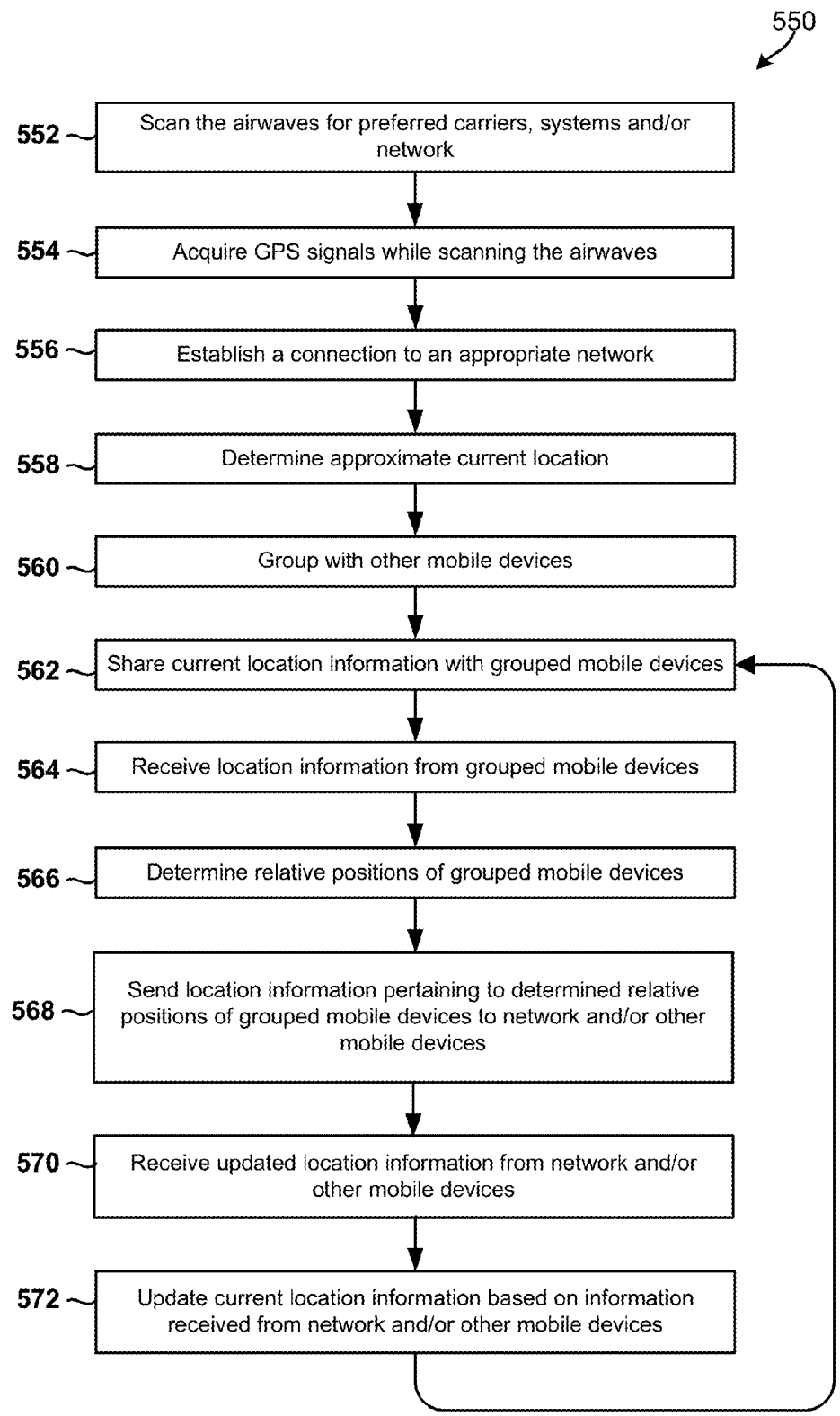
FIG. 5D is a process flow diagram illustrating an embodiment mobile device method for grouping mobile devices and sharing location information between grouped mobile devices and the network to compute enhanced location information.

FIG. 5D illustrates an embodiment mobile device method 550 for grouping mobile devices and sharing location information between grouped mobile devices and a network to compute enhanced location information. In block 552, a mobile device may scan the airwaves for predefined and/or preferred radio frequency carriers and/or systems with which the mobile device may connect. This may be done at power on, if a connection is lost, and at various time during normal operations of the mobile device. In block 554, the mobile device may begin acquiring GPS signals while scanning the airwaves for radio frequency carriers and/or systems. In various embodiments, block 554 may begin or run concurrent to the operations of block 552. If the mobile device cannot acquire GPS signals, the mobile device or a network component may, as part of block 554, determine the relative position of the mobile device based on one or more of the location determination solutions discussed herein. In block 556, the mobile device may acquire (e.g., connect to) an appropriate radio access system, radio frequency carrier, system and/or network.

In block 558, the mobile device may compute its current location (e.g., via GPS and/or the location determination solutions discussed herein). The mobile device may store the computations in a memory, and may report its current location to the network. In block 560, the mobile device may group with other mobile devices in response to receiving instructions/commands from a network component and/or in response to detecting that the other mobile devices are within a predefined proximity to the mobile device (e.g., within a threshold distance). In block 562, the mobile device may share its current location information, as well as information collected from sensors, with the grouped mobile devices. In block 564, the mobile device may receive location and/or sensor information from the grouped mobile devices. The sensor information may include X, Y, and Z coordinate information and/or velocity information.

In block 566, the mobile device may identify the relative positions of the other mobile devices, which may be achieve by evaluating location and sensor information received from the other mobile devices and/or via any or all of the location determination solutions discussed herein. In block 568, the mobile device may send the relative location information, its current location information, and/or sensor information to a network component and/or the other mobile devices, which may receive the sensor and location information and compute updated location information (e.g., based on distance in time delay, angle of arrival, relative location, and/or altitude information). In block 570, the mobile device may receive updated location information from the network component and/or the other grouped mobile devices. In block 572, the mobile device may update its current location calculation and/or information based on the information received from the network component and/or the other grouped mobile devices. The operations of blocks 562-572 may be repeated until the desired level of precision is achieved for the location information.

FIGS. 6A-6D illustrate functional components, communication links, and information flows in an embodiment method for computing location information in which the grouped mobile devices 102, 502 are updated with their respective location information.

Figure 6A:
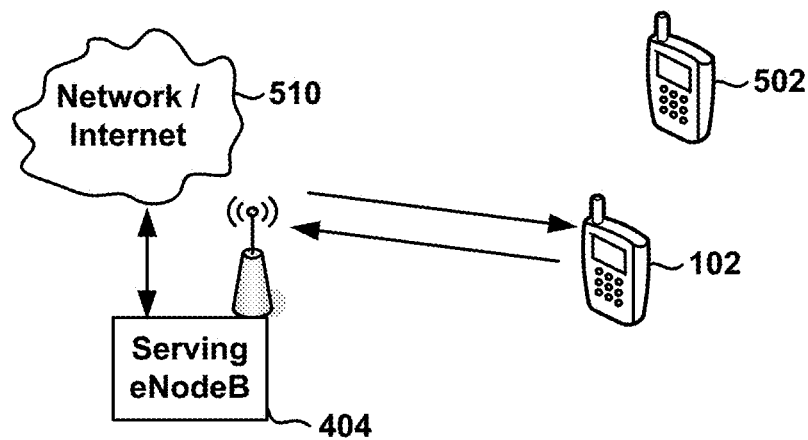
FIGS. 6A through 6D are component block diagrams illustrating functional components, communication links, and information flows in an embodiment method for computing location information in which the grouped mobile devices are updated with their respective location information.

FIG. 6A illustrates that the mobile device 102 may communicate with a serving eNodeB 404 to relay its location information to the network 510 and/or to receive location information from the network 510.

Figure 6B:
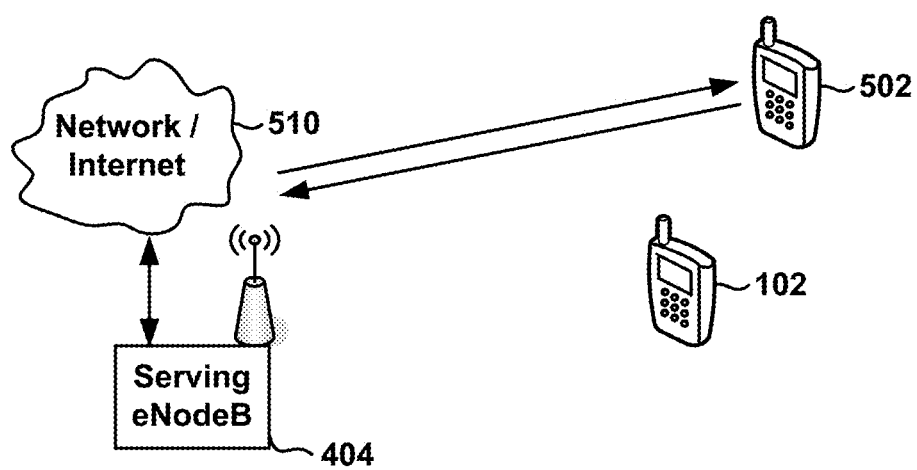

FIG. 6B illustrates that another mobile device 502 may also communicate with the serving eNodeB 404 to relay its location information to the network 510 and/or to receive location information from the network 510.

Figure 6C:
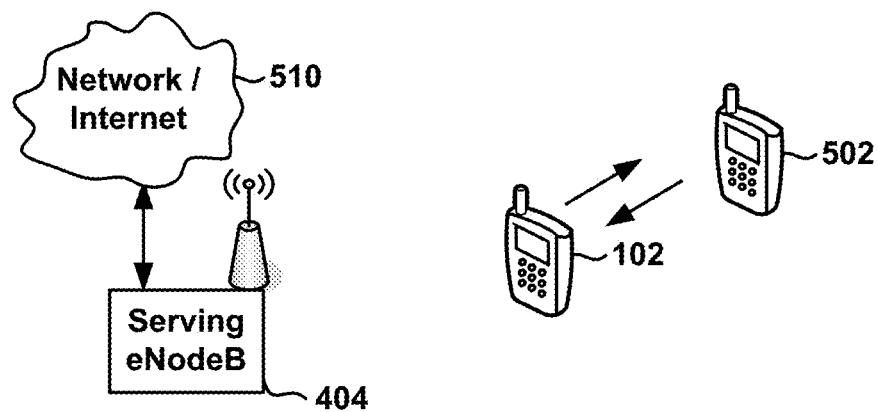

FIG. 6C illustrates that the grouped mobile devices 102, 502 may communicate with each other to determine the distance between each other. This may be achieved by the mobile devices 102, 502 communicating various types of information, such as time-of-arrival, relative position with angle-of-arrival measurements, and other similar values, measurements, or computations. The mobile devices 102, 502 may then re-compute, refine, and/or update their current location calculations and/or location information based on information received from the other mobile devices 102, 502.

Figure 6D:
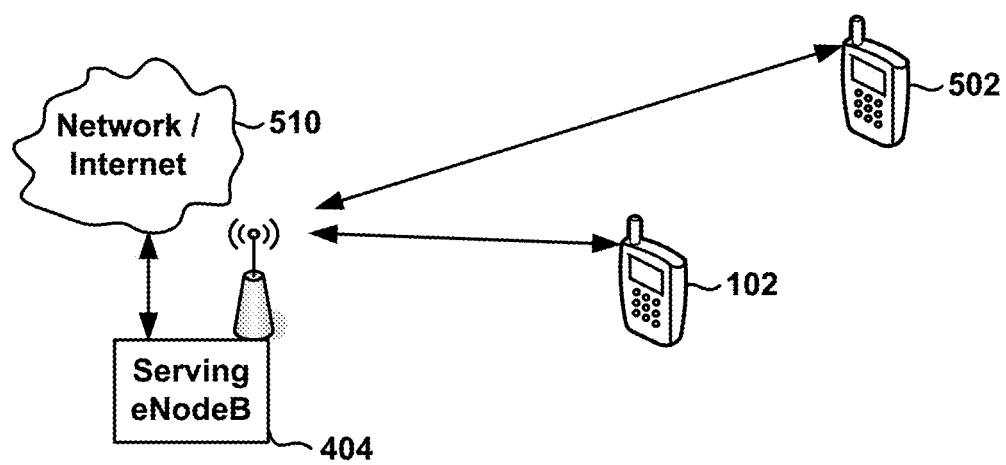

FIG. 6D illustrates that the grouped mobile devices 102 and 502 may send their self-aware location information and/or relative location information to the network 510 (via the serving eNodeB 404), and receive updated location information from the network 510. For example, the mobile devices 102, 502 may send their present location coordinates, distances between mobile devices (e.g., distance to each other), altitude, and bearings (e.g., where mobile device 102 is with respect to mobile device 502) to the network 220. The network may compute updated location information based on the received information (e.g., coordinates, sensor information, proximity information), and send the updated location information to the mobile devices 102, 502. The network may store the data and/or computed updated location information. The mobile devices 102, 502 may then re-compute, refine, and/or update their current location calculations and/or location information based on information received from the network.

The operations discussed above with respect to FIGS. 6A-6D may be repeated so that the mobile devices 102, 502 recursively, continuously, and/or periodically re-compute, refine, and/or update their current location calculations and/or location information based on updated information received from the other mobile devices and/or the network 510 until the desired level of precision is achieved for the location information.

Figure 6E:
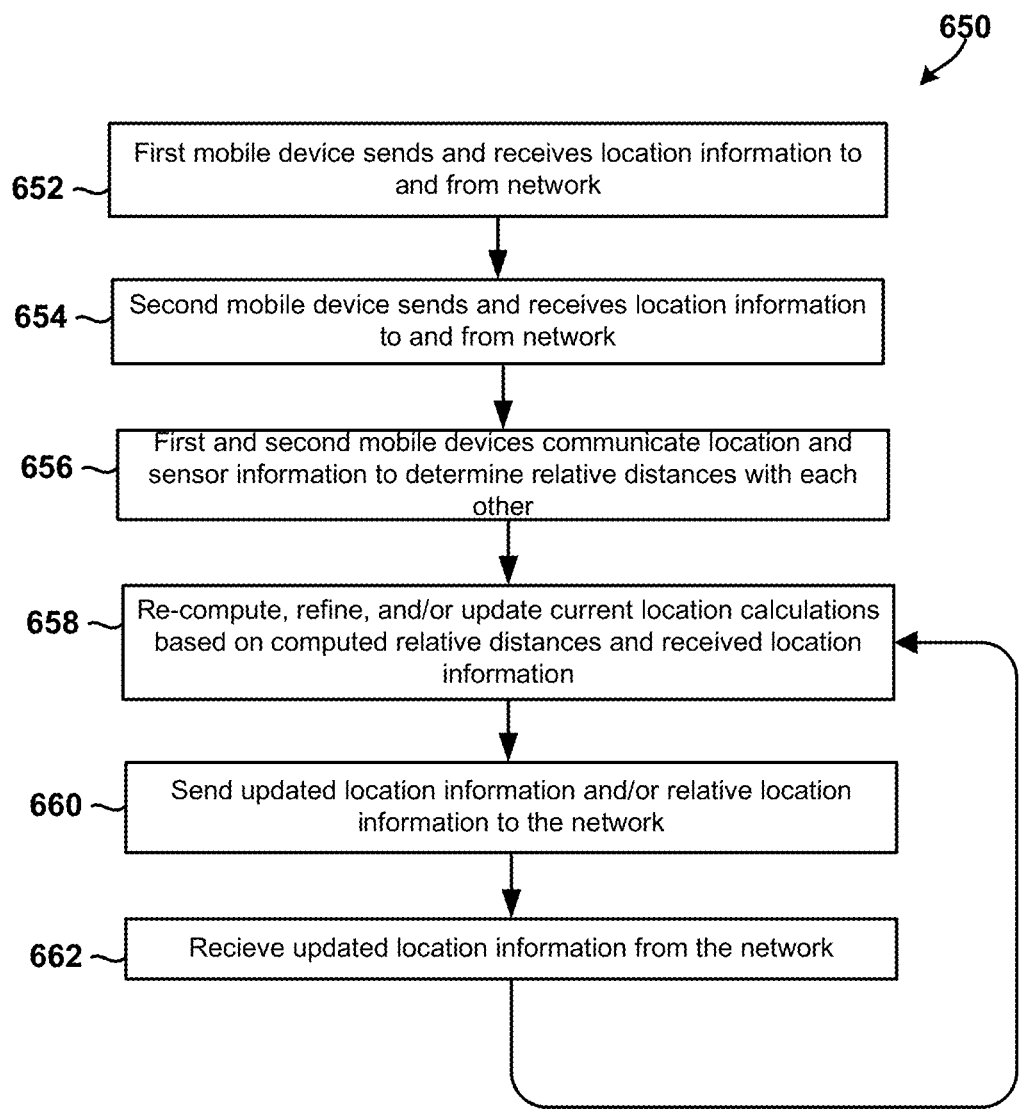
FIG. 6E is a process flow diagram illustrating an embodiment system method of determining the location of two or more grouped mobile devices.

FIG. 6E illustrates an embodiment system method 650 of determining the location of two or more grouped mobile devices. In block 652, a first mobile device may send and/or receive current location information to and from a network component. In block 654, a second mobile device may send and/or receive current location information to and/or from the network component. In block 656, the first and second mobile devices may communicate with each other to determine the relative distances between each other, which may be achieved by communicating various types of information, including time-of-arrival, relative position with angle-of-arrival measurements, velocity, altitude, etc.

In block 658, the first and/or second mobile devices may re-compute, refine, and/or update their current location calculations and/or location information based on information received from the other mobile devices and/or the network. In block 660, the first and/or second mobile devices may send their updated current location calculations and/or location information to the network component, which may receive the calculations/information and compute updated location information (e.g., based on distance in time delay and angle of arrival, relative altitude information). In block 662, the first and/or second mobile devices may receive updated location information from the network. The operations in blocks 658-662 may be repeated until the desired level of precision is achieved for the location information.

It should be understood that the methods and operations discussed above with reference to FIGS. 5A-5D and 6A-6F may also be performed such that they include more than two devices. The specific number of devices may generally be a design choice. However, in various embodiments the number of devices may have function significance. For example, in an embodiment, the mobile devices may be grouped into units of four (4) such that each mobile device may triangulate its position relative to three other mobile devices in the same group.

In an embodiment, a mobile device 102 and/or a network component may store relative location information for all the mobile devices within each group, based on the type of grouping. For example, a network component may store relative location information for all the mobile devices grouped by an incident command system (ICS) commander. Likewise, the network component may store relative location information for all the mobile devices grouped based on criteria such as, proximity to each another, type of service the mobile devices are to receive, and/or the cell/tower(s) the mobile devices are connected to.

In an embodiment, the mobile device 102 may be configured to detect a low battery condition, and initiate operations to conserve battery. For example, a mobile device 102 may be configured to turn off its radio, limit processes to be run, and/or terminate or reduce its participation in the group information exchange. As another example, a mobile device 102 may be flagged or identified as having a low battery condition, and the other grouped mobiles devices may be informed of the low battery situation so that update intervals may be adjusted to reduce battery consumption.

Figure 6F:
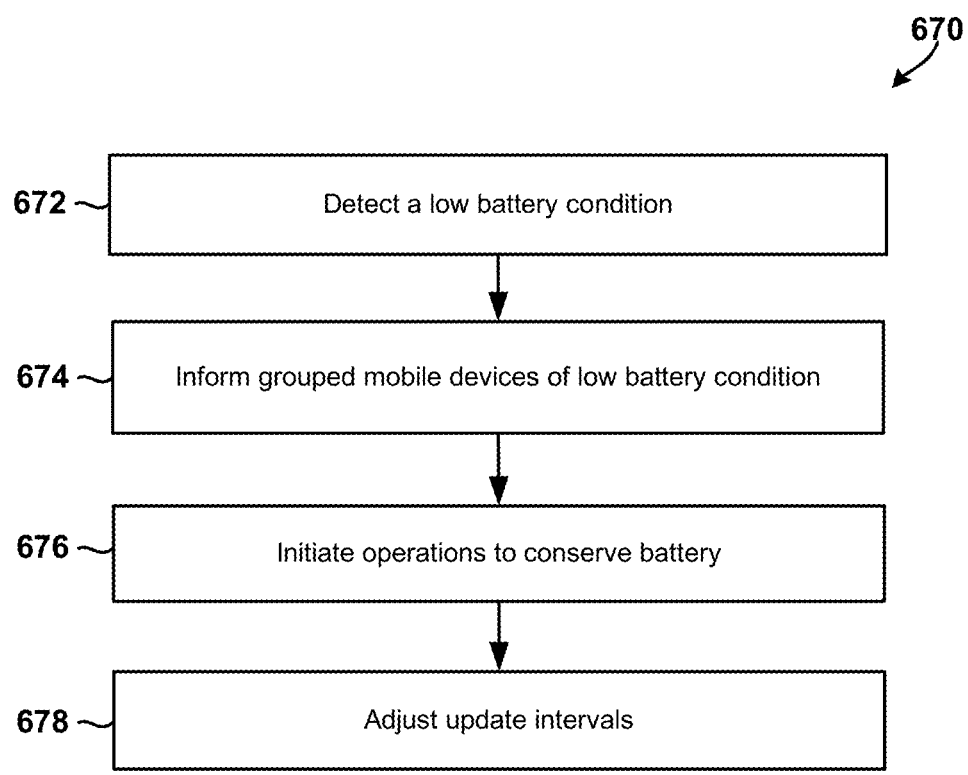
FIG. 6F is a process flow diagram illustrating an embodiment mobile device method of adjusting the update intervals in response to detecting a low battery condition.

FIG. 6F illustrates an embodiment method 670 of adjusting the update intervals in a mobile device in response to detecting a low battery condition. In block 672, the mobile device may detect/determine that the amount of power remaining in the mobile device battery is below a predetermined threshold. In block 674, the mobile device may transmit a signal or otherwise inform grouped mobile devices of the detected low battery condition. In block 676, may initiate operations to converse power, such as by turn off its radio and/or reducing its participation in exchanging information with grouped mobile devices. In block 678, the mobile device and/or the informed grouped mobile devices may adjust the update intervals with respect to the mobile device to reduce the load on the mobile device.

Grouped mobile devices may share various types of information to improve the accuracy of the location determination calculations. For information shared between grouped mobile devices, a comparison may be made for the path, range, between the mobile devices using any or all of the information available to the mobile devices (e.g., location coordinates, sensor information, proximity information). If the two mobile devices report relative location information that is within a user or network defined range tolerance as being acceptable this information may be forwarded to the network. If the relative positional information is not within the defined range tolerance, additional polling operations may be performed to improve the accuracy of the measurements or location information. The above-mentioned operations may be repeated until the desired level of accuracy is achieved. In an embodiment, the number of times the above-mentioned operations are repeated may be determined based on definable values which may be set by the network, user, or algorithm used.

A mobile device 102 may include two or more of the same type of sensor. In various embodiments where the mobile device 102 includes more than one of the same type of sensor (e.g., includes two accelerometers), one of the sensors (e.g., one of the two accelerometers) may be identified as a master sensor. The values measures by each sensor may be compared, and if the difference between values falls within a tolerance range, the values measured by the master sensor may be used to compute the sensor's measured parameters (e.g., X, Y, Z, and velocity parameters, acceleration, temperature). If the difference between the values falls outside a tolerance range, the mobile device may use information collected from other sensors (of the same or different types) to determine if the values measured by the master sensor, or secondary sensor, are consistent with expected values. For example, the mobile device may use information collected from various other types of sensors to compute the sensor's measured parameters and compare the computed sensor's measured parameters to a similar sensor's measured parameter(s) computed based on the values measured by the master sensor to determine if the master sensor is functioning correctly. Values measured on the master sensor may also be compared to information stored on the mobile device, the network, or other mobile devices to determine if the master sensor is functioning correctly. If it is determined that the master sensor is not functioning correctly, a secondary sensor may be designated as the master sensor. The previous master sensor may be demoted to standby status (e.g., for use if the primary sensor has a failure) and not used for immediate positional calculations.

As mobile devices move into or out of an area, the mobile devices may be asked to group with more devices. The number of devices that a mobile device can group with may be restricted by user or network configurations.

In an embodiment, proximity grouping may be used in the X, Y, and Z coordinates/fields and/or for velocity information.

In an embodiment, proximity grouping may be used in the X, Y, and Z coordinates/fields and/or for velocity information.

In the event that a mobile device is unable to group with a specified mobile device as instructed, the mobile device may group with another mobile device in an ad-hoc fashion. If no mobile device is pairable with the mobile device, it may rely on its own geographic and/or and sensor information to report to the network. This may include conducting dead reckoning operations based on the last set of location information.

In various embodiments, if a mobile device 102 is not detected as being within a given proximity of a grouping radius, other mobile devices in the same group as the mobile device 102 may be informed of the decision to degroup them from the mobile device 102. In various embodiments, the system may be configured so that an approval from the incident commander or user may be required before the mobile is degrouped. In various embodiments, this may be achieved may transmitting a signal to a mobile device of the incident commander or user requesting approval, to which the incident commander or user may send a reply approving or disapproving of the request to degroup. In an embodiment, the degrouping process may be transparent to the mobile device users. A notice may be sent to some or all grouped member devices that the device is no longer detected or has been removed from the group.

In the event that a mobile device is unable to communicate with the network, the mobile device may send telemetry information pertaining to location services (and other telemetry information) to a grouped mobile device for relaying to the network.

In an embodiment, polling for information may be performed if the network has lost communication with a mobile device. Mobile devices that were grouped with the missing mobile device in a geographic area near the last known location of the missing mobile device may be instructed to connect/communicate with the disconnected mobile. This may be done even when the mobile device is trying to reacquire the network. A logical sequence based on proximity, signal quality to the network, and/or battery strength may be used to determine which mobile device(s) may be used as a relay for communicating with the network.

The relayed telemetry and location information may include more than just positional information. For example, the relayed information may also include bio sensor and user bio information reporting on the environment and user conditions, including heart rate, and/or temperature, CO, O2 and other sensor information.

In an embodiment, the network may continuously measure/monitor the connected mobile devices. Knowing the location and/or relative locations to each of the other mobile devices enables the network to continuously measure the uplink and downlink communication paths. If communication path degradation occurs, a defined system quality range (which may be user defined), a mobile device may be instructed to either handover to another radio access node for the same network and/or network technology, connect to a different network, be instructed to perform relay operations to relay communications though other mobile device(s) or means as a secondary signal path.

In the event a mobile device loses a communication link with the network, the mobile device may attempt to acquire a link through another network. While the acquisition process is underway, a mobile device may act as a mesh device. Other mobile devices in the proximity group may also connect as a mesh network. A mesh network herein being a network established by the mobile devices or an entity other than a cellular telephone network provider network.

In an embodiment, a mobile device may utilize dead reckoning (also called deducted reckoning) techniques to compute updated location information. This may be done with or without a network connection. A mobile device may store the updated information for eventual relay to another mobile device which has network access or until the mobile device or establishes a connection to the initial network or another network and granted access to whether it is public or a private network.

Figure 7:
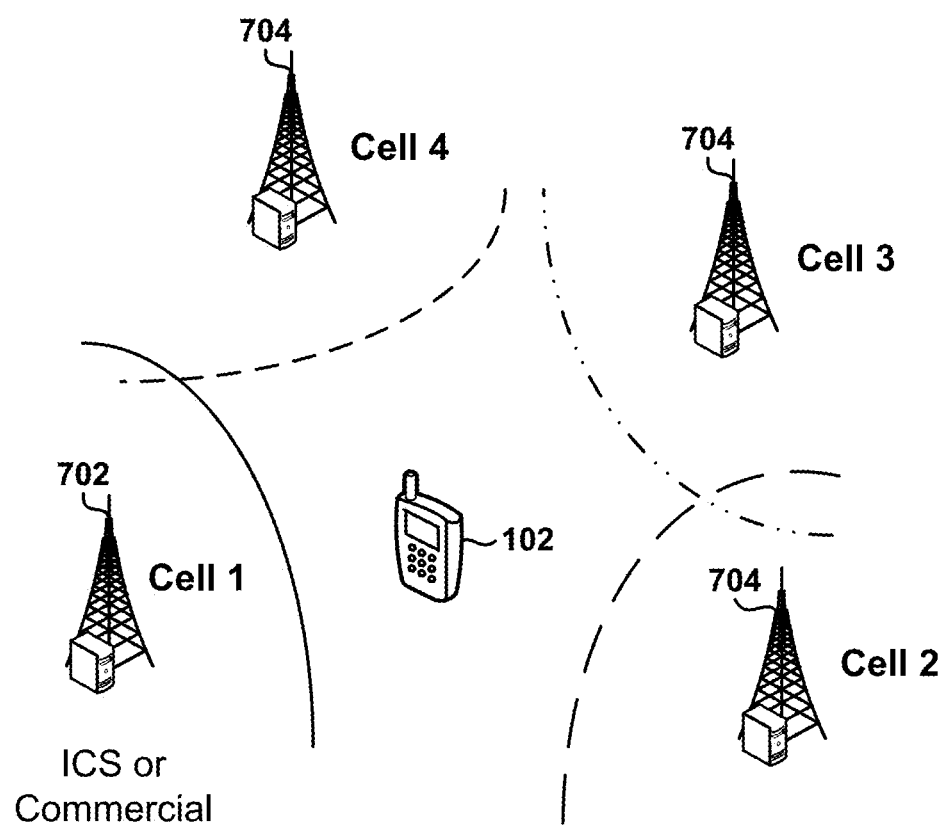
FIG. 7 is a component block diagram illustrating functional components, communication links, and information flows in embodiment method of periodically scan for cells.

FIG. 7 illustrates an embodiment where under normal operating conditions, a mobile device 102 may periodically scan for other cells 704, including its serving cell 702. If the radio access points are part of the network to which the mobile device 102 is connected to, then the mobile device may report the identity and signaling information required by the existing network to determine (e.g., via triangulating and/or lateration) the mobile device's location based on a network approach. If the mobile device detects a radio access point that is not part of its preferred cell selection process, it may attempt to read the coordinates and positional information broadcast by the access point.

Once the mobile device synchronizes with an access point, the mobile device may determine the timing difference and other requisite information to help determine its relative location and distance from other devices and access points. This information may be used in conjunction to the location system used by the mobile device to help refine its current location calculations.

Additionally the mobile device may be configured to compare each cell read to the mobile device's own location using bearing and time difference for all the cells it reads. The mobile device may then triangulate on its own position.

In various embodiments, a software application on the distressed mobile device may be executed during a 911 call. The software application may access an active neighbor list, read the overhead of each cell, and use that information to determine the mobile device's own position. The mobile device may also read the time offset for each of the cells.

The system may begin trying to locate the distressed mobile's position with more precision and accuracy to assist First Responders with locating the distressed mobile's position. The location information may be sent to the incident commander and/or public service answering point (PSAP) with a relative distance to target indication that may be updated on periodically. If the mobile device has lost contact with the 911 center, PSAP then the last location may be continuously displayed and any velocity information may also be relayed to assist the first responders.

In an various embodiments, such as in an emergency, the mobile device 102 may be configured to send its location information to the network. The mobile device 102 may be configured to automatically send its location information in response to detecting an emergency, or may provide the user with an option to send the location information. In various embodiments, the mobile device may be configured to send its location information in response to a network initiated command.

Each mobile device may become an access point (AP). The decision to be an access point may be periodically updated while still in communication with the network, or when no network is detected. Upon powering up, each mobile device may act as a client, and on a pseudo random time interval, the mobile devices may become an access point and then a client.

In various embodiments, the location based methodology may be the same for a frequency-division duplexing (FDD) and a time-division duplexing (TDD) systems. However, in the event that the communication link between the mobile device and the network is lost, the mobile device may be configured to relay its information through another mobile device having network access.

In an embodiment, all information sent via wireless communication links may be digital. In an embodiment, the information may be encrypted to a requisite advanced encryption standard (AES) standards level or the appropriate encryption level needed for the requisite communication system and access method used. Certain information may also be transmitted unencrypted in various embodiments.

Generally, the location based systems may utilize reactive or proactive based methods. In a reactive location based system, the mobile devices may synchronously interact with each other on a time basis or some other predetermined update method. In a proactive location based system, the mobile devices may update their location information based on a set of predetermined event conditions and/or using algorithms. The various embodiments may include both reactive and proactive aspects, taking the relative advantageous features of both approaches to enhance location accuracy and precision.

Various embodiments may include location determination solutions that utilize horizontal data (e.g., a set of reference points on the Earth's surface against which position measurements are made) and/or vertical data. Horizontal data define the origin and orientation of the coordinate system and may be prerequisites for referring a position relative to the Earth's surface. Vertical data may be based on geoids, which primarily serves as a basis to determine the height of a position relative to mean sea level for which the geoids act as a benchmark for origin and orientation. Various embodiments may utilize horizontal and vertical data to provide/generate enhanced three dimensional location information. The horizontal and vertical data can be global, national, local, or custom depending on the locality and positioning reference system utilized.

Traditionally global data are used for location as compared to a local data. Global data may be used for initial position fixing if possible and are based on GPS coordinates. Local data may be based on a particular position on the surface of the earth, which allows for a non GPS based location based services to take place. The various embodiments may use global data, local data, or both. In various embodiment, GPS may be used to help identify the initial positional fix, and may be augmented by dead reckoning and/or a hybrid lateration solution that utilizes both network and terminal based positioning.

Generally, a hybrid lateration solution may include a mobile device performing a measurement and sending it to the network, and a network component performing the location determination calculations. The various embodiments may include a hybrid lateration solution in which the mobile device performs the location determination calculations, with or without the support of network components.

Various embodiments may include sensor fusion operations in which a collaborative approach may be used such that the sensors act collectively. The mobile device may include various sensors (e.g., accelerometer, gyros, magnetic compass, altimeters, odometers) capable of generating heading, orientation, distance traveled, and velocity as part of the sensor information collected on the mobile device. In various embodiments, information collected from any or all of the internal sensors may be used for improving location or positioning accuracy and/or confidence values. Various embodiments may compute location information based on information from multiple sensors, with or without the aid of radio frequency propagation information.

The sensor fusion operations may include the sharing of telemetry including sensor data indicating relative movement of the individual mobile device, which enables temporal readings to assist in the location estimate, either with external assistance or dead reckoning.

Figure 8:
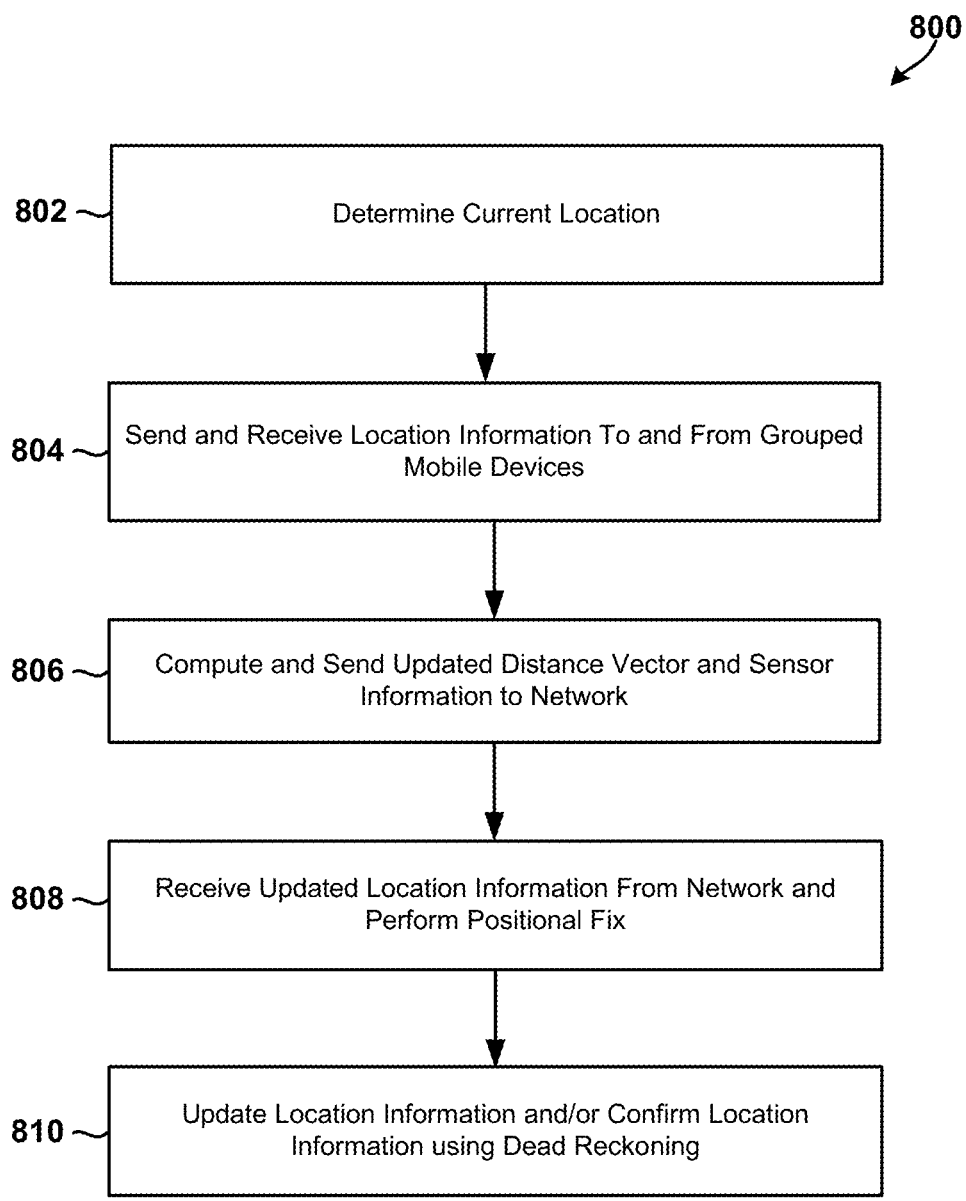
FIG. 8 is a process flow diagram illustrating an embodiment mobile device method for determining the location of a mobile device in a wireless network.

FIG. 8 illustrates an embodiment of method 800 for determining the location of a mobile device in a wireless network. In block 802, a mobile device may determine its current location using any location determination solutions described herein. In block 804, the mobile device may share its location information with other grouped mobile devices and/or receive location information from other grouped mobile devices. In block 806, the mobile device may compute and send updated distance vector and sensor information to a network component for improved positional fix. In block 808, the mobile device may receive updated location information from the network component, and perform its own positional fix based on mobile data information received from the network. In block 810, the mobile device may update its location information and/or confirm its location information using dead reckoning to enhance positional accuracy.

Dead reckoning may provide location corrections as local data methods for positioning when GPS or network related location solutions are not available. Additionally, dead reckoning may enhance the location position accuracy and precision calculations by providing additional horizontal and vertical data comparisons.

With dead reckoning, the current position may be extrapolated from the last known position. Dead reckoning accuracy requires a known starting point which either can be provided by the network, GPS, near field communication link, RF beacon, via another mobile device(s) or any other method of location determination.

A dead reckoning system may be dependent upon the accuracy of measured distance, heading, and origin. However, relying on dead reckoning alone to assist in locational improvements generally introduces error accumulation caused by sensor drift (e.g., differences or errors in values computed/collected from one or more sensors). In particular, magnetic sensors, accelerometers, and gyroscopes are susceptible to sensor drift. The error accumulation for any of the sensors may increase over undulating terrain, as compared to flat terrain. Bias error and step size error often are leading contributors to dead reckoning errors.

Various embodiments may couple the mobile device sensors and continuously recalibrate the sensors to reduce any drift errors that may be caused by unaided dead reckoning. Additionally, as part of the coupling of the sensors, any bias drift associated with the sensors may be address by utilizing a Kalman filter to reduce the errors from the primary and/or secondary sensors.

In various embodiments, the mobile device may be configured to include velocity computations as part of the location determination computations to account for position changes. When a GPS signal is available, the step size (via velocity computation) and compass bias errors may be estimated by an Enhanced Kalman Filter (EKF). Additionally if GPS is available, the compass may also be able to identify slow motion changes due to changes in magnetic inclination. The compass may be relied upon for motion computations in addition to that of accelerometers and gyroscopes, with and without the availability of GPS.

Dead reckoning accuracy may degrade with time, and may require regular location updates or location corrections. Therefore, the mobile device may be configured to not only use its own internal sensors to compute the locational information, but may also communicate with other mobile devices to leverage their locational information to enhance its own locational information. In essence, the mobile devices may act as RF base stations, providing the lateration capability to improve the positional accuracy of other mobile devices.

In an embodiment, a mobile device may be configured to poll one or more other mobile devices to improve its own location fix.

Mobile devices may be grouped together, either through assignment by the network or through the mobile device acquiring/detecting/connecting to other mobile devices (which may or may not be in the same network) as part of a discovery method for sharing location information.

Location information may be shared via the use of a near field communication systems (e.g., Bluetooth™®, ultra-wideband, peanut radios), infrared, ultrasonic, and other similar technologies, such as via the use of WiFi. The wireless communications may also be ad hoc or infrastructure based, or based on a TDD system, such as LTE, SD-CDMA, TD-CDMA, or any other TDD methods.

In an embodiment, the mobile device may be configured to initiate the sharing of location information in response to receiving a network-driven grouping request from a network component.

In an embodiment, when the mobile device has lost contact with the network, it may attempt to find a suitable mobile device to help in its location determination computations, and for possible connection to the network (e.g., via a relay).

In an embodiment, the mobile device may be configured to send a request for location information to another mobile device(s). The request may be sent after the authentication process between mobile devices, and may include a time stamp which may be sub-seconds in size (milliseconds). Another mobile device may respond with a message that also has its time stamp and when it received the time stamped message from the initiating mobile device.

Several messages (e.g., three messages) may be exchanged quickly between the mobile devices to establish time synchronization and share location information that may include X, Y, and Z coordinates, a velocity component and a vector in each message. The time differences along with the X, Y, and Z coordinates may be compared with possible pulses or pings to establish an estimated distance vector between the devices.

When the distance vector and the X, Y, Z coordinates of two mobile devices are known, a point-to-point fix may be established. This process may be repeated for some or all the mobile devices in a group that have been assigned or created by the mobile device itself. Having multiple distance vectors from other points to the mobile will enhance the positioning accuracy.

A mobile device may be configured to report back to the network location server the distance vectors it has established between different mobiles. The other mobile devices involved with the positioning enhancement may also report their distance vectors to the network to have their overall position accuracy improved as well.

The location accuracy may be done in incremental steps. The process may continue until no more positional improvements are achievable or a set precision or accuracy is achieved. The positional accuracy improvement threshold may be operator defined, and may be stored in a mobile device memory.

When collecting the distance vectors and other positional information, if the error associated with a location is greater than Q % for a lower positional confidence level then no update may be required. As the mobile device receives other sensor data and more than a pre-described change in distance in any direction or a combined distance vector, then the positional update process may begin again. However if the Q % of location confidence level is less than desired, additional positional updates may be made with the mobile devices grouped together in an interactive process to improve the confidence level of the location information.

It is important to note that typical positional location methods that are used currently used by networks are not necessarily replaced with above-described positional lateration. Instead, the hybrid lateration method may be used in various embodiments to augment the positioning accuracy and confidence for network based position requests due to boundary changes or paging requests or other position/location triggered events.

Figure 9A:
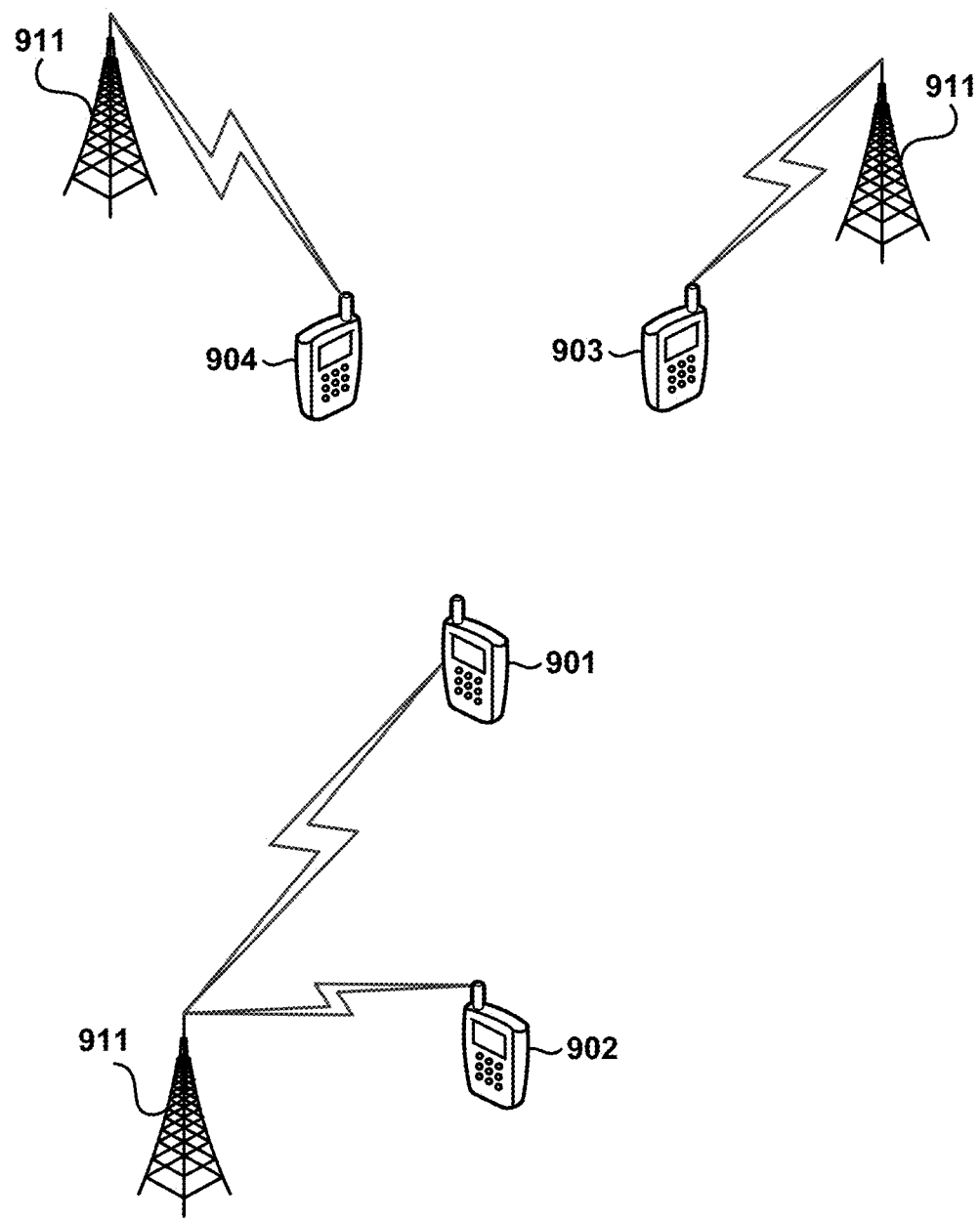
FIGS. 9A through 9E are component block diagrams illustrating various logical and functional components, information flows and data suitable for use in various embodiments.

FIGS. 9A-9E illustrate various logical components, information flows, and data suitable for use in various embodiments. FIG. 9A illustrates that mobile devices 901, 902, 903, and 904 are communicating with the wireless network via multiple cell sites/radio access points/eNodeBs 911. The mobile devices 901, 902, 903, and 904 may compute a relative fix on their initial location using any of the location determination solutions discussed above. A first mobile device 901 may be instructed to find and communicate with the other mobile devices 902, 903, and 904, and/or any or all of mobile devices 902, 903, and 904 may be instructed to communicate with the first mobile device 901. The mobile devices 901, 902, 903, and 904 may be grouped together (e.g., via one of the grouping methods discussed above). The network may also designate any one of the mobile devices 901-904 (e.g., a mobile device having a high position confidence) to be used as the reference or beacon for the other mobile devices within the group of mobile devices 901-904.

Figure 9B:
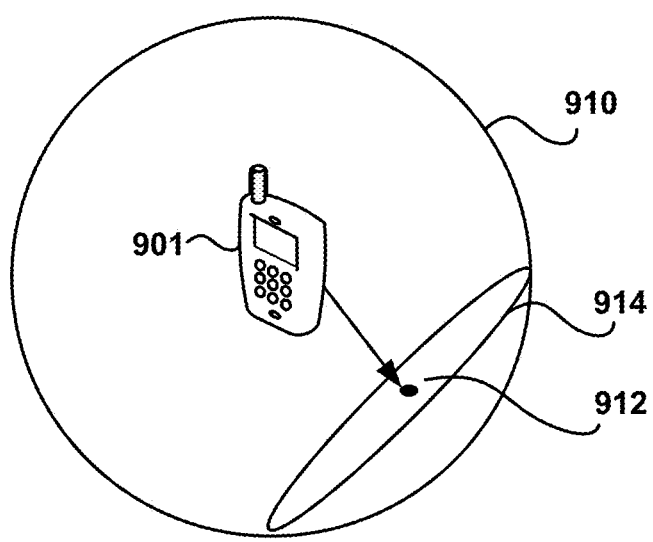

FIG. 9B illustrates that a combination of circular and/or hyperbolic lateration operations may be performed as part of an embodiment location determination solution. For example, if any of the coordinate data provided by the sensors and/or mobile devices is in latitude and longitudinal coordinates, it may be converted to Cartesian coordinates to facilitate a hybrid lateration calculation. In the embodiments illustrated in FIG. 9B, the mobile devices 901 has been designated as reference mobile device, reference number 912 identifies the position to be determined/computed (e.g., with a high level of accuracy) with respect to mobile device 901, reference number 910 identifies a three dimensional sphere that encompass the mobile device 901, and reference number 914 identifies an area of the three dimensional sphere (with X, Y, and Z coordinates) within which the device exists.

Figure 9C:
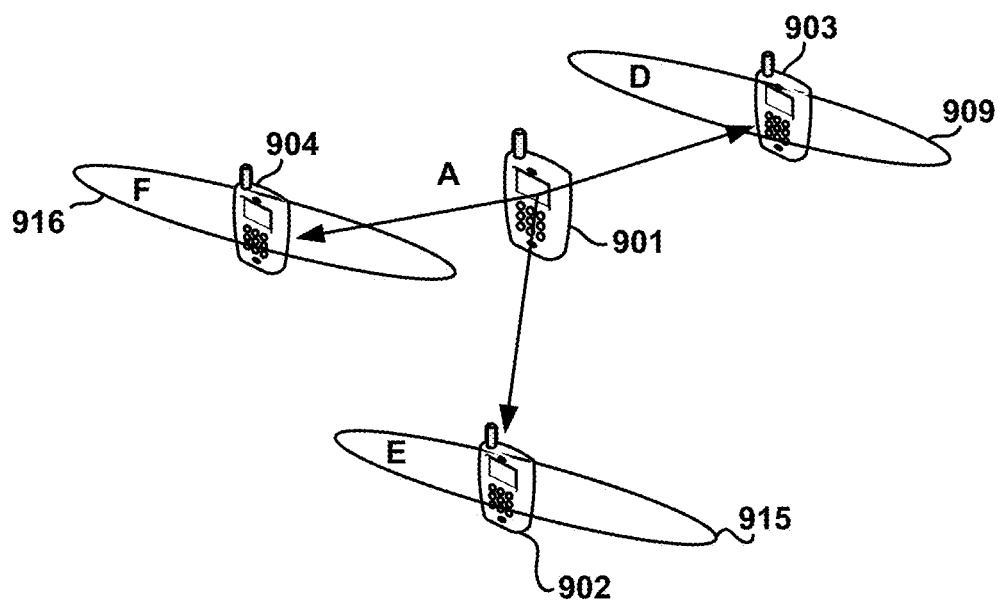
Figure 9D:
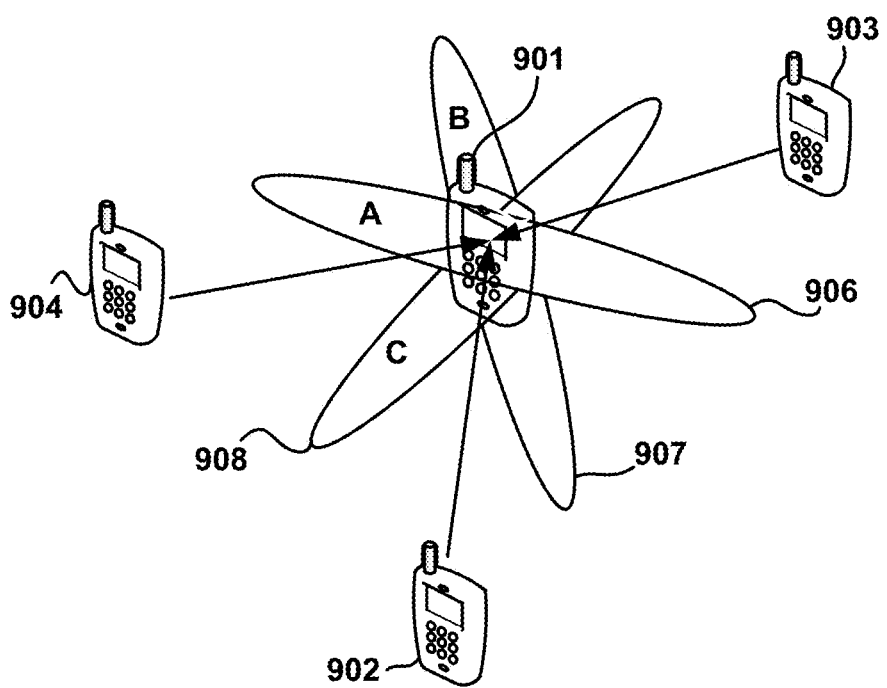

FIG. 9C-9D illustrate that distance vectors may be computed between the mobile devices 901, 902, 903, and 904 as part of an embodiment location determination solution. In FIG. 9C mobile 901 using the hybrid lateration method determines a relative position with respect to mobile devices 902, 903, and 904 respectively. Additionally, reference numbers 909, 915, and 916 identify the relative areas of mobile devices 902, 903, and 904, respectively. As part of the hybrid lateration operations of the embodiment location determination, mobile devices 902, 903, and 904 may locate mobile device 901, and the mobile device 901 may compute a distance vector between itself and mobile devices 902, 903, and or 904. The mobile device 901 may initiate communications with mobile device 902 (although mobile device 902 could initiate the communication) and exchange time stamps, location information, sensor data. The same process may occur with respect to mobile devices 904 and 903, in which positional and sensor information is exchanged.

As illustrated in FIG. 9D, the mobile devices 902, 903, and 904 may establish a distance vector between themselves and mobile device 901. The same process may occur with respect to mobile devices 902, 903, and/or 904, in which positional and sensor information is exchanged. Where mobile device 902 undergoes a similar process as with mobile device 901 as part of the hybrid lateration process. Mobile device 901 may use mobiles 902, 903, and 904 to enhance its location information and mobile device 902 may use mobiles 901, 903, and 904 to enhance its positional information, and so forth for all the mobile devices that are grouped together.

The three ellipsoids 909, 915, and 916 illustrated in FIG. 9C and the three ellipsoids 906, 907, and 908 illustrated in FIG. 9D may not intersect at a given point, but span an area of a particular size depending on the ranges involved. In various embodiments, all of the ellipsoids may not all intersect with each other. An interpolation of the best position may be necessary in any embodiment.

Figure 9E:
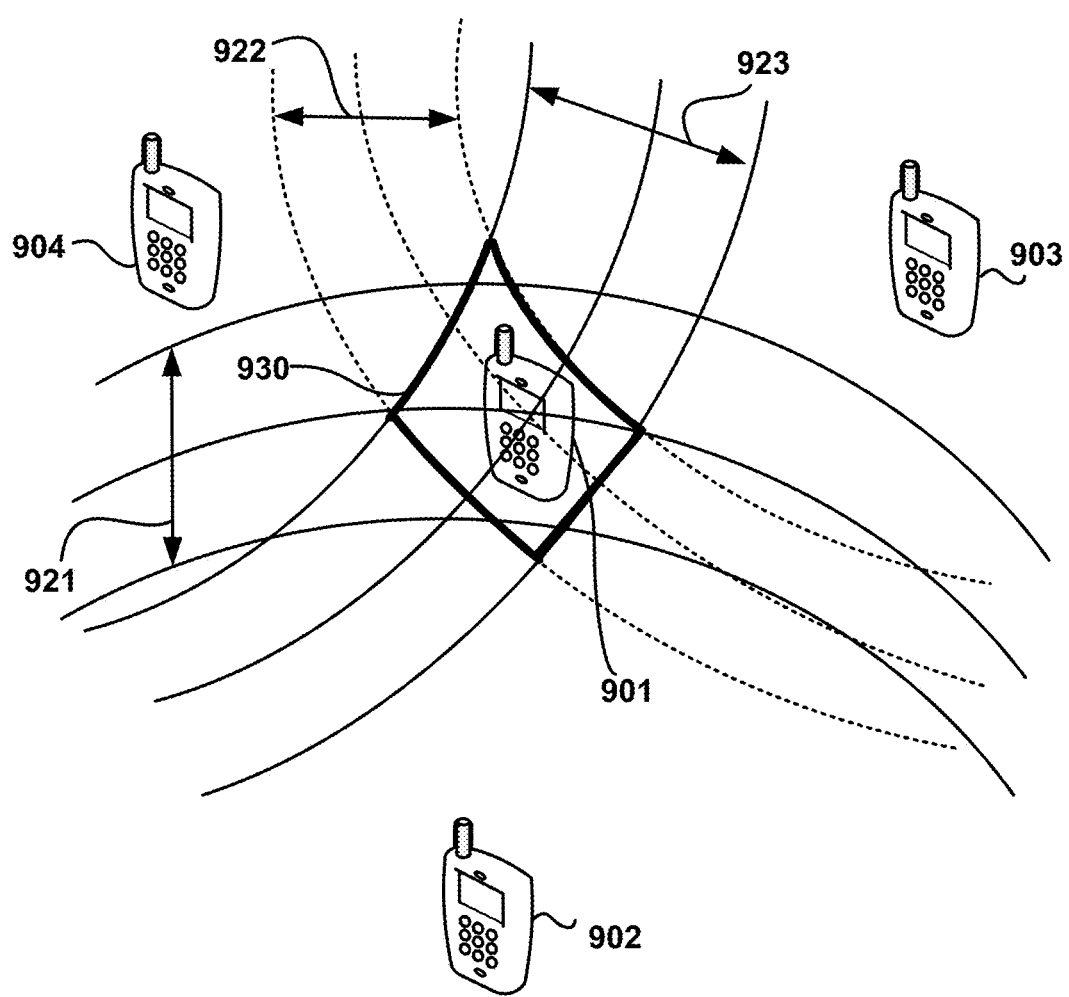

FIG. 9E illustrates an embodiment hybrid lateration method in which the position of mobile device 901 is validated or improved upon. As part of the hybrid lateration method, a separate calculation operation may be required for each X, Y, and Z coordinates, in addition to accounting for velocity. However, the ability to have three mobile devices 902, 903, and 904 locate mobile device 901 may present an error window (or an error area) for each coordinate plane represented by reference number 930. The error window/area may be a combination of range errors from the mobile devices 902, 903, and 904. Contributing to the error window/area is the hybrid range errors illustrated by reference numbers 921, 922, and 923, where: reference number 921 is the hybrid range error associated with mobile device 902; reference number 922 is the hybrid range error associated with mobile device 903; and reference number 923 is the hybrid range error associated with mobile device 904. Additionally this process can be done with less or more mobile devices than used in the above example.

For each axis (X, Y, or Z), a similar process occurs where the error area/volume 930 is a combination of determining the range between the other mobile devices and mobile device 901. The hyperbolic lateration is a typical calculation method used in location based systems and is based on the principal that the range between two locations is the same. However the range determined for the points may not be constant because the devices may be moving relative to each other.

With the hybrid lateration method proposed, a corrective distance vector $\Delta X$, $\Delta Y$, $\Delta Z$ is used that may be used with the estimated position.

The three ellipsoids 909, 915, and 916 illustrated in FIG. 9C and the three ellipsoids 906, 907, and 908 illustrated in FIG. 9D may not intersect at a given point, but may span an area of a particular size depending on the ranges involved. Therefore range is "r" and is denoted by the subscript representing the distance vector involved. Thus: $r = p_i + error$.

The pseudo range $p_i$ may represent a deviation from the actual range in any axis due to the inaccuracy in synchronization or propagation in a multipath environment or due to sensor induced errors. Where the distance vector accounting for change in direction is: $r_i = \sqrt{(X_i-x)2+(Y_i-y)2+(Z_i-z)2}$.

Three range calculations may then be averaged to determine the distance vector that is used. If the previous range calculation $r_j$ as compared to that of the current calculation has an error in excess of a defined percentage or variant, then the new measurement may be disregarded. Included with the distance vector validation may be fusion sensor information where the expected location vector calculated may be included for the confidence interval. Range difference=$d_{ij}=r_i-r_j$ An iterative process may be used for position improvement, which may include the use of a least squares calculation fit to approximate the position solution in a step wise basis. The process may continue until the range difference measured does not produce appreciable accuracy improvements, which may be defined level, either at the mobile device, the network, or both.

Multi-lateration calculations may include estimating a location of a mobile device based upon estimated distances to three or more measurement locations (e.g., locations of three other mobile devices or wireless transceivers). In these calculations, the estimated distance from a measurement location (location of another mobile device) to the mobile device may be derived from the measured signal strength. Since signal strength roughly decreases as the inverse square of the separation distance, and the transmission power of the mobile device may be presumed, the distance $d_i$ may simply be calculated as:

$$d_i = \sqrt{(S_0/S_i)}$$

where:
d_i is the estimated separation distance between a measurement location and the mobile device;
S_i is the measured signal strength; and
S_0 is the strength of the signal transmitted by the other mobile device.

Alternatively, the signal strength readings may be translated into distances using a path loss model, such as the following:

$$RSSI_i = a - cb \log_{10}(d_i)$$

where:
a is the signal strength at $d_i = 1$ meter;
b is the path loss exponent; and
c is the pathloss slope with 20 being used for free space.

The lateration operations may include performing a least squares computation, which may accomplished by a processor calculating the following formula:

$$\min_{(x,y)} \Sigma (d_i - \|MS_i - (x,y)\|)^2$$

where:
$d_i$ is the distance calculated based on a measured signal strength value;
$MS_i$ corresponds to the known location of the mobile device; and
the minimization value of (x, y) is the estimated position of other mobile devices.

The above equation may be expanded to three (3) dimensions or between any two coordinates.

Figure 10:
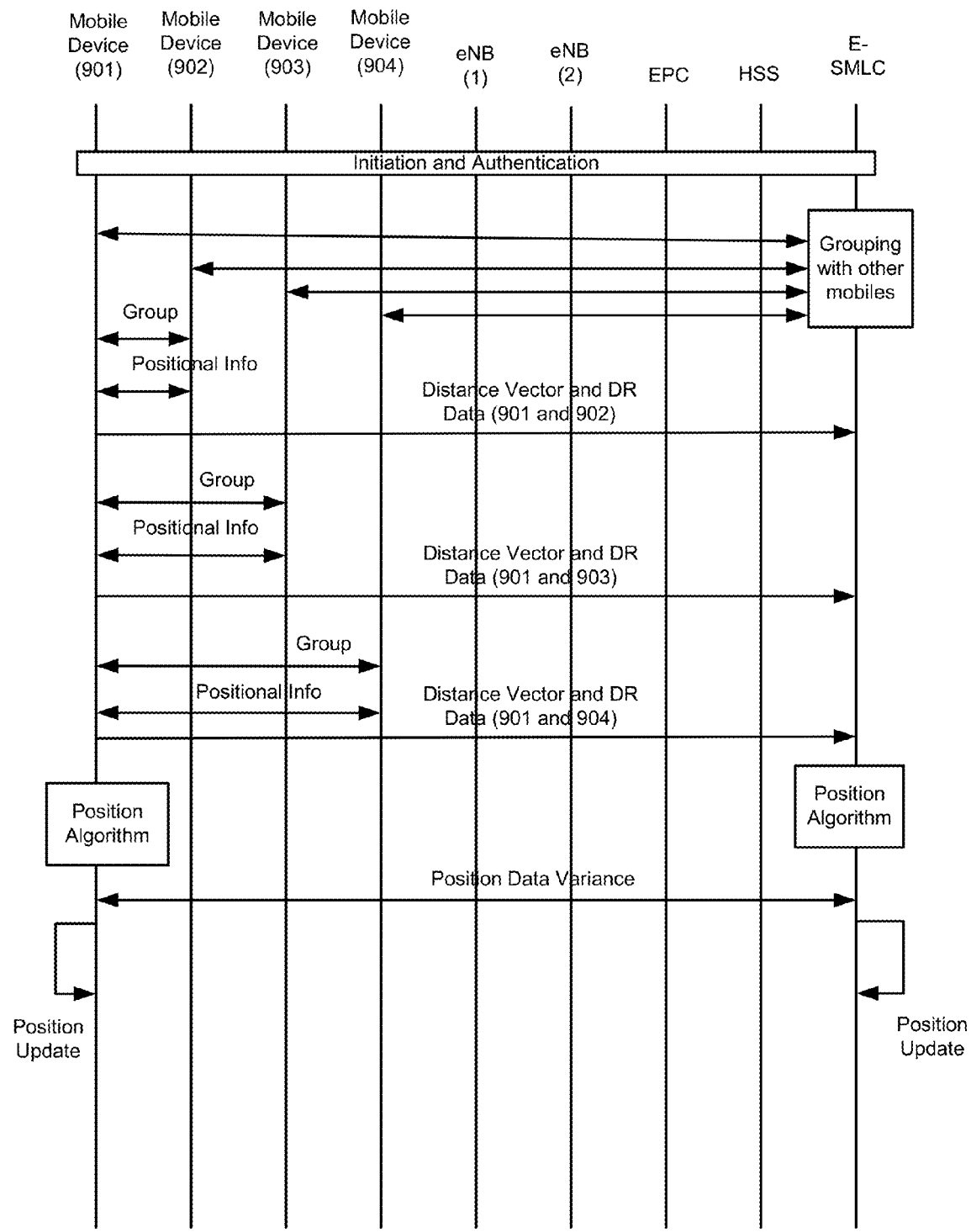
FIG. 10 is a sequence diagram illustrating an embodiment hybrid lateration method by which mobile devices may gain access to the network.

FIG. 10 illustrates an embodiment hybrid lateration method 1000 in which mobile devices may gain access to the network. The mobile devices may be instructed to be grouped by a network. Mobile devices 901 and 902 may initiate sharing of information for location due to a network driven grouping request. The sharing may be initiated because the mobile device has lost contact with the network and attempts to find a suitable mobile device to help in its location determination and/or possible connection to the network from which it disconnected via a relay or connection to another network.

Mobile device 901 may send a request for position information to mobile device 902. The information may be sent after an authentication process between mobile devices, and may include a time stamp. The time stamp may be sub seconds in size (e.g., milliseconds). The mobile device 902 may respond with a message that also has a time stamp, and timing information pertaining to when the mobile device 902 received the time stamp from mobile device 901. Multiple messages (e.g. 2 or more) may be transferred quickly to establish time synchronization. The time differences may then be compared, along with possible pulses or pings, to establish an estimated distance vector between the mobile devices. Knowing the distance vector and the X, Y, and Z coordinates of both 901 and 902, a point-to-point fix may be established.

The mobile device 901 may then initiate communication with mobile devices 903 and/or 904 and repeat the operations discussed above with respect to mobile device 902 for each of mobile device 903 and/or 904. After obtaining one or more distance vectors along with positional information, the mobile device 901 may compare the new coordinates to its previously computed current location, and adjust the location computations accordingly.

The positional information distance vectors may be sent to the network for positional processing with other network positional information. Based on the position calculated for the mobile device, the network (e.g., a component in the network, such as a network server or E-SMLC) may instruct the mobile device to adjust its positional information.

Additionally the mobile device 901 may also make a positional correction if the network does not respond in time, which may result in a message update time out. Alternatively, when the network cannot make the necessary correction, the positional information may be used by another component and/or other mobile devices to perform the necessary corrections.

If the error is greater than Q % for a lower positional confidence level then no update is required. As the mobile receives other sensor data and more than a pre-described distance in any direction or a combined distance vector than the positional update process begins again. If the Q % of positional confidence level is less than desired, additional positional updates may be made with the grouped mobile devices (e.g., iteratively) to improve the confidence level of the positional information. Additionally, if the location information from the mobile devices that are attempting to obtain a distance vector appears to be in error, then that mobile devices data may be selected to not be used for this iterative step of performing positional updates with other grouped mobile devices. However, it may continue to be queried as part of the process since its location could be corrected in one of the steps it is taking to improve its location as well.

Additionally, in the event that one or more mobile devices lose communication with the core network it may still be possible to maintain position accuracy through one of the other grouped mobile devices. It will also be possible to continue to maintain a communication link by establishing a network relay connection with another mobile device(s) in the same group which still has communication with the network.

Figure 11:
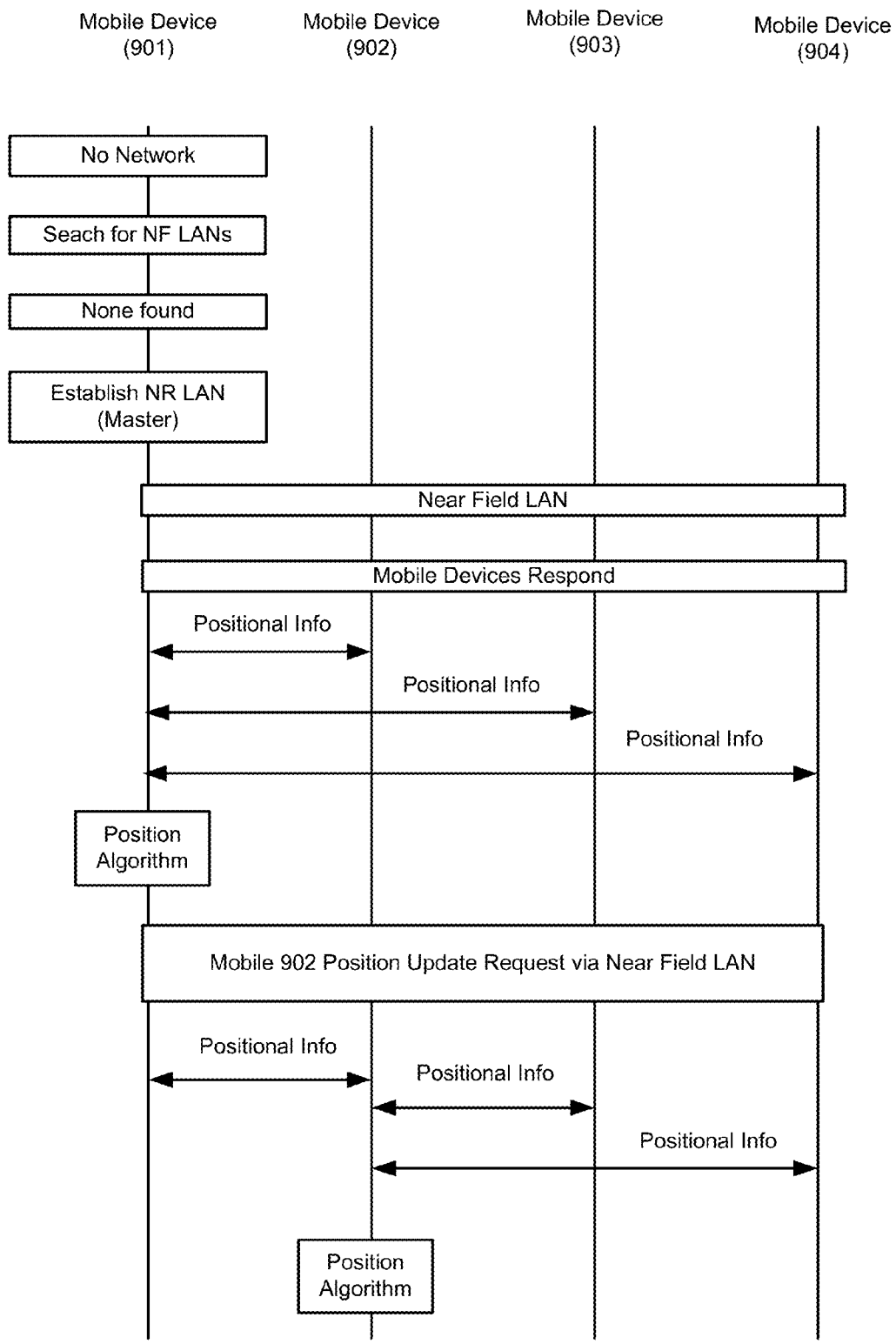
FIG. 11 is a sequence diagram illustrating another embodiment hybrid lateration method in which a mobile device cannot locate a network due coverage problems.

FIG. 11 illustrates another embodiment hybrid lateration method 1100 in which a mobile device cannot locate a network. The mobile device 901 may operate in an autonomous mode and attempt to locate another mobile device. The other mobile device could be used to relay information to the network and possibly set up a near field communication bridge in addition to providing location enhancement capabilities.

In the example illustrated in FIG. 11, mobile device 901 establishes a near field LAN inviting other mobile devices in proximity to communicate with it. Positional information can then be shared and the mobile device 901 can have its location improved. The positional information may be relayed back to the core network via another mobile device.

The mobile device 901 may also communicate its positional information and establish near field communication link with a mobile device that is not part of the home network associated with mobile device 901.

The mobile devices may have the USIM, SIM, PRL or access point information pre-built in. The mobile device for first responders may have the incident radio system set as their preferred system, or in the case that the radio access system being used as a public safety network.

For first responders to utilize a wireless mobile network (e.g., LTE), the location information accuracy may need to be improved within builds in addition to providing more accurate location information about where the mobile devices are actually located. The improvements benefit the mobile device where it is used by a first responder, commercial cellular user, or a combination of both.

The location improvement for first responders may be helpful to improve situation awareness, improve telemetry, and overall communication with the incident commander.

Since all incidents for first responders tend to be fluid, the ability to account for a dynamic environment of mobile devices coming into and out of the incident area may be crucial. In addition the mobile devices proximity location to other mobile devices can and will change as the incident situation changes where resources are added and/or reassigned as the need arises for operational requirements.

The use of network and terminal driven position enhancement techniques previously discussed herein may be exploited. The grouping of mobile devices may be done either as part of pre-plan, with intervention by the incident commander, or driven from the commercial wireless network, public safety wireless network, or local incident communication system (ICS) based on reported proximity of the mobile devices.

Figure 12A:
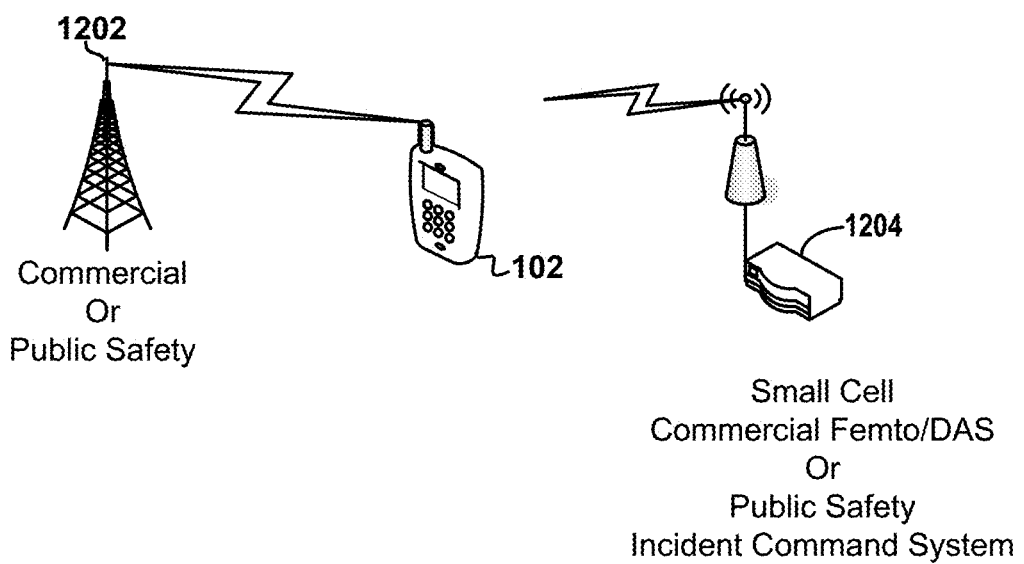
FIGS. 12A through 12C are component block diagrams illustrating functional components, communication links, and information flows in an embodiment method of transferring a connection from a local radio system to the small cell system.

FIG. 12A illustrates that upon arriving at the incident scene, a mobile device 102 may recognize the existence of a local radio network 1202. If there is no ICS radio network 1204 with which the mobile device may connect, the mobile device 102 may continue to communicate via a commercial or other wireless network, 1202.

Figure 12B:
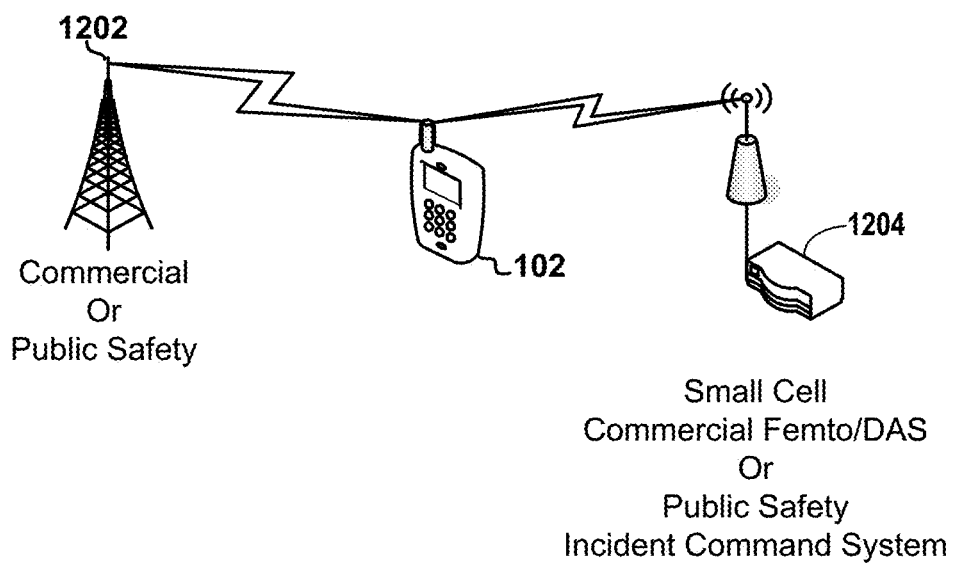

FIG. 12B illustrates that the mobile device 102 may determine that there is a valid local radio system 1202 with which it may communicate. Mobile device 102 may have priority access to the small cell system 1204 based on a preferred network and cell selection process the mobile device 102 has been instructed to use.

Figure 12C:
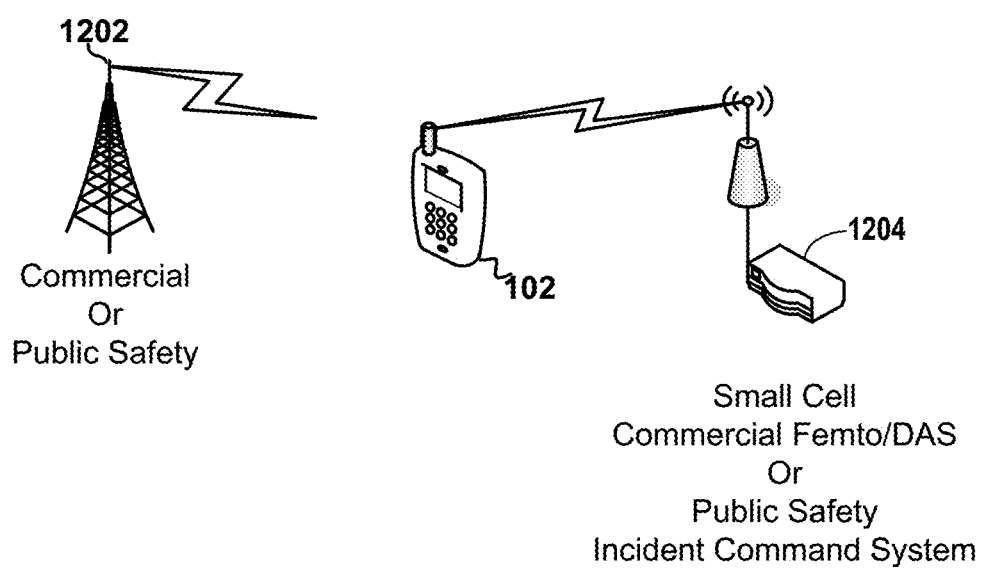

FIG. 12C illustrates embodiments where the mobile device 102 may transfer the connection from the local radio system 1202 to the small cell system 1204.

For first responders when a situation arises that requires finding a man down or responding to an emergency call (911), the location based process may be used to help in the search and rescue operation.

Figure 13A:
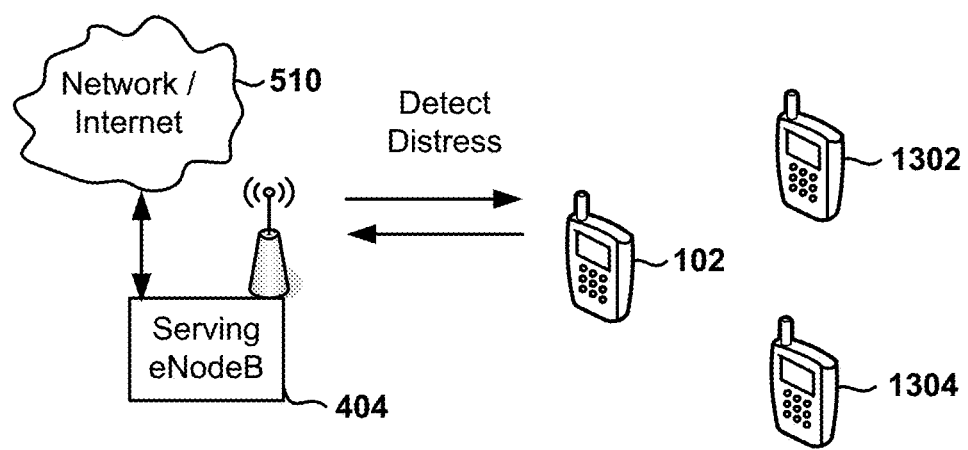
FIGS. 13A through 13C are component block diagrams illustrating functional components, communication links, and information flows in an embodiment method of identifying and responding to a distressed mobile device.

FIG. 13A illustrates embodiments where the mobile device 102 or its user may be identified by the network as being in distress. This may be by the network monitoring the mobile device 102 or via the mobile device transmitting a distress signal. The distressed mobile device 102 may determine that it has lost communication with the network, and may instruct the wearer/user to either disable or initiate a distress signal. The mobile device 102 may in various embodiments be set to auto initiate a distress signal. This may include situations such as a response to sensor readings, loss of connectivity, or inactivity of the device for a period of time. The mobile device 102, upon initiation of a distress signal, may begin a grouping process previously defined.

Figure 13B:
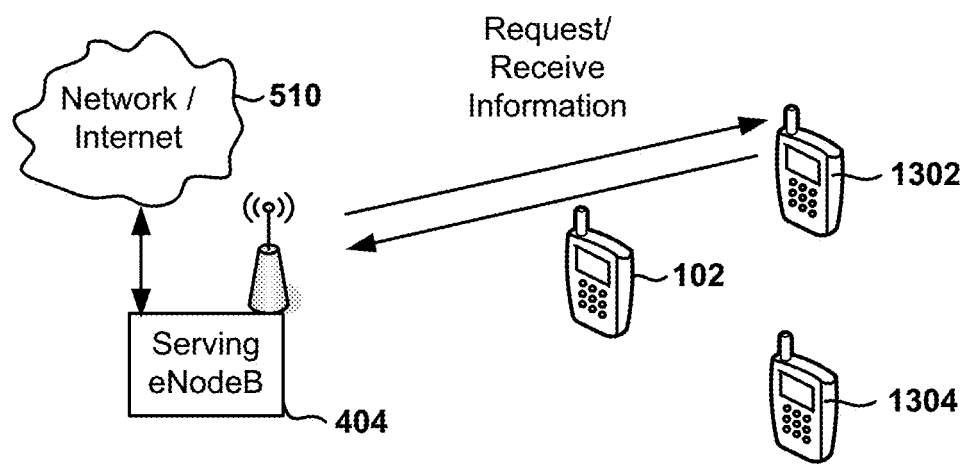

FIG. 13B illustrates embodiments where the network 510 to which the serving eNodeB 404 is connected to may instruct a mobile device 1302 in the same group as the distressed mobile device 102 to report the last known location of the mobile device 102 and time stamp.

Figure 13C:
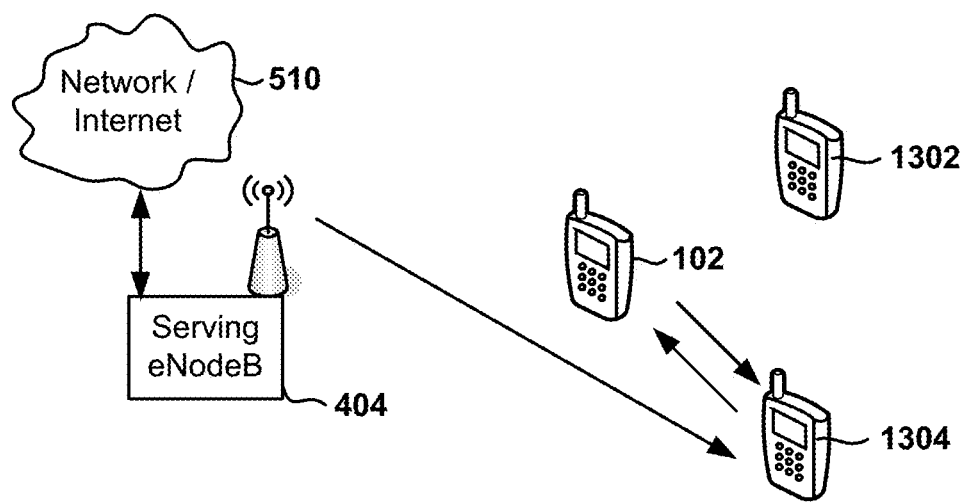

FIG. 13C illustrates embodiments where the network 510 may instruct additional mobiles devices 1304 to attempt to group with the distressed mobile device 102.

Figure 14:
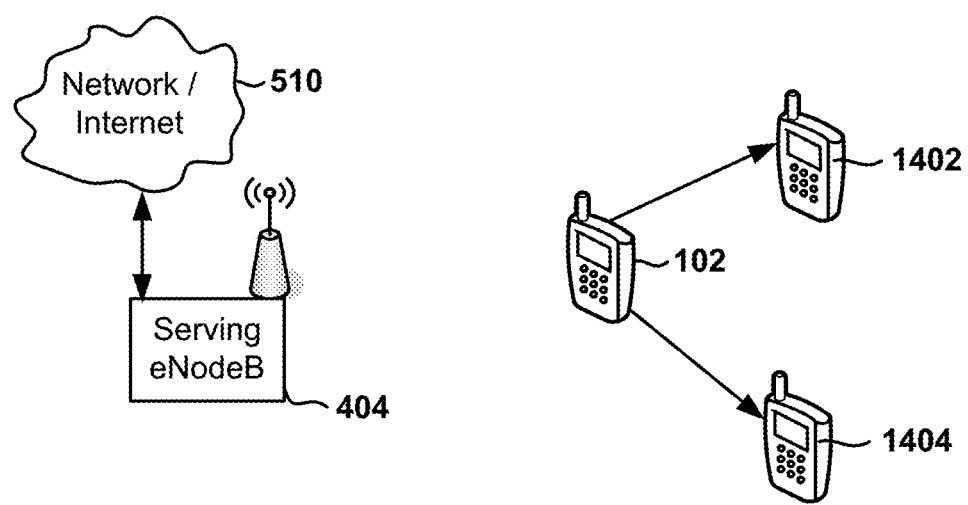
FIG. 14 is a component block diagrams illustrating functional components, communication links, and information flows in an embodiment method of performing dead reckoning grouping mobile devices in an ad-hoc scheme.

FIG. 14 illustrates embodiments where the mobile device 102 is unable to communicate with the network 510, it may be operating under a dead reckoning process and continue to attempt to locate other mobile devices 1402, 1404 and group with them under an ad-hoc scheme.

Once the mobile device has been grouped, or is still connected to the network, the relative location of the mobile device may be sent to all the mobile devices that are in active search for that mobile device. The selection of which mobile devices will be searched may be determined by operator intervention and selection.

Figure 15:
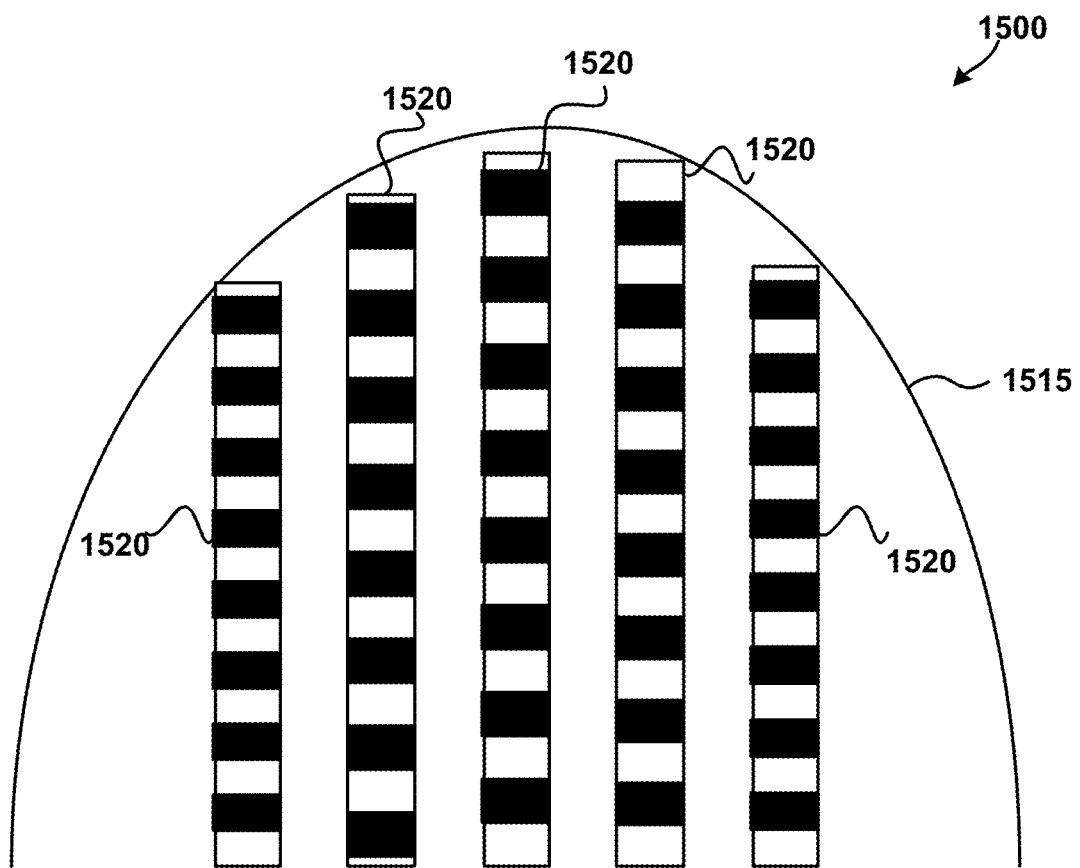
FIG. 15 is an illustration of an enhanced antenna that may be used with various embodiments to further improve positional accuracy.

FIG. 15 illustrates an embodiment enhanced antenna scheme 1500 that may be used by wireless network operators or first responders to improve the positional accuracy for the mobile device. The enhanced antenna scheme 1500 may include a radome 1515 that is curved over a series of patch antennas 1520. Several antennas 1520 may be used achieve better angle of arrival measurement. In an embodiment, the enhanced antenna scheme 1500 may include an array of antennas 1520 on flexible circuit boards so they can conform to the radome 1515.

Figure 16A:
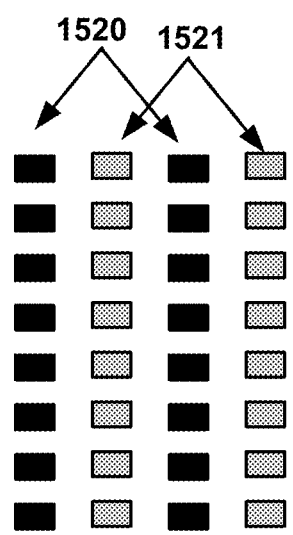
FIGS. 16A and 16B are sectional diagrams illustrating strips of antenna patches that may be used in various embodiments.
Figure 16B:
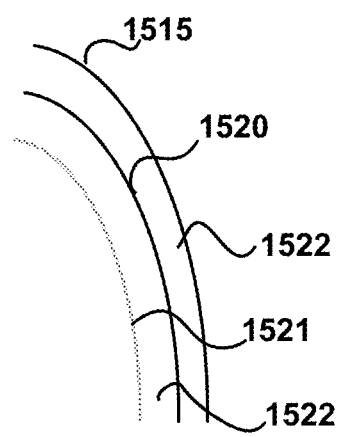

FIG. 16A-B illustrate embodiments of strips of antenna patches that may be used in various embodiments. FIG. 16A illustrates two strips of antenna patches 1520 and 1521 next to each other in an antenna array. The strips may be on a flexible circuit board so they conform to a radome. FIG. 16B is an illustration of a cross sectional view of the radome 1515 in which the antenna patches 1520 and 1521 of the antenna array are shown layered. The antenna patch 1520 is closer to the outer radome cover 1515 than is antenna array 1521. A fiber glass or a transparent RF medium 1522 may provide rigidity and enable the antennas to be closely spaced. The antenna array may be cone or other shaped using a flexible circuit design for various embodiments such as receive only configurations. Envelope detectors may be used to determine which of the antenna patches are receiving the highest quality signal from the mobile device using an amplitude method for detection.

Figure 17:
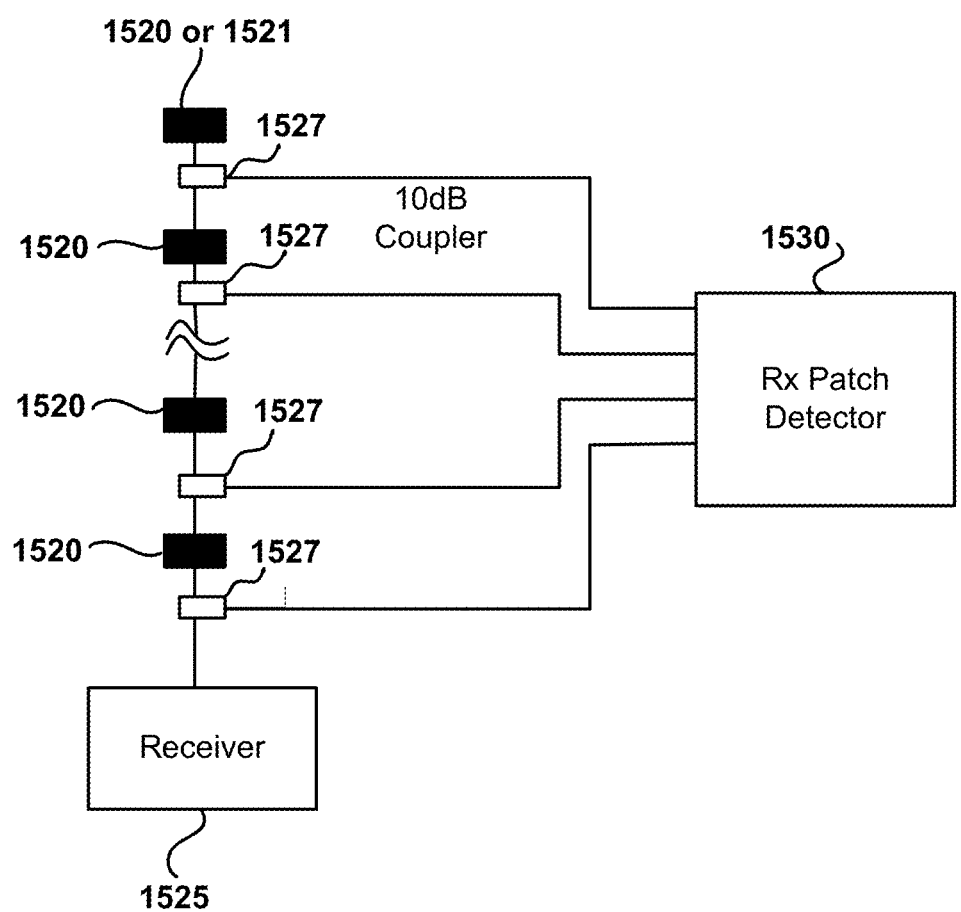
FIG. 17 is a circuit diagram of antenna system suitable for use with various embodiments.

In an embodiment, the detection and tracking of a mobile device may be controlled such that the measurements are in-synch with a eNodeB pulse request to the mobile device for positional information FIG. 17 illustrates an antenna array (1520 or 1521) in which the antenna system is connected to the normal antenna port on a receiver (e.g., eNodeB) 1525. Each of the patch antennas may be matched to a 10 db coupler 1527 and configured to provide a port coupling to a receive patch detector 1530. The receive patch detector 1530 may be configured to determine which patch antenna has the strongest signal, and based on the number of patch antennas and the distance calculation, another altitude measurement may be made by the mobile device.

In an embodiment, the antenna array system may not be connected to the eNodeB receiver 1525 and control coordination may be provided by the E-SMLC for synchronization of the received signal from the mobile device.

Figure 18:
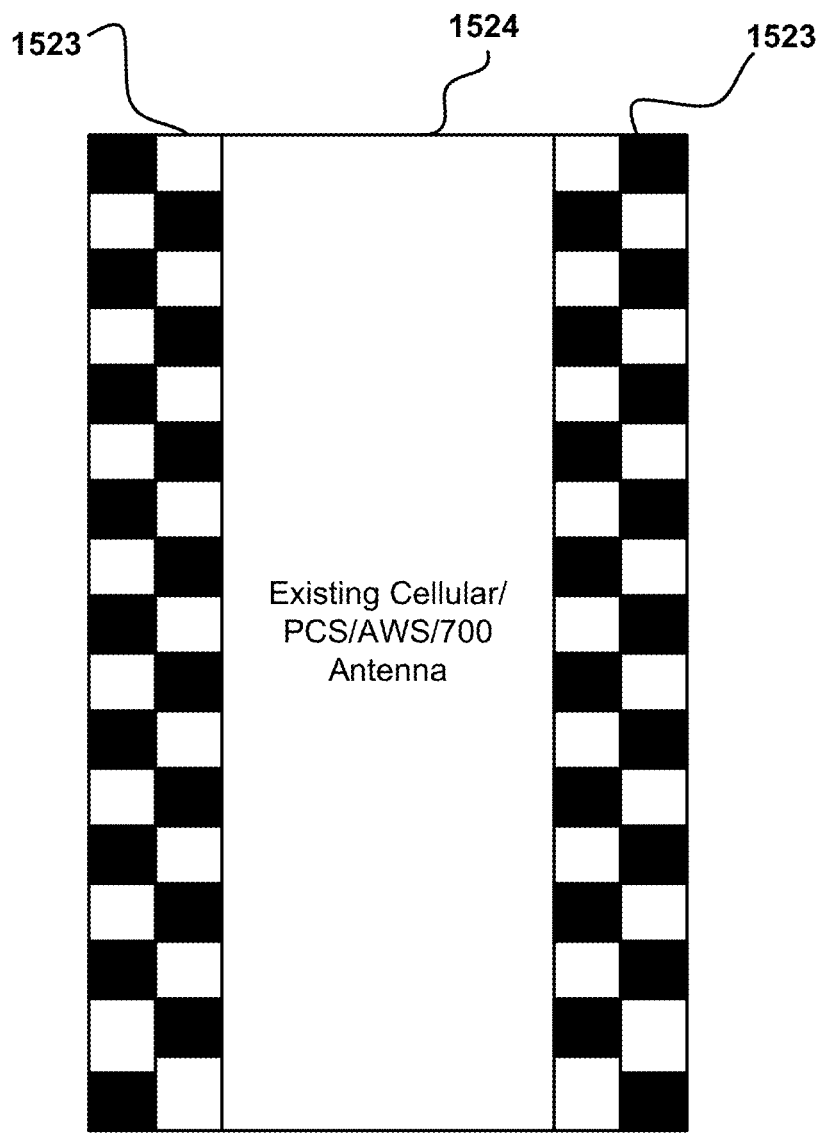
FIG. 18 is an illustration of an embodiment antenna array retrofitted into an existing cellular wireless network in accordance with an embodiment.

FIG. 18 illustrates an embodiment antenna array 1523 retrofitted into an existing cellular wireless network. The array 1523 may be installed in parallel to an existing antenna 1524. A control mechanism that is the same as or similar to the control mechanism illustrated in FIG. 18 may used for the commercial applications.

Figure 19A:
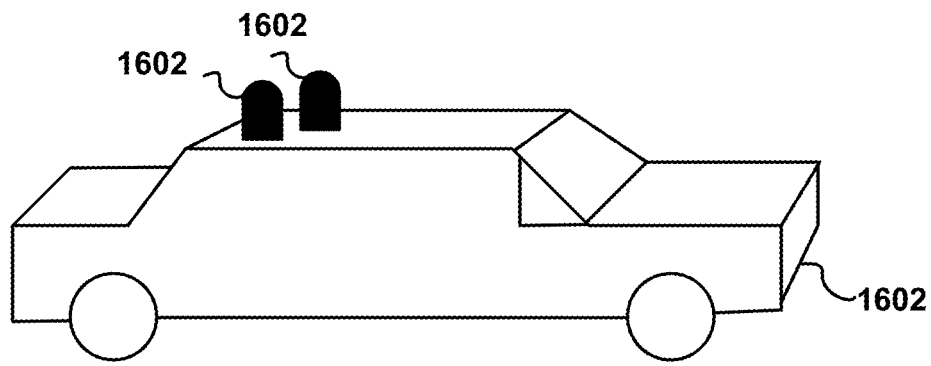
FIGS. 19A and 19B are illustrations of various enhanced antenna configurations that may be used with the various embodiments to further improve positional accuracy.
Figure 19B:
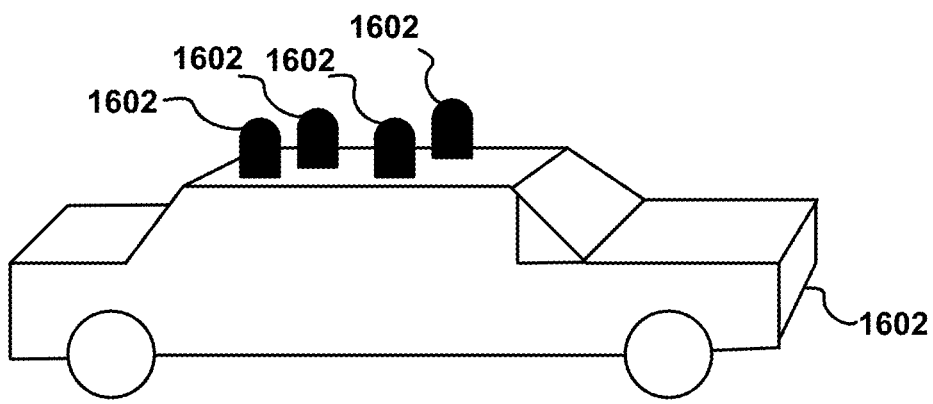

FIGS. 19A-B illustrate that the above mentioned enhanced antenna scheme 1500 may be implemented on a vehicle 1902. Specifically, FIG. 19A illustrates an enhanced antenna scheme that includes two antennas 1904 for this purpose. FIG. 19B illustrates an enhanced antenna scheme that includes four antennas 1904 for this purpose. Each antenna 1904 may include an array of antennas 1520 on flexible circuit boards so they can conform to the radome 1515.

Services and applications based on accurate knowledge of the location of a mobile device are becoming more prevalent in wireless communication systems. Additionally, public safety entities are also embarking on the use of commercial cellular technology, LTE, as a communication protocol of choice. Of specific importance is the need for improved location and situational awareness.

Presently, GPS provides a good estimate of the mobile devices current location under optimum conditions. However, in many situations, especially inside buildings and urban environments, the ability to utilize GPS for location determination is hampered and many times is not reliable or usable. Network based solutions for determining the mobile device's location have difficulties with locating the mobile device within buildings and in urban areas. The introduction of wireless network systems such as the third generation partnership project (3GPP) long-term evolution (LTE) present new capabilities, including the ability in the public safety band to provide excellent coverage in urban and indoor environments. Although the wireless mobile networks can provide coverage in urban and in-building environments, the location information and positional accuracy is often limited.

Better location accuracy and confidence has many advantages for use in emergency location services, commercial location services, internal location services and lawful intercept location services. The various embodiments provide the ability to improve the positional location information for both new and existing wireless networks.

For commercial applications, the various embodiments provide the ability to have the mobile device improve location specific information within a multiple story building or an urban environment. This provides both network radio resource improvements, and has unique targeted advertising capabilities. Improved location information can also be used by applications for improved fleet management, asset tracking, and various machine to machine communications applications where location determination is required to be highly accurate. For commercial users, the need for improved location information accuracy is most needed for in-building environments where the location of the mobile device can be more accurately pin pointed.

An advantage of improved location information for law enforcement with may enable improved the tracking of mobile devices inside buildings. This may enable determinations of what floor or part of the building the device is located in without the need for using additional radio beacons or location aware access points.

For emergency services, an advantage of better location information for the party in need of assistance, especially in an urban environment where the positional information is most problematic with existing techniques may be quicker response times or location of a victim.

For first responders, this enhancement enables mobile devices which are in the vicinity of the distressed mobile device to help augment their location information or precision with each other in a controlled ad-hoc environment. The location information shared may include any or all of latitude, longitude, altitude, and velocity. This information generally involves a small amount of data, the mobile devices can have the E-SMLC in the case of LTE share the information both on-net and off-net.

The use of sensors including accelerometers, gyroscopes, magnetometers, and pressure sensors along with GPS receivers with mobile devices is becoming more prevalent. Therefore, the enhancements for location information may give, in the case of LTE, the E-SMLC the ability to not only utilize GPS or network derived coordinate information, but also to augment sensor data associated with the mobile device which may include accelerometers, gyroscopes, magnetometer, and pressure sensors for refining and reducing some of the positional uncertainties that are in inherent to wireless location determination.

For wireless mobile networks, like LTE, users demand improved location information accuracy, especially for in building environments, in addition to generally desiring more accurate location information about the location of the mobile devices. This is true regardless whether the mobile device is used by a first responder, commercial cellular user, or a combination of both.

Improvements to location information enable improved situation awareness, improved telemetry, and improved overall communication with incident commander. In addition, the devices proximity to other devices or to fixed infrastructure devices may change. Improved location information for mobile devices allows for resources to be added and/or reassigned according to operational requirements in dynamic situations.

As discussed above, the various embodiments include methods of performing enhanced location based operations to determine an improved location (e.g., a more precise location that includes more precise values, more accurate coordinates, etc.) for a mobile device. These enhanced location based operations may include determining an approximate location of the device, grouping the devices with a wireless transceiver in its proximity to form a communication group, sending the determined approximate location to the wireless transceiver, receiving location information from the wireless transceiver, and determining a more precise location (e.g., a more precise value, more accurate coordinates, etc.) of the device based on the received location information. As part of the operations for determining its location (e.g., when determining its approximate location, etc.), the mobile device may estimate its position and/or generate a position estimate (e.g., a value or information structure that includes one or more information fields, such as latitude, longitude, altitude, ranking, confidence, precision, etc.). The various embodiments allow such position estimates to include latitude, longitude and elevation information that is accurate to within a specific level of accuracy. In a preferred embodiment, the mobile device may be configured to generate a position estimate that includes latitude, longitude and elevation information that is accurate within one (1) meter or better.

Further embodiments includes methods of providing a location based service on a first fixed wireless device. A processor of a first fixed wireless device may be configured to determine whether information that was obtained from (an internal or external) geospatial system is available in the first fixed wireless device. The processor may also determine whether the first fixed wireless device is able to establish a location fix (e.g., calculate its geospatial location) based on information obtained via a geospatial system. The processor may collect location information from a communication group in response to determining that the first fixed wireless device is not able to establish a location fix (e.g., due to its inability to acquire satellite signals or navigation data, the unavailability of information that was obtained via a geospatial system, inaccuracy of the available information, etc.). The processor may use the collected information (e.g., the information collected from devices in the communication group) to compute a new location fix when it is unable to establish an adequate location fix based on information that is obtained via a geospatial system. The new location fix may be a three-dimensional location fix that includes three-dimensional location and position information, and the first fixed wireless device may provide all or portions of a location based service based on the new three-dimensional location fix.

The various embodiments may include a wireless device having a processor that is configured to receive and use location information from one or more external devices (e.g., another mobile device, a device having a Cell ID, a WiFi device, a Bluetooth device, an RFID device, a GPS device, a location beacon transmitting device, etc.). In some embodiments, the wireless device may receive the location information in the form of one or more waypoints.

A waypoint may be an information structure that includes one or more information fields, component vectors, location information, position information, coordinate information, etc. Each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding external device. The timestamp may identify the time that the location was determined/captured. The range value may identify a distance between the external device and the mobile device. In various embodiments, a waypoint may be, or may include, a location estimate value, a position estimate, a location set, or any other similar value or location information that suitable for adequately conveying or communicating location information.

Some of the embodiments discussed above may allow a processor in a computing device (e.g., mobile wireless device, etc.) to generate a position estimate (a value or information structure that includes one or more information fields). Wireless fixed infrastructure devices (FIDs) such as small cells, femto cells, WiFi access nodes, Bluetooth™ beacons, fixed appliances, etc. could also benefit from such position estimates, particularly if they include longitude, latitude, and elevation information that is within a specific or high degree of accuracy (e.g., within one (1) meter or better). Generating and using such accurate geodetic coordinate values is also of growing importance for various entities (e.g., wireless service providers, mobile advertisers, public safety operators, etc.) that could also benefit from the position estimate generated via the various embodiments discussed in this application.

In the various embodiments, a processor may be configured to provide location based services on or via a fixed wireless device (e.g., a FID, etc.). In some embodiments, the fixed wireless device may include a geospatial positioning system (e.g., a GPS receiver, etc.). In other embodiments, the fixed wireless device does not include any geospatial positioning system (e.g., GPS, etc.) or its equivalents.

In the various embodiments, a processor that is included in or coupled to a computing device (e.g., a first fixed wireless device) may be configured to receive information that was obtained via a geospatial system. In some embodiments, this geospatial system may be included in the first fixed wireless device. In other embodiments, the geospatial system is included in a second fixed wireless device, a mobile wireless device, or some other device that is external to the first fixed wireless device, and transmitted to the first fixed wireless device.

The processor may be configured to determine whether the first fixed wireless device is able to use the received information (e.g., location information that was obtained via a geospatial system, either directly in the device or indirectly via another device) to adequately establish a location fix.

In response to determining the first fixed wireless device is not able to (or did not) establish an adequate location fix (e.g., based on the received information), the processor may collect additional location information (e.g., GPS timing information) from other devices that are in its communication group and/or from a network based location server.

In some embodiments, the processor may be configured to collect the additional location information from an intermediary device that was forwarded the information. For example, the processor may be included in a first fixed wireless device that is a member of a communication group. In addition to the first fixed wireless device, the communication group may include a first member, a second member, a third member, etc. Further, there may be other devices that are not in the same communication group as the first fixed wireless device, but which may communicate with one or more of the devices in the communication group (e.g., the first, second or third member).

As such, in some embodiments, in response to determining the first fixed wireless device is not able to (or did not) establish an adequate location fix, the processor may collect additional information by collecting forwarded information from the first member of the communication group. The first member may have received the forwarded information for from the second member of the communication group, from a network based location server, or from a fixed or mobile wireless device that is not a member of the communication group. As such, the first member may operate as an intermediary device that sends the forwarded information to the first fixed wireless device.

The processor may be configured to use the collected additional information (e.g., forwarded information, etc.) to determine or compute a new three-dimensional location fix (e.g., a value or information structure that includes one or more information fields, such as three-dimensional location and position information, etc.) for the first fixed wireless device. The processor may then use the new three-dimensional location fix to provide an enhanced location based service.

Often the geodetic coordinates for a small cells, femto cells, WiFi access nodes, Bluetooth™ beacons and/or other fixed appliances are manually entered (e.g., via human data entry). This may result in inaccurate values and/or cause other problems in the device. As such, automated and more reliable solutions that do not require any human interaction or intervention could be beneficial to wireless service providers, mobile advertisers, public safety operators, mobile device users, device manufactures, and users of location based services.

In some embodiments, a computing device (e.g., a fixed infrastructure device (FID) or wireless mobile device (MD)) may be equipped with a "sensor fusion" system/module that is configured to use various sensors to further improve location information. Such use (of sensors) may allow the computing device to better determine its approximate location and/or to generate a better position estimate (e.g., a more precise value, more accurate coordinates, etc.). In some embodiments, the computing device may also be equipped with a lateration module that is configured to perform any or all of the various lateration operations discussed in this application. The lateration operations may also include, or may be performed as part of, location-based operations that provide or accomplish enhanced location based services (eLBS) for wireless devices, including wireless FIDs and wireless MDs.

By performing lateration operations, the computing device may determine its location with a high degree of accuracy (e.g., within one meter) without human interaction or intervention.

In some embodiments, performing lateration operations on the computing device may include the computing device (or its processors) using or communicating with fixed infrastructure devices (FIDs) and/or wireless mobile devices (MDs).

Performing lateration operations may also include a fixed infrastructure device (FID) communicating with another FID and/or sharing location information (e.g., location-based information, coordinates, ranging data, etc.) with other devices.

If the location information does not provide ranging data (e.g., distances between an external device and the computing device), the devices may execute various processes or perform various operations in order to determine ranging information. These operations/processes may include sounding operations/processes, ranging operations/processes, etc. Ranging operations may include operations for implementing any conventionally or known technique for determining the distance between two components.

In various embodiments, an eLBS system (e.g., any system or device that includes a processor configured to perform eLBS operations, etc.) may be extended to function (or to be used for, to support, etc.) an FID or FID-based location based services.

In some embodiments, the FIDs may be configured to receive and use inputs from other FIDs and/or MDs in order to improve the location information. This may be especially helpful where an object is to be fixed (is to be located at a fixed location), but over time may move, such as in locations where tectonic active can cause shifts.

Figure 20:
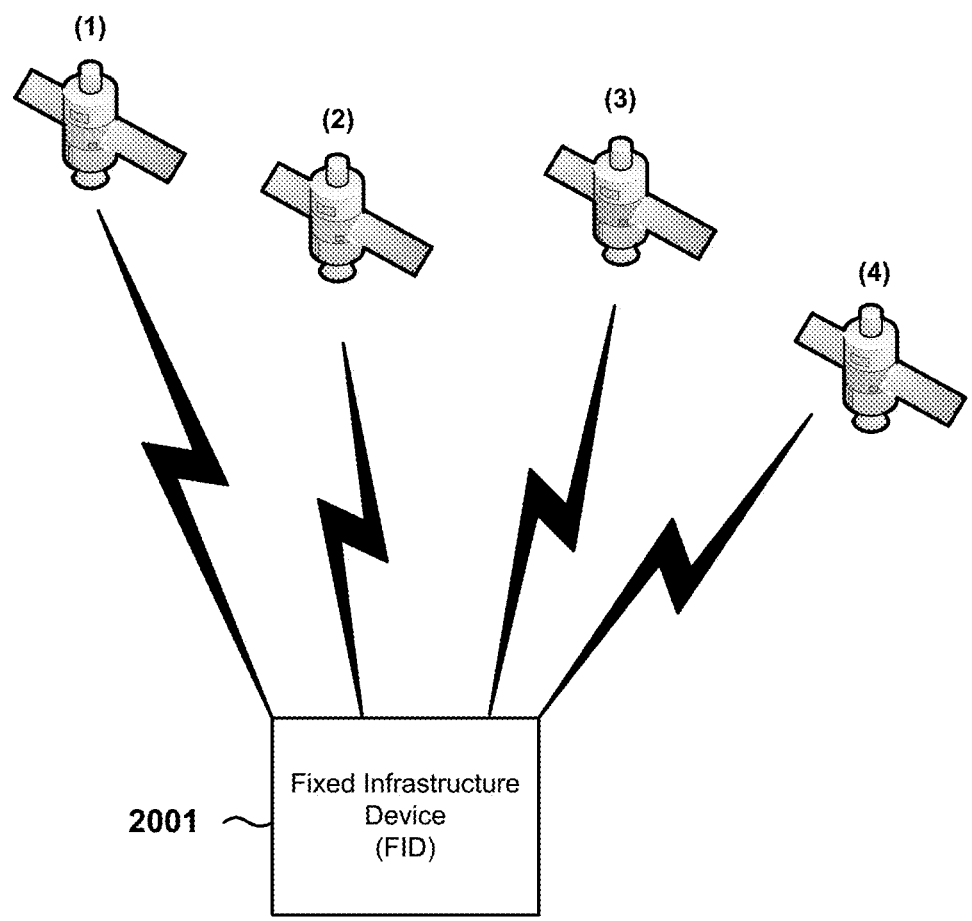
FIG. 20 is a system block diagram illustrating that a wireless fixed infrastructure device may require information from four satellites (numbered satellites (1), (2), (3), and (4)) in order to obtain GPS location in some embodiments.

Various embodiments may involve FIDs that cannot obtain a GPS lock using traditional methods. An example of such a device is illustrated in FIG. 20, which illustrates an embodiment FID 2001 (e.g. a small cell, femto cell, beacon with GPS capabilities, etc.). This example illustrates that the FID 2001 generally needs four satellites, numbered satellites (1), (2), (3), and (4) in order to obtain GPS location.

Figure 21:
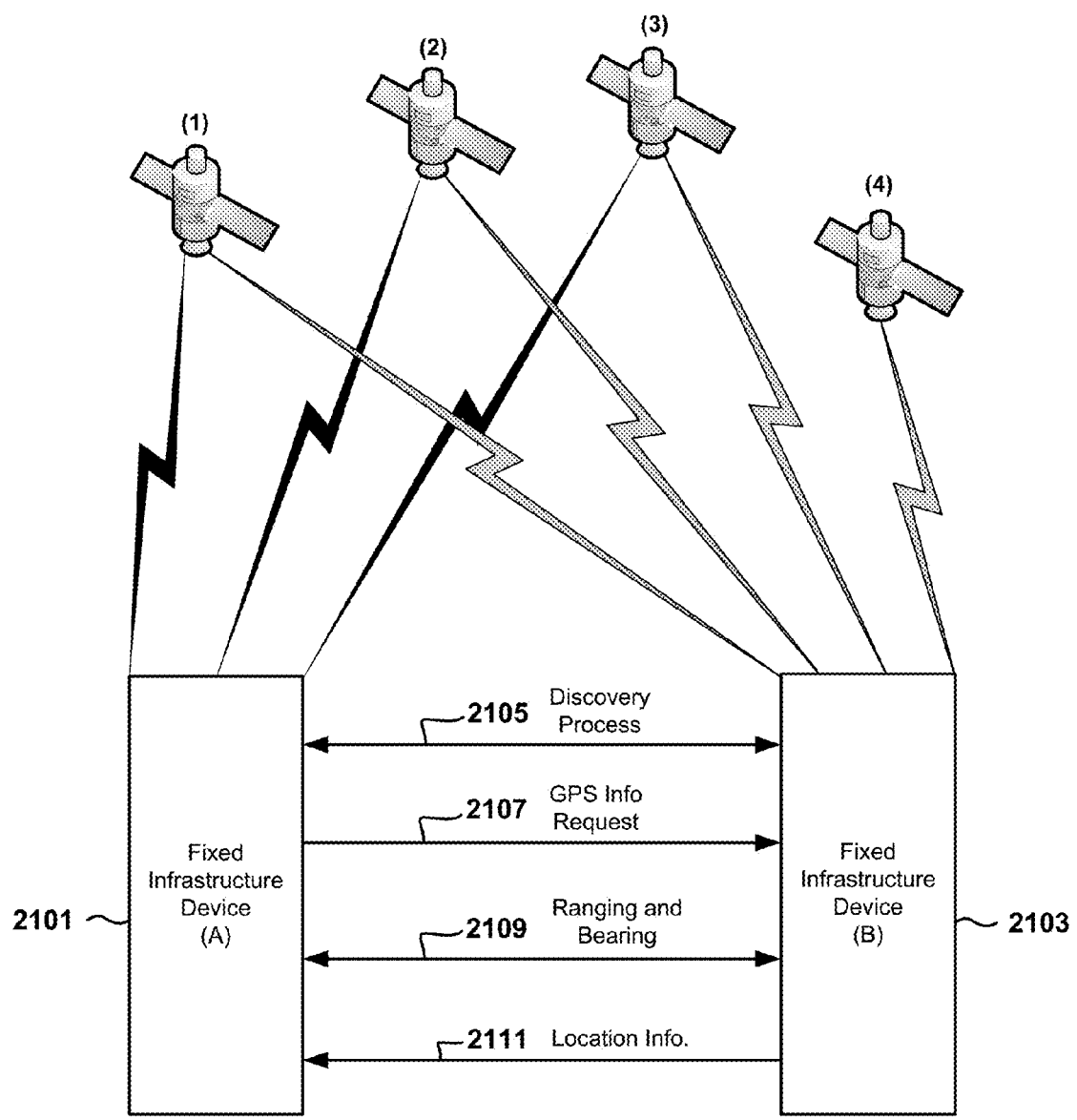
FIG. 21 is a system block diagram illustrating communication links between four satellites and two fixed infrastructure devices that may be configured to perform enhanced location based operations in accordance with some embodiments.
Figure 22:
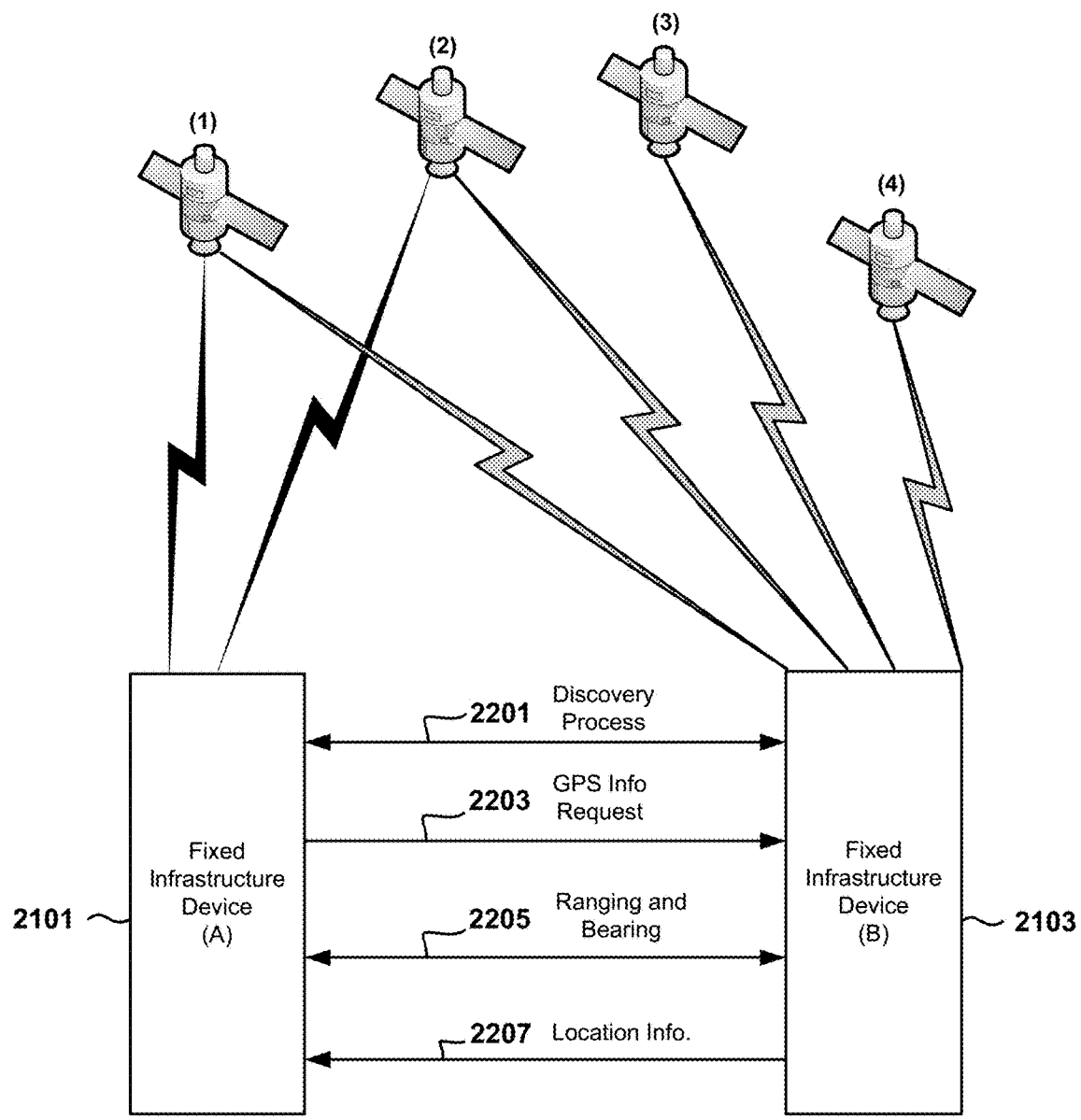
FIG. 22 is a system block diagram illustrating alternative communication links between four satellite and two fixed infrastructure devices configured to perform enhanced location based operations in accordance with other embodiments.

A FID may not always be able to connect to four satellites. At times, FID 2001 may only be able to obtain communication with three or fewer satellites. In various embodiments, an FID may use other FIDs or MDs to assist in making a GPS position determination. For example, FIG. 21 illustrates an embodiment system in which a FID may use such assistance for GPS position determination. As shown, FID(A) 2101 may only be able to obtain GPS timing and information from three satellites (1), (2), and (3) instead of the minimum four required for an initial location determination. Therefore, FID(A) 2101 may undergo discovery process 2105 with another FID, FID(B) 2103, allowing FID(A) 2101 and FID(B) 2103 to establish communication with one another. Specifically, once FID(A) 2101 and FID (B) 2103 discover each other via discovery process 2105 that could be through connectivity which may or may not include a network or core network or via a wireless communication methods, FID(A) 2101 may send a message 2017 to FID(B) 2103 requesting GPS assistance ("GPS Info Request"). Upon receiving the message 2107, the FID(B) 2103 may establish the distance between FIB(A) 2101 and FIB(B) 2103. This may be done by exchange of various signals and messages exchanged between FID(B) 2103 and FID(A) 2101. Once ranging and bearing information is established, the information is sent via message 2109 to FID(A) 2101. In various embodiments, the ranging and bearing information included in message 2109 may include bearing direction measurements as well distance measurements. FID(A) 2101 having received the ranging and bearing information to FID(B) 2103 from FID(B) 2103, FID(B) sends location info. (location information) message 2111 which includes GPS timing information for the satellite which FID(A) is unable to obtain information from. Utilizing the ranging and bearing information and the GPS timing information, FID(A) 2101 is able to offset the GPS timing information in order to use it as the fourth GPS satellite necessary to obtain a GPS lock. While the FID(A) 2101 is shown in FIG. 21 as obtaining initial information from each of satellite (1), (2), and (3), in some cases FID(A) may obtain initial information from only or two satellites. For example, FIG. 22 illustrates an example in which FID(A) 2101 is able to obtain initial information from only two GPS satellites (1) and (2). In this embodiment, FID(B) may provide GPS satellite information for satellites (3) and (4) to FID(A) 2101 using the same messages 2105-2111 described above with respect to FIG. 21. The GPS satellite information can include latitude, longitude and timing information from one or both of the satellites that FID(A) cannot obtain information on its own from.

Referring to FIGS. 1-22, a discovery process 2201 is executed between FID(A) 2101 and FID(B) 2103. This process is generally initiated by FID(A) 2101, but may be initiated by FID(B) 2103 in various embodiments. The discovery process 2205 is similar to discovery process 2105. FID(A) 2101 then may send a GPS information request message 2203 to FID(B) 2103. This may be one message requesting a number of GPS satellites necessary to obtain a GPS lock. Alternatively, message 2203 may request fewer than the necessary number needed from any one FID. In response to receiving the GPS information request message 2203, FID(B) 2103 and FID(A) 2101 establish ranging and bearing between each other similar to 2109. FID(B) 2103 may then send the GPS timing information for the number of satellites that have been requested that FID(A) 2101 is unable to communicate with. In various embodiments, FID (A) 2101 may request fewer than all necessary satellites from FID(B) 2103. The same process as illustrated in FIG. 22 may be followed but message 2203 may indicate a request for GPS information for fewer than all satellites. As illustrated in FIG. 22, it would be for one satellite.

The GPS information exchanged can include latitude, longitude, altitude and timing information about any of the satellites that FID(B) has and that FID(A) cannot obtain information on its own from.

FIG. 22 may also encompass embodiments where FID(A) 2101 is able to communicate with one or zero satellites. In these embodiments, FID(A) 2101 follows the same procedures and messages 2201-2207 with FID(B) 2103 but requesting the additional information necessary.

It is obvious to anyone skilled in the craft that obtaining GPS information that FID(A) needs to obtain a positional GPS lock can come from one, two or multiple FID's that FID(A) is able to communicate with.

In addition to obtaining an initial location using GPS information, additional refinements to position accuracy and/or precision of an FID may be achieved using the lateration operations with eLBS.

Figure 23:
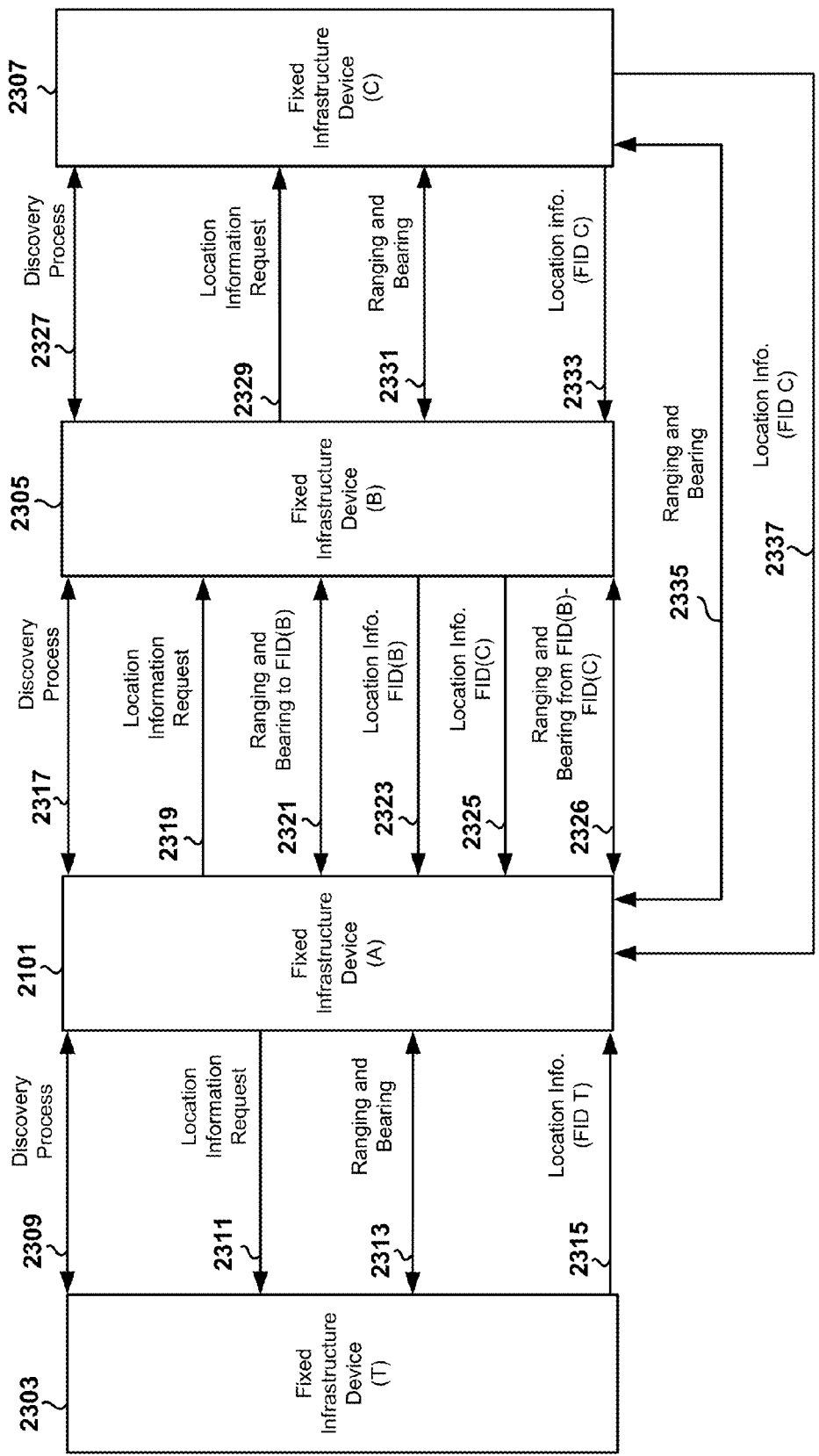
FIG. 23 is a system block diagram illustrating communications and communication links between four different fixed infrastructure devices that could be configured for performing enhanced location based operations in accordance with the various embodiments.

FIG. 23 illustrates communications among several FIDs. In various embodiments, FID(T) 2301, FID(A) 2101, FID (B) 2305, and FID(C) 2307 may communicate with each other in order to share location information (e.g., latitude, longitude, altitude, bearing information data, GPS data, GPS timing information, etc.). In various embodiments, the FID (T) 2301, FID(A) 2101, FID(B) 2305, and FID(C) 2307 may be of the same infrastructure and/or technology type, (e.g., LTE eNodeBs, LTE small cells, LTE femto cells, 3GPP, UMTS cells, Wi-Fi access points, Bluetooth™ beacons, or other radio access devices, etc.). In other embodiments, some or all of the FIDs may be of mixed infrastructure and/or technology types.

With reference to FIGS. 1-22, in various embodiment, FID(A) 2303 may obtain location information from other FIDs to determine its position. In various, embodiments, FID(A) 2303 may undergo a discovery process with FID(T) 2301 through message(s) 2309, and a discovery process with FID(B) 2305 with message(s) 2317.

The FID(A) 2303 may request location information from FID(T) 2301 through message 2311 which may be provided by various methods. For example, ranging and bearing may be established between FID(T) 2301 and FID(A) 2101 through exchange of message(s) 2313. FID(T) 2301 may then provide location information to FID(A) via message 2315. FID(T) 2301 may then provide GPS location information for FID(T) 2301 it has obtained from a satellite with which that FID(A) 2101 is unable to communicate.

Similarly, FID(A) 2101 may request location from FID (B) 2305 through message 2319. In response, ranging and bearing may be established between FID(B) 2305 and FID(A) 2101 through exchange of message(s) 2321. FID(B) 2305 may provide location information to FID(A) 2101 via message 2323. FID(B) 2305 may also provide GPS timing and location information for satellites FID(A) 2101 is unable to communicate with to FID(A) 2101.

FID(B) 2305 may respond by establishing ranging and bearing to FID(A) 2303 via ranging and bearing 2321. Location information for FID(B) 2305, including GPS satellite timing information may be sent to FID(A) 2303 location information message 2325. In some embodiments, the location information message 2325 may be sent to FID(A) 2101 prior to FID(A) 2101 and FID(B) 2305 establishing ranging and bearing via message(s) 2321. Further, transmission of messages 2305-2325 may occur, before, after, or simultaneously with the transmission of messages 2311-2315.

In various embodiments in which FID(T) 2301 and/or FID(B) 2305 are able to provide sufficient location information to FID(A) 2303 to establish a location fix, communications with additional FIDs and/or MDs (e.g. FID(C)) may not be necessary. However, in embodiments in which FID(T) 2301 and/or FID(B) 2305 are unable to provide sufficient additional GPS timing and location information to FID(A) 2303 to obtain a location fix, FID(T) 2301 and/or FID(B) 2305 may obtain additional GPS timing from other FIDs, including FIDs with which FID(A) 2303 may or may not be able to communicate with directly. For example, FID(B) 2305 may obtain, or facilitate FID(A) 2101 in obtaining, additional location information from FID(C) 2307, way may subsequently be provided to FID(A) 2101. In particular, FID(B) 2305 may undergo a discovery process with FID(C) 2307 through exchanging message(s) 2237. FID(B) 2305 may generate and send a location information request message 2329 to FID(C) 2307. FID(C) 2307 and FID(B) 2305 may establish ranging and bearing between each other via ranging and bearing messages 2331. FID(C) 2307 may then send GPS timing information via message 2333 for a satellite with which FID(A) 2101 and FID(B) 2305 are unable to obtain GPS timing information from. Message 2333 may also include additional location information such as latitude, longitude and/or altitude of FID(C) 2307. FID(B) 2305 may provide the contents of location info message 2333, or simply forward message 2333 to FID(A) 2303 as message 2325. In addition to message 2325, FID(A) 2303 will need to establish ranging and bearing from FID(A) 2101 to FID(C) 2307. This may be done by FID(B) 2305 providing ranging and bearing between FID(A) 2101 and FID(B) 2305 through message(s) 2321 and ranging and bearing between FID(B) 2305 and FID(C) 2307 via message(s) 2326. FID(A) 2101 then calculates the ranging and bearing from FID(A) 2101 to FID(C) 2307 to use with the GPS timing information provided by FID(C) 2307.

FID(B) 2305 and FID(C) 2307 may establish ranging and bearing via messages 2331 similar to how FID(B) 2305 and FID(A) 2101 establish ranging and bearing between each other. This may be accomplished in response to FID(B) 2305 requesting location information from FID(C) 2307 via message 2329.

In an various embodiments, FID(C) 2307 may be able to establish ranging and bearing to FID(A) 2101. This may be done in response to location information request message 2329 which may indicate the requesting FID, in this example, FID(A) 2101. In such an example, FID(C) 2307 may establish ranging and bearing via message(s) 2335 with FID(A) 2101 and provide GPS timing information via message 2337 directly to FID(A) 2101, or relay the GPS timing information via message 2333 to FID(B) 2305, which in turn sends it via message 2326 to FID(A) 2101.

In various embodiments, wireless mobile devices (MDs) may access a FID utilizing in order to provide an eLBS updates to one or more FIDs.

Figure 24:
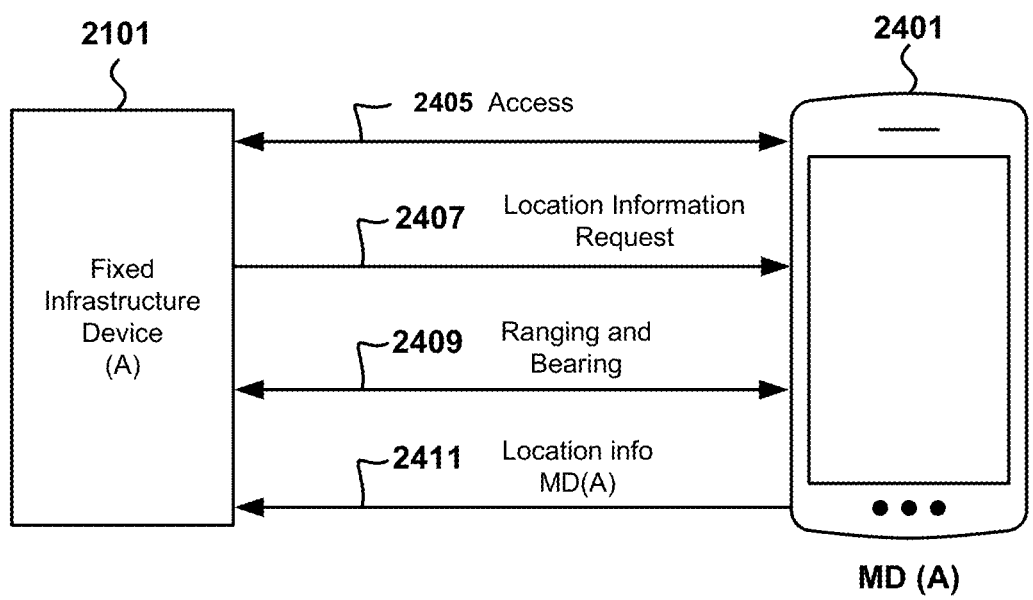
FIG. 24 is a system block diagram illustrating communications and communication links between a fixed infrastructure device and a mobile device configured to perform enhanced location based operations in accordance with the various embodiments.

FIG. 24 illustrates an example in which a mobile device, MD(A) 2401, communicates with FID(A) 2101. Referring to FIGS. 1-23, FID(A) 2101 may establish access with MD(A) via message 2405. Alternatively, the MD(A) 2401 may establish access with FID(A) 2101. In either embodiment, messages 2405 may include normal communications between a wireless mobile device and a wireless fixed infrastructure device, such as a cellular telephone handset and an eNodeB, a base station, a WiFi access point, or BlueTooth™ enabled computing device, etc. FID(A) 2101 may request position information from MD(A) 2401 via location information request message 2407. FID(A) 2101 and MD(A) 2401 may establish ranging and bearing between each other via message(s) 2409. MD(A) 2401 may provide FID(A) with its location information to GPS timing via message 2411. In various embodiments, MD(A) 2401 may also provide location information such as latitude, longitude, and/or altitude information via message 2411 to FID(A) 2101. Location information may further include a velocity component for MD(A) 2103, or a relative velocity between FID(A) 2101 and MD(A) 2401. FID(A) 2101 may use the received location information in addition to the GPS timing information to determine a location fix.

Figure 25:
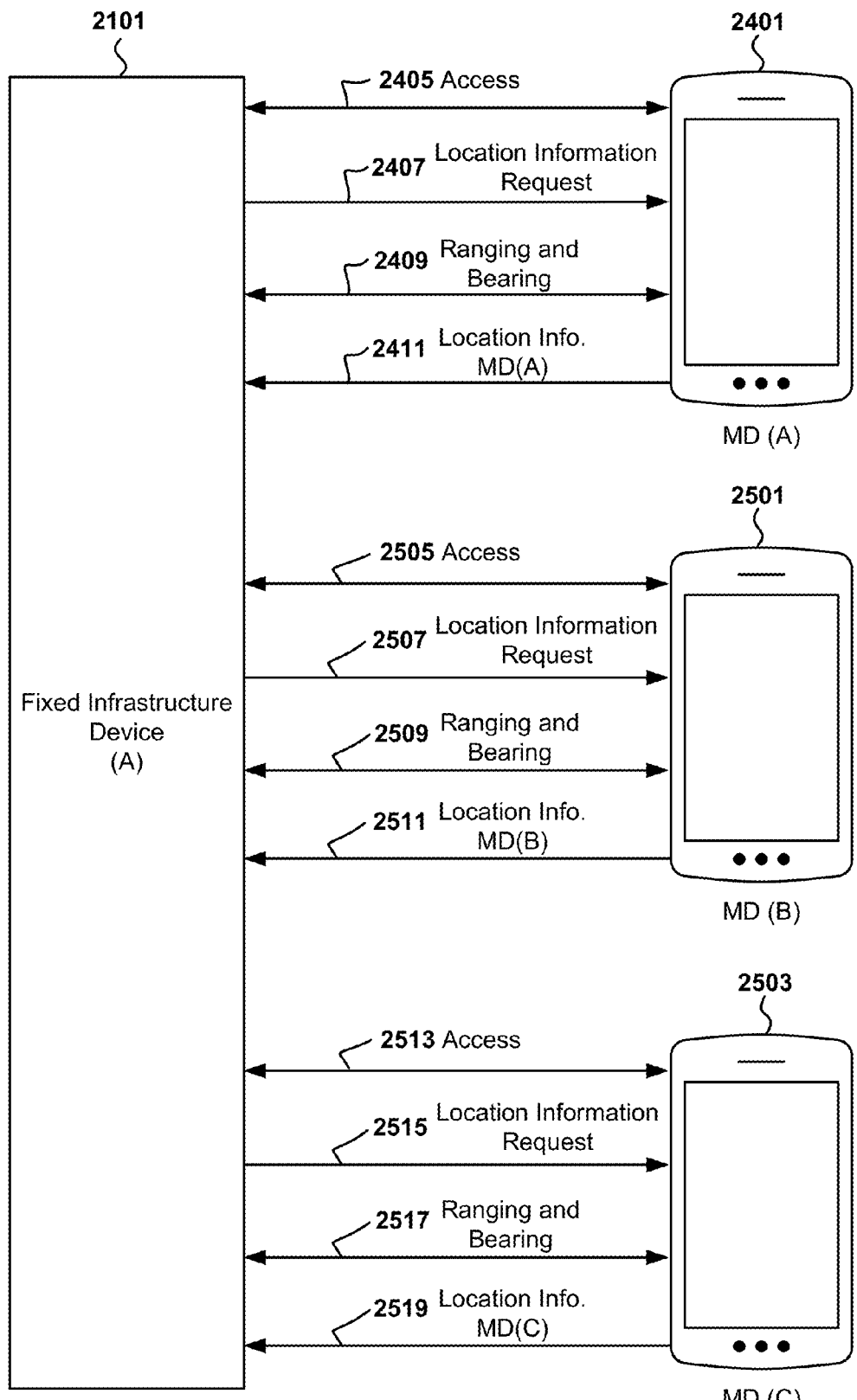
FIG. 25 is a system block diagram illustrating communication links and information flows between a fixed infrastructure device and a plurality of mobile devices that could be configured to perform enhanced location based operations in accordance with the various embodiments.

FIG. 25 illustrates another example in which multiple MDs may exchange communications with a FID to enable the FID to determine its position. With reference to FIGS. 1-24, MD(B) 2501 and MD(C) 2503 may provide location information to FID(A) 2101 in addition to MD(A) 2101. FID(A) 2101 may establish access with MD(B) 2501 via message(s) 2505. MD(B) 2501 may receive a location information request message 2507. MD(B) 2501 and FID (A) 2101 may establish ranging and bearing via message(s) 2509. MD(B) 2501, may send location information via message 2511 to FID(A) 2101. FID(A) 2101 may also establish access with MD(C) 2503 via messages 2513, send a location information request message 2515 to MD(C) 2503, establish ranging and bearing via messages 2517 between FID(A) 2101 and MD(C) 2503, and receive location information from MD(C) 2503 via message 2519. Messages 2505-2511 and 2513-2519 are similar to messages 2405-2411. FID(A) 2101 may obtain location information from multiple MDs and FIDs simultaneously or in series. In various embodiments, access between FID(A) 2101 and any of MDs(A) 2401, (B) 2501, (C) 2503, may have previously been established. An examples include an MD camped on a cell tower, an MD that previously transferred connection to a cell tower or a WiFi transceiver.

In various embodiments, a FID may have location information, to include some or all of latitude, longitude, and/or altitude or location. MDs and/or other FIDs, may be used to improve the accuracy of the FIDs latitude, longitude, and/or altitude measurements, or to verify the location information the FID currently has on record.

Figure 26:
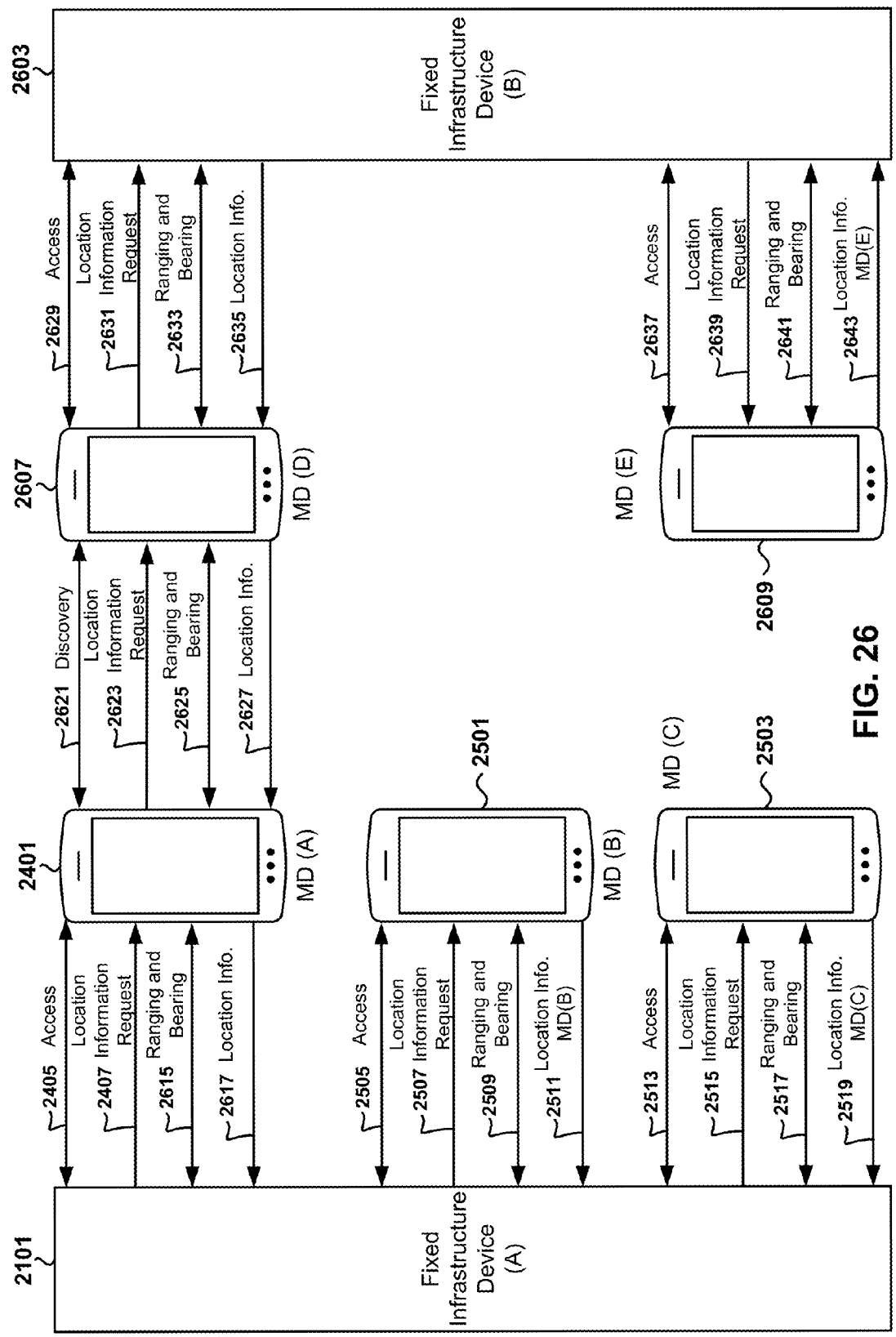
FIG. 26 is a communication system block diagram illustrating communication links and information flows between a plurality of fixed infrastructure devices and a plurality of mobile devices that could be configured to perform enhanced location based operations in accordance with an embodiment.

FIG. 26 illustrates an example in which multiple MDs may be used to a FID in determining or improving precision and/or accuracy of location information or to determine a location fix. FIG. 26 illustrates communications which may originate at an FID and be relayed to/through MDs to other MDs or FIDs. With reference to FIGS. 1-25, FID(A) 2101 may exchanges messages 2505-2511 and 2513-2519 with MD(B) 2501 and MD(C) 2503 respectively, and messages 2405-2407 with MD(A) 2401, the same as described above with reference to FIG. 25. Ranging and bearing message(s) 2615 and location information messages 2617 may be similar to messages 2409 and 2411 is no forwarding is necessary. As illustrated in FIG. 26, FID(A) 2101 may have location information requests forwarded from an MD to another MD, such as from MD(A) 2401 to MD(D) 2607. The location information requests may be sent from MD(D) 2607 to FID(B) 2603 as well as communications though FID(B) 2603 to MD(E) 2609. In such embodiments where ranging and bearing information and location information is routed through other one or more devices, messages 2615 and 2617 may carry additional information as described below.

In an embodiment where FID(A) 2101 is unable to receive sufficient location information from MDs (A) 2401, (B) 2501, and/or (C) 2503, an MD may be able to establish a communication link with another MD or FID. FIG. 26 illustrates such an example, where MD(A) 2401 may conduct a discovery mode to establish communication with MD(D) 2607 via message(s) 2621. This may include communication such as ad hoc WiFi, BlueTooth™, near field communication (NFC) or other protocol to transmit the necessary messages between the devices. Once communication is established, MD(A) 2401 may send location information request to MD(D) 2607. MD(D) 2607 may establish range and bearing to MD(A) 2401 via message(s) 2625. MD(D) 2607 may then send location information, to include GPS timing information to MD(A) 2401 via message 2627. In various embodiments, message 2627 may additionally, or alternatively, include latitude, longitude, altitude information. MD(A) 2401 may send the information received from MD(D) 2607 to FID(A) 2101 via message(s) 2619.

A request for location information may be sent onto another device if MD(D) 2607 is unable to provide the requested information. In FIG. 26, MD(D) 2607 may establish communication with FID(B) 2603. This may be achieved through access message(s) 2629. Message 2631 may be a forward the location information request 2623 from MD(A) 2401 received by MD(D) 2607, or message 2631 may be a new location information request from MD(D) 2607 to FID(B) 2603. In response to the location information request message 2631, FID(B) may establish ranging and bearing between FID(B) 2603 and MD(D) 2607 via message(s) 2633. FID(B) 2603 may then send location information to include GPS timing information to MD(D) 2607. The location information regarding FID(B) 2603 may be sent from MD(D) 2607 to MD(A) 2401 via message 2627 and any ranging and bearing information between FID(B) 2603 and MD(D) 2607 may be sent via message 2625 to MD(A) 2401. Upon receipt by MD(A) 2401 of the messages containing ranging and bearing information and location information from FIB(B) 2603 through MD(D) 2607 via message(s) 2625 and 2627 respectively, MD(A) 2401 may send the ranging and bearing information to FID(A) 2101 via message 2615 and the location information to FID(A) 2101 via message 2615.

If FID(B) 2603 is unable to provide the requested location information, FID(B) 2603 may forward the request to another FID or MD. FIG. 26 illustrates FID(B) 2603 establishing access with MD(E) 2609 via message(s) 2637. FID(B) sending a location information request to MD(E) 2609 via message 2639. MD(E) 2609 and FID(B) 2603 may then establish ranging and bearing between each other via message(s) 2641. MD(E) may provide location information to include GPS timing information to FID(B) 2609 via message 2643. Messages 2637 through 2643 are similar to messages 2505 through 2511 or 2513 through 2519. A difference being that the message 2639 may indicate it is a forwarded location information request.

The ranging and bearing information received via message(s) 2641 and location information received via message 2643 may be sent back through the same communication pathway to FID(A) as the request was originally received, e.g., though MD(D) 2607 through messages 2633 and 2635 to MD(A) 2401 via messages 2625 and 2627 and to FID(A) 2101 via messages 2615 and 2617.

In various embodiments where location information is forwarded from one device to another, (e.g., FID(B) 2603 through MD(D) 2607 through MD(A) 2401 to FID(A) 2101 as illustrated in FIG. 26), relative ranging and bearing information between each linking device needs to be transmitted as well if the device providing GPS timing information does not also include location information of sufficient accuracy and precision (e.g., sufficiently accurate and precise latitude, longitude, and altitude position information) for the ultimate receiving device, which in FIG. 26 is FID(A) 2101. This does not apply in circumstances in which the relayed device providing the GPS timing information is able to establish ranging and bearing to the ultimate receiving device, even if the GPS timing and ranging and bearing information are forwarded through other devices.

Figure 27:
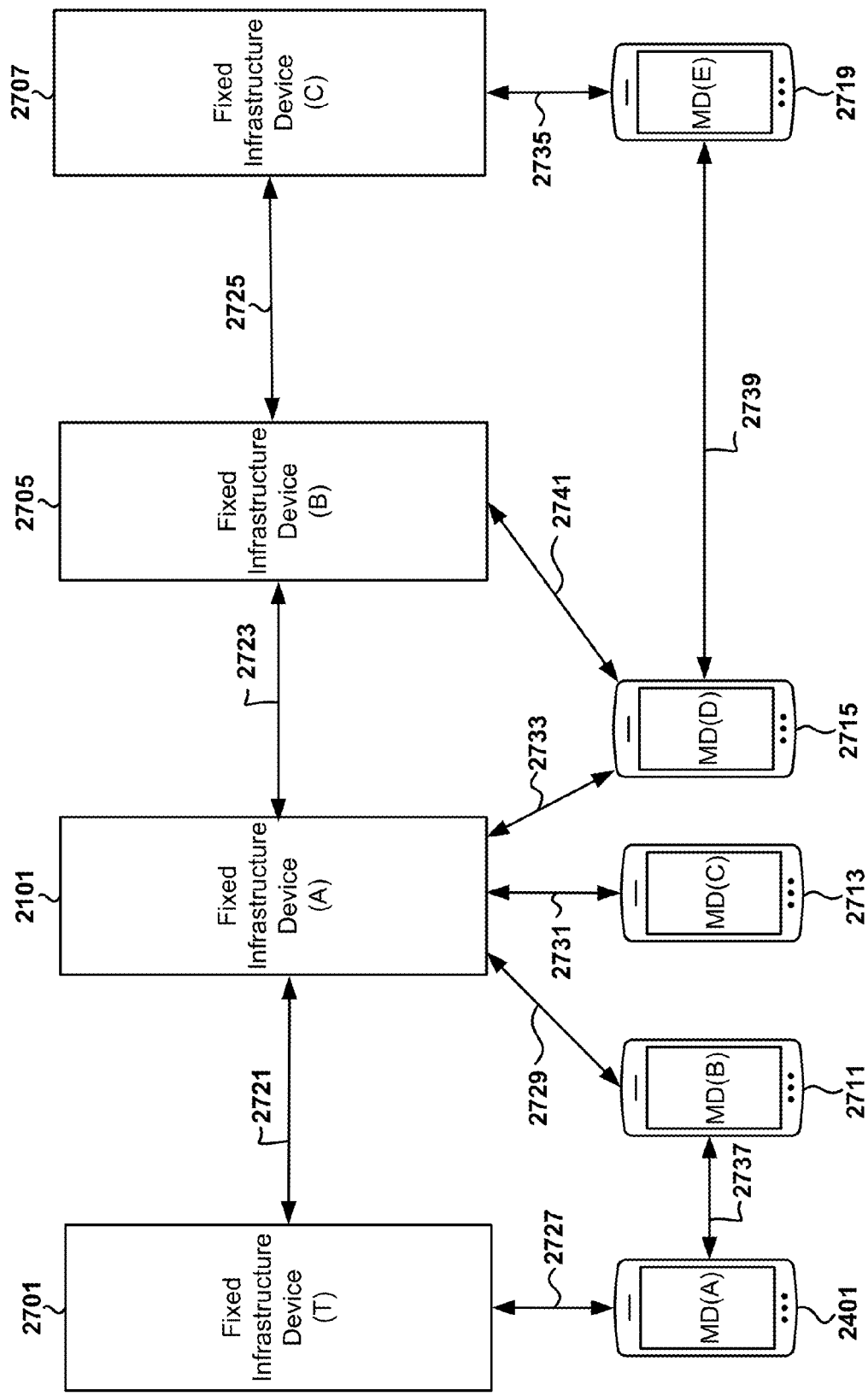
FIG. 27 is a communication system block diagram illustrating communication links and information flows between a plurality of fixed infrastructure devices and a plurality of mobile devices that could be configured to perform enhanced location based operations in accordance with another embodiment.

FIG. 27 illustrates an example in which multiple MDs and multiple FIDs may be used to obtain location information. With reference to FIGS. 1-26, FID(A) 2101 may obtain location information from FID(T) 2701 through communication links 2721. Obtaining location information may be performed, for example, using any of the communications described above with respect to FIG. 23. Similarly communications in link 2721 may also include any communications that are routed from FID(A) 2101 through FID(T) 2701 to and/or from MD(A) 2401 via communication link 2727.

Each of the communication links 2721, 2723, 2725, 2727, 2729, 2731, 2733, 2735, 2737, 2739, and 2741 illustrate example communication pathways between FIDs and MDs. These communications links represent routes via which location information and ranging and bearing information may be communicated between FIDs and/or MDs, to include FID(A) 2101, FID (B) 2705, FID (C) 2707, FID (T) 2701, MD(A) 2401 MD(B) 2711, MD(C) 2713, MD(D) 2715, and MD(E) 2719. Location information and ranging and bearing information may be communicated via one pathway, e.g. FID(A) 2101 to MD(E) 2719 via link 2713 to FID(B) 2705 and via link 2725 to FID(C) 2707 and link 2735 to MD(E) 2719 and returned a different route, e.g.

MD(E) 2719 via link 2739 to MD(D) 2715 and link 2733 back to FID(A) 2101. Other links may be established as needed or desired in various circumstances including when a MD moves to another FID or is no longer in communication with a FID or there is another FID that is added or removed from the network.

Figure 28:
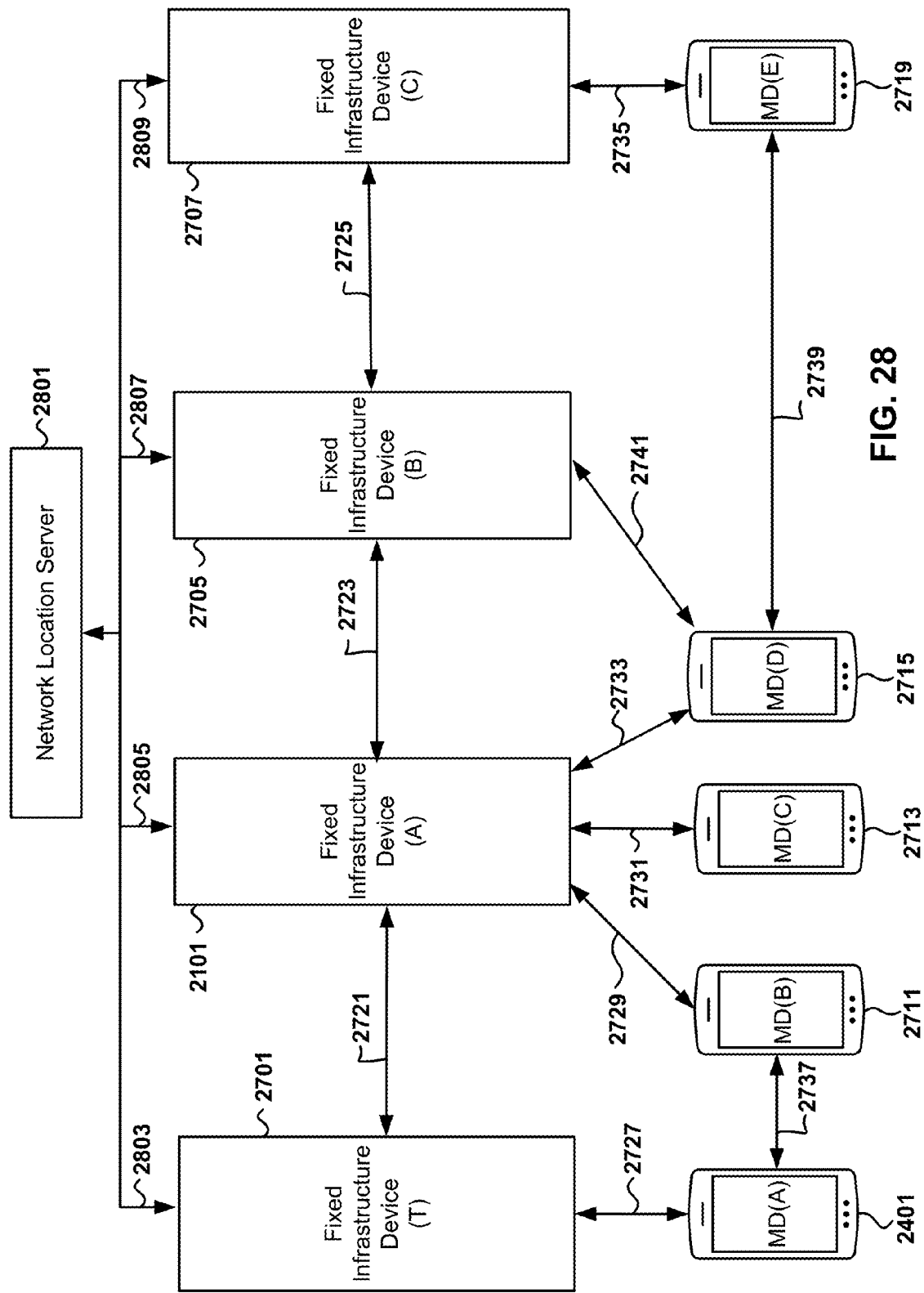
FIG. 28 is a communication system block diagram illustrating communication links and information flows between a network location server, a plurality of fixed infrastructure devices and a plurality of mobile devices that could be configured to perform enhanced location based operations in accordance with an embodiment.

FIG. 28 illustrates various embodiments in which a network provided location server may assist FIDs and/or MDs in location determination. With reference to FIGS. 1-27, a network location server 2801 may assist in determining location of the FID(A) 2101 by providing latitude, longitude, altitude, and/or GPS data based on inputs from other FIDs and or MDs. In various embodiments, network locations server 2801 may contain or store latitude, longitude, altitude, and/or GPS data for various devices (e.g., FIDs and MDs.) GPS data may include satellites to which various devices have access to. This may assist in routing location information requests to a unit that can provide the desired location information to establish a fix.

Each FID, FID(T) 2701, FID(A) 2101, FID(B) 2705, FID(C) 2707 may have a communication link, communication links 2803, 2805, 2807, and 2809 respectively, to network location server 2801. Communication links 2803, 2805, 2807, and 2809 may be wireless and/or wired connections. The communication links may be used to communicate between the FIDs as well for sharing positional information. For example, FID(A) 2101 may contact network location server 2801 via link 2805 to obtain current or history location information for any other FID the network location server may communicate with. If FID(A) 2101 requests current location information for FID(T) 2701, network location server 2801 may obtain the information from FID(T) 2701 via communication link 2803 and provide the information to FID(A) through communication link 2805. Alternatively, network location server 2801 may act as an intermediary and relay the communication between FID(A) 2101 and FID(T) 2701. In another embodiment, network location server 2801 may relay the initial request from FID(A) 2101 to FID(T) 2701. FID(T) 2701 may initiate a discovery process between FID(A) 2101. Once the relayed request is received from network location server 2801, FID(T) 2701 may establish ranging and bearing with FID(A) 2101 and provide location information and/or GPS timing. In various embodiments, communications between FID(A) 2101 and FID(T) 2701 may utilize links 2803 and 2805 through network location server 2801 in addition to communication link 2721.

The communication links 2803-2809 may forward location information for MDs that connect to the network location server 2801 through a FID. MDs may also obtain location information from the network location server 2801 through an FID, or relay the location information obtained from the network location server 2801 to an FID if an FID does not have a direct link to the network location server 2801. For example, if FID(T) 2701 is unable to communication directly with network location server 2801, it may have its request forwarded through other FID(s) and/or MD(s) to obtain data from the server.

Figure 29:
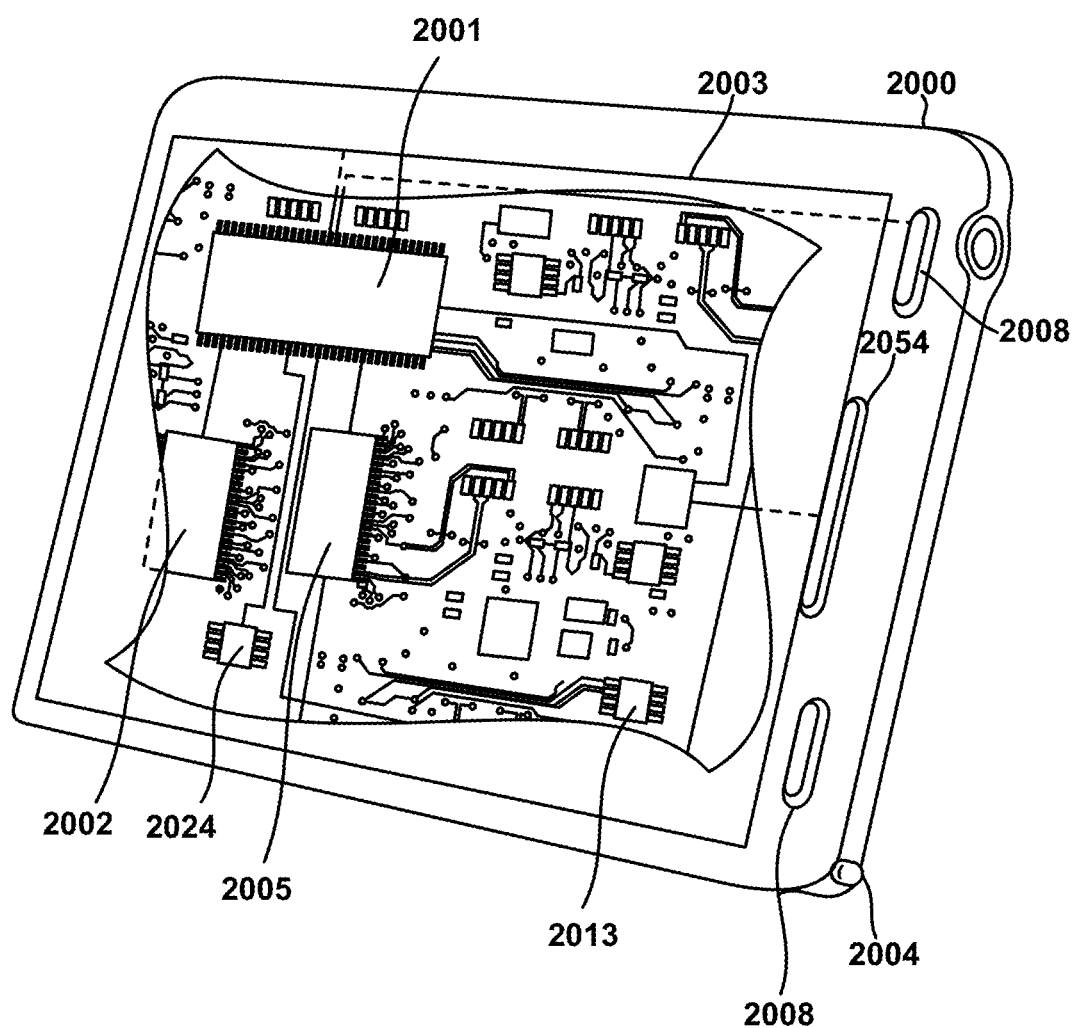
FIG. 29 is a component block diagram of a client computing device suitable for use with various embodiments.

The various embodiments may be implemented on a variety of mobile computing devices, an example of which is illustrated in FIG. 20. Specifically, FIG. 29 is a system block diagram of a mobile transceiver device in the form of a smartphone/cell phone 2000 suitable for use with any of the embodiments. The cell phone 2000 may include a processor 2001 coupled to internal memory 2002, a display 2003, and to a speaker 2054. Additionally, the cell phone 2000 may include an antenna 2004 for sending and receiving electromagnetic radiation that may be connected to a wireless data link and/or cellular telephone transceiver 2005 coupled to the processor 2001. Cell phones 2000 typically also include menu selection buttons or rocker switches 2008 for receiving user inputs.

A typical cell phone 2000 also includes a sound encoding/decoding (CODEC) circuit 2024 which digitizes sound received from a microphone into data packets suitable for wireless transmission and decodes received sound data packets to generate analog signals that are provided to the speaker 2054 to generate sound. Also, one or more of the processor 2001, wireless transceiver 2005 and CODEC 2024 may include a digital signal processor (DSP) circuit (not shown separately). The cell phone 2000 may further include a peanut or a ZigBee transceiver (i.e., an IEEE 802.15.4 transceiver) 2013 for low-power short-range communications between wireless devices, or other similar communication circuitry (e.g., circuitry implementing the Bluetooth® or WiFi protocols, etc.).

Figure 30:
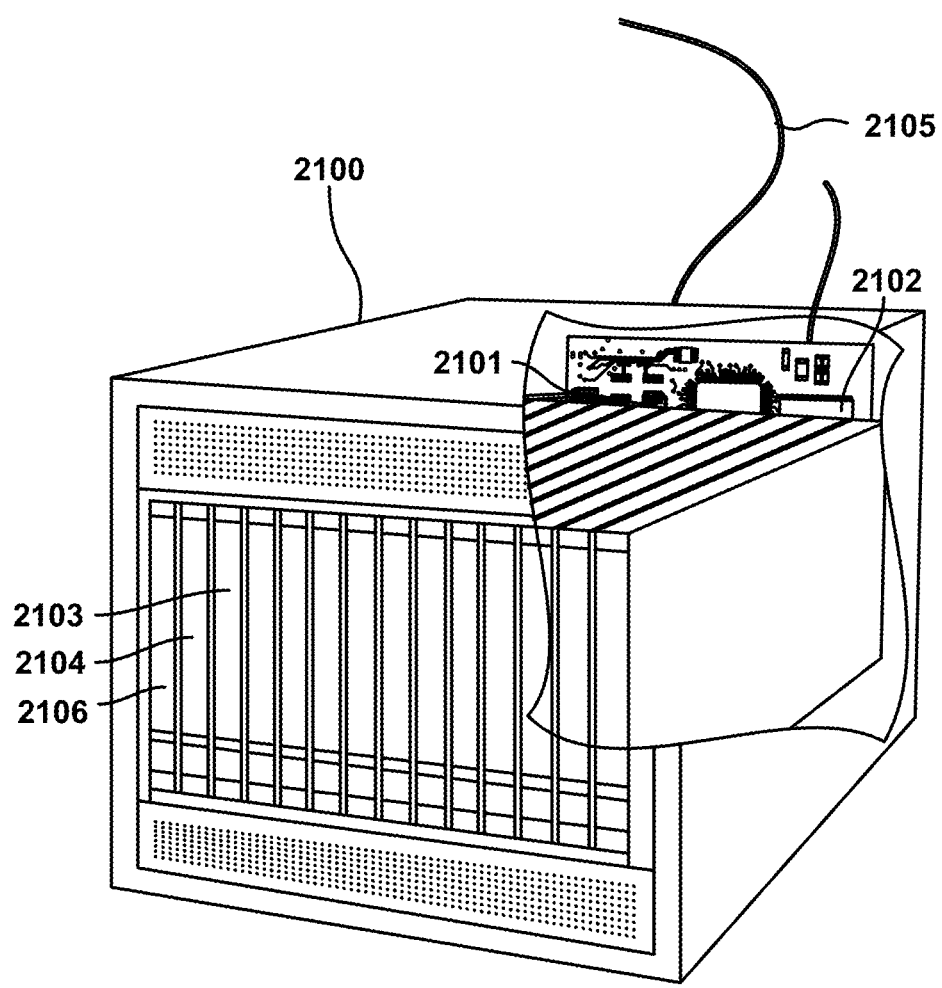
FIG. 30 is a component block diagram of a server computing device suitable for use with various embodiments.

Various embodiments may be implemented on any of a variety of commercially available server devices, such as the server 2100 illustrated in FIG. 30. Such a server 2100 typically includes one or more processors 2101, 2102 coupled to volatile memory 2103 and a large capacity nonvolatile memory, such as a disk drive 2104. The server 2100 may also include a floppy disc drive, compact disc (CD) or DVD disc drive 2106 coupled to the processor 2101. The server 2100 may also include network access ports 2106 coupled to the processor 2101 for establishing data connections with a network 2105, such as a local area network coupled to other communication system computers and servers.

The processors 2001, 2101, and 2102 may be any programmable microprocessor, microcomputer, or multiple processor chip or chips that can be configured by software instructions (applications) to perform a variety of functions, including the functions of the various embodiments described below. In some mobile devices, multicore processors 2102 may be provided, such as one processor core dedicated to wireless communication functions and one processor core dedicated to running other applications. Typically, software applications may be stored in the internal memory 2002, 2103, and 2104 before they are accessed and loaded into the processor 2001, 2101, and 2102. The processor 2001, 2101, and 2102 may include internal memory sufficient to store the application software instructions.

The wireless (or mobile) device location determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Frequency Division Multiple Access (FDMA) network, a Time Division Multiple Access (TDMA) network, an OFDMA network, a 3GPP LTE network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. W-CDMA is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Various embodiments may include enhancements to the current location based service methods and methodologies used for wireless mobile communications, and include improved methods for determining the location of a mobile or wireless device (e.g., mobile device 102).

Commercial and public safety positioning applications are growing in popularity and use, as are other similar services and applications that are based on, or which utilize, precise, accurate, and detailed location information. As a result, it is becoming increasingly important for modern wireless/mobile devices to be able to accurately determine their locations within a wireless network. The various embodiments include mobile devices that are configured to accurately determine their locations within a wireless network to a high degree of confidence/precision.

Public Safety systems are now embarking on the use of commercial cellular technologies, such as the third generation partnership project (3GPP) long-term evolution (LTE), as their communication protocol(s) of choice. As a result, there is a need for improved situation awareness at the site of an incident (e.g., for first responders, mobile device users, etc.). The various embodiments include mobile devices that may be used by first responders for improved situation awareness at the site of an incident. In some embodiments, this may be accomplished by configuring a mobile device to determine its location with a high degree of accuracy and precision.

Under the correct conditions, existing geo-spatial positioning systems, such as GPS systems, provide a good estimate for a mobile device's location. However in many other cases (e.g., in buildings and urban environments) these geo-spatial positioning systems are not available and/or do not generate sufficiently accurate location information. For example, a GPS system may not be able to acquire satellite signals and/or sufficient navigation data to calculate its geospatial location (called "performing a fix") when the device is indoors, below grade, or when the satellites are obstructed (e.g., by tall buildings, etc.). In addition, the presence of physical obstacles, such as metal beams or walls, may cause multipath interference and signal degradation of the wireless communication signals when the mobile device is indoors (or in urban environments that include tall buildings, skyscrapers, etc.). These and other factors often cause existing geo-spatial technologies to function inaccurately and/or inconsistently on mobile devices, and hinder the mobile device user's ability to fully utilize location-aware mobile software applications and/or other location based services and applications.

Similarly, network based solutions for determining the location of mobile device may also not be adequate for locating a mobile device within buildings and/or in urban environments. The introduction of new wireless network systems, such as LTE, has presented some new opportunities and capabilities (e.g., network based solutions). However, despite these advancements, existing solutions are often unable to generate location information with a sufficiently high level of accuracy, precision or detail required to provide enhanced location based services (e.g., applications that improve situational awareness at the site of an incident, etc.).

In some cases, wireless network systems, such as LTE, may be used in conjunction with the public safety band. This combination may allow for excellent coverage in urban and indoor environments. However, using existing solutions, the accuracy and precision of the location information is often limited. For example, location information that is generated via existing network based solutions and/or existing wireless network system technologies often does not include a sufficiently high level of accuracy, precision or detail to provide enhanced location based services (e.g., applications that improve situational awareness at the site of an incident, etc.).

Improving positional location accuracy, confidence and precision in a mobile device has many advantages, particularly when the device is used for emergency location services, commercial location services, internal location services and lawful intercept location services. The various embodiments provide the ability to improve the positional location information for both new and existing wireless networks, and improve the positional location accuracy, confidence and precision in a mobile device.

For commercial applications, a mobile device's ability to generate highly accurate location information (e.g., eLBS information) within a multiple story building, in an urban environment, within a mall, etc. may provide the system with various network radio resource improvements. In addition, eLBS information may also allow for unique advertising targeting capabilities. Moreover, eLBS information may be used for applications related to improved fleet management, asset tracking and various machine to machine communications for which highly accurate location/position information is important. For commercial users, the need for improved position/location information accuracy is most needed for in-building environments where the location of the mobile device can be more accurately pin pointed for location based services. The advantage of law enforcement with improved positional information will enable the tracking of mobile devices inside a building to enable determination of what floor or part of the building the device is being used is located without the need for replacing radio beacons or location aware access points. For emergency services the advantage comes to better positional location of the party in need of assistance, especially in an urban environment where the positional information is most problematic with existing techniques. For first responders this enhancement enables mobile devices which are in the same scene to help augment their position coordinates with each other in a controlled ad-hoc environment. The positional information shared not only includes latitude and longitude but also altitude and velocity. Since this information involves a small amount of data the mobile devices can have the E-SMLC in the case of LTE share the information both on net and off-net.

The use of sensors including accelerometers, gyroscopes, magnetometers and pressure sensors along with GPS receivers with mobile devices is becoming more prevalent. Therefore, the enhancements for positional location will give the E-SMLC in the case of LTE the ability to not only utilize GPS or Network derived coordinate information but also to have an augmentation with sensors associated the mobile device which can include accelerometers, gyroscopes, magnetometer and pressure sensors for refining and reducing some of the positional uncertainties that are in inherent to wireless positional determination.

For wireless mobile network like LTE, the position/location information accuracy needs to be improved for in building environments in addition to providing more accurate location information about where the mobile devices are actually located. Whether the mobile device is used by a first responder, commercial cellular user or a combination of both.

Positional location improvement enables improved situation awareness, improved telemetry, and improved overall communication with the incident commander. In addition, the mobile devices proximity location to other mobile devices can and will change dynamically allowing for resources to be added and/or reassigned as the need arises for operational requirements.

As discussed above, the various embodiments include methods, and mobile computing devices configured to implement the methods, of determining a location of a mobile device. The methods may include determining an approximate location of the mobile device, grouping the mobile device with a wireless transceiver in proximity to the mobile device to form a communication group, sending the determined approximate location of the mobile device to the wireless transceiver, receiving on the mobile device location information from the wireless transceiver, and determining a more precise location of the mobile device based on the location information received from the wireless transceiver. As part of determining its approximate location, the mobile device may estimate its position and/or generate a position estimate. It could be beneficial for these position estimates to include latitude, longitude and elevation information that is accurate to within one (1) meter (and many times within one meter accuracy).

In some embodiments, the mobile device may be equipped with a "sensor fusion" system/component. The sensor fusion component may be configured to collect and use information from sensors in the mobile device to further improve the location position determinations. As such, the sensor fusion component may allow the device to better determine its approximate location and/or to generate a better position estimate (e.g., a more precise value, more accurate coordinates, etc.).

In further embodiments, the mobile device may be configured to receive (e.g., via an antenna coupled to one or more of its processors, etc.) location information from a multitude of external devices, and use this information to better determine its approximate location and/or to generate a better position estimate (e.g., a more precise value, more accurate coordinates, etc.).

In some embodiments, the mobile device may be configured to receive the location information as waypoints. A waypoint may be an information structure that includes one or more information fields, component vectors, location information, position information, coordinate information, etc. In some embodiments, each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding external device. The timestamp may identify the time that the location was determined/captured. The range value may identify a distance between the external device and the mobile device. In some embodiments, a waypoint may also be, or may include, a location estimate value, a location set, or any other similar location information suitable for adequately conveying or communicating location information.

In an embodiment, the mobile device may be configured to receive location information in the form of a first waypoint from a first external device, a second waypoint from a second external device, a third waypoint from a third external device, and a fourth waypoint from a forth external device. The mobile device may use any combination of the received waypoints (e.g., first through fourth waypoints) in conjunction with stored and historical information (e.g., previously computed waypoints, movement information, etc.) to determine or compute its approximate and/or more precise location with a high degree of accuracy.

In some embodiments, the mobile device may be configured to perform advanced location based operations (e.g., advanced sensor fusion operations) to generate location information (e.g., a location estimate set/value), use a differential RMS2 method (or any other method known in the art) compute confidence values, and compare the computed confidence values to one or more threshold values to determine whether there is a sufficiently high degree of confidence in the accuracy of the generated location information (e.g., location estimate set/value). In some embodiments, the mobile device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the mobile device may be configured to also compute a precision value that identifies, or which is indicative of, the repeatability factor of the computation/measurements over multiple measurements. The precision value may be used to determine how often the device reports the same position/location (i.e., based on evaluating multiple reports indicating that the device has not moved more than X meters, etc.), which may be used to determine the precision of the measurement (e.g., within 1 meter, etc.). The precision value may also be used to determine the likelihood that repeating the computation (e.g., using the same inputs or input sources) will result in substantially the same values.

In some embodiments, the mobile device may be configured to perform normalization operations to normalize/synchronize the timing of the received location information (the "location information timing"). In some embodiments, this may be accomplished via a timing component or mechanism (a timer, system clock, processor cycles, etc.) in the mobile device. The mobile device may use a common time value (or common timer, reference clock, etc.) to synchronize and/or coordinate the information included in the received waypoints. The mobile device may generate normalized waypoints that include normalized values and/or which are normalized, synchronized and/or updated to account for various delays and inconsistencies, including the propagation delay between the mobile device and the corresponding external device, the time difference between when the waypoint was captured in external device and when the waypoint received in the mobile device, the relative movements of the devices, communication pathway time delays, delays associated with processing the requests, etc.

In some embodiments, the mobile device may be configured to associate or assign a time value to each normalized waypoint (e.g., by storing the waypoint relative to the time value in a map or table, etc.), and determine whether each normalized waypoint is valid. For example, mobile device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the mobile device may determine or compute one or more rankings for that waypoint, and associate and/or assign the rankings to the waypoint (by storing it as a field. In some embodiments, the mobile device may determine and assign an overall rank and a device-specific rank to each valid waypoint, and store the waypoints in memory (e.g., in a location database, etc.).

In some embodiments, the mobile device may be configured to determine the number of stored waypoints that are suitable for use in determining the device's current location. For example, the mobile device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the mobile device with a sufficiently high level of accuracy, etc. In response to determining that there are four or more suitable waypoints stored in memory, the mobile device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the mobile device's current location with a high level of accuracy (e.g., within one meter in all directions, etc.).

Figure 31:
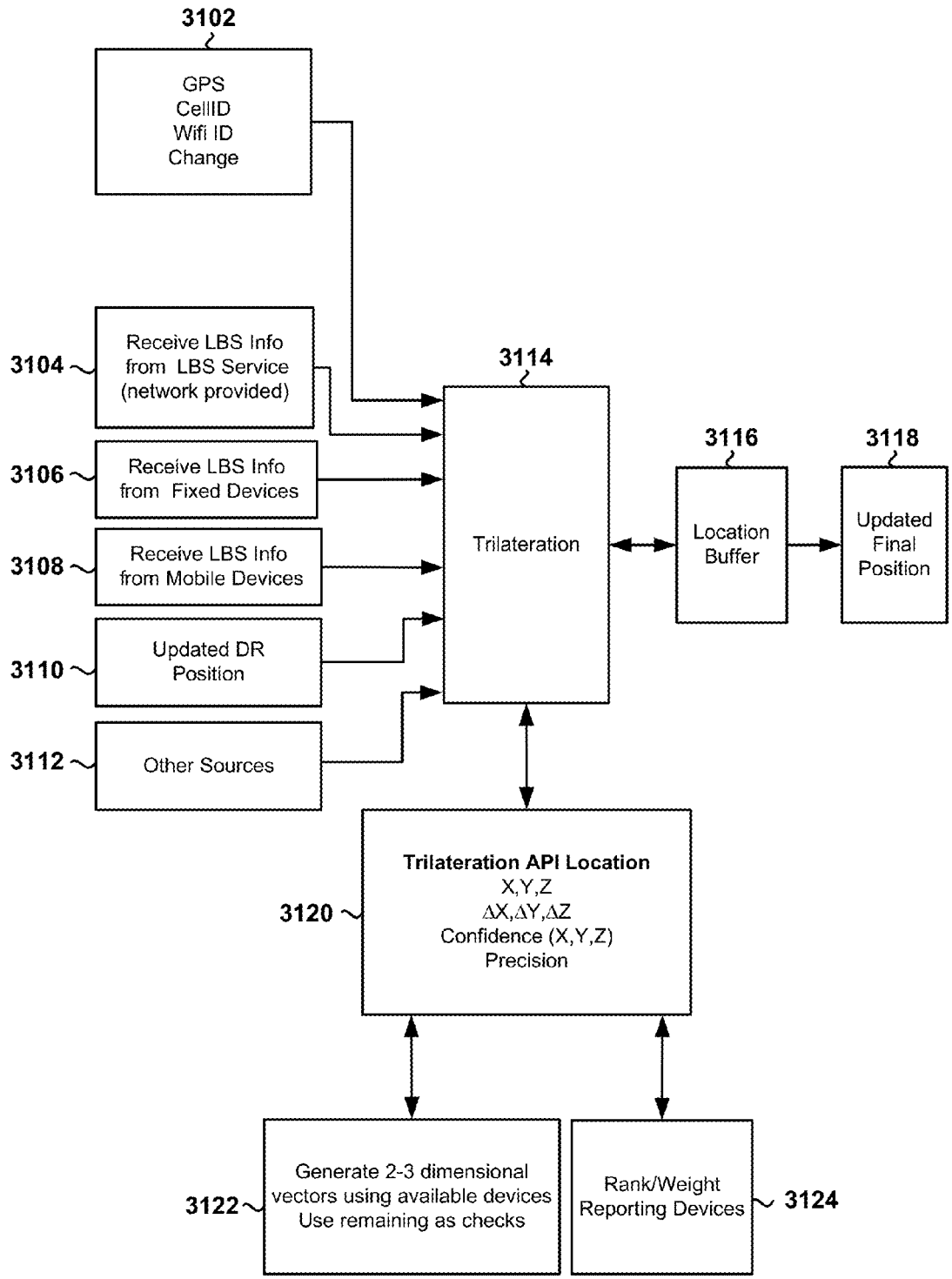
FIGS. 31 and 32 are process flow diagrams illustrating various operations in a system configured to perform enhanced location based operations using fix infrastructure devices in accordance with some embodiments.

FIG. 31 illustrates various components, information flows, and operations in an example fixed infrastructure device system that is configured to perform enhanced location based service (eLBS) trilateration operations in accordance with an embodiment. The system includes location information inputs including GPS, CellID, WiFi ID 3102, LBS info (network provided) 3104, LBS info from fixed devices 3106, LBS info from mobile devices 3108, updated dead reckoning 3110 and other sources 3112.

The system also includes a trilateration component 3114. In blocks 3120-3124, the fixed infrastructure device/trilateration component 3114 may use the received input data to perform trilateration operations (e.g., trilateration API location operations, etc.), determine the geographical coordinates (e.g., latitude, longitude, and altitude coordinates) of the mobile device, generate a trilateration position estimate value, generate a final position set (e.g., a final location estimate value), generate an updated final position set (e.g., x, y and z coordinates, an updated position estimate value, more precise information, etc.), and send the updated final position set to the output/storage component 3114. The trilateration operations may include operations for implementing any or all of the techniques discussed in this application, including time of arrival, angle of arrival, mobile-to-mobile trilateration, lateration, multilateration, triangulation, etc.

In the example illustrated in FIG. 31, in block 3120, the fixed infrastructure device generates/computes/receives trilateration location values (X, Y, Z), a time value, trilateration location delta values ($\Delta X$, $\Delta Y$, $\Delta Z$), confidence values ($C_X$, $C_Y$, $C_Z$), and one or more precision values, the combination of which may be stored or used as a waypoint (or a data set or estimate value). In block 3124, the fixed infrastructure device may rank or assign weights to the current or historical waypoints (i.e., previously computed waypoints). In block 3122, the fixed infrastructure device may generate two or three dimensional vectors using the waypoints (current and/or historic). In an embodiment, the fixed infrastructure device may generate the vectors based on their rank/weights (e.g., by including/using only waypoints having a rank that exceeds a threshold value).

As mentioned above, the trilateration component 3114 may send the computed updated final position set to the output/storage component. The output/storage component may store the updated final position set in a location buffer 3116 or the illustrated updated final position datastore 3118. In block 3118, the output/storage component may use the updated final position set (more precise location information) to provide a location based service. Additionally, the output/storage component may send the updated final position set 3118 to other devices, such as to a network server or the other mobile devices in the communication group.

FIG. 31 includes dead reckoning for use with fixed infrastructure devices, not because the FID are moving, but because when they are initially installed, dead reckoning could be used to help determine the initial latitude, longitude, and/or altitude for the device as it gets moved toward the install point. For example, if the FID is to be installed in a GPS stressed environment then an initial GPS fix can be obtained. The FID is then moved into the GPS stressed environment for installation having dead reckoning used to provide one method of making latitude, longitude, and/or altitude adjustments for its move to the new location. This can also be used where the object the FID is affixed to moves, such as a building having moved due to an earthquake, or taller buildings where the communication devices are mounted on the upper floors that may sway, or relocation, repair or improvement of the FID or what the FID is affixed to.

Figure 32:
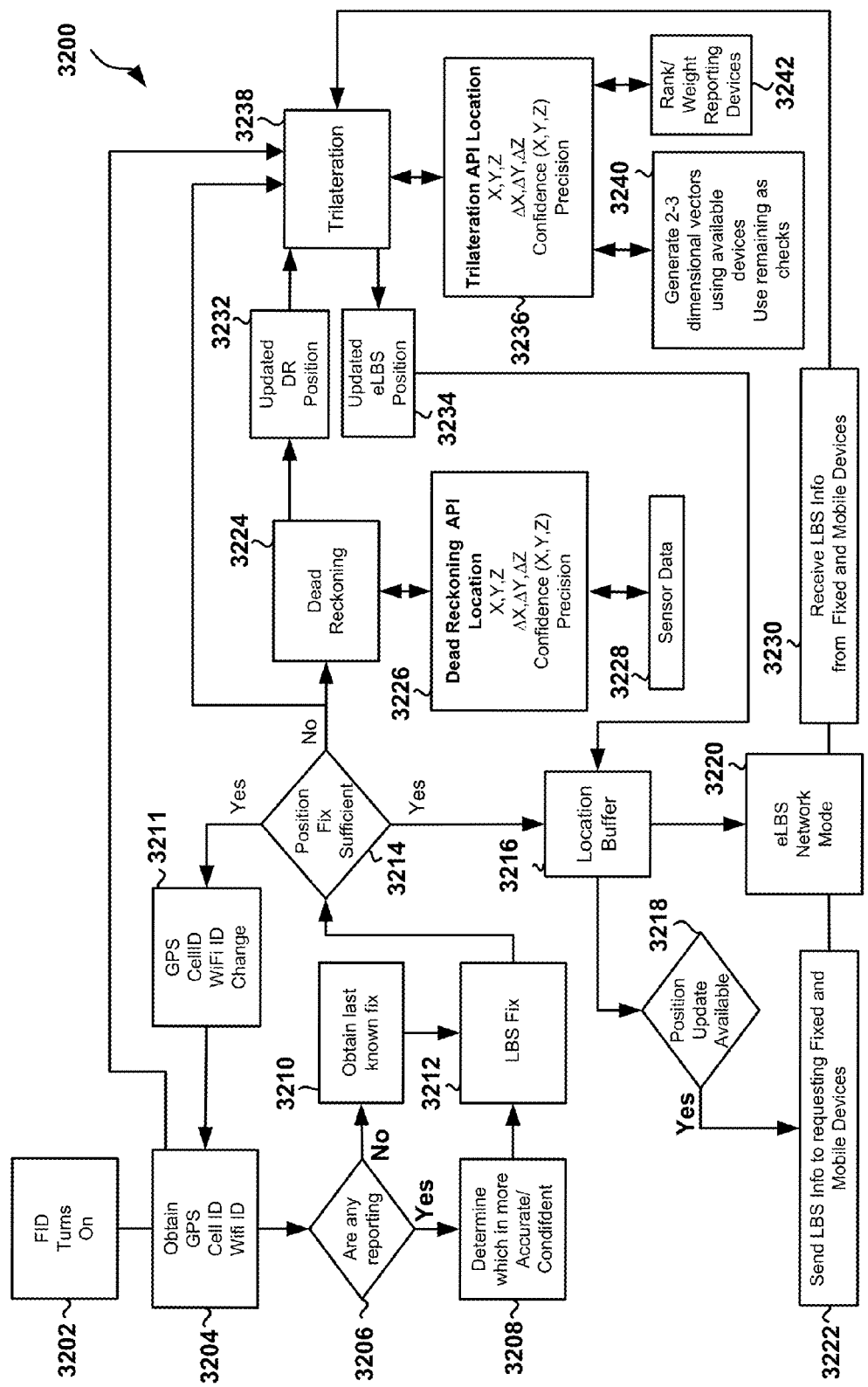

FIG. 32 illustrates an example embodiment of a logic flow, algorithm or method 3200 for accomplishing eLBS with a fixed infrastructure device (FID). In block 3202, the fixed infrastructure device may turn on (i.e., power on, etc.) and acquire service from a wireless service provider (e.g., via operations performed by the fixed infrastructure device processor, etc.). In block 3204, the processor/fixed infrastructure device may obtain an initial positional fix, and use this information to generate a waypoint (e.g., a current location waypoint, etc.) or other location information unit. The fixed infrastructure device may obtain the initial positional fix by using GPS, CellID, WiFi ID, enhanced LoranC, and/or other similar information that is received by, computed in, or available to the mobile device to perform any or all of the location determination techniques, methods, or operations discussed in this application.

In some embodiments, as part of the operations in block 3204, the fixed infrastructure device may also obtain, determine, generate or compute a near term positional fix estimate (e.g., latitude and longitude values, etc.) from information received from small cells (e.g., femto cells, etc.) that are positioned in, or suitable for use in, interior locations, such as within buildings, at store entrances in malls, on light posts, in fixtures, etc. In some embodiments, the operations in block 3204 may be accomplished by utilizing RFID chips, quick response (QR) codes, or other similar technologies. For example, an external device may include an RFID chip that transmits its location information to the fixed infrastructure device. The fixed infrastructure device may receive and use this information to generate a near term positional fix estimate value, use the near term positional fix estimate value to generate a new waypoint, and use this new waypoint to check or validate an existing waypoint (e.g., the current location waypoint, etc.). The fixed infrastructure device may also be configured to use the near term positional fix estimate value to compute, replace and/or re-compute the current location waypoint.

In block 3206, the fixed infrastructure device may determine whether additional location information was received and/or whether the fixed infrastructure device recently reported its location information (which is indicative of the device having acquired an adequate positional fix). In response to determining that additional location information was not received (i.e., determination block 3206="No"), in block 3210, the fixed infrastructure may select the last known/trusted location from memory. In various embodiments, this may be accomplished by selecting the most recently computed, generated or stored waypoint (e.g., the previous "current location waypoint," etc.), selecting the waypoint having the most recent timestamp, selecting the waypoint having the highest precision or confidence values, selecting the waypoint having the highest ranking, or any combination thereof.

In response to determining that additional location information was received, (i.e., determination block 3206="Yes"), in block 3208, the fixed infrastructure device may determine whether the received "additional location information" is more accurate (or has higher confidence and/or precision values) than the last known/trusted location stored in memory (or the current location waypoint discussed above), and select the more accurate location information for use in generating a final location waypoint. For example, the fixed infrastructure device may generate a temporary waypoint based on the received "additional location information," determine whether the temporary waypoint is more accurate than the current location waypoint, and select/set the more accurate of the two waypoints for use in determining the final location waypoint.

In block 3212, the fixed infrastructure device may use the selected waypoint (e.g., current location waypoint) to establish an LBS fix. In determination block 3214 the fixed infrastructure device may determine whether the LBS fix is sufficient (e.g., sufficiently detailed, sufficiently accurate, etc.) for use in determining the final location waypoint. In response to determining that the LBS fix is sufficient (i.e., determination block 3214="Yes"), the fixed infrastructure device may store the location information (e.g., the LBS fix, waypoint associated with the LBS fix, current location waypoint, etc., block 3210) in a location buffer in block 3216, enter an eLBS network mode (or receive eLBS network data) in block 3220, and receive LBS information from other devices in blocks 3230. If a position update is available, block 3218, a request for LBS information for fixed and mobile devices may be sent, block 3222 and the results sent to the eLBS network mode, block 3220. In response to determining that the LBS fix is not sufficient (i.e., determination block 3214="No"), in block 3224, the fixed infrastructure device may request, retrieve and/or receive sensor data, and use this information to perform sensor fusion operations. In block 3226, the fixed infrastructure device may perform dead reckoning operations (e.g., based on the sensor data, results of the sensor fusion operations, etc.) to generate a DR waypoint (or DR data) that includes DR location values (X, Y, Z), a time value, DR location delta values ($\Delta X$, $\Delta Y$, $\Delta Z$), confidence values (CX, CY,CZ), and one or more precision values.

In blocks 3232, 3234, 3236, 3238, 3240 and 3242, the fixed infrastructure device may perform trilateration operations (e.g., based on the received LBS information, DR data, etc.) to generate updated eLBS information. For example, in blocks 3228, 3232, 3236, 3240 and 3242 the fixed infrastructure device may use the received LBS information and/or DR data to determine/compute the current location of the device, generate a final location waypoint (or estimate value) that includes trilateration location values (X, Y, Z), a time value, trilateration location delta values ($\Delta X$, $\Delta Y$, $\Delta Z$), confidence values (CX,CY,CZ) and one or more precision values, and/or use the generated final location waypoint to set the current location of the device (e.g., by storing the generated final location waypoint as the current location waypoint, etc.). The fixed infrastructure device may store any or all of this updated eLBS position information (e.g., the final location waypoint, etc.) in a location buffer in block 3216.

In some embodiments, the fixed infrastructure device processor attempts to obtain its positional location in block 3204, and based on the types of position/location information that is provided/received, determines a confidence level value for the received information. In some embodiments, the processor may be configured so that, if no responses are provided or received in block 3204, the processor may use the last location of the fixed infrastructure device to obtain/determine the initial positional fix. After the initial fix is obtained (regardless of its accuracy), the fixed infrastructure device may determine whether additional improvements are available, possible, acquirable, and/or required. If improvements are required (or when a 911 call is placed), the fixed infrastructure device may use the information collected from its various sensors to determine, compute and/or provide an estimate (e.g., a waypoint or estimate value) of the change in location/position of the device. In some embodiments, this may be achieved via the mobile device processor performing a combination of sensor fusion and dead reckoning operations (which are described in greater detail above).

As part of the dead reckoning operations (e.g., operations in block 3226, etc), the sensors/sensor information may be incremented and/or decremented based on any of a variety of weighting filters, including a kalman filter. A kalman filter may be a component in the fixed infrastructure device that is configured to perform kalman operations on a plurality of input data streams to generate a single output in the form of a location, location information, coordinates, or a waypoint.

In some embodiments, the fixed infrastructure device may be configured to update or adjust the intervals for the sensors based on each sensor's response characteristics. Adjusting the sensors may allow the fixed infrastructure device to prevent sensor saturation, thereby improving the device's overall responsiveness. For example, accelerometer data may be updated at 100 Hz intervals, manometer data may be updated at 15 Hz intervals, and the difference in the updates intervals may be included (or otherwise accounted for) in the dead reckoning determinations made in the mobile device (e.g., when the mobile device generates a dead reckoning position estimate in block 3236, etc.).

The trilateration component of the fixed infrastructure device may be configured to perform various operations/calculations to determine or generate triangulation data (e.g., in blocks 3238, 3236, 3240 and 3242) that identifies the location of the device with respect to other wireless devices, both fixed and mobile. For example, after the dead reckoning position is estimated (or after the DR data is generated in block 3236, etc.), this information may be passed to the trilateration component (e.g., via memory write operations, wireless transceiver, etc.) that uses these inputs in conjunction with the information received from the wireless/external devices to compute the location of the device (e.g., in blocks 3238, 3236, 3240 and 3242). In some embodiments, sensor data associated with the dead reckoning estimate/value may include confidence intervals for the x, y, and z axis. These confidence values may identify an individual or overall confidence of the position/location information.

Generally, performing eLBS method 3200 improves the performance of the fixed infrastructure device by improving the location-based solutions described above (e.g., with reference to FIGS. 1-19, etc.). For example, eLBS method 3200 may allow the device to fixed infrastructure to generate the "more precise location information," updated eLBS position information, or a more accurate waypoint more efficiently than if the information is generated based solely on received location information. This method also allows the mobile device to generate more accurate location information with fewer iterations, thereby freeing up the devices resources and improving its performance characteristics. For all these reasons, the method 3200 improves the overall functionality of the fixed infrastructure device.

In some embodiments, the fixed infrastructure device may be configured to request a position updates from other devices. The fixed infrastructure device's initial position may be determined through the use of time of flight (TOF) via two message inquiries. The RSSI may be read as well, and using the TOF and RSSI, the fixed infrastructure device may more accurately determine the distance between the fixed infrastructure device and each of the other devices. The fixed infrastructure device may then use this distance information to better determine its current location (via the performance of any or all the methods, operations, or techniques discussed in this application).

Figure 33:
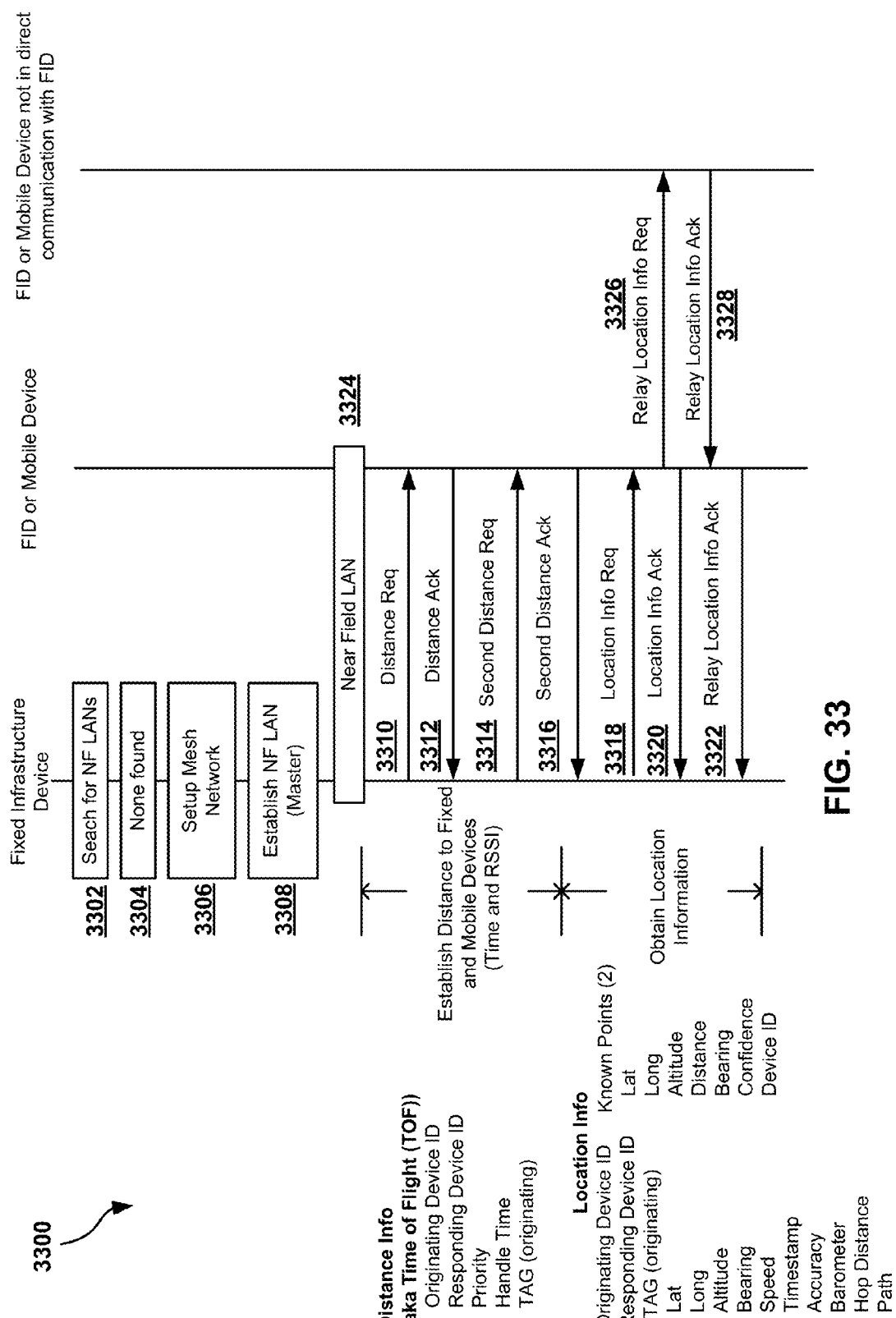
FIG. 33 is a call flow diagram that illustrates example components and information flows in a system that is configured to perform location based operations in accordance with an embodiment.

FIG. 33 illustrates an embodiment of possible communication formats for where an FID requests a position update from other devices. The specific formats and communication medium may vary. However, the initial position may be determined via the use of time of flight (TOF) and two message inquiries. Additionally, the RSSI may be read. By determining the TOF and RSSI, the distance from one device to another may be determined faster and with a higher degree of accuracy.

Once the initial handshake has taken place the FID and/or mobile devices may exchange location information with another FID or mobile device. The other FID or mobile device may also provide known points, and device providing its location information to include any or all of a waypoint, latitude, longitude, altitude, relative bearing information and/or a confidence value regarding the information.

FIG. 33 also illustrates the use of relaying the information request message is shown. The number of hops this path may take is also reported. This relaying enables FID and mobile devices and other FID that are not initially in direct communication with each other to establish communications pathways for Trilateration.

Various embodiments for providing a location based service in a fixed wireless device may include determining via a processor of a fixed wireless device (or fixed infrastructure device) whether information obtained via a geospatial system of the fixed wireless device is accurate. Additionally, the methods may include collecting location information from a plurality of fixed wireless devices in a communication group in response to determining that the information obtained via the geospatial system of the fixed wireless device is not accurate. Next, the methods include computing more precise location information for the fixed wireless device based on the location information collected from the plurality of fixed wireless devices (the more precise location information including three-dimensional location and position information), and using the generated location and position information to provide the location based service.

Further embodiments may include methods, and computing devices configured to implement the methods, of performing trilateration for fixed infrastructure nodes (FIN) using enhanced location based positions (location information) with wireless devices. The trilateration may rely on multiple inputs from various devices to assist in initial fix and subsequent improvements for the fixed nodes' location determination involving latitude, longitude and altitude.

Generally, the concept of how eLBS with fixed nodes (fixed infrastructure devices, fixed infrastructure nodes, etc.) takes place is important for the enhanced position to be achieved using a multitude of devices. As the need to improve location services the accuracy and confidence of the actual three-dimensional coordinates of the fixed node needs to have a high degree of confidence and precision. The confidence and precision of the three-dimensional coordinates, (latitude, longitude and altitude) need to be established for each of the antennas with a LTE site in support of the position reference signal (PRS).

With LTE new (pico) or small cell sites required for providing coverage and network capacity for LTE and LTE-A will be located at street level or even indoors, where GPS reception is poor or non-existent.

An item useful for LTE is Clock synchronization and this is now being achieved with IEEE 1588 in place of GPS. However, a LTE cell site that relies on backhaul being provided by a donor LTE cell site, the IEEE1588 is not viable since it is relevant to the donor cell site. Therefore GPS will be relied on for timing synchronization in the situation for donor cell sites in LTE. eLBS for Fixed Infrastructure Nodes can assist or improve the use to GPS for timing synchronization by providing its timing to the remote cell site that is in a GPS stressed environment.

In a GPS stressed environment eLBS for FIN can provide a GPS clock signal to the eNB of the remote site. The GPS clock signal that is relayed can also be used to improve the determination of the geodesic location (latitude, longitude and altitude) of the remote eNB that is in a GPS stressed environment.

In LTE the Evolved Serving Mobile Location Center (E-SMLC) is responsible for provision of accurate assistance data and calculation of position. In the current art Positioning over LTE is enabled by LPP. LPP call flows are procedure based where the main functions of LPP are to provision the E-SMLC with the positioning capabilities of the UE (a) to transport Assistance Data from the E-SMLC to the UE (b) to provide the E-SMLC with co-ordinate position information or UE measured signals (c) to report errors during the positioning session. LPP can also be used to support "hybrid" positioning such as oTDoA+A-GNSS.

In the case of network based positioning techniques, the E-SMLC may require information from the eNodeB (such as receive-transmit time difference measurements for supporting ECID). A protocol called the LPP-Annex (LPPa) is used to transport this information. LPP OTDOA ECID A-GNSS eXTensions To LPP (LPPe) LPP was designed to enable the key positioning methods (with enhancements) available on 2G and 3G networks, and provide the minimum set of data necessary for positioning.

Overcoming some limitation for positioning of the mobile in LTE the Primary Reference Signal (PRS) introduced in 3GPP is transmitted from the eNB from antenna port 6. While the PRS is a great enhancement its functionality is reliant upon the coordinate of the antenna for transmitting the PRS and not the location coordinate of the eNB. eLBS for FIN however is able to improve the coordinate determination for the antenna using PRS and therefore provide the needed coordinates needed for the PRS itself.

To achieve a three-dimensional position (latitude, longitude and altitude) with a high confidence of its correctness or rather confidence a fixed infrastructure node using eLBS FIN Trilateration can obtain a three-dimensional position using a variety of different devices.

Figure 34:
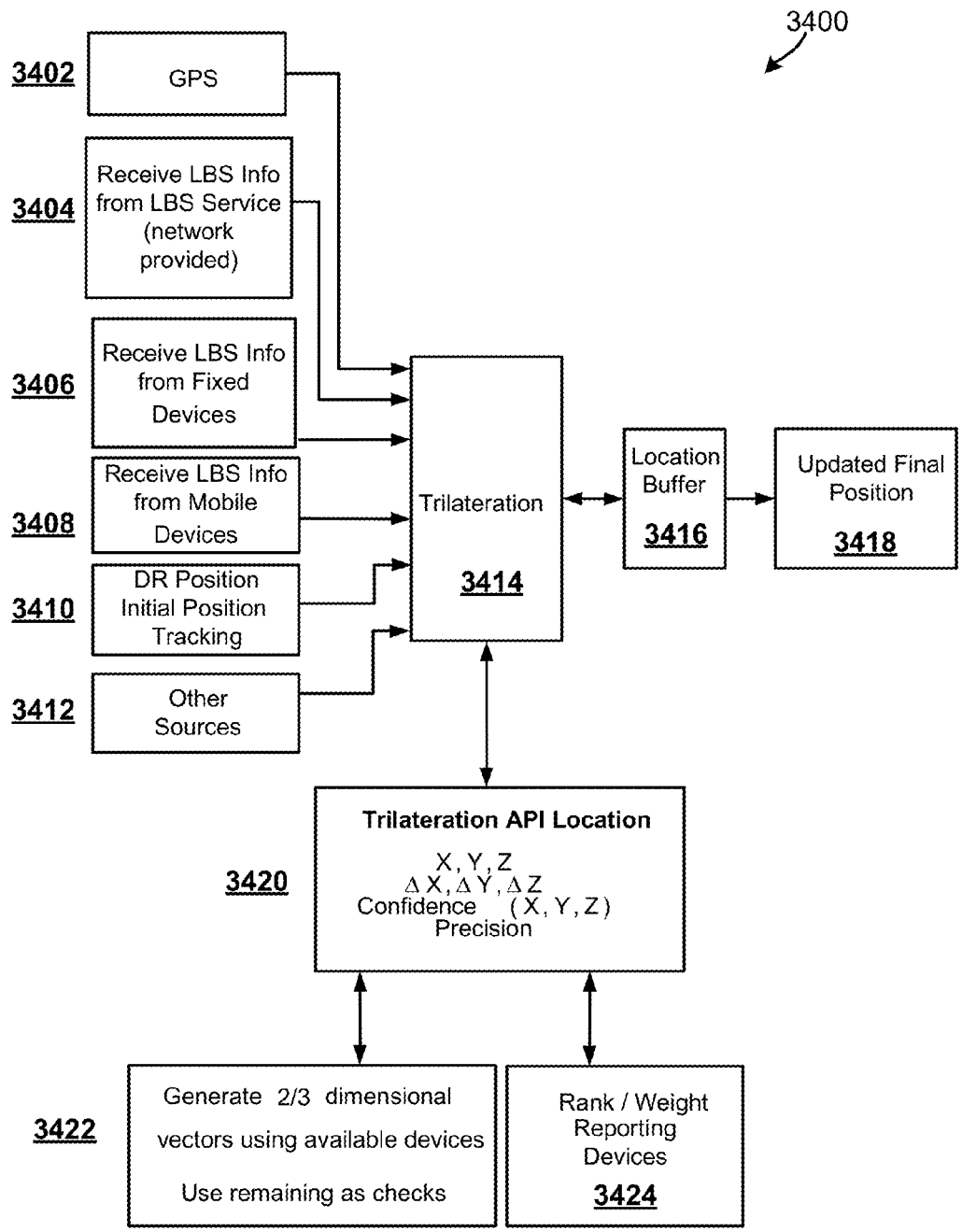
FIG. 34 is a process flow diagram illustrating operations in a system configured to perform enhanced location based operations using fix infrastructure devices in accordance with the other embodiments.

FIG. 34 is a high-level diagram indicating the various inputs (i.e. inputs 3402-3412) that make up a eLBS Trilateration process for Fixed Infrastructure Nodes (FIN) or FIN trilateration process 3400. The output for the FIN trilateration process 3400 is a location defining three (3) points from which a reliable positional determination can take place. This embodiment is similar to the embodiment illustrated in FIG. 31 and described above. However, in this embodiment, because the trilateration process is being used to better determine the location of a fixed infrastructure device, the dead reckoning data of block 3410 is used to determine the initial position when installing the node or its antenna. Also, eLBS FIN Trilateration process shown in FIG. 34 utilizes inputs from GPS, Cell ID, WiFi ID, Beacons, RFIDs, Mobile Devices (Ue's) or other external devices that provide a location position of the device in blocks 3402 through 3412, which are similar to the operations in block 3102 through 3112 described above. The external devices can be both active and passive devices.

The eLBS FIN Trilateration process may also use dead reckoning when placing the installing the node or antenna where the antenna or node has sensors, incorporated in it including GPS, Accelerometer, two and three-dimensional Gyro, Compass, and barometers and other advanced sensors enabling the device to estimate how far it has transverses over a particular period of time in any three dimensions in space from a predetermined fixed reference point. The eLBS FIN Trilateration method may also utilize other mobile devices to obtain its position relative to those devices. The mobile devices used for positioning may be non-stationary, enabling multiple waypoints to be established at discrete periods of time. The eLBS FIN Trilateration operations with other mobile devices may be unique in this case because the mobile devices rely on the eNB to obtain position information. By utilizing an iterative process with eLBS FIN trilateration, the actual position of the eNB and the eNB's antenna used for the position reference signal (PRS) may be better determined, thereby enhancing the location determination for the mobile device.

The trilateration system illustrated in FIG. 34 includes location information inputs including GPS 3402, LBS info (network provided) 3404, LBS info from fixed devices 3406, LBS info from mobile devices 3408, initial dead reckoning 3410 and other sources 3412.

The system also includes a trilateration component 3414. In blocks 3420-3424, the fixed infrastructure device/trilateration component 3414 may use the received input data to perform trilateration operations (e.g., trilateration API location operations, etc.), determine the geographical coordinates (e.g., latitude, longitude, and altitude coordinates) of the mobile device, generate a trilateration position estimate value, generate a final position set (e.g., a final location estimate value), generate an updated final position set (e.g., x, y and z coordinates, an updated position estimate value, more precise information, etc.), and send the updated final position set to the output/storage component 3114. The trilateration operations may include operations for implementing any or all of the techniques discussed in this application, including time of arrival, angle of arrival, mobile-to-mobile trilateration, lateration, multilateration, triangulation, etc.

In the example illustrated in FIG. 34, in block 3420, the fixed infrastructure device generates/computes/receives trilateration location values (X, Y, Z), a time value, trilateration location delta values ($\Delta X$, $\Delta Y$, $\Delta Z$), confidence values ($C_X$, $C_Y$, $C_Z$), and one or more precision values, the combination of which may be stored or used as a waypoint (or a data set or estimate value). In block 3424, the fixed infrastructure device may rank or assign weights to the current or historical waypoints (i.e., previously computed waypoints). In block 3422, the fixed infrastructure device may generate two or three dimensional vectors using the waypoints (current and/or historic). In an embodiment, the fixed infrastructure device may generate the vectors based on their rank/weights (e.g., by including/using only waypoints having a rank that exceeds a threshold value).

As mentioned above, the trilateration component 3414 may send the computed updated final position set to the output/storage component. The output/storage component may store the updated final position set in a location buffer 3416 or the illustrated updated final position datastore 3418. In block 3418, the output/storage component may use the updated final position set (more precise location information) to provide a location based service. Additionally, the output/storage component may send the updated final position set 3418 to other devices, such as to a network server or the other mobile devices in the communication group.

The eLBS Trilateration process at a high level shown in FIG. 34 uses is a kalman filter approach used for the trilateration process involving various external devices which the anchor eNB and the eNB's antenna determines its position from but the various external trilateration position is fed into another Kalman filter process which also uses as inputs from other external devices and systems which are reporting what the current devices location (latitude, longitude and altitude) is.

The output of the entire eLBS trilateration process is a position location (latitude, longitude and altitude) which is used by the FIN device to report its current position (latitude, longitude and altitude) or use that position for another function including the enhanced position for each of the antennas used for the PRS.

Figure 35A:
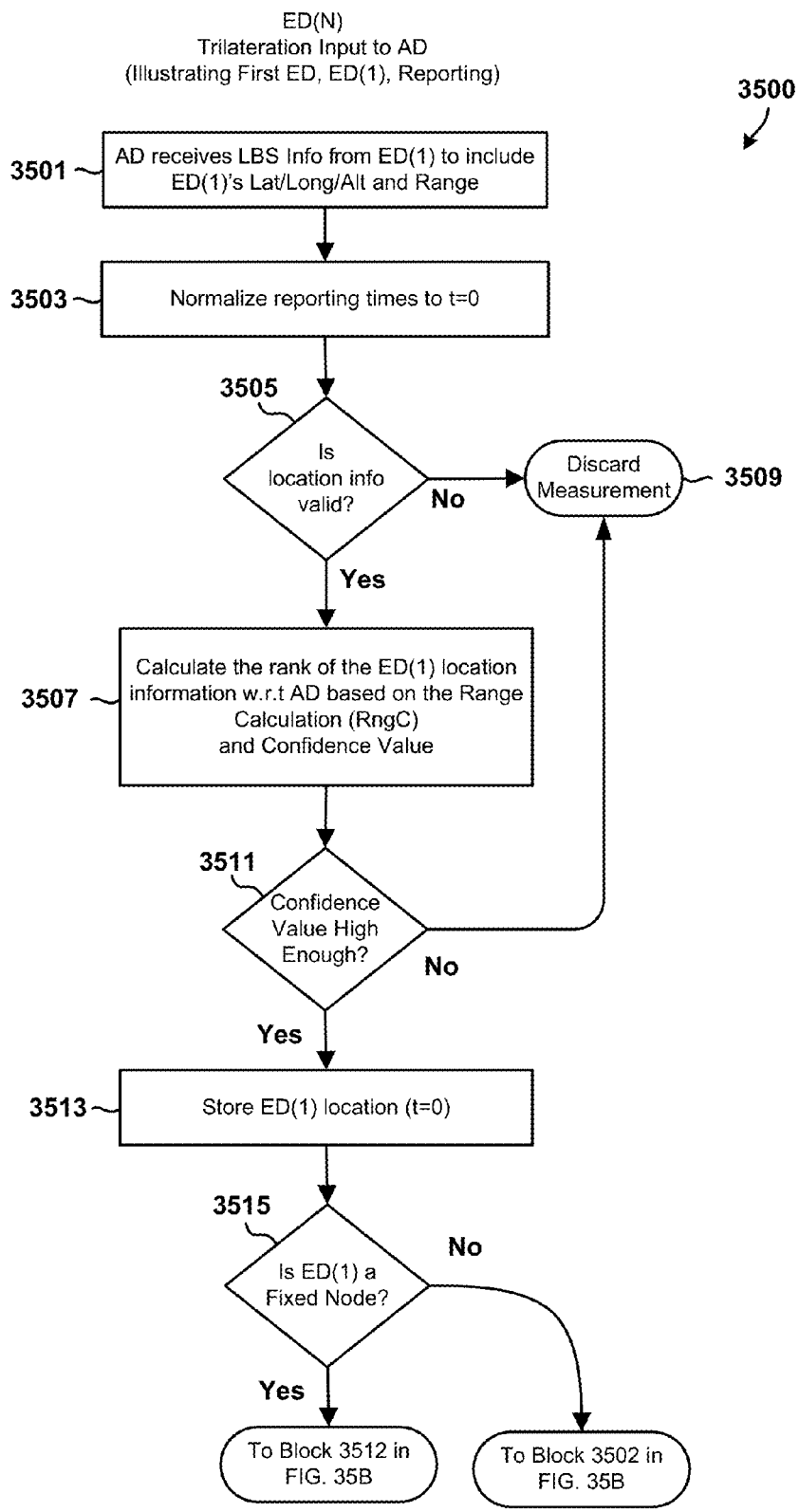
FIGS. 35A and 35B are process flow diagrams illustrating operations in a system configured to select or generate location information for trilateration input in accordance with an embodiment.
Figure 35B:
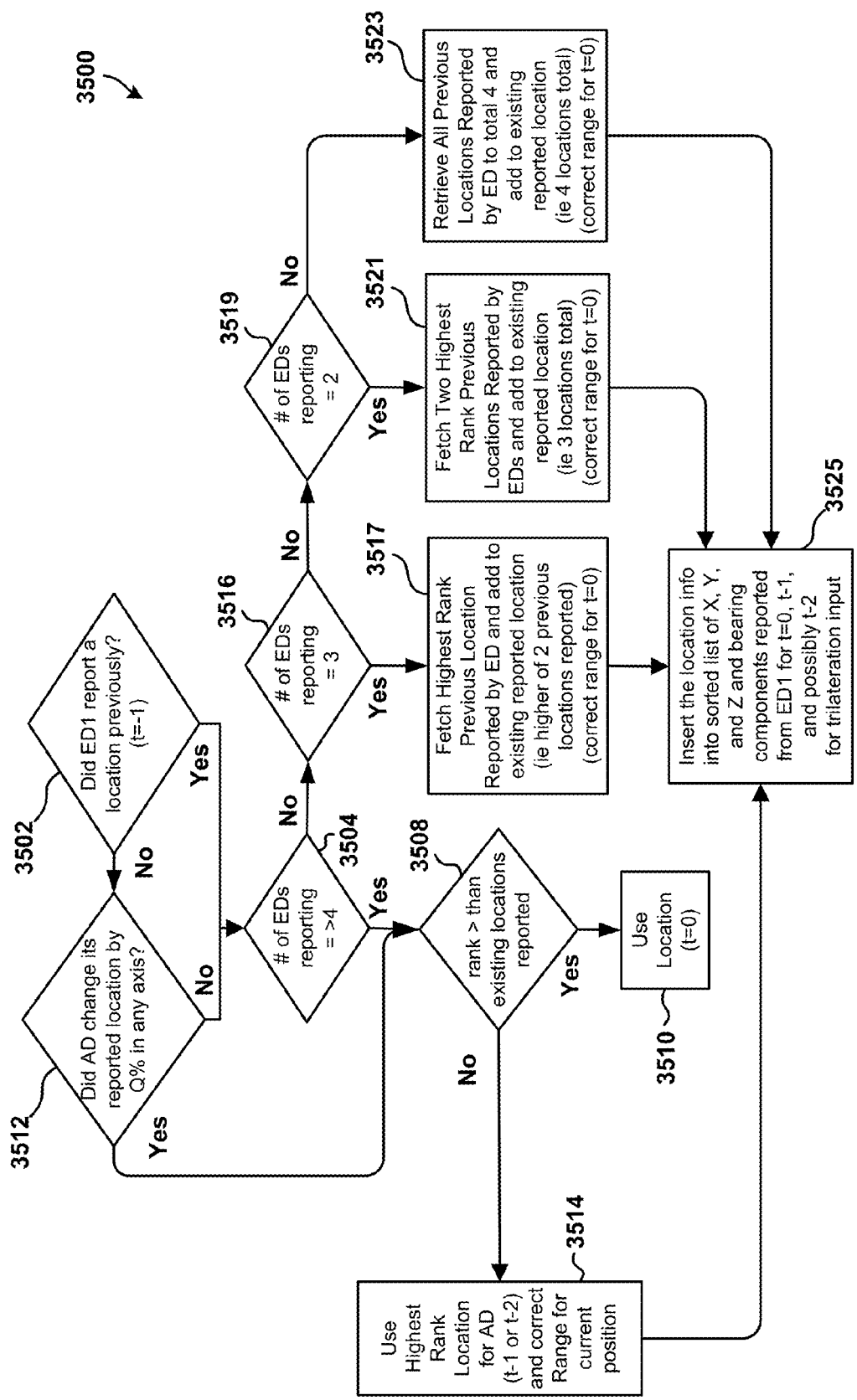

FIGS. 35A and 35B illustrate methods for receiving and using (e.g., in an anchor device (AD)) an external device's (ED's) position information to provide an enhanced location based service. The ED may be a fixed infrastructure node (FIN) or a mobile device (Ue). The AD may be configured to determine the ED's relative position (e.g., relative to itself) and compare the determined relative position to a range value provided by the ED. The range value may be value that is calculated in the ED, and which identifies a distance between the ED and the AD. For ease of legibility, the method illustrated in FIG. 35A represents an example for receiving data from a single device. It should be understood that, in other embodiments, the same or similar operations may be performed based on information received from multiple devices.

At block 3501, an AD may receive location information (e.g., LBS information, etc.) from ED(1), which may be a fixed or mobile device. The location information may include a latitude value, a longitude value, an altitude value, range information, and a time value. In an embodiment, the location information may be a waypoint. In block 3503, the AD may normalize the location information timing to a time (e.g., t=0). Said another way, the AD may normalize its measured location and/or received location information to a common time (e.g., based on the processors cycle) so that the ad-hoc positions reported by all the EDs and other sensors are normalized (or synchronized) to a unified time. In some embodiments, in block 3503, the AD may perform a pseudo synchronization method. In some embodiments, after normalizing/synchronizing the location information timing, the AD may determine and assign a confidence value to each unit of location information (e.g., each waypoint, etc.) provided by each ED. In block 3504, the AD may calculate a rank for the received information (e.g., with respect to the current device, etc.) based on the range calculation (RngC) and confidence value.

In determination block 3505, the AD may determine whether the received location information is valid. Validity may be determined on a variance between expected and actual relative positions. For example, the AD may be configured to compute or determine an expected position (or expected relative position) based on previous trilateration results, previous dead reckoning results, or data received from other external sensors or devices. In some embodiments, the location may be calculated based on the location information provided to the AD by the ED.

In response to determining that location information is not valid, (i.e., determination block 3505="No"), the AD may discard the measurement in block 3509. If a location value is determined to not be valid and/or has a confidence that is too low (i.e., does not exceed a threshold value), it can be temporarily stored and marked to be discarded. If the AD receives location information from several EDs having low confidence values associated with the location information which were initially determined not to be valid, but the EDs reported location information have high precision, the AD may take those low confidence measurements as being valid. In this case the measurements have the marker for discarding removed and are stored for use in block 3507. In response to determining that a location information is valid, (i.e., determination block 3505="Yes") the AD may use the information in block 3507.

In particular, in block 3507, the AD may calculate a rank for location information provided by ED(1) with respect to AD based on the range calculation and confidence value of the location information provided by ED(1). In determination block 3511, the AD may determine whether the location information provided by ED(1) has a sufficiently high confidence value. In response to determining that the location information provided by ED(1) does not have a sufficiently high confidence value (i.e., determination block 3511="No"), the AD may mark the location information provided by ED(1) to be discarded in block 3509. This is similar to the AD making a determination that the information is not valid, but the location information has a confidence value, and range value/calculation associated with it. In response to determining that a location information has a sufficiently high confidence value, the AD, in block 3513, may stores the location information as a waypoint (e.g., as a current location waypoint) for ED(1) in its location database.

With reference to FIG. 35B, in determination block 3502, the AD may determine whether the ED previously reported a location (or sent a valid waypoint, etc.). In response to determining the ED did not previously report a location, (i.e., determination block 3502="No"), in determination block 3512, the AD may determine whether the AD moved (or changed its reported location) by more than a distance or a percentage value in any axis or direction.

In response to determining that the AD changed its position by a set percentage in any axis (i.e., determination block 3512="Yes"), the AD may determine whether a rank value associated with reported location information (or reported waypoint) exceeds (e.g., is greater than, etc.) the ranks of the other stored or received location information (or received waypoints) in determination block 3508. In response to determining that the rank value associated with reported location information does not exceed the ranks of the other stored or received location information, in block 3514, the AD may select and use the highest ranked waypoint, which may be a previously computed and stored waypoint for AD (e.g., for t=t−1 or t=t−2 etc.) with its range corrected to the t=0 for the current position of AD. In block 3525, the AD may insert the waypoint into a sorted list of coordinates X, Y, and Z and bearing components reported from ED1 for t=0, t=t−1, or possibly t=t−2 accordingly.

In response to determining that the AD did not move (or change its reported location) by more than the distance or percentage value in any axis or direction (i.e., determination block 3512="No"), that the AD is stationary, or that the ED did report a location (i.e., determination block 3502="Yes"), the AD may determine whether four or more EDs are currently reporting location information (or whether waypoints where received from four or more devices) in determination block 3504. In response to determining that four or more EDs are reporting location information (i.e., determination block 3504="Yes"), the AD may determine whether a rank value associated with reported location information (or reported waypoint) exceeds (e.g., is greater than, etc.) the ranks of the other stored or received location information (or received waypoints) in determination block 3508.

In response to determining that the rank of the reported waypoint exceeds the ranks of the other stored or received waypoints (i.e., determination block 3508="Yes"), in block 3510 the AD may store the location information (or received waypoint) in memory and/or mark the information as being suitable for use as the current location waypoint or location information for t=0. On the other hand, in response to determining that the rank of the reported waypoint does not exceed the ranks of the other stored or received waypoints (i.e., determination block 3508="No"), the AD may select and use the highest-ranking waypoint/location information in block 3514.

In response to determining that four or more EDs are not reporting location information (i.e., determination block 3504="No"), in determination block 3516 the AD may determine whether three EDs are currently reporting location information. In response to determining that three EDs are reporting location information (i.e., determination block 3516="Yes"), in block 3517 the AD may retrieve the highest-ranking location information or the highest ranked stored waypoint from memory. The highest ranked stored waypoint may be a previously reported waypoint (received from any of the reporting EDs) that has the highest rank. The retrieved waypoint may be added to the existing three reported waypoints (i.e., the waypoints received from each of the three reporting EDs) to obtain a total of four waypoints. The waypoints may time normalized to t=0 and range corrected for t=0, and in block 3525, the AD may insert the waypoints into a sorted list of coordinates X, Y, and Z and bearing components reported from ED1 for t=0, t=t−1, or possibly t=t−2 accordingly.

In response to determining that three EDs are not reporting location information (i.e., determination block 3516="No"), in determination block 3519 the AD may determine whether two EDs are currently reporting location information. In response to determining that two EDs are reporting location information (i.e., determination block 3519="Yes"), in block 3521 the AD may retrieve two previously reported highest ranked waypoints (received from any of the reporting EDs). The AD may add the retrieved waypoints to the existing two reported waypoints to obtain a total of four way points. The previously reported waypoints may be time normalized to t=0 and range corrected for t=0. In block 3525, the AD may insert the waypoints into a sorted list of coordinates X, Y, and Z and bearing components reported from ED1 for t=0, t=t−1, or possibly t=t−2 accordingly.

In response to determining that two EDs are not reporting location information (i.e., determination block 3519="No"), in block 3523 the AD may retrieve three of the highest ranked previously reported waypoints stored in memory to obtain a total of four waypoints. The previously reported waypoints may be time normalized to t=0 and range corrected for t=0. In block 3525, the AD may insert the waypoints into a sorted list of coordinates X, Y, and Z and bearing components reported from ED1 for t=0, t=t−1, or possibly t=t−2 accordingly.

Block 3525 uses the waypoints in the sorted list as input for the various method for trilateration disclosed in this application, including the methods for determining the position location accuracy (using the trilateration) for multiple devices reporting locations. The output of the AD's trilateration for each EDs, the reported positions, may be ranked with respect to each other based on accuracy and confidence. Using these values, possibly discarding or ignoring those values which are considered inferior or invalid, provides for achieving highest position location accuracy to be achieved. The output of the eLBS trilateration operations may be a position/location (or waypoint) that is used by a device to report its current position (or for other functions, such as to provide an enhanced location based service).

Figure 36:
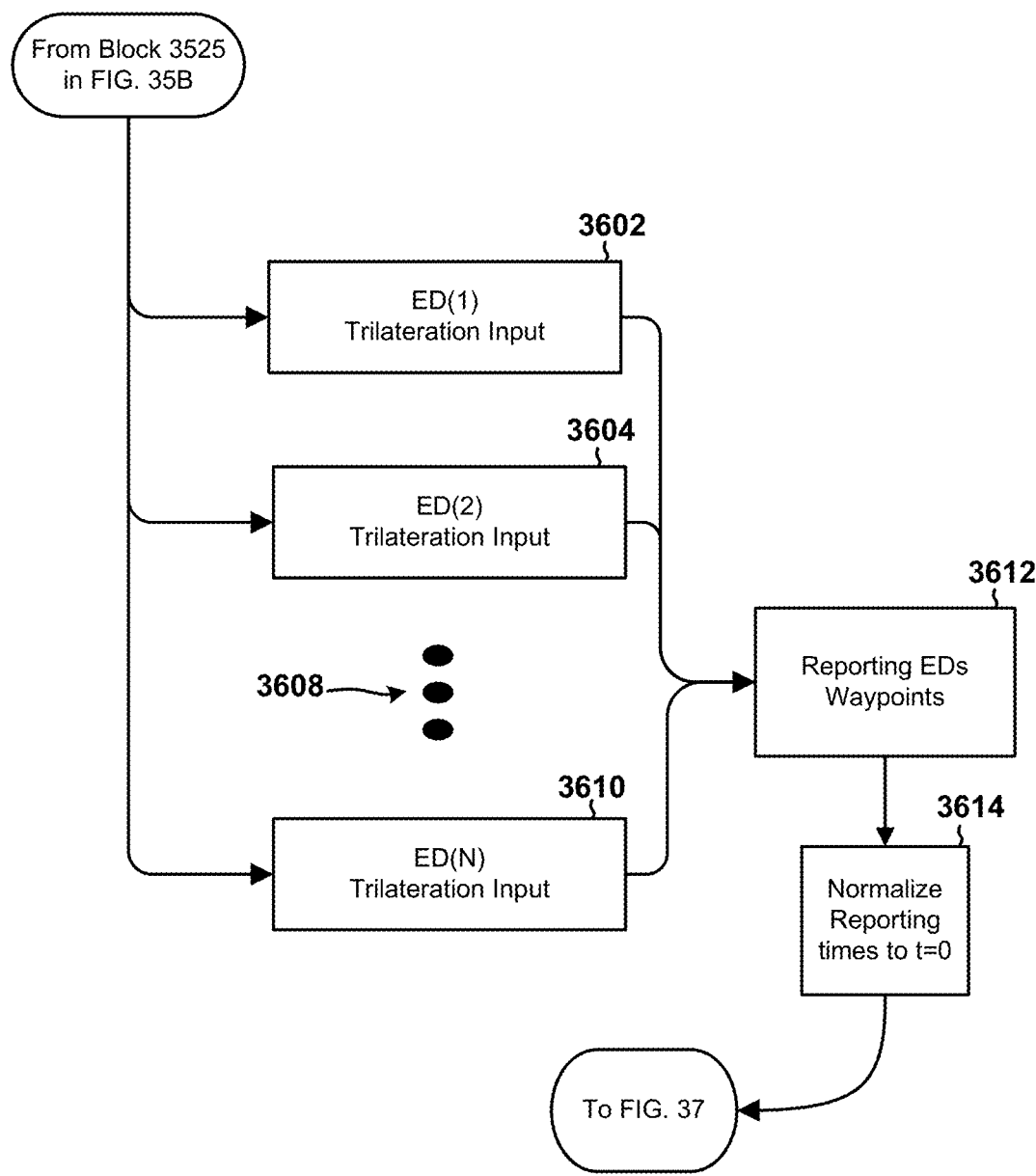
FIGS. 36 and 37 are process flow diagrams illustrating operations in a system configured to use trilateration inputs to generate a fusion trilateration value for a fix infrastructure device in accordance with an embodiment.
Figure 37:
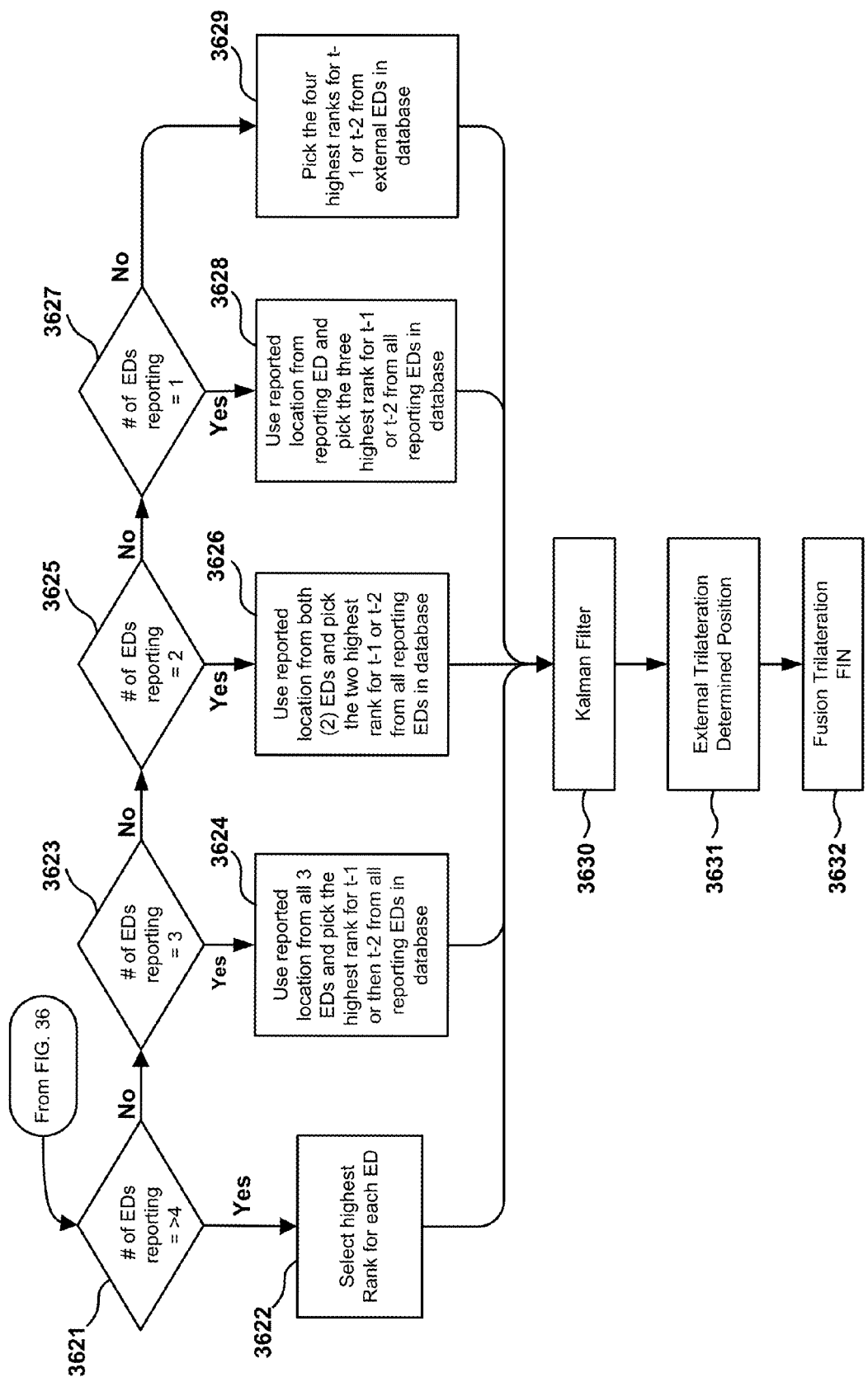

FIGS. 36 and 37 illustrate processes for determining the position location accuracy using the trilateration methods for multiple devices reporting locations. In particular, FIG. 36 illustrates the output of block 3525 (illustrated in FIG. 35B) may be used (for each reporting ED, which may be a fixed infrastructure device (FID) or fixed infrastructure node (FID)) as trilateration input. Block 3602 illustrates the trilateration input for a first ED, ED(1), which is process 3500 for ED(1). Block 3604 illustrates the trilateration input for a second ED, ED(2) which is process 3500 for ED(2). Block 3608 illustrates one or more EDs providing trilateration input. Block 3610 illustrates the trilateration input for an Nth ED, ED(N) which is process 3500 for ED(N). All of the trilateration input may be combined in block 3612 as reporting EDs waypoints. All of the separate ED's waypoints may be normalized to a time, t=0, in block 3614.

With reference to FIG. 37, in determination block 3621, the AD may determine whether four or more EDs are reporting location information. In response to determining four or more EDs are reporting location information (i.e., determination block 3621="Yes"), in block 3622, the AD may select the highest ranked waypoint reported for each ED. The AD may provide the selected waypoints as inputs to a kalman filter in block 3630.

In response to determining fewer than four EDs are reporting location information (i.e., determination block 3621="No"), in determination block 3623, the AD may determine whether three EDs are reporting location information. In response to determining three EDs are reporting location information (i.e., determination block 3623="Yes"), in block 3624, the AD may use the reported waypoints from all three EDs and selects the highest ranked previously reported waypoint for t=t−1 and/or t=t−2 for any ED in the database (and in so doing obtains a total of four waypoints). The AD may then provide the four waypoints to a kalman filter in block 3630.

In response to determining that fewer than three EDs are reporting location information (i.e., determination block 3623="No"), in determination block 3625 the AD may determine whether two EDs are reporting location information. In response to determining two EDs are reporting location information (i.e., determination block 3625="Yes"), in block 3626 the AD may use the reported waypoints for both EDs and select the two highest ranked previously reported waypoints for t=t−1 and/or t=t−2 (for any reporting ED in the database) to obtain a total of four waypoints. The AD may provide these four waypoints to the kalman filter in block 3630.

In response to determining that fewer than two EDs are reporting location information (i.e., determination block 3625="No"), in determination block 3627 the AD may determine whether one ED is reporting location information. In response to determining that one ED is reporting location information (i.e., determination block 3627="Yes"), in block 3628 the AD may use the reported waypoint and the three highest ranked previously reported waypoints for t=t−1 and/or t=t−2 for the any EDs in the database to obtain a total of four waypoints. The AD may provide these four waypoints to the kalman filter in block 3630.

In response to determining no EDs are reporting location information, (i.e., determination block 3625="No"), in block 3629 the AD may retrieve the four highest ranked waypoints, and provides these four waypoints to a Kalman filter in block 3630.

The kalman filter in block 3630 may be used to generate an external trilateration determined position 3631 for time period 0 (t=0). This value may be fed as input to the fusion trilaterion process 3632 to generate filtered LBS data (e.g., a filtered LBS estimate value, etc.). The kalman filter 3630 may be a procedure, algorithm, method, technique, or sequence of operations for accomplishing the function of a kalman filter.

All the reporting EDs may be compared to each other, ranked prior to being sent to a kalman filter with the appropriate matrix and weighting factors.

The trilateration operations discussed above with reference to FIGS. 32-35 may be performed/conducted for various sources. The fusion trilateration operations discussed above enable the device to generate more robust position/location information having high confidence values (e.g., for accuracy, precision, etc.).

In the example illustrated in FIG. 37, the anchor eNB or sub device (shown in FIGS. 45 and 46) of the eNB may receive location information (latitude, longitude and altitude) from external sources (such as other FIN or UEs), and may determine whether the location reported is indeed valid. Validity is based on relative position to itself and the confidence the reporting device position is correct. However, if the FIN eNB or sub device does not have confidence in its location (latitude, longitude and altitude) and several of the external devices also report similar positions which may be initially discarded the eNB may take those degraded measurements as possibly being within validity.

The eNB after determining quickly the validity of the reported device location (latitude, longitude and altitude) stores the value in its database. The eNB also normalizes the measurement to a common time based on the processors cycle so the ad-hoc positions reported by all the devices and other sensors are normalized or rather synchronized to a unified time.

Several decisions are made regarding the measurement received as well as the need to obtain previous positions or rather waypoints (WP) based on the number of devices reporting to the anchor eNB or its sub device.

The output of the eNB FIN trilateration process for each device is then feed into another process which utilizes the best reported positions (latitude, longitude and altitude) from all the reporting and devices that did report so the best position estimate (latitude, longitude and altitude) may be achieved. This process is shown in FIGS. 36 and 37 for FIN devices and/or mobile devices (since the FIN are fixed and not moving). In some embodiments, a FIN that is determined to have moved/moving may be treated as a mobile device in the trilateration process.

In example illustrated in FIG. 37, all the FIN's or devices reporting are compared to each other and then ranked prior to being sent to a Kalman filter with the appropriate matrix and weighting factors provides an External Trilateration FIN Determined Position for time period 0 (t=0). And this value is then fed to the Fusion Trilateration process illustrated in FIG. 38. Also, in the example illustrated in FIG. 37, all the UE's or devices reporting are compared to each other and then ranked prior to be sent to a Kalman filter with the appropriate matrix and weighting factors provides an External UE Trilateration Determined Position (latitude, longitude and altitude) value for time period 0 (t=0). And this value (trilateration input value) may be fed to the Fusion Trilateration process in FIG. 38.

Figure 38:
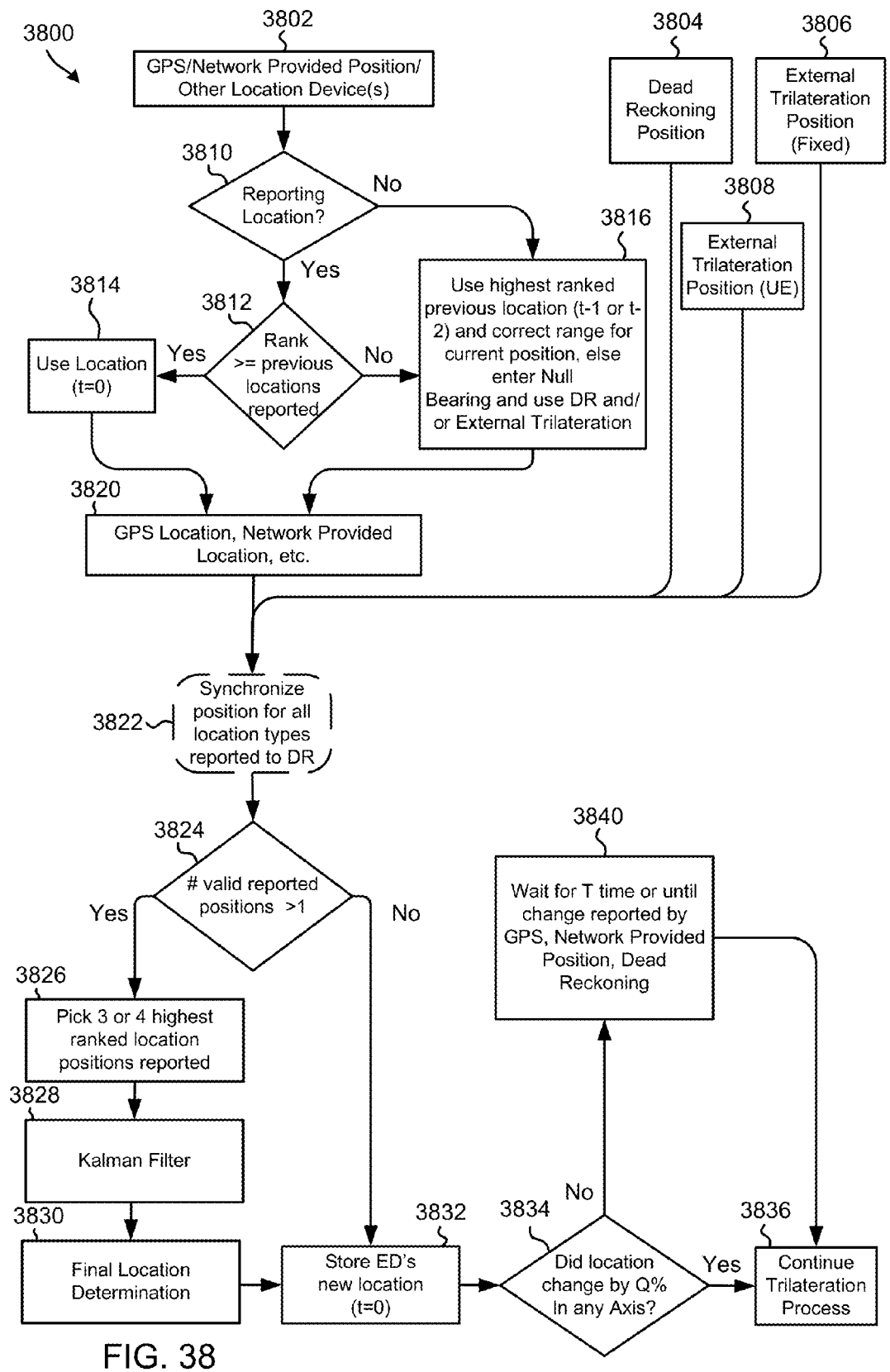
FIG. 38 is a process flow diagram illustrating a method of using trilateration inputs to generate or provide positional information in accordance with an embodiment.

FIG. 38 illustrates a method 3800 of performing fusion trilateration operations using information from various sources. In block 3802, a processor in an anchor device (AD), such as anchor eNB or sub device, may receive information from external sources, including include GPS data, Network provided position information, Cell ID, WiFiID, Beacon/RFID and other data. In the illustrated example, the AD processor receives GPS and network provided position in block 3802, dead reckoning 3804, external trilateration position from fixed devices 3806 and external trilateration position from mobile devices or UEs 3808.

In block 3810, the AD processor may determine whether a waypoint or location information has been reported (e.g., by a specific device having a source type, etc.). In response to determining that a waypoint or location information has not been reported (i.e., determination block 3810="No"), in block 3816 the AD processor may retrieve and use previous reported locations from memory. In response to determining that at least one waypoint or location information has been reported (i.e., determination block 3810="Yes"), in blocks 3812, 3814 and 3818 the AD processor may select and use the received waypoint or information (for t=0). If more than the required number of waypoints have been reported (and stored in memory), the AD processor may select and use the waypoints/location information with the highest ranks in blocks 3812, 3814, and 3818 as the location information. Alternatively, the if no valid previous locations have been reported, the AD processor could elect to not use data from that device, but rather use dead reckoning position information 3804, fixed external trilateration positioning information 3806, and/or UE external trilateration positioning information to select location information in block 3606.

If the external device is reporting valid location information to AD processor, it is ranked according to previously received location information for that device. If no previous location information has been received, the most current valid location information being received is used. If the current reported location information is ranked highest, it is used as the location information and stored in the location information database. If previous location information has been received and the ranking of the current received location information is lower than the previous information, the highest ranked previously reported location information is used.

In some embodiments, having received the location reporting devices from external devices, if any external trilateration position information is received, all location information may be synchronized for time values in optional block 3822 (e.g., via any of the methods discussed in the application) with the dead reckoning data from the AD processor. If in block 3824, only one valid position is available (i.e., determination block 3824="No"), that location information may be stored by the AD processor as the location for the AD processor in block 3832. If more than one valid position is reported (i.e., determination block 3824="Yes"), the valid positions are ranked from best to worse based on confidence values, and the three or four highest positions are selected in block 3826. The selected positions are used as input into a kalman filter in block 3828. The output from the kalman filter is stored as the AD processor's location (or Final Location Determination value) in block 3830. If more than one, but less than four locations are reported, for determining the remaining positions to obtain a total of four positions, inputting these into the kalman filter, and storing the best location (output of the kalman filter) in block 3832. The stored location, best location, or output of the kalman filter may also be identified as the location of the fixed infrastructure node (FIN) in block 3832.

In determination block 3834, the AD processor may determine whether the new location of AD processor changed (relative to its previously computed location) more than a given distance or percentage value in any axis, or greater than a location information value. In response to determining that the new location of AD processor changed (relative to its previously computed location) more than a given distance or percentage value in any axis (i.e., determination block 3834="Yes"), the trilateration process may be continued or repeated in block 3836 to obtain a more precise location information. If there is no change or the change is less than a certain percentage (i.e., determination block 3834="No"), the AD processor may wait for a set amount of time (T) to obtain any changes in location in block 3840. The procedure can also mark the AD processor as stationary and wait until a change is reported by any reporting device, external trilateration information, or internal sensors or components that can be used for dead reckoning. Also, as part of the process involving external device trilateration, the use of previous positions can be used to achieve the necessary set of points from which a three-dimension position may be calculated.

Thus, method 3800 includes using the various inputs (trilateration input values) to generate or provide positional information (latitude, longitude and altitude) in accordance with an embodiment. The inputs may include external and internal sources. The external sources may include GPS, network provided position, fixed infrastructure nodes and mobile devices and other external position sources.

In an embodiment, the method 3800 includes GPS and network provided position (block 3802), dead reckoning 3804, external trilateration position from fixed devices 3806 and external trilateration position from mobile devices 3808. When using GPS data, the AD processor (system) may be queried to determine if the inputs (e.g., GPS data) provides new position location information. A processor in a FIN or FID may determine whether a waypoint or location information has been reported and/or weather at least one waypoint or location information has been reported.

If the inputs (e.g., GPS data) provides new position location information, then the inputs are ranked based on a confidence value associated with each position location. If the new position location is ranked higher than the previous position location, the new position location is passed on. If the GPS system is not reporting new position locations or the rank of the new GPS position location is less than prior position locations, then the highest ranked position location is passed on. Alternatively, the highest ranked position may be corrected or a nullity may be passed on.

Similarly, when using network provided position locations, the system is queried (e.g., in block 3810) to determine if the network is providing new position location information. If the answer is yes, then the network inputs are ranked based on a confidence value associated with each position location. If the new position location is ranked higher than the previous position location, the new position location is passed on. If the GPS system is not reporting new position locations (or the rank of the new GPS position location is less than prior position locations) then the highest ranked position location is passed on. Alternatively, the highest ranked position may be corrected or a nullity may be passed on.

Dead reckoning (3804), fixed external trilateration (3806), and mobile external trilateration (3808) position information may also be used in some embodiments. The GPS, network provided position, dead reckoning, external trilateration position from fixed devices and external trilateration position from mobile devices are then evaluated to determine if the number of valid reported positions is two or more (or greater than one). If the answer is "No", then a subset of the reported positions, such as 3 or 4 highest ranked location, are selected. The selected positions may then be provided to a kalman filter (e.g., in block 3828), a final location determination may be made (e.g., in block 3830), and a final location position value may then be stored (in block 3840). If the number of valid reported positions is two or more (or greater than one), then the valid position may be stored.

The position may be identified as the location of the fixed infrastructure node (FIN). However, the newly determined final location position may be compared to the previous location position in block 3844 to see if the position changed in any axis. If the new final location position is different from the previously reported location position by a threshold value in any axis, such as 1-5%, the trilateration process is continued. If the answer is "No" in block 3844, then the process can be paused for a finite amount of time, such as 1-5 minutes, or paused until a change in position is reported by one of the sources. Then the trilateration process may be continued.

Dead Reckoning's output is also provided as part of the Fusion Trilateration process and is an internal reference for the eNB or the eNB sub device which can be used for initial positioning based on an initial fix so that the position can be updated continuous as the device is moved into its final position. The External Trilateration process output from FIGS. 37 and 38 is used as key input into the Fusion Trilateration Process.

As part of the process involving external device trilateration, the use of previous positions can and will be used to achieve the necessary set of points from which a three-dimensional position (latitude, longitude and altitude) can be calculated.

Figure 39:
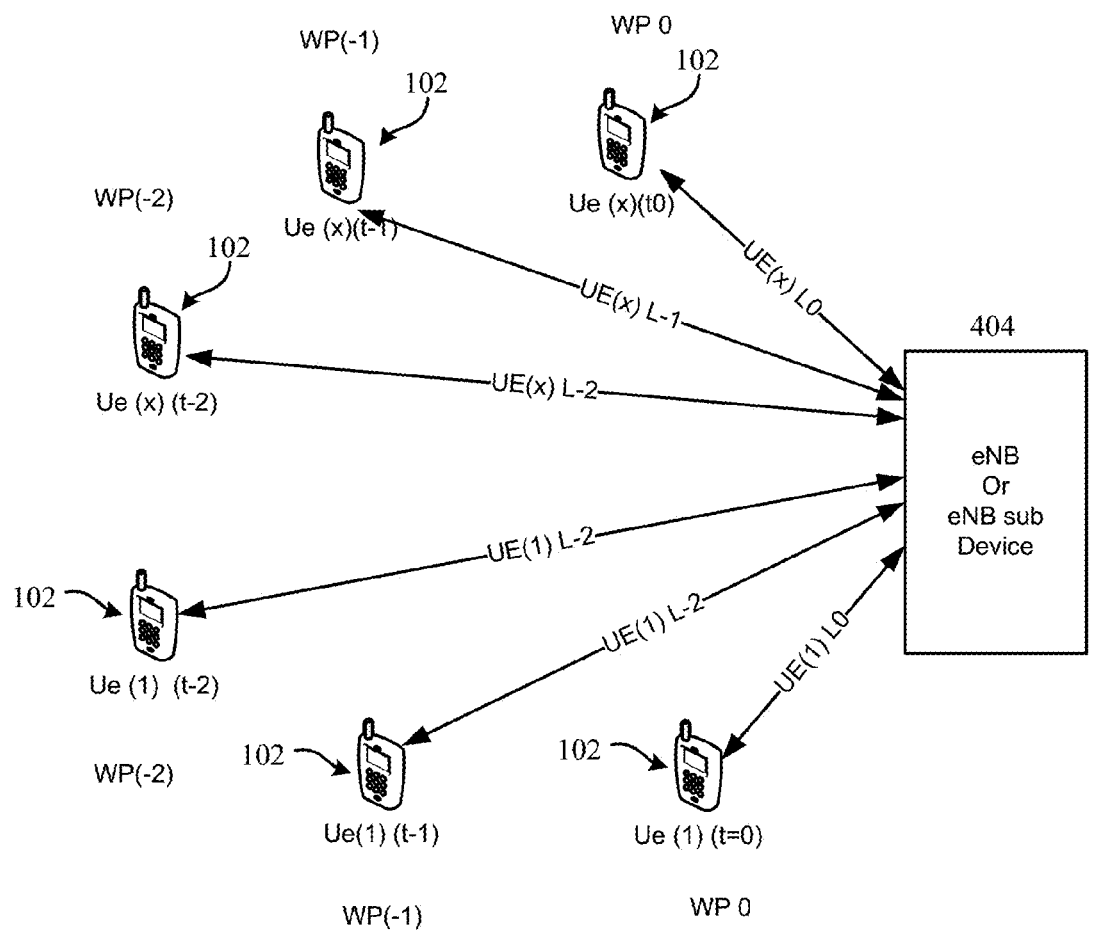
FIG. 39 is a block diagram that illustrates various components, operations, and information flows in a system configured to receive and use position infomration from multiple different devices in accordance with an embodiment.

FIG. 39 is a high-level diagram illustrating an embodiment with 2 devices for ease of reading. However, the concept can easily be extrapolated to 3, 4, 5, 6 or more devices. As illustrated, each mobile device 102 (Ue(1), Ue(x)) sends position information as a function of time to the eNodeB (eNB) device or sub device 404. The eNodeB (eNB) device or sub device 404 may use this position information as discussed above to determine a more accurate position.

In FIG. 39 position at t=0 is reported by Ue (x) and Ue (1). The range or distance between the two devices is also determined by the eNB as part of the normal LTE signaling process for determining range to the UE for timing advances and other related functions. The range may also be used to determine the confidence of the position reported which may be in addition to the confidence the UE(x) is reporting about its own location.

The depiction shown in FIG. 39 can be two or three dimensional (latitude, longitude and altitude). To obtain a three dimensional position, the relative height between the eNodeB or the eNodeB antenna and the Ue should be determined. A eNodeB antenna system utilizes MIMO technology and is also able to determine the angle of arrival (AOA) of a received signal. For eLBS FIN trilateration, the inclusion of the AOA is desired but not an absolute requirement.

Figure 40:
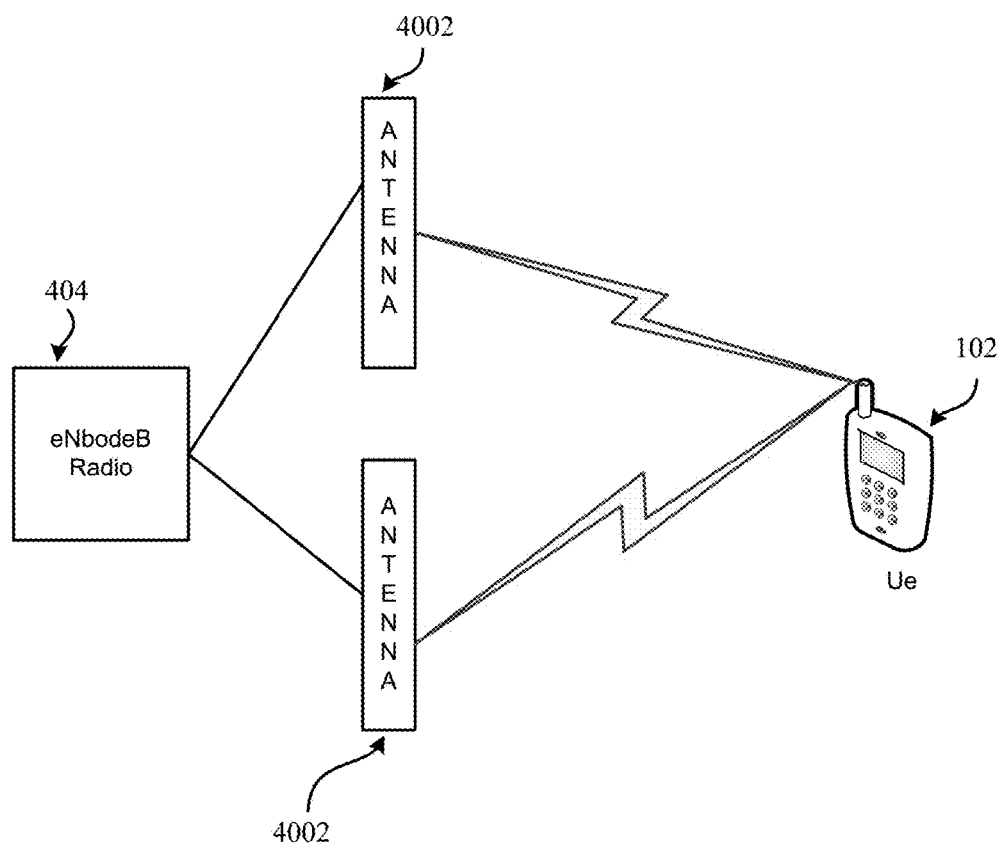
FIGS. 40 through 46 are block diagrams that illustrate methods, and devices configured to implement the methods, for performing trilateration for fixed infrastructure nodes (FIN) using enhanced location based positions (location information) with wireless devices in accordance with various embodiments.

FIG. 40 depicts a typical eNodeB 404 with a 2×2 MIMO configuration having a Ue 120 attached to it. The antenna system 4002 for the eNodeB receives the uplink radio signal from the Ue 120 and is able to determine the AoA of the received signal from the Ue 120. The AoA is important for eLBS FIN 404 because it enables the three-dimensional vector to be established. Specifically if the Ue 120 has altitude to report as part of its location information then the eNodeB 404 or the network location service with the AoA information can better trilaterate the eNodeB's 404 position with the aid of the Ue 120 that is attached to it. Additionally the Ue 120 will also be able to obtain a better position estimate of the eNodeB 404 with the eNodeB 404 providing a better altitude calculation coupled with a PSR signal enabling the Ue 120 to perform its own trilateration process using the eNodeB 404. As more Ue's 120 attach to the eNodeB 404 the improvement to the eNodeB 404 and each of its antennas 4002 latitude, longitude and altitude improve.

Figure 41:
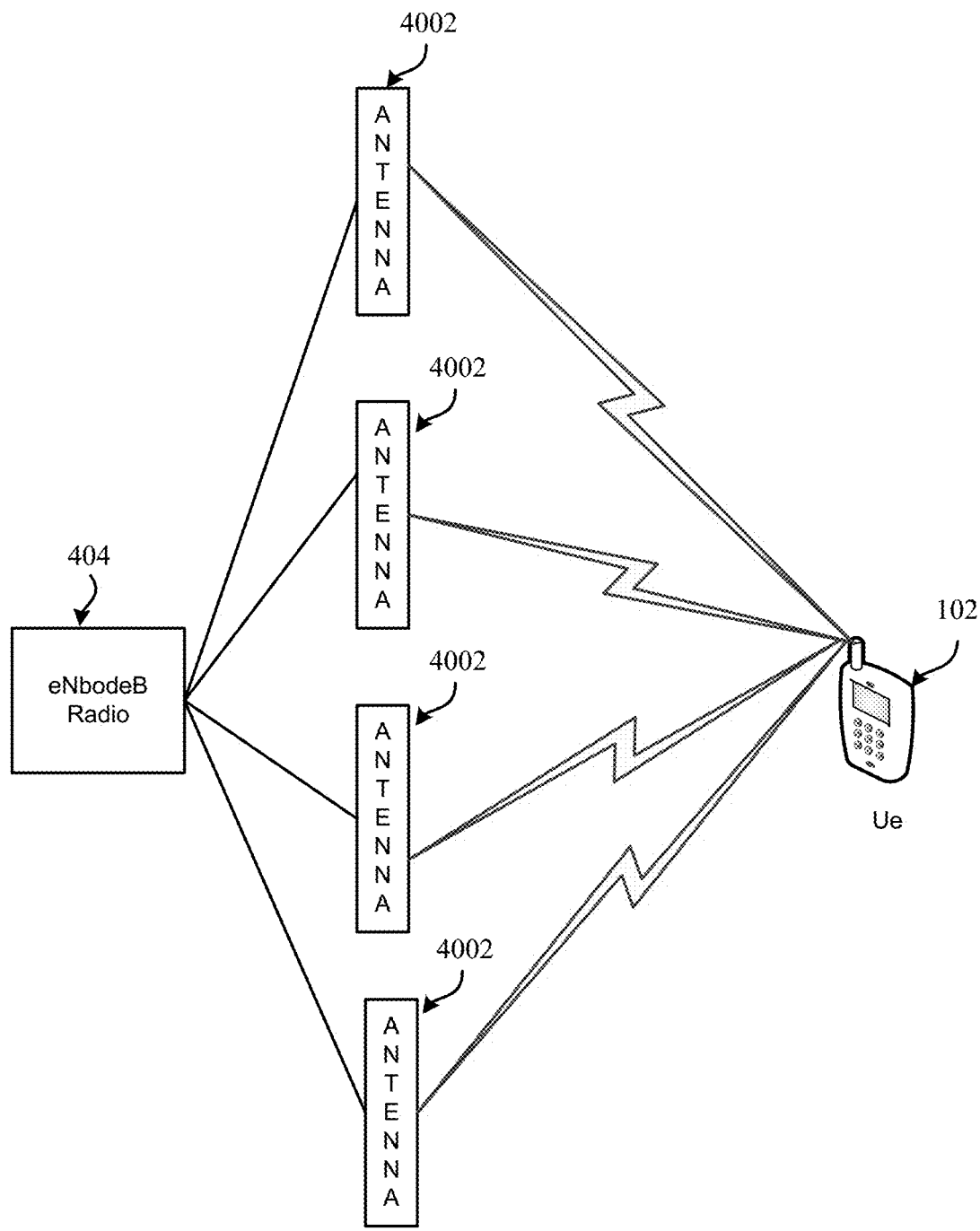

FIG. 41 is another example of a eNodeB 404 having a 4×4 antenna network. As the amount of antennas 4002 increase, the positioning of the Ue 120 improves where one mobile device 120 is able to provide 3 or 4 positions at the same time enabling the eNodeB 404 to determine its latitude, longitude and altitude.

Figure 42:
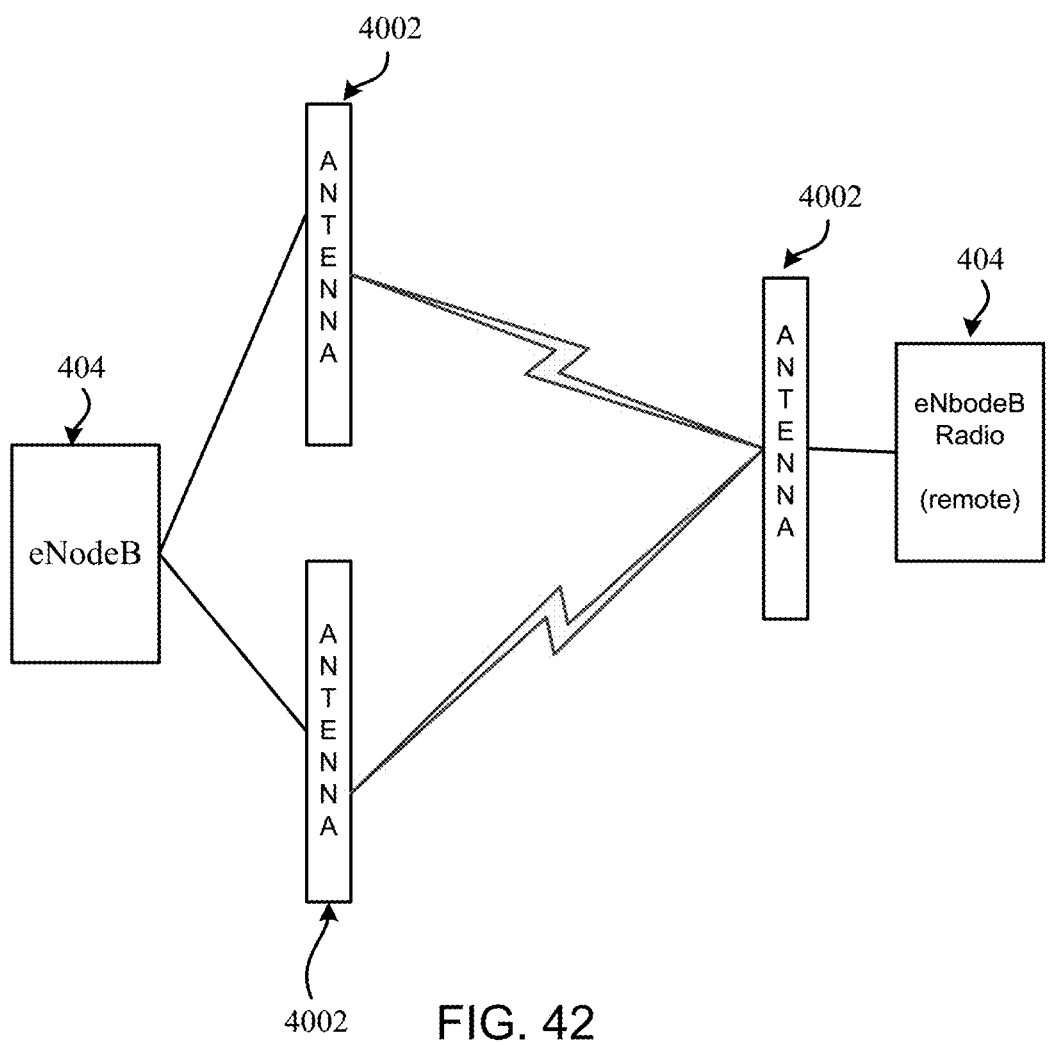

FIG. 42 shows that the device that is being communicated with is another eNodeB 404 or some other FIN or fixed infrastructure device. The AoA of the communication between the FIN eNodeB 404 and the remote FIN is used to enhance the trilateration process where the remote FIN is providing establishing communication with the FIN eNodeB 404 providing ranging information. The latitude, longitude and altitude information of the remote FIN and the FIN eNodeB 404 can either be included in the communication or will be coordinated through the network.

For a small cell, femto cell, beacon, wifi access point of any smaller radio infrastructure device the MIMO antenna 4002 can be housed in the same device there the separation of the antennas 4002 is very small lending to the FIN radio and antenna array 4002 have the same relative location for latitude, longitude and altitude.

Figure 43:
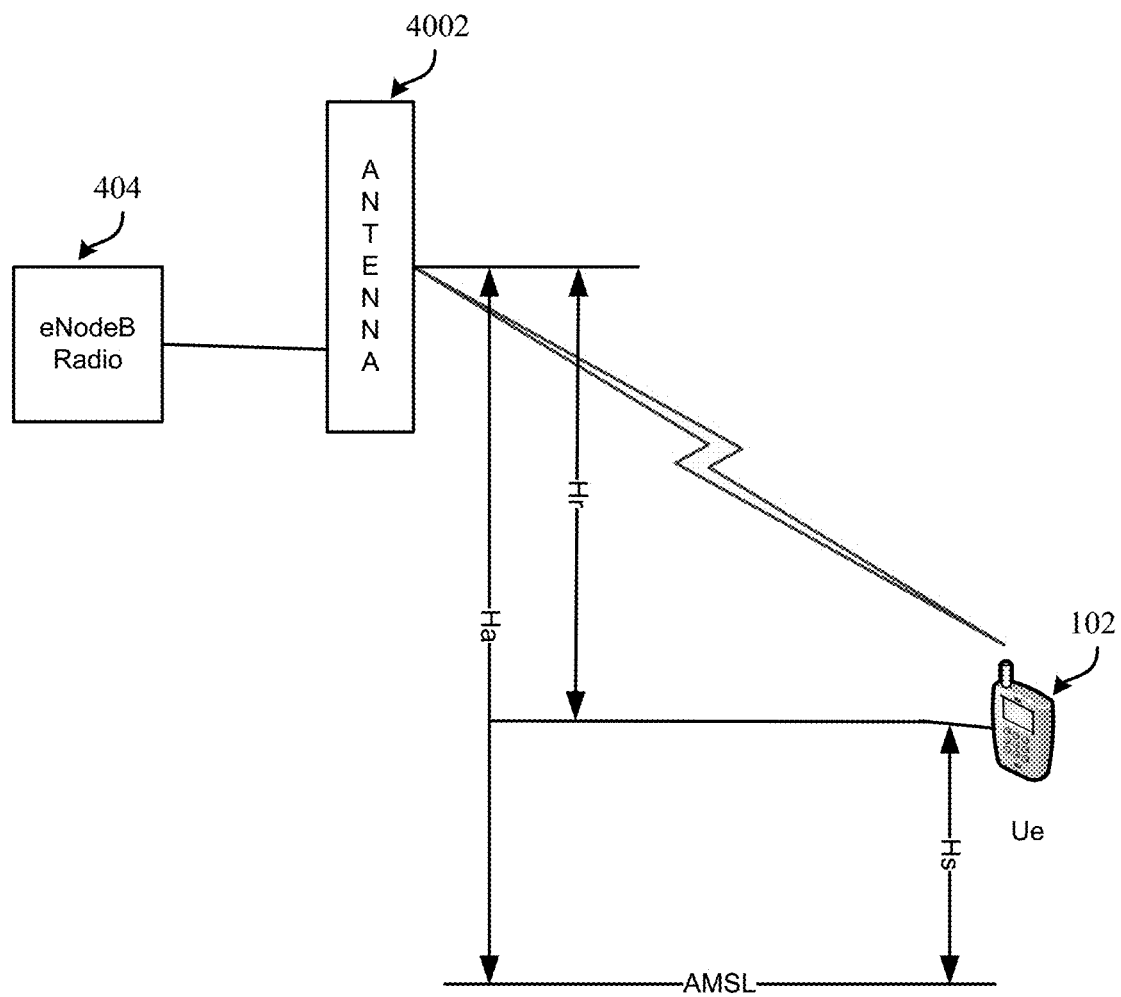

FIG. 43 depicts an example of how the altitude information reported by the Ue 120 to the eNode (or FIN) 404 and vise versa for improving the altitude determination. In FIG. 43, the Ue 120 is at a particular height (Hs) and it provides that information as part of the trilateration process. The FIN eNodeB 404 or its antenna 4002 receives the signal from the Ue 120 and based on the AoA is able to determine the vector angle between the Ue 120 and the FIN antenna 4002. The FIN eNodeB 404 may or may not know its altitude before the communication commences.

In the situation that the FIN eNodeB 404 has an altitude component for its own 3D location then the FIN antenna 4002 is Ha above AMSL. The difference between Ha and Hs, which is Hr, along with the AoA is able to determine height vector used in trilateration. If the FIN or its antenna 4002 does not know its altitude then the Ue 120 reporting its altitude Hs along with the AoA can be used as the first fix for determining Ha.

Figure 44:
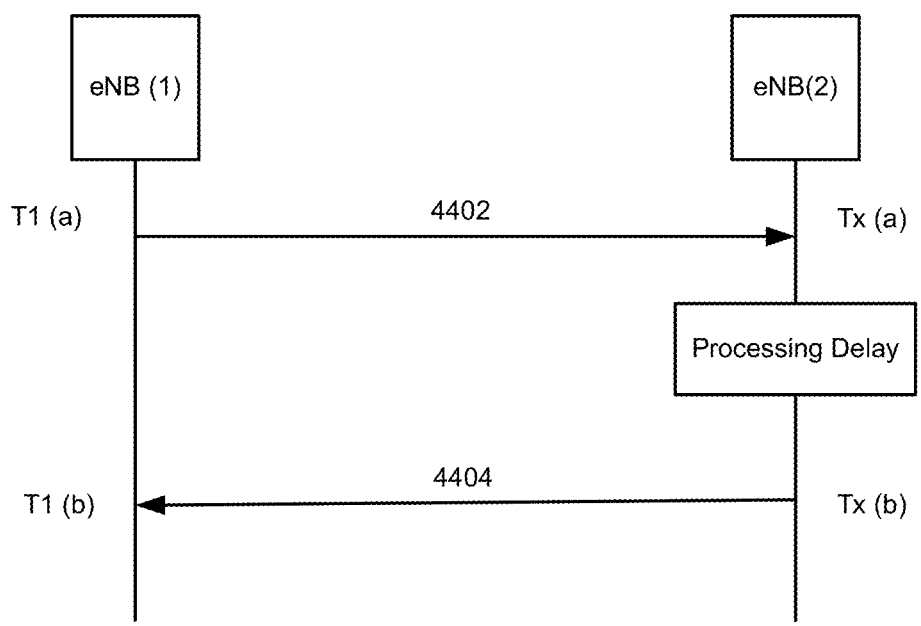

FIG. 44 is an example of how the range between eNB's is determined. Specifically, as illustrated in FIG. 44, the eNB(1) sends a request 4402 for position updates to eNB(x). eNB(x) and eNB(1) should share a common clock. However, this is not assured in the initial acquisition process where eNB(x) is using eNB(1) as the donor cell. Therefore, eNB(x) reports in its response 4404 how long it took from the time it received the request 4402 to when it transmitted the response 4404. eNB(1) of course knows when it sends the request 4402 and when it receives the response 4404 from eNB(x). It also knows the total time expired. The time of flight between the devices can be determined by subtracting the delay in eNB(x) to process the request eNB(1).

As location position refinement continues in the industry, there is a need to more accurately determine the physical location of the antenna 4002 or antennas 4002 used for FIN. The FIN antennas array 1500 can be housed together or they can be geographically dispersed as in a remote antenna system, distributed antenna system (DAS) or as a macro cell site which employs multiple antennas 4002 which are typically arranged in sectors having several antennas per sector.

Figure 45:
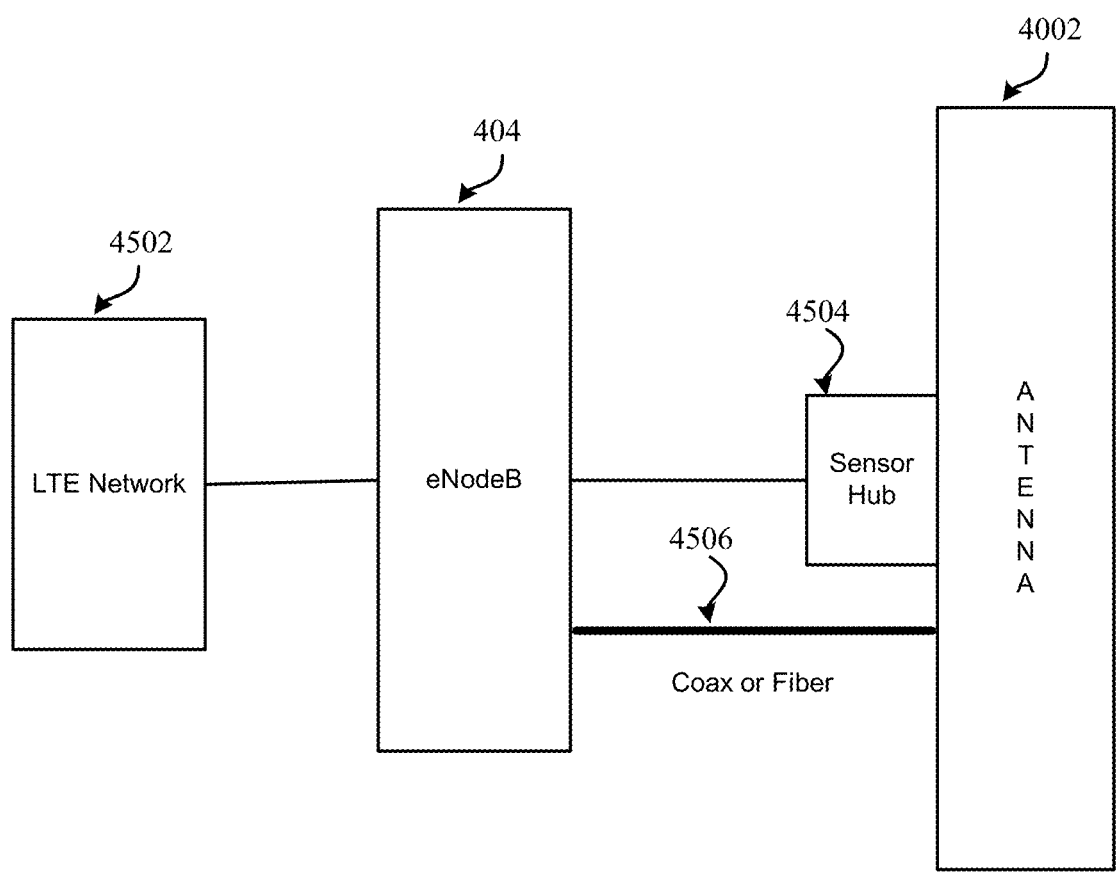

To improve the latitude, longitude and altitude of an antenna 4002 or antenna array 1500 for a FIN a sensor hub or sensors can be incorporated with the FIN or associated with the antenna 4002 itself. FIG. 45 depicts an example of a sensor hub 4504 being associated with an antenna 4002. However the sensor hub 4504 can also be associated with an antenna array 1500 or the primary FIN platform itself.

The sensor hub in FIG. 45 has multiple sensors associated with it. The sensors that can be associated with a sensor hub include an accelerometer, 2 or 3 axis gyro, compass, altimeter and other sensors including GPS. The sensor hub 4504 has the ability to communicate with the eNodeB or FIN or the network 4502 for the purposes of providing a more detailed location determination with latitude, longitude and altitude. The communication between the sensor hub 4504 and the eNodeB 404 (such as via coaxial or fiber cable 4506), FIN or network 4502 can be via a separate communication link or included in the communication link already established between the FIN and the antenna array 1500.

Figure 46:
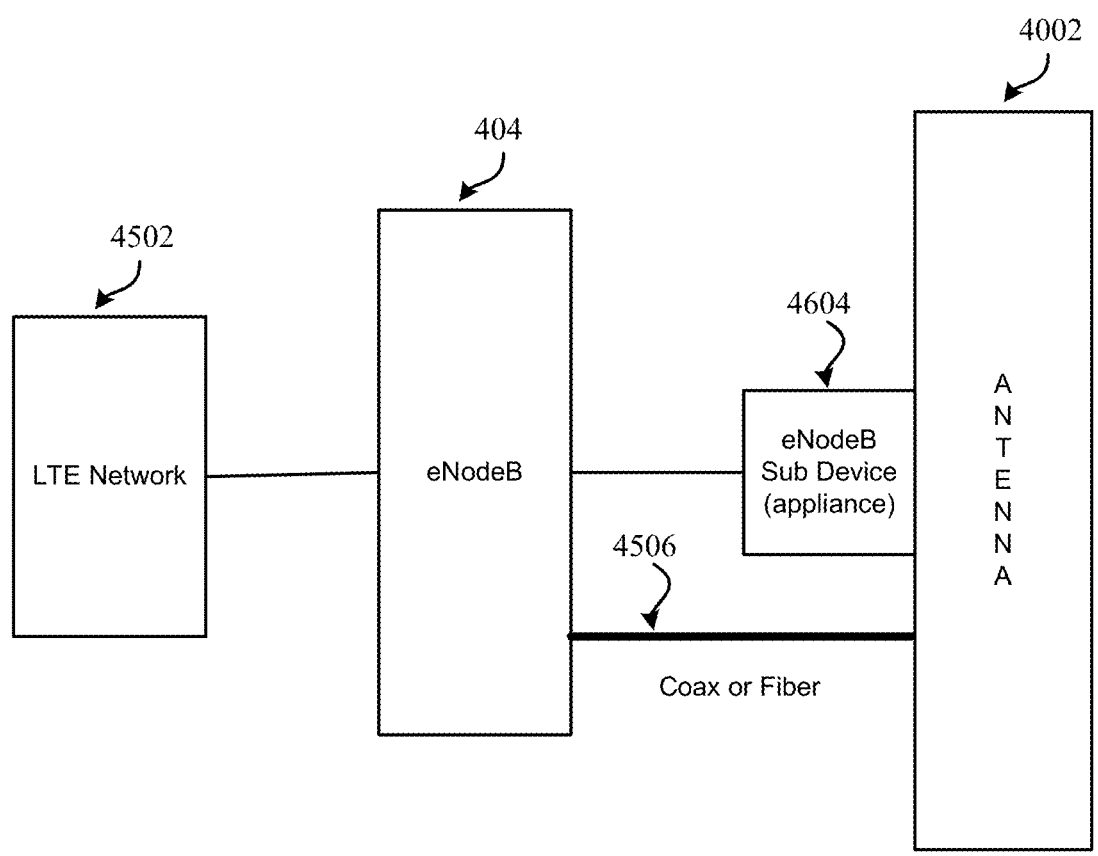

FIG. 46 depicts an enhancement to the Sensor hub 4504 shown in FIG. 45. The system illustrated in FIG. 46 has the sensor capability of the system illustrated in FIG. 45, however, it can also have a radio transceiver 4604 included with it to facilitate communication with other FINs. The radio transceiver 4606 can be a LTE, Ue, Bluetooth, WiFi or any other radio protocol device necessary to facilitate communication between FINs.

Figure 47:
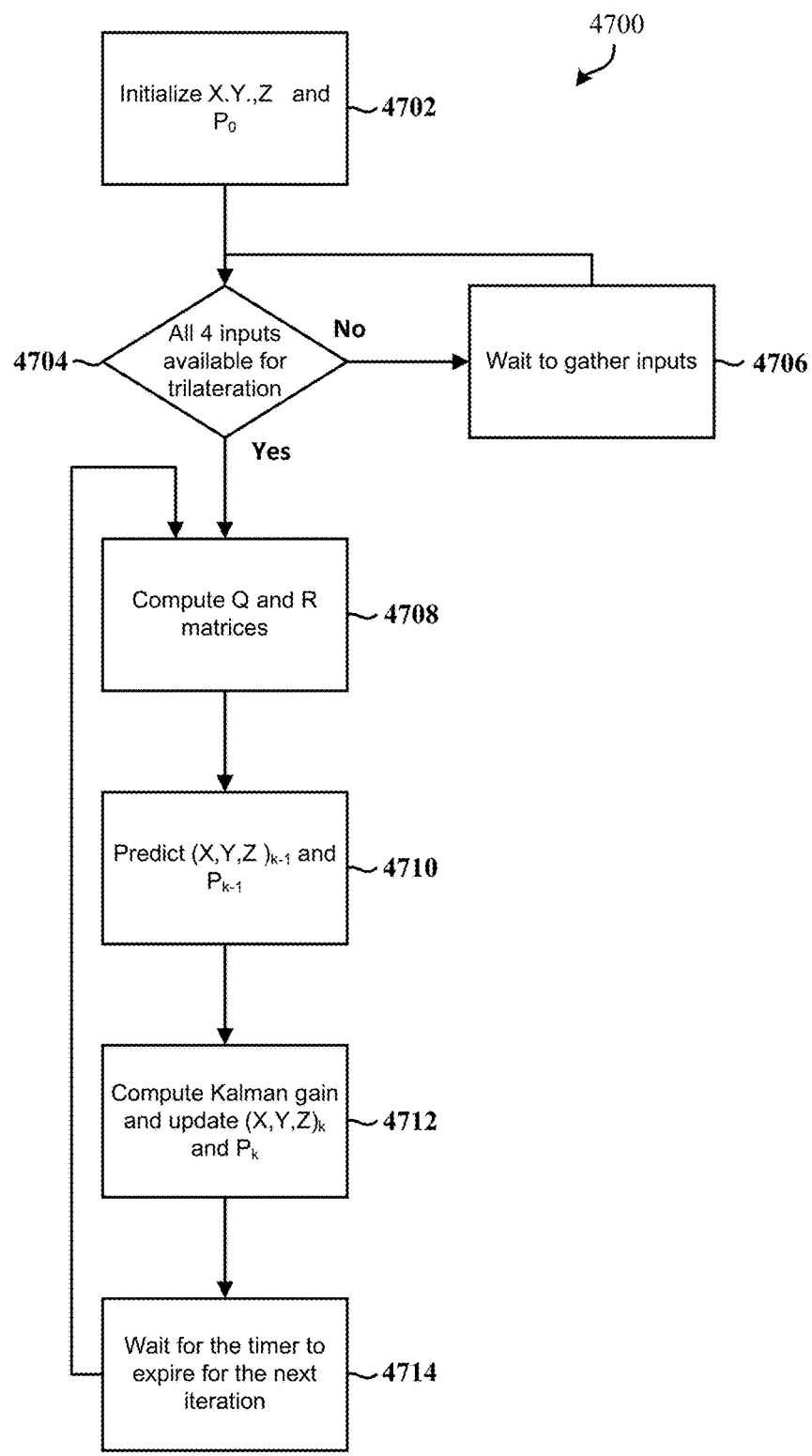
FIGS. 47 and 48 are process flow diagrams illustrating methods of using a three-dimensional Kalman filter for a fix infrastructure device in accordance with various embodiments.

FIG. 47 is a flow diagram illustrating a process 4700 using 3D Kalman filter. The inputs, illustrated in block 4702, include latitude X, longitude Y and altitude Y and the covariance $P_0$. These inputs may be used in the kalman filter matrix for either the Ue or FIN trilateration process. In block 4704, a determination is made as to whether all four of the inputs are available for trilateration. If the answer is "No," then the system pauses to gather the missing inputs, block 4706. After a suitable amount of time, another determination is made as illustrated in block 4702 to determine whether all 4 inputs are now available for trilateration.

If all of the inputs are available, then the Q and R matrices of the Kalman algorithm are determined in block 4708, where "R" is a matrix representing the variance of the measurements and "Q" is a covariance matrix. In some embodiments, the Q matrix of the Kalman filter may be represented via Q matrix information structure, and R matrix of the Kalman filter may be represented via R matrix information structure.

In block 4710, the updating process of the position begins. A location estimate for a Cartesian coordinate system may be represented by the expression.

$$L_k = [x, y, z, v_x, v_y, v_z, a_x, a_y, a_z]$$

The new position $(X,Y,Z)_{k-1}$ at time k−1 and with a covariance $P_{k-1}$ at time k−1 is predicted based on the previous position and the Q and R matrices.

In block 4710, the Kalman gain "K" is computed for the current time interval. The gain may be a product of the estimated covariance, and the measurement variance "R," and may thus be represented by the expression:

$$K_k = P_k^- \cdot H^T \cdot (H \cdot P_k^- \cdot H^T + R)^{-1}$$

Kalman gain depends on the current state estimate and the accuracy of the measurements. As the accuracy of the measurements increase the Kalman gain will be high placing higher weight on the measurements. After computing the Kalman gain, the systems waits for the timer to expire before performing another iteration.

Figure 48:
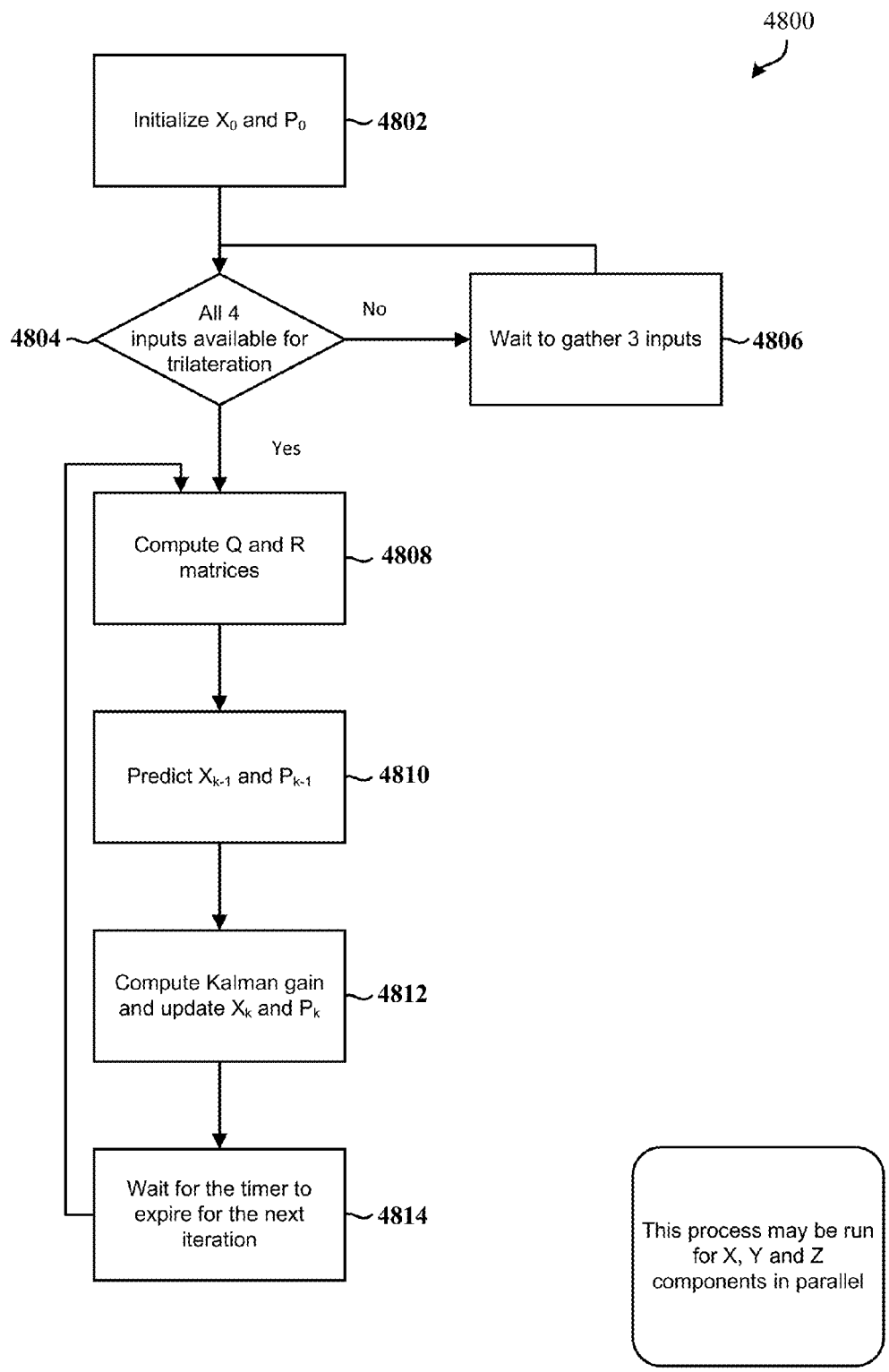

FIG. 48 is similar to the process shown in FIG. 47 except it utilizes a single axis for the Kalman filter separating out latitude, longitude and altitude separately. That is, in block 4802, an initial latitude $X_0$ and an initial covariance $P_0$ are provided as a pair, an initial longitude $Y_0$ and an initial covariance $P_0$ are provided as a pair and an initial altitude $Y_0$ and an initial covariance $P_0$ are provided as a pair. Preferably the method is run such that the latitude, longitude, and altitude components are processed in parallel, i.e. at the same time.

In box 4804, a determination is made as to whether all four of the inputs are available for trilateration. If the answer is "No," then the system pauses to gather the missing inputs, block 4706. After a suitable amount of time, another determination is made as illustrated in block 4802 to determine whether all 4 inputs are now available for trilateration.

If all of the inputs are available, then the Q and R matrices of the Kalman algorithm are determined in block 4808, where "R" is a matrix representing the variance of the measurements and "Q" is a covariance matrix. Corresponding to the method illustrated in FIG. 47, the latitude, longitude and altitude at time k−1 are calculated, block 4810 followed by calculation of the Kalman gain, block 4812.

In block 4812, the Kalman gain is computed separately for the latitude, longitude and altitude. Similarly to the method illustrated in FIG. 47, in block 4814, the system waits for a timer to expire before moving to the next iteration.

Figure 49:
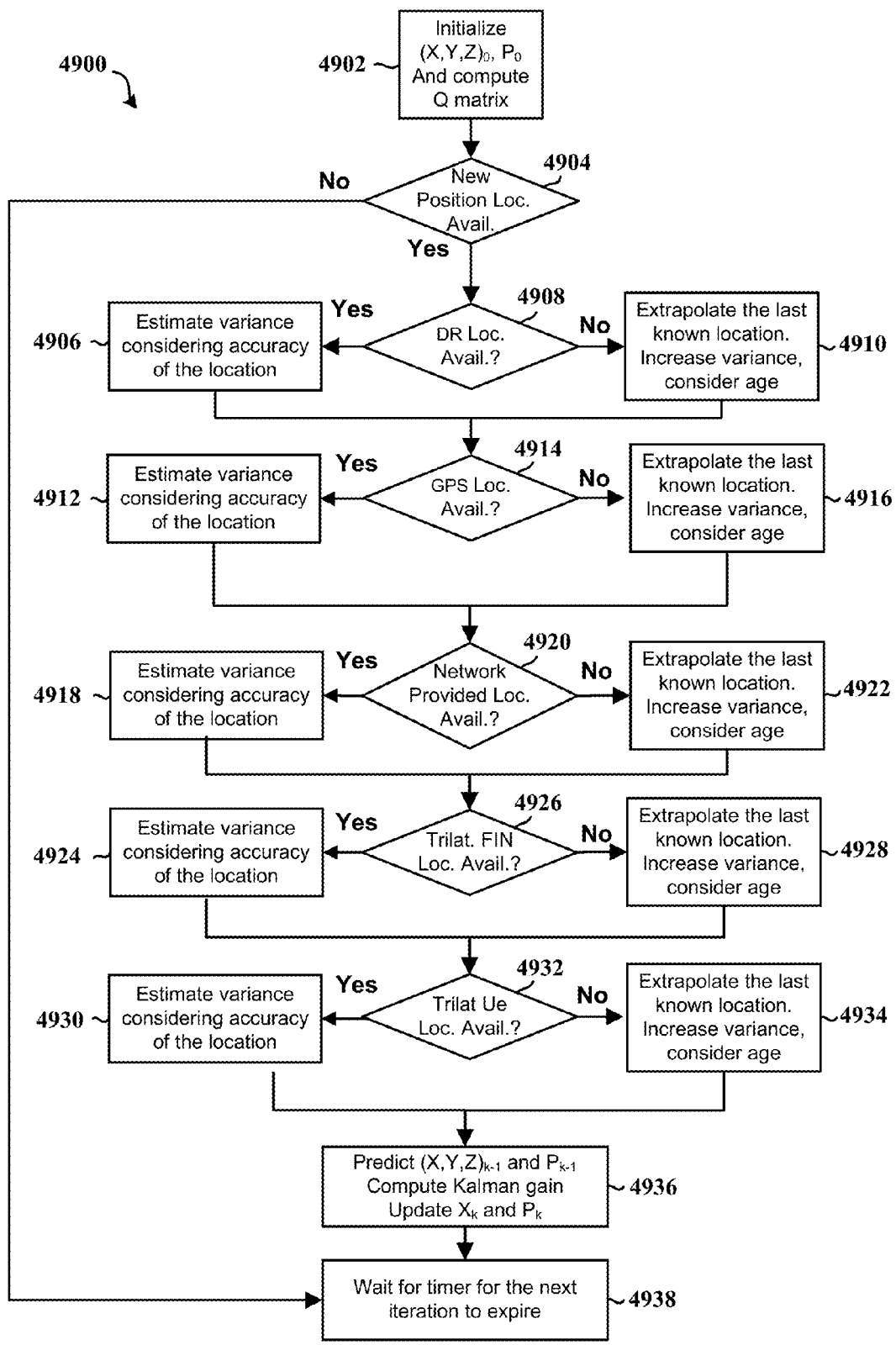
FIGS. 49 and 50 are process flow diagrams illustrating methods of using a three-dimensional eLBS Kalman filter for computing a final determination values (e.g. a waypoint value) for a fixed infrastructure node (FIN) or a fix infrastructure device (FID) in accordance with the various embodiments.

FIG. 49 depicts a method 4900 using a 3D eLBS Kalman filter process flow used for final determination of the FIN's latitude, longitude and altitude position using all the available sources that the eLBS algorithm has available to it. In block 4902, the initial latitude $X_0$, longitude $Y_0$, altitude $Z_0$ and the initial covariance $P_0$ are provided. In addition, the covariance matrix is calculated. In block 4904, a determination is made as to whether new position location information is available. If the determination is "No", then the system weights until the next iteration to expire. However, if new position location information is available, then the system determines if additional dead reckoning location information is available in block 4908. If no additional dead reckoning location information is available, then the system extrapolates the last known location and increases the variance considering the age of the location data in block 4910. If additional dead reckoning location information is available, then an estimate of the variance is made considering the accuracy of the location in block 4906.

Then, the system determines if any new GPS location data is available in block 4914. If new GPS location data is available, then an estimate of the variance is made considering the accuracy of the location in block 4912. If no new GPS location data is available, then the extrapolation is made based on the last known location, block 4916. Additionally the variance is increased considering the age of the location data.

Next, the system considers network provided location data in block 4918. If data is available, then an estimate of the variance is made considering the accuracy of the location in block 4918. If no network data is available, then the extrapolation of the last known location is made, block 4922. Additionally, the variances increased considering the age of the data. Next a determination is made as to whether there is additional trilateration FIN location data available in block 4926. If data is available, then an estimate of the variance is made considering the accuracy of the location in block 4924. If no network data is available, then the extrapolation of the last known location is made, block 4928. Additionally, the variances are increased considering the age of the data.

Next, the system determines if there is an additional trilateration data from mobile devices available in block 4932. If so, then an estimate of the variance is made considering the accuracy of the location in block 4930. If the answer is "No", then the location is extrapolated based on the last known location in block 4934. In addition, the variance is increased considering the age of the information.

All of the above additional location information is then used to predict a new location $(X,Y,Z)_{k-1}$ and a new variance $P_{k-1}$ in box 4936. In addition, the Kalman gain is calculated. Then, the system waits for the next time iteration to expire in block 4938.

Figure 50:
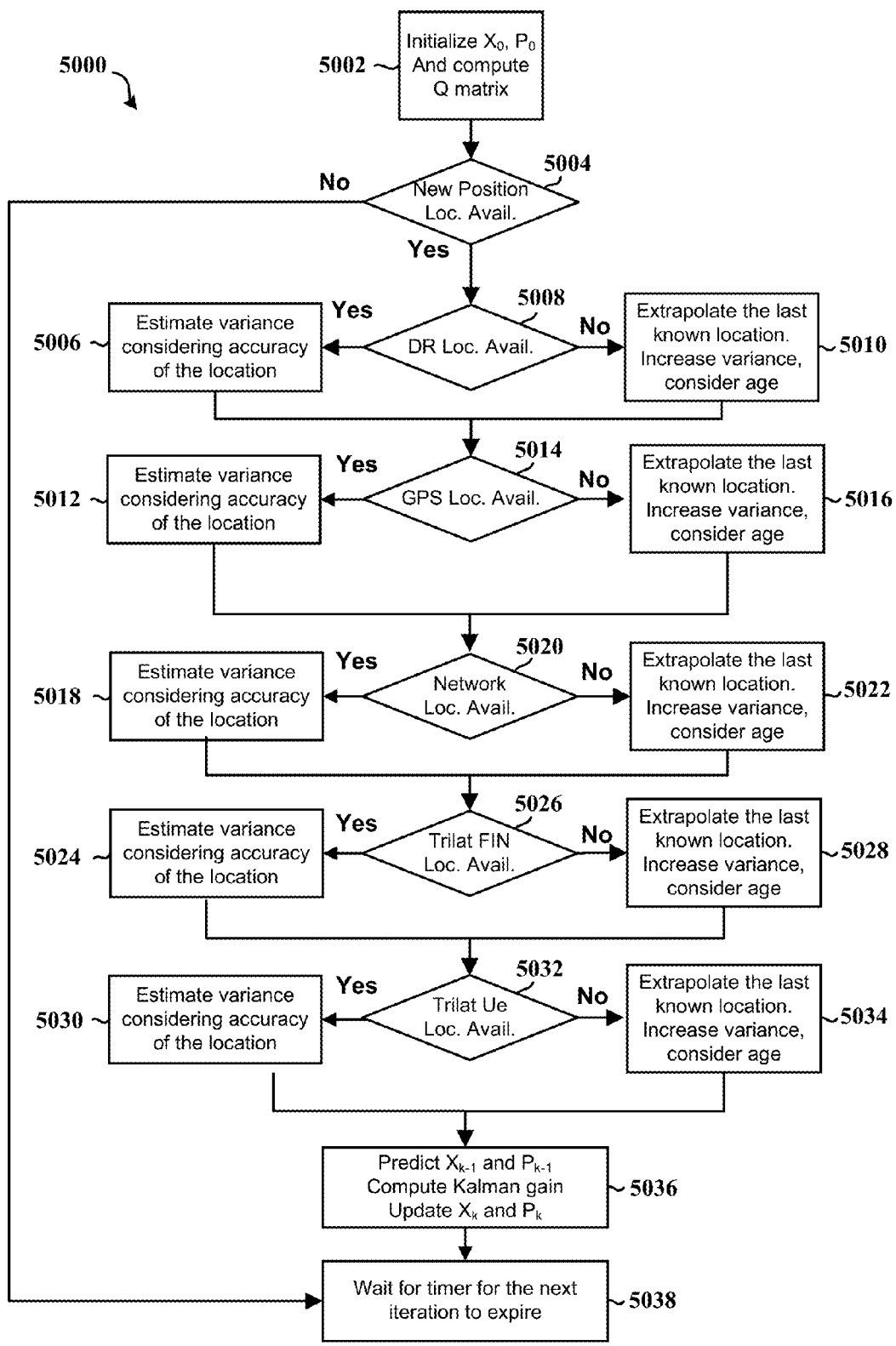

FIG. 50 is similar to that depicted in FIG. 49 for establishing the final determination of the FIN. However, the process involves a single axis calculation where latitude is calculated separately than longitude and altitude. The three outputs are then combined for a composite latitude, longitude and altitude position for the FIN.

In block 5002, the initial latitude $X_0$, and the initial covariance $P_0$ are provided. In addition, the covariance matrix is calculated. In block 5004, a determination is made as to whether new position location information is available. If the determination is "No", then the system weights until the next iteration to expire. However, if new position location information is available, then the system determines if additional dead reckoning location information is available in block 5008. If no additional dead reckoning location information is available, then the system extrapolates the last known location and increases the variance considering the age of the location data in block 5010. If additional dead reckoning location information is available, then an estimate of the variance is made considering the accuracy of the location in block 5006.

Then, the system determines if any new GPS location data is available in block 5014. If new GPS location data is available, then an estimate of the variance is made considering the accuracy of the location in block 5012. If no new GPS location data is available, then the extrapolation is made based on the last known location, block 5016. Additionally the variance is increased considering the age of the location data.

Next, the system considers network provided location data in block 5018. If data is available, then an estimate of the variance is made considering the accuracy of the location in block 5018. If no network data is available, then the extrapolation of the last known location is made, block 5022. Additionally, the variances increased considering the age of the data. Next a determination is made as to whether there is additional trilateration FIN location data available in block 5026. If data is available, then an estimate of the variance is made considering the accuracy of the location in block 5024. If no network data is available, then the extrapolation of the last known location is made, block 5028. Additionally, the variances are increased considering the age of the data.

Next, the system determines if there is an additional trilateration data from mobile devices available in block 5032. If so, then an estimate of the variance is made considering the accuracy of the location in block 5030. If the answer is "No", then the location is extrapolated based on the last known location in block 5034. In addition the variance is increased considering the age of the information.

All of the above additional location information is then used to predict a new latitude location $X_{k-1}$ and a new variance $P_{k-1}$ in box 5036. In addition, the Kalman gain is calculated. Similar calculation are performed for longitude and altitude. Then, the system waits for the next time iteration to expire in block 5038.

An embodiment is drawn to a method of performing trilateration for fixed infrastructure nodes (FIN) using enhanced location based positions (location information) with wireless devices. The method includes using multiple inputs from a plurality of devices to assist in initial fix and subsequent improvements for the fixed nodes' location determination involving latitude, longitude and altitude. Another embodiment is drawn to a computing device including a processor configured with processor-executable instructions to perform operations recited above. Another embodiment includes a computing device including means for performing functions of the operations recited above. An embodiment is drawn to a non-transitory processor-readable storage medium having stored thereon processor-executable instructions to cause a processor to perform operations recited above.

An embodiment is drawn to a method of performing trilateration for fixed infrastructure nodes (FIN) using enhanced location based positions (location information) with wireless devices. The method includes initializing X, Y, Z and P0 values, determining whether all four inputs (e.g., X, Y, Z and P0) are available for trilateration and computing Q and R matrices. The method also includes predicting (X, Y, Z)k-1 and Pk-1 values, computing Kalman gain and updating (X,Y,Z)k and Pk values. Another embodiment includes a computing device having a processor configured with processor-executable instructions to perform operations recited above. Another embodiment includes a computing device including means for performing functions of the operations recited above. Another embodiment includes a non-transitory processor-readable storage medium having stored thereon processor-executable instructions to cause a processor to perform operations recited above.

An embodiment is drawn to method of performing trilateration for fixed infrastructure nodes (FIN) using enhanced location based positions (location information) with wireless devices. The method includes initializing X0 and P0 values, determining whether all four inputs are available for trilateration and computing Q and R matrices. The method also includes predicting Xk−1 and Pk−1 values, computing Kalman gain and updating Xk and Pk values. In an embodiment, the method further includes determining whether new location information is available, such as whether DR location information is available, GPS location information is available, Network Provided location information is available, Trilateration FIN location information is available, Trilateration Ue location information is available. The method also includes estimating a variance considering accuracy of the location in response to determining new location information is available (e.g., in response to determining that new DR location information is available, new GPS location information is available, new Network Provided location information is available, new Trilateration FIN location information is available, new Trilateration Ue location information is available, etc.). The method also includes extrapolating the last known location and increasing variance, considering the age of the location, in response to determining new location information is not available (e.g., in response to determining that the new location information is not DR location information is available, is not GPS location information, is not Network Provided location information, is not Trilateration FIN location information, is not Trilateration Ue location information, etc.). An embodiment is drawn to a computing device including a processor configured with processor-executable instructions to perform operations recited above. Another embodiment is drawn to a computing device, comprising means for performing functions of the operations recited above. An embodiment is drawn to a non-transitory processor-readable storage medium having stored thereon processor-executable instructions to cause a processor to perform operations recited above.

An embodiment is drawn to a method of providing a location based service in a fixed wireless device. The embodiment includes determining via a processor of a fixed wireless device whether information obtained via a geospatial system of the fixed wireless device is accurate and collecting location information from a plurality of fixed wireless devices in a communication group in response to determining that the information obtained via the geospatial system of the fixed wireless device is not accurate. The embodiment also includes computing more precise location information for the fixed wireless device based on the location information collected from the plurality of fixed wireless devices, the more precise location information including three-dimensional location and position information and using the generated location and position information to provide the location based service. In an embodiment, a fixed wireless device sends GPS timing information to another fixed wireless device. In another embodiment, mobile devices provide three-dimensional location and position information to a fixed wireless device.

In an embodiment, a fixed wireless device relays three-dimensional location and position information from another fixed wireless device. In an embodiment, a communication group providing three-dimensional location and position information comprises of both fixed and mobile wireless devices. In an embodiment, an in network based location server provides three-dimensional location and position information. In an embodiment, a network based location server provides three-dimensional location and position information in addition to other fixed and mobile wireless devices. In an embodiment, the fixed wireless device is a fixed infrastructure device, such as a small cell device, a femto cell device, or a beacon device that has GPS capabilities.

In an embodiment, the fixed wireless device further comprises a sensor hub comprising at least one of an accelerometer, a 2 or 3 axis gyro, a compass, an altimeter or a GPS transceiver. Another embodiment is drawn to a computing device including a processors configured with processor-executable instructions to perform operations recited in any of the processes recited above. Another embodiment is drawn to a computing device including means for performing functions of the operations recited in any of the processes discussed above. Another embodiment is drawn to a non-transitory processor-readable storage medium having stored thereon processor-executable instructions to cause a processor to perform operations recited in any of the processes discussed above.

An embodiment is drawn to a method of performing trilateration for fixed infrastructure nodes (FIN) using enhanced location based positions (location information) with wireless devices. The method includes, using multiple inputs from a plurality of devices to assist in initial fix and subsequent improvements for the fixed nodes' location determination involving latitude, longitude and altitude. The multiple inputs comprise inputs from one or more of a global position system (GPS), a network provided location based services (LBS), a mobile device LBS, a dead reckoning or external devices. The dead reckoning input comprises dead reckoning position data collected during an initial positioning of the FIN.

In an embodiment, the external devices are active devices. In an embodiment, the external devices are passive devices. In an embodiment, the trilateration process comprises determining a new position based on initial latitude (X), longitude (Y), altitude (Z), changes in latitude ($\Delta X$), longitude ($\Delta Y$), altitude ($\Delta Z$), confidence values ($C_x$, $C_y$, $C_z$) and a time value $\Delta t$. In an embodiment, the method includes initializing X, Y, Z and P0 values, determining whether all four inputs (e.g., X, Y, Z and P0) are available for trilateration and computing Q and R matrices. The method also includes predicting (X, Y, Z)k−1 and Pk−1 values, computing Kalman gain and updating (X,Y,Z)k and Pk values. The P0 values and Pk−1 values are covariance and the Q and R matrices are associated with the kalman filter.

In an embodiment, the trilateration process generates three-dimensional vectors. In an embodiment, the method further includes ranking the multiple inputs based on the confidence values. In an embodiment, inputs having confidence values below a predetermined threshold are discarded. In an embodiment, the trilateration process uses a kalman filter. In an embodiment, the trilateration process uses at least three points to make a positional determination. In an embodiment, the trilateration process is performed iteratively.

In an embodiment, the inputs are provided from at least one mobile device and include time and range information.

In an embodiment, providing range information includes sending a request from the FIN to the mobile device for position information, receiving from the mobile device position information and a time the mobile device took from receiving the request to when the position information was transmitted to the FIN and subtracting the time the mobile device took from receiving the request to when the position information was transmitted to the FIN from a total elapse time from sending the request for position updates to receiving the position information.

An embodiment of the method further includes determining whether new location information is available, estimating a variance considering accuracy of the location in response to determining new location information is available and extrapolating a last known location and increasing variance, considering the age of the location, in response to determining new location information is not available. In an embodiment, the multiple inputs from the global position system (GPS), the network provided location based services (LBS), the mobile device LBS, the dead reckoning or the external devices is processed sequentially. In an embodiment, the multiple inputs from the global position system (GPS), the network provided location based services (LBS), the mobile device LBS, the dead reckoning or the external devices is processed simultaneously.

In an embodiment, if the new position is different from the previously reported location position by a threshold value in any axis, the trilateration process is continued. In an embodiment, the threshold value is in a range of 1-5%. In an embodiment, the multiple inputs include angle of arrival (AOA) information. In an embodiment, the network provided location based services comprises a multiple input, multiple output (MIMO) configuration.

Some embodiments may include methods of providing a location based service on a first fixed wireless device, which may include determining whether the first fixed wireless device is able to establish a location fix based on information obtained via a geospatial system, collecting location information from a communication group in response to determining the first fixed wireless device is unable to establish a location fix, in which the communication group includes at least a second wireless device, computing a new three-dimensional location fix for the first fixed wireless device based on the location information collected from the communication group, the new location information including three-dimensional location and position information, and providing location based service based on the new three-dimensional location fix.

In an embodiment, collecting location information from the communication group may include receiving GPS timing information from a second wireless device in the communication group. In a further embodiment, the second wireless device may be a fixed wireless device. In another embodiment, the second wireless device may be a mobile wireless device.

In a further embodiment, collecting location information from the communication group may include receiving, by the first fixed wireless device, location information from a first member of the communication group that was forwarded to the first member from a second member of the communication group. In a further embodiment, collecting location information from the communication group may include receiving, by the first fixed wireless device, location information that was forwarded by the first member of the communication group from a fixed wireless device (or a mobile wireless device) that is outside of the communication group.

In a further embodiment, collecting location information may further include collecting three-dimensional location information from a network based location server. In a further embodiment, determining whether the first fixed wireless device is able to establish a location fix based on information obtained via a geospatial system may include determining whether a fixed infrastructure device (e.g., a cell tower antenna, an eNodeB, a small cell device, a femto cell device, a WiFi access node, a beacon device, etc.) is able to establish a location fix based on information obtained via a geospatial system. In some embodiments, the first fixed wireless device includes the geospatial system. In other embodiments, the first fixed wireless device does not include the geospatial system.

In a further embodiment, the method may include determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further embodiment, the method may include establishing a first connection to a data network, in which the first connection is not a cellular data uplink transmission path, obtaining location information for a current location of the first fixed wireless device via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further embodiment, the method may include collecting location information from a plurality of mobile devices in a communication group, computing more precise location information (or a waypoint) based on the location information collected from the plurality of mobile devices, and using the generated location and position information to provide the location based service, in which computing the more precise location information includes using horizontal data to determine a position relative to the Earth's surface, using vertical data to determine a height of the position relative to sea level, and generating three-dimensional information based on the determined position and the determined height.

Further embodiments may include a first fixed wireless device that includes a processor configured with processor-executable instructions to perform operations that include determining whether the first fixed wireless device is able to establish a location fix based on information obtained via a geospatial system, collecting location information from a communication group in response to determining the first fixed wireless device is unable to establish a location fix, in which the communication group includes at least a second wireless device, computing a new three-dimensional location fix for the first fixed wireless device based on the location information collected from the communication group, the new location information including three-dimensional location and position information, and providing location based service based on the new three-dimensional location fix.

In an embodiment, the processor may be configured with processor-executable instructions to perform operations such that collecting location information from the communication group includes receiving GPS timing information by the first fixed wireless device from the at least a second wireless device. In an embodiment, the processor may be configured with processor-executable instructions to perform operations such that collecting location information from the communication group includes collecting location information from a second wireless device in the communication group. In an embodiment, the processor may be configured with processor-executable instructions to perform operations such that collecting location information from the communication group includes collecting location information from a fixed wireless device. In an embodiment, the processor may be configured with processor-executable instructions to perform operations such that collecting location information from the communication group includes collecting location information from a mobile wireless device.

In a further embodiment, the processor may be configured with processor-executable instructions to perform operations such that collecting location information from the communication group includes receiving by the first fixed wireless device location information that was forwarded by a first member of the communication group from a second member of the communication group. In a further embodiment, the processor may be configured with processor-executable instructions to perform operations such that collecting location information from the communication group includes receiving, by the first fixed wireless device, location information that was forwarded by the first member of the communication group from a fixed wireless device or a mobile wireless device that is outside of the communication group. In a further embodiment, the processor may be configured with processor-executable instructions to perform operations such that collecting location information further includes collecting a three-dimensional location information from a network based location server.

In a further embodiment, the processor may be configured with processor-executable instructions to perform operations such that collecting location information from the communication group includes receiving location information in a fixed infrastructure device (e.g., a cell tower antenna, an eNodeB, a small cell device, a femto cell device, a WiFi access node, a beacon device, etc.) In a further embodiment, the processor may be configured with processor-executable instructions to perform operations such that determining whether the first fixed wireless device is able to establish a location fix based on information obtained via a geospatial system includes determining whether a fixed infrastructure device (e.g., a cell tower antenna, an eNodeB, a small cell device, a femto cell device, a WiFi access node, a beacon device, etc.) is able to establish a location fix based on information obtained via a geospatial system.

In a further embodiment, the processor may be configured with processor-executable instructions to perform operations further including determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further embodiment, the processor may be configured with processor-executable instructions to perform operations further including establishing a first connection to a data network, in which the first connection is not a cellular data uplink transmission path, obtaining location information for a current location of the first fixed wireless device via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further embodiment, the processor may be configured with processor-executable instructions to perform operations further including collecting location information from a plurality of mobile devices in a communication group, computing more precise location information (or a waypoint) based on the location information collected from the plurality of mobile devices, and using the generated location and position information to provide the location based service, in which computing the more precise location information includes using horizontal data to determine a position relative to the Earth's surface, using vertical data to determine a height of the position relative to sea level, and generating three-dimensional information based on the determined position and the determined height. Further embodiments include a non-transitory server-readable storage medium having stored thereon processor-executable instructions configured cause a first fixed wireless device to perform operations that include determining whether the first fixed wireless device is able to establish a location fix based on information obtained via a geospatial system, collecting location information from a communication group in response to determining the first fixed wireless device is unable to establish a location fix, in which the communication group includes at least a second wireless device, computing a new three-dimensional location fix for the first fixed wireless device based on the location information collected from the communication group, the new location information including three-dimensional location and position information, and providing location based service based on the new three-dimensional location fix. In an embodiment, the stored processor-executable instructions may be configured to cause a processor to perform operations such that collecting location information from the communication group includes receiving GPS timing information by the first fixed wireless device from the at least a second wireless device.

In a further embodiment, the stored processor-executable instructions may be configured to cause a processor to perform operations such that collecting location information from a communication group includes collecting information from a second wireless device in the communication group, the second wireless device being fixed wireless device or a mobile wireless device.

In a further embodiment, the stored processor-executable instructions may be configured to cause a processor to perform operations such that collecting location information from the communication group includes receiving by the first fixed wireless device location information that was forwarded by a first member of the communication group from a second member of the communication group. In a further embodiment, the stored processor-executable instructions may be configured to cause a processor to perform operations such that collecting location information from the communication group includes receiving, by the first fixed wireless device, location information that was forwarded by the first member of the communication group from a fixed wireless device or a mobile wireless device that is outside of the communication group. In a further embodiment, the stored processor-executable instructions may be configured to cause a processor to perform operations such that collecting location information further includes collecting a three-dimensional location information from a network based location server.

In a further embodiment, the stored processor-executable instructions may be configured to cause a processor to perform operations such that determining whether the first fixed wireless device is able to establish a location fix based on information obtained via a geospatial system includes determining whether a fixed infrastructure device (e.g., a cell tower antenna, an eNodeB, a small cell device, a femto cell device, a WiFi access node, a beacon device, etc.) is able to establish a location fix based on information obtained via a geospatial system. In a further embodiment, the stored processor-executable instructions may be configured to cause a processor to perform operations that further include determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further embodiment, the stored processor-executable instructions may be configured to cause a processor to perform operations that further include establishing a first connection to a data network, in which the first connection is not a cellular data uplink transmission path, obtaining location information for a current location of the first fixed wireless device via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further embodiment, the stored processor-executable instructions may be configured to cause a processor to perform operations that further include collecting location information from a plurality of mobile devices in a communication group, computing more precise location information (or a waypoint) based on the location information collected from the plurality of mobile devices, and using the generated location and position information to provide the location based service, in which computing the more precise location information includes using horizontal data to determine a position relative to the Earth's surface, using vertical data to determine a height of the position relative to sea level, and generating three-dimensional information based on the determined position and the determined height.

The various embodiments may also include methods of determining a location of a mobile device via enhanced location based trilateration, the method including receiving, via a processor of the mobile device, location information from one or more external devices, the received location information including a waypoint from each of the one or more external devices, each waypoint including a coordinate value, an altitude value and a range value, the range value identifying a distance from a external device to the mobile device, determining the validity of each of the received waypoints, performing normalization operations to normalize the received valid waypoints, assigning an overall ranking to each of the normalized waypoints, assigning an device-specific ranking to each of the normalized waypoints, and storing the normalized waypoints in memory, selecting four waypoints from memory based on a combination of the overall ranking and the device-specific ranking associated with each waypoint, applying the four selected waypoints to a kalman filter to generate a final location waypoint, and using the generated final location waypoint to provide a location based service.

In an embodiment, receiving location information from one or more external devices may include receiving location information from one or more of a mobile device, a device having a Cell ID, a WiFi device, a Bluetooth device, an RFID device, a GPS device, a location beacon transmitting device, and external trilateration location information. In a further embodiment, determining the validity of each of the received waypoints may include determining a range value for each waypoint included in the received location information, and determining the validity of each of the received waypoints based on its corresponding range value. In a further embodiment, determining the validity of each of the received waypoints may include determining a confidence value for each waypoint included in the received location information, and determining the validity of each of the received waypoints based on its corresponding confidence value. In a further embodiment, receiving location information from one or more external devices may include establishing communication links to each of a plurality of external devices in a communication group, and receiving location information from only the external devices in the communication group.

In a further embodiment, selecting four waypoints from memory based on a combination of the overall ranking and the device-specific ranking associated with each waypoint may include selecting one of the waypoints included in the received location information and three previously generated waypoints from the memory. In a further embodiment, selecting four waypoints from memory based on a combination of the overall ranking and the device-specific ranking associated with each waypoint may include selecting two of the waypoints included in the received location information and two previously generated waypoints from the memory. In a further embodiment, selecting four waypoints from memory based on a combination of the overall ranking and the device-specific ranking associated with each waypoint may include selecting three of the waypoints included in the received location information and one previously generated waypoints from the memory.

The various embodiments may also include methods, and mobile computing devices configured to implement the methods, of determining a location of a mobile device. The methods may include determining an approximate location of the mobile device, grouping the mobile device with a wireless transceiver in proximity to the mobile device to form a communication group, sending the determined approximate location of the mobile device to the wireless transceiver, receiving on the mobile device location information from the wireless transceiver, and determining a more precise location of the mobile device based on the location information received from the wireless transceiver. As part of determining its approximate location, the mobile device may estimate its position and/or generate a position estimate. It could be beneficial for these position estimates to include latitude, longitude and elevation information that is accurate to within one (1) meter (and many times within one meter accuracy).

In some embodiments, the mobile device may be equipped with a "sensor fusion" system/component. The sensor fusion component may be configured to collect and use information from sensors in the mobile device to further improve the location position determinations. As such, the sensor fusion component may allow the device to better determine its approximate location and/or to generate a better position estimate (e.g., a more precise value, more accurate coordinates, etc.).

In further embodiments, the mobile device may be configured to receive (e.g., via an antenna coupled to one or more of its processors, etc.) location information from a multitude of external devices, and use this information to better determine its approximate location and/or to generate a better position estimate (e.g., a more precise value, more accurate coordinates, etc.).

In some embodiments, the mobile device may be configured to receive the location information was waypoints. A waypoint may be an information structure that includes one or more information fields, component vectors, location information, position information, coordinate information, etc. In some embodiments, each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding external device. The timestamp may identify the time that the location was determined/captured. The range value may identify a distance between the external device and the mobile device. In some embodiments, a waypoint may also be, or may include, a location estimate value, a location set, or any other similar location information suitable for adequately conveying or communicating location information.

In an embodiment, the mobile device may be configured to receive location information in the form of a first waypoint from a first external device, a second waypoint from a second external device, a third waypoint from a third external device, and a fourth waypoint from a forth external device. The mobile device may use any combination of the received waypoints (e.g., first through fourth waypoints) in conjunction with stored and historical information (e.g., previously computed waypoints, movement information, etc.) to determine or compute its approximate and/or more precise location with a high degree of accuracy.

In some embodiments, the mobile device may be configured to perform advanced location based operations (e.g., advanced sensor fusion operations) to generate location information (e.g., a location estimate set/value), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value). In some embodiments, the mobile device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the mobile device may be configured to also compute a precision value that identifies, or which is indicative of, the repeatability factor of the computation/measurements over multiple measurements. The precision value may be used to determine how often the device reports the same position/location (i.e., based on evaluating multiple reports indicating that the device has not moved more than X meters, etc.), which may be used to determine the precision of the measurement (e.g., within 1 meter, etc.). The precision value may also be used to determine the likelihood that repeating the computation (e.g., using the same inputs or input sources) will result in substantially the same values.

Further embodiments may include a computing device having a processor configured with processor-executable instructions to perform various operations corresponding to the methods discussed in this application.

Further embodiments may include a computing device having various means for performing functions corresponding to the method operations discussed in this application.

Further embodiments may include a non-transitory processor-readable storage medium having stored thereon processor-executable instructions configured to cause a processor to perform various operations corresponding to the method operations discussed in this application.

Figure 51:
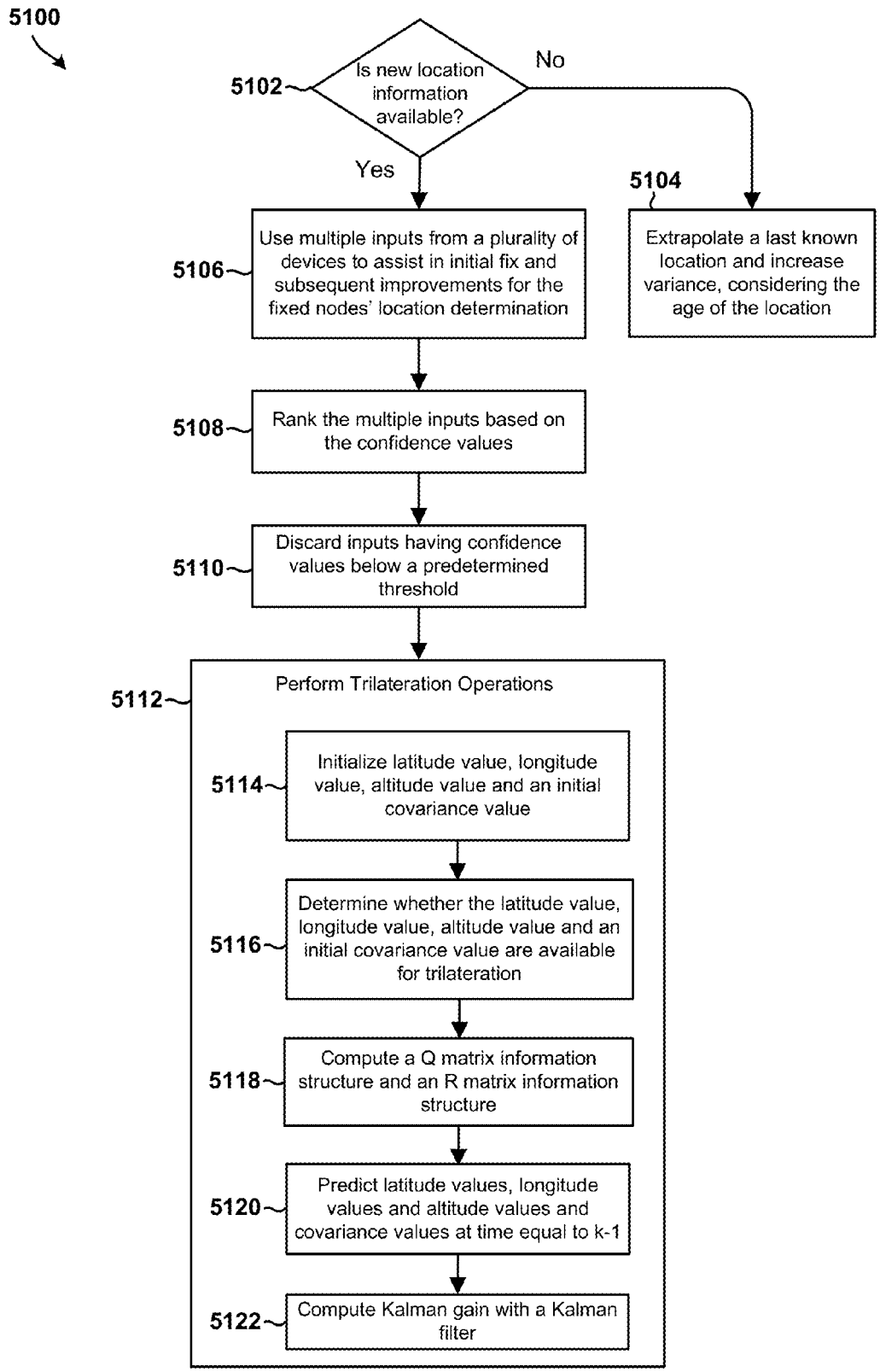
FIG. 51 is a process flow diagram illustrating a method of performing trilateration for a FIN using enhanced location based positions with wireless devices in accordance with an embodiment.

FIG. 51 illustrates a method 5100 of performing trilateration for a fixed infrastructure node (FIN) using enhanced location based information in accordance with an embodiment. Method 5100 may be performed via a processor in a computing device or via a processor of the fixed infrastructure node (FIN). In determination block 5102, the processor may determine whether new location information is available. In response to determining that new location information is not available (i.e., determination block 5102="No"), in block 5104 the processor may extrapolate a last known location and increase variance, considering the age of the location. For example, in block 5104, the processor may extrapolate the last known location value and increase a variance value based on the age of previously generated (updated) location information or stored waypoints.

In response to determining that new location information is not available (i.e., determination block 5102="No"), in block 5106 the processor may use multiple inputs from a plurality of devices to assist in initial fix and subsequent improvements for the fixed nodes' location determination. For example, the processor may continuously or repeatedly receive a plurality of inputs from a plurality of devices, such as a global position system (GPS) data input, a network provided location based service (LBS) data input, a mobile device LBS data input, a dead reckoning data input collected during an initial positioning of the FIN, and/or an external device data input. In response, the processor may generate an initial positional fix, and set its current waypoint based the initial positional fix. The processor may use the received plurality of inputs to generate updated location information for the FIN, and update its current waypoint based on the generated updated location information.

In block 5108, the processor may determine or identify a confidence value for each input (or each waypoint included in the received plurality of inputs), and rank the inputs based on the confidence values. In block 5110, the processor may discard those inputs having confidence values that are below a predetermined threshold. For example, the processor may compare each determined confidence value to a threshold value, and discard each input (or waypoint) that is associated with a confidence value that does not exceed (e.g., is greater than, is less than, etc.) the threshold value. In some embodiments, the processor may discard the value prior to using the received plurality of inputs to generate updated location information (e.g., in the next iteration) for the FIN.

In block 5112, the processor may perform trilateration operations. The trilateration operations may include determining a new position based on initial latitude (X), longitude (Y), altitude (Z), changes in latitude ($\Delta X$), longitude ($\Delta Y$), altitude ($\Delta Z$), confidence values (Cx, Cy, Cz) and a time value $\Delta t$. The trilateration operations may also include initializing X, Y, Z and P0 values, determining whether all four inputs (e.g., X, Y, Z and P0) are available for trilateration, computing Q and R matrices, predicting (X, Y, Z)k−1 and Pk−1 values, computing Kalman gain, and updating (X,Y,Z)k and Pk values. In some embodiments, the P0 values and Pk−1 values may be covariance values. In some embodiments, Q and R matrices may be associated with the kalman filter. For example, as part of the trilateration operations in block 5112, the processor may determine an initial latitude value (X), an initial longitude value (Y), an initial altitude value (Z), a change in latitude value ($\Delta X$), a change in longitude value ($\Delta Y$), a change in altitude value ($\Delta Z$), confidence values (Cx, Cy, Cz), and a time value ($\Delta t$). The processor may generate a Q matrix information structure (e.g., a multidimensional array that represents the Q matrix) based on a Kalman filter, generate an R matrix information structure based on the Kalman filter, determine or predicting an updated coordinate value, determine a covariance value, use the Kalman filter to compute a Kalman gain, and update the current waypoint based on the Kalman gain.

In some embodiments, as part of the trilateration operations in block 5112, the processor may initialize latitude value, longitude value, altitude value and an initial covariance value in block 5114. In block 5116, the processor may determine whether latitude value, longitude value, altitude value and an initial covariance value are available for trilateration. In block 5118, the processor may compute a Q matrix information structure and an R matrix information structure. In block 5120, the processor may predict latitude values, longitude values and altitude values and covariance values at time equal to k−1. In block 5122, the processor may compute Kalman gain with a Kalman filter.

Figure 52:
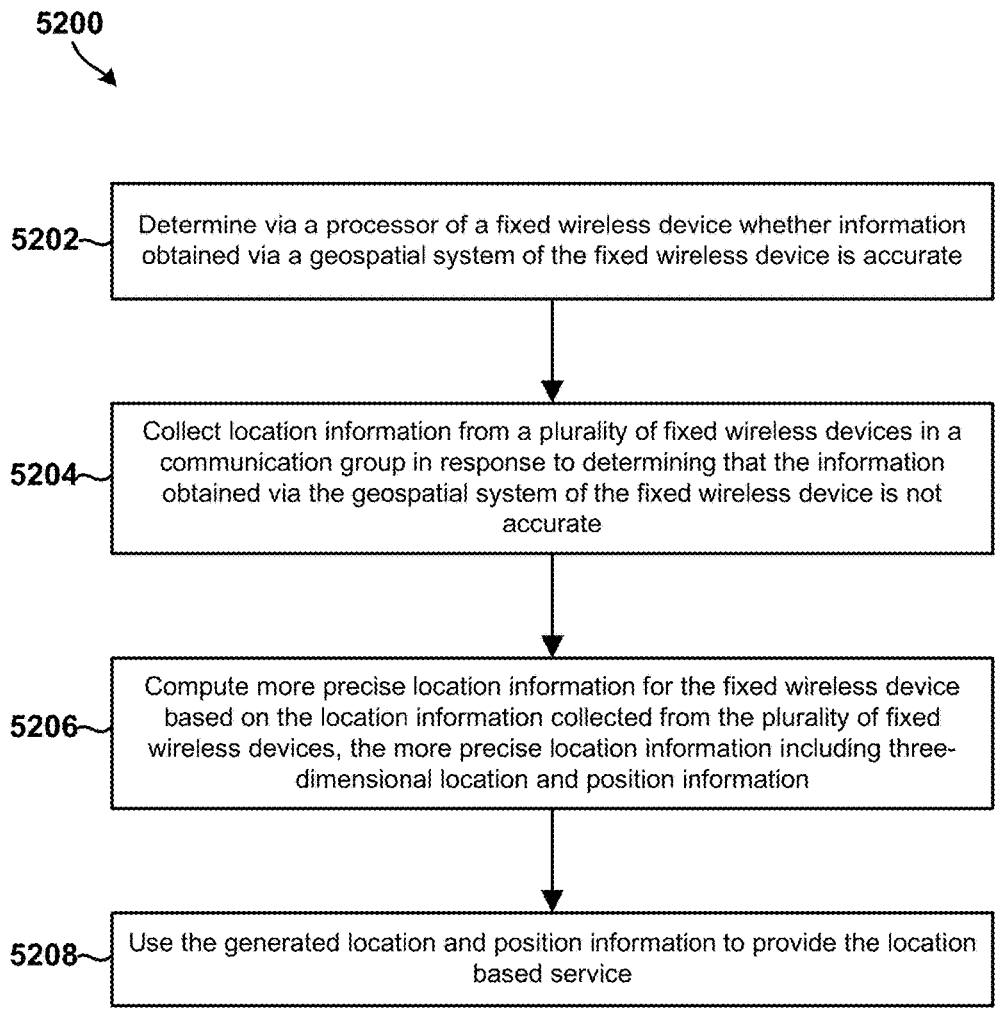
FIG. 52 is a process flow diagram illustrating a method of providing a location based service in a fixed wireless device in accordance with an embodiment.

FIG. 52 illustrates a method 5200 of providing a location based service in a fixed wireless device in accordance with an embodiment. Method 5200 may be performed via a processor in a computing device or via a processor of the fixed infrastructure node (FIN). In block 5202, the processor may determine via a processor of a fixed wireless device whether information obtained via a geospatial system of the fixed wireless device is accurate. In block 5204, the processor may collect location information from a plurality of fixed wireless devices in a communication group in response to determining that the information obtained via the geospatial system of the fixed wireless device is not accurate. In block 5206, the processor may compute more precise location information for the fixed wireless device based on the location information collected from the plurality of fixed wireless devices, the more precise location information including three-dimensional location and position information. In block 5208, the processor may use the generated location and position information to provide the location based service.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of performing trilateration for a fixed infrastructure node (FIN) using enhanced location based information, comprising:
   receiving, via a processor of a FIN device, a plurality of inputs from a plurality of devices, the received plurality of inputs including two or more of: a global position system (GPS) data input, a network provided location based service (LBS) data input, a mobile device LBS data input, a dead reckoning data input collected during an initial positioning of the FIN, and an external device data input;
   using the received plurality of inputs to generate an initial positional fix;
   setting a current waypoint of the FIN based the initial positional fix;
   using the received plurality of inputs to generate updated location information for the FIN; and
   updating the current waypoint based on the generated updated location information.

2. The method of claim 1, wherein receiving the plurality of inputs from the plurality of devices comprises receiving location information from one or more external devices, the received location information including a waypoint from each of the one or more external devices, each waypoint including a coordinate value, an altitude value and a range value, the range value identifying a distance from an external device to the mobile device.

3. The method of claim 2, further comprising:
   determining the validity of each of the received waypoints;
   performing normalization operations to normalize the received valid waypoints;
   assigning an overall ranking to each of the normalized waypoints;
   assigning a ranking to each of the normalized waypoints; and
   storing the normalized waypoints in memory.

4. The method of claim 3, wherein using the received plurality of inputs to generate updated location information for the FIN comprises:
   selecting at least three waypoints from memory based on the ranking associated with each waypoint; and
   applying the selected waypoints to a kalman filter to generate a final location waypoint.

5. The method of claim 1 further comprising using the current waypoint to provide a location based service.

6. The method of claim 1, wherein using the received plurality of inputs to generate the initial positional fix for the FIN comprises determining an initial latitude value (X), an initial longitude value (Y), and an initial altitude value (Z).

7. The method of claim 1, wherein receiving the plurality of inputs from the plurality of devices comprises receiving external device data from at least one passive device.

8. The method of claim 1, wherein receiving the plurality of inputs from the plurality of devices comprises receiving external device data from at least one active device.

9. The method of claim 1, further comprising determining:
   an initial latitude value (X);
   an initial longitude value (Y);
   an initial altitude value (Z);
   a change in latitude value ($\Delta X$);
   a change in longitude value ($\Delta Y$);
   a change in altitude value ($\Delta Z$);
   at least three confidence values ($C_x$, $C_y$, $C_z$); and
   a time value ($\Delta t$).

10. The method of claim 9, further comprising:
    generating a Q matrix information structure based on a Kalman filter;
    generating an R matrix information structure based on the Kalman filter;
    predicting an updated coordinate value;
    determining a covariance value;
    computing Kalman gain with the Kalman filter; and
    updating the current waypoint based on the Kalman gain.

11. The method of claim 1, further comprising:
    determining a confidence value for each waypoint included in the received plurality of inputs;
    comparing each determined confidence value to a threshold value; and
    discarding each input that is associated with a confidence value that does not exceed the threshold value prior to using the received plurality of inputs to generate updated location information for the FIN.

12. The method of claim 1, wherein:
    using the received plurality of inputs to generate updated location information for the FIN comprises applying waypoints included in the received plurality of inputs to a kalman filter to generate a final location waypoint; and
    updating the current waypoint based on the generated updated location information comprises setting the current waypoint equal to the final location waypoint.

13. The method of claim 12, wherein applying waypoints included in the received plurality of inputs to the kalman filter to generate the final location waypoint comprises:
    applying at least three waypoints to the kalman filter to generate the final location waypoint.

14. The method of claim 1, wherein receiving the plurality of inputs from the plurality of devices comprises receiving at least one waypoint from a mobile device that includes time and range information, the method further comprising:
    sending a request for position information from the FIN device to the mobile device;

receiving, via the processor, the requested position information and a time value identifying an amount of time between a first time that the mobile device received the request and a second time that the mobile device began transmission of the position information;

determining a total elapse time value; and subtracting the identified amount of time from the total elapse time.

15. The method of claim 1, further comprising:

determining whether new location information is available;

estimating a variance value base on an accuracy of the generated updated location information in response to determining that new location information is available; and extrapolating a last known location value and increasing the variance value based on an age of the generated updated location information in response to determining that new location information is not available.

16. The method of claim 1, wherein at least one input in the received plurality of inputs include:

information for determining an angle of arrival (AOA) value, time of arrival (TOA) value, or observed time difference of arrival (OTDOA) value; or network provided LBS data that includes multiple input multiple output (MIMO) configuration information.

17. The method of claim 1, further comprising:

determining whether information obtained via a geospatial system of the FIN is accurate;

collecting location information from a plurality of fixed wireless devices in a communication group in response to determining that the information obtained via the geospatial system is not accurate;

computing more precise location information for the FIN based on the location information collected from the plurality of fixed wireless devices, the more precise location information including three-dimensional location information; and using the generated location information to provide a location based service.

18. The method of claim 1, wherein further comprising:

determining a new position based on initial latitude value (X), longitude value (Y), altitude value (Z), changes in latitude value ($\Delta X$), longitude value ($\Delta Y$), altitude value ($\Delta Z$), confidence values ($C_x$, $C_y$, $C_z$) and a time value $\Delta t$;

initializing latitude value, longitude value, altitude value and an initial covariance value;

determining whether the latitude value, longitude value, altitude value and an initial covariance value are available for trilateration;

computing a Q matrix information structure and an R matrix information structure;

predicting latitude values, longitude values and altitude values and covariance values at time equal to k−1;

computing Kalman gain with a Kalman filter; and updating the latitude value, longitude value, altitude value and covariance value at time equal to k, wherein the Q and R matrix information structures are associated with the Kalman filter.

19. A fixed infrastructure node (FIN), comprising:

a processor configured with processor-executable instructions to perform operations comprising:

receiving a plurality of inputs from a plurality of devices, the received plurality of inputs including two or more of: a global position system (GPS) data input, a network provided location based service (LBS) data input, a mobile device LBS data input, a dead reckoning data input collected during an initial positioning of the FIN, and an external device data input;

using the received plurality of inputs to generate an initial positional fix;

setting a current waypoint of the FIN based the initial positional fix;

using the received plurality of inputs to generate updated location information for the FIN; and updating the current waypoint based on the generated updated location information.

20. A non-transitory computer readable storage medium having stored thereon processor-executable software instructions configured to cause a processor in a fixed infrastructure node (FIN) to perform operations for comprising:

receiving a plurality of inputs from a plurality of devices, the received plurality of inputs including two or more of: a global position system (GPS) data input, a network provided location based service (LBS) data input, a mobile device LBS data input, a dead reckoning data input collected during an initial positioning of the FIN, and an external device data input;

using the received plurality of inputs to generate an initial positional fix;

setting a current waypoint of the FIN based the initial positional fix;

using the received plurality of inputs to generate updated location information for the FIN; and updating the current waypoint based on the generated updated location information.

* * * * *